US012516475B2

(12) United States Patent
Young et al.

(10) Patent No.: US 12,516,475 B2
(45) Date of Patent: Jan. 6, 2026

(54) SOFT SANITARY TISSUE PRODUCTS COMPRISING NON-WOOD FIBERS

(71) Applicant: The Procter & Gamble Company, Cincinnati, OH (US)

(72) Inventors: Christopher Michael Young, Loveland, OH (US); Jeffrey Glen Sheehan, Symmes Township, OH (US); Kathryn Christian Kien, Cincinnati, OH (US); Ward William Ostendorf, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 237 days.

(21) Appl. No.: 18/131,383

(22) Filed: Apr. 6, 2023

(65) Prior Publication Data

US 2023/0323604 A1   Oct. 12, 2023

Related U.S. Application Data

(60) Provisional application No. 63/456,020, filed on Mar. 31, 2023, provisional application No. 63/353,183, (Continued)

(51) Int. Cl.
*D21H 27/00* (2006.01)
*A47K 10/16* (2006.01)
(Continued)

(52) U.S. Cl.
CPC ........... *D21H 27/005* (2013.01); *A47K 10/16* (2013.01); *D21H 11/12* (2013.01); *D21H 17/26* (2013.01); *D21H 21/10* (2013.01); *D21H 21/20* (2013.01); *D21H 27/002* (2013.01); *D21H 27/004* (2013.01); *D21H 27/02* (2013.01); *D21H 27/30* (2013.01); *D21H 27/40* (2013.01)

(58) Field of Classification Search
CPC ...... D21H 27/005; D21H 11/12; D21H 17/26; D21H 21/10; D21H 21/20; D21H 27/002; D21H 27/004; D21H 27/02; D21H 27/30; D21H 27/40; D21H 27/38; A47K 10/16
See application file for complete search history.

(56) References Cited

U.S. PATENT DOCUMENTS 3,004,884 A    10/1961   Eberl et al.
3,994,771 A    11/1976   Morgan, Jr. et al.
(Continued)

FOREIGN PATENT DOCUMENTS

CA    2076615 A1    10/1993
CA    2168894 A1     8/1997
(Continued)

OTHER PUBLICATIONS

PCT Search Report and Written Opinion for PCT/US2023/017658 dated Jun. 20, 2023, 10 pages.
(Continued)

*Primary Examiner* — Jose A Fortuna
(74) *Attorney, Agent, or Firm* — Richard L. Alexander

(57) ABSTRACT

Sanitary tissue products having non-wood fibers selected from the group consisting of bamboo, abaca, and mixtures thereof and exhibiting a TS7 of less than about 14 dB V² rms and/or a TS750 less than about 45 dB V² rms.

28 Claims, 93 Drawing Sheets

Related U.S. Application Data filed on Jun. 17, 2022, provisional application No. 63/330,077, filed on Apr. 12, 2022, provisional application No. 63/329,718, filed on Apr. 11, 2022, provisional application No. 63/329,222, filed on Apr. 8, 2022.

(51) Int. Cl.
*D21H 11/12* (2006.01)
*D21H 17/26* (2006.01)
*D21H 21/10* (2006.01)
*D21H 21/20* (2006.01)
*D21H 27/02* (2006.01)
*D21H 27/30* (2006.01)
*D21H 27/40* (2006.01)

(56) References Cited

U.S. PATENT DOCUMENTS

| | | | |
|---|---|---|---|
| 4,300,981 | A | 11/1981 | Carstens |
| 4,464,224 | A | 8/1984 | Matolcsy et al. |
| 4,857,145 | A | 8/1989 | Villavicencio |
| 5,320,710 | A | 6/1994 | Reeves et al. |
| 5,348,620 | A | 9/1994 | Hermans et al. |
| 5,472,569 | A | 12/1995 | Nicolucci et al. |
| 5,607,551 | A | 3/1997 | Farrington, Jr. et al. |
| 5,656,132 | A | 8/1997 | Farrington, Jr. et al. |
| 5,932,068 | A | 8/1999 | Farrington, Jr. et al. |
| 6,162,327 | A | 12/2000 | Batra et al. |
| 6,171,442 | B1 | 1/2001 | Farrington, Jr. et al. |
| 6,174,412 | B1 | 1/2001 | Paterson-brown et al. |
| 6,248,211 | B1 | 6/2001 | Jennings et al. |
| 6,258,207 | B1 | 7/2001 | Pan |
| 6,302,997 | B1 | 10/2001 | Hurter et al. |
| 6,455,129 | B1 | 9/2002 | Kershaw et al. |
| 6,511,579 | B1 | 1/2003 | Edwards et al. |
| 6,699,360 | B2 | 3/2004 | Heath et al. |
| 6,709,550 | B2 | 3/2004 | Holz et al. |
| 6,796,114 | B2 | 9/2004 | Sheedy et al. |
| 6,797,114 | B2 | 9/2004 | Hu |
| 6,821,387 | B2 | 11/2004 | Hu |
| 6,896,768 | B2 | 5/2005 | Dwiggins et al. |
| 6,926,149 | B2 | 8/2005 | Tippey |
| 6,931,313 | B2 | 8/2005 | Kato et al. |
| 7,156,954 | B2 | 1/2007 | Farrington, Jr. et al. |
| 7,166,190 | B2 | 1/2007 | Graef et al. |
| 7,172,073 | B2 | 2/2007 | Hanson |
| 7,682,488 | B2 | 3/2010 | Yeh et al. |
| 8,049,060 | B2 | 11/2011 | Vinson et al. |
| 8,197,455 | B2 | 6/2012 | Zander et al. |
| 8,287,986 | B2 | 10/2012 | Huss et al. |
| 8,343,625 | B2 | 1/2013 | Mackey et al. |
| 8,524,374 | B2 | 9/2013 | Shannon |
| 8,574,400 | B1 | 11/2013 | Shannon et al. |
| 8,715,826 | B2 | 5/2014 | Mackey et al. |
| 8,741,104 | B2 | 6/2014 | Edwards et al. |
| 8,742,181 | B2 | 6/2014 | Sharratt et al. |
| 8,778,505 | B2 | 7/2014 | Shannon |
| 8,961,739 | B2 | 2/2015 | Salminen |
| 9,175,444 | B1 | 11/2015 | Polat et al. |
| 9,222,224 | B2 | 12/2015 | Shannon |
| 9,242,775 | B2 | 1/2016 | Knobloch et al. |
| 9,327,888 | B2 | 5/2016 | Knobloch et al. |
| 9,404,222 | B2 | 8/2016 | Ostendorf et al. |
| 9,410,291 | B2 | 8/2016 | Shannon |
| 9,447,545 | B2 | 9/2016 | Hermans et al. |
| 9,657,443 | B2 * | 5/2017 | Rekoske ............. D21H 27/005 |
| 10,132,036 | B2 | 11/2018 | Collins et al. |
| 10,145,069 | B2 | 12/2018 | Shannon et al. |
| 10,227,729 | B2 | 3/2019 | Mohammadi et al. |
| 10,337,149 | B2 | 7/2019 | Rouse et al. |
| 10,428,465 | B2 | 10/2019 | Rouse et al. |
| 10,472,771 | B2 | 11/2019 | Maladen et al. |
| 10,519,601 | B2 | 12/2019 | Shannon et al. |
| 10,550,522 | B2 | 2/2020 | Shannon et al. |
| 10,731,301 | B2 | 8/2020 | Sze et al. |
| 10,914,039 | B2 | 2/2021 | Shannon et al. |
| 10,954,417 | B2 | 3/2021 | Sumnicht et al. |
| 10,982,392 | B2 | 4/2021 | Sealey et al. |
| 11,053,643 | B2 * | 7/2021 | Rouse ..................... D21F 11/04 |
| 11,090,900 | B2 | 8/2021 | Kraus et al. |
| 11,097,881 | B2 | 8/2021 | Marsh et al. |
| 11,123,951 | B2 | 9/2021 | Kleinwaechter et al. |
| 11,124,357 | B2 | 9/2021 | Knobloch et al. |
| 11,179,913 | B2 | 11/2021 | Kleinwaechter et al. |
| 11,198,972 | B2 | 12/2021 | Wang et al. |
| 11,634,870 | B2 * | 4/2023 | Rouse ..................... D21F 11/04 |
| | | | 162/129 |
| 11,795,619 | B2 * | 10/2023 | Wei ....................... D21H 27/00 |
| 12,128,665 | B2 | 10/2024 | Young et al. |
| 12,180,654 | B2 * | 12/2024 | Martin ..................... B32B 3/20 |
| 12,203,222 | B2 | 1/2025 | Mckee et al. |
| 2002/0096287 | A1 | 7/2002 | Jewell et al. |
| 2002/0134520 | A1 | 9/2002 | Behnke et al. |
| 2002/0148574 | A1 | 10/2002 | Van et al. |
| 2002/0148584 | A1 | 10/2002 | Edwards et al. |
| 2003/0111197 | A1 | 6/2003 | Hu |
| 2003/0121629 | A1 | 7/2003 | Hu |
| 2003/0192662 | A1 | 10/2003 | Heath et al. |
| 2003/0196772 | A1 | 10/2003 | Awofeso et al. |
| 2004/0084165 | A1 | 5/2004 | Shannon et al. |
| 2004/0140076 | A1 | 7/2004 | Hermans et al. |
| 2004/0163781 | A1 | 8/2004 | Hernandez-munoa et al. |
| 2004/0163782 | A1 | 8/2004 | Hernandez-munoa et al. |
| 2004/0168780 | A1 | 9/2004 | Dwiggins et al. |
| 2004/0194901 | A1 | 10/2004 | Hu et al. |
| 2004/0226673 | A1 | 11/2004 | Edwards et al. |
| 2005/0236122 | A1 | 10/2005 | Mullally et al. |
| 2005/0238682 | A1 | 10/2005 | Anast et al. |
| 2006/0288639 | A1 | 12/2006 | Vinson et al. |
| 2007/0011762 | A1 | 1/2007 | Vinson et al. |
| 2007/0051484 | A1 | 3/2007 | Hermans et al. |
| 2007/0107863 | A1 | 5/2007 | Edwards et al. |
| 2007/0298995 | A1 | 12/2007 | Eggers et al. |
| 2008/0008853 | A1 | 1/2008 | Hupp et al. |
| 2008/0110783 | A1 | 5/2008 | Burgdorf et al. |
| 2008/0202954 | A1 | 8/2008 | Knobloch et al. |
| 2008/0202968 | A1 | 8/2008 | Knobloch et al. |
| 2009/0022960 | A1 | 1/2009 | Suer et al. |
| 2009/0056891 | A1 | 3/2009 | Wiwi et al. |
| 2009/0068633 | A1 | 3/2009 | Cohen et al. |
| 2009/0194435 | A1 | 8/2009 | Heilman et al. |
| 2009/0266500 | A1 | 10/2009 | Schubert et al. |
| 2009/0297781 | A1 | 12/2009 | Huss et al. |
| 2009/0311660 | A1 | 12/2009 | Imholt et al. |
| 2009/0311661 | A1 | 12/2009 | Weaver et al. |
| 2010/0032113 | A1 | 2/2010 | Awofeso et al. |
| 2010/0043989 | A1 | 2/2010 | Shannon et al. |
| 2010/0126685 | A1 | 5/2010 | Fike et al. |
| 2011/0017631 | A1 | 1/2011 | Sheasley |
| 2011/0168342 | A1 | 7/2011 | Mohammadi |
| 2011/0297343 | A1 | 12/2011 | Li et al. |
| 2011/0303375 | A1 | 12/2011 | Shannon et al. |
| 2012/0018964 | A1 | 1/2012 | Edelblut |
| 2012/0247696 | A1 | 10/2012 | Bogren et al. |
| 2013/0068867 | A1 | 3/2013 | Hermans et al. |
| 2013/0068868 | A1 | 3/2013 | Hermans et al. |
| 2013/0071655 | A1 | 3/2013 | Zwick et al. |
| 2013/0071678 | A1 * | 3/2013 | Shannon .................. B32B 5/022 |
| | | | 428/534 |
| 2013/0199741 | A1 | 8/2013 | Stage et al. |
| 2013/0269892 | A1 | 10/2013 | Pawar et al. |
| 2013/0299107 | A1 * | 11/2013 | Shannon .................. D21H 11/12 |
| | | | 162/123 |
| 2013/0312924 | A1 | 11/2013 | Shi et al. |
| 2014/0044883 | A1 | 2/2014 | Kleinwaechter et al. |
| 2014/0093704 | A1 | 4/2014 | Shi et al. |
| 2014/0093705 | A1 | 4/2014 | Shi et al. |
| 2014/0096924 | A1 * | 4/2014 | Rekoske ............. D21H 27/002 |
| | | | 162/111 |
| 2014/0205777 | A1 | 7/2014 | Hawkins et al. |
| 2014/0284010 | A1 | 9/2014 | Shannon |
| 2015/0129143 | A1 | 5/2015 | Hawkins et al. |

(56) References Cited

U.S. PATENT DOCUMENTS

| | | |
|---|---|---|
| 2015/0144280 A1 | 5/2015 | Shannon et al. |
| 2016/0038353 A1 | 2/2016 | Bonilla |
| 2016/0051422 A1 | 2/2016 | Warner |
| 2016/0069029 A1 | 3/2016 | Shannon |
| 2016/0097163 A1* | 4/2016 | Rekoske ............... D21H 27/40 162/111 |
| 2016/0130762 A1 | 5/2016 | Ramaratnam et al. |
| 2016/0138224 A1 | 5/2016 | Shannon et al. |
| 2016/0145809 A1 | 5/2016 | Hermans et al. |
| 2016/0304818 A1 | 10/2016 | Cordial et al. |
| 2016/0355987 A1 | 12/2016 | Hermans et al. |
| 2016/0355990 A1* | 12/2016 | Zwick ................. D21H 27/005 |
| 2017/0254025 A1 | 9/2017 | Miller et al. |
| 2017/0282519 A1 | 10/2017 | Cabell et al. |
| 2017/0325640 A1 | 11/2017 | Trokhan et al. |
| 2018/0030654 A1 | 2/2018 | Chute |
| 2018/0044859 A1 | 2/2018 | Hermans et al. |
| 2018/0135248 A1 | 5/2018 | Collins et al. |
| 2018/0135249 A1 | 5/2018 | Shannon et al. |
| 2018/0142419 A1 | 5/2018 | Rouse et al. |
| 2018/0142420 A1 | 5/2018 | Rouse et al. |
| 2018/0142421 A1 | 5/2018 | Rouse et al. |
| 2018/0155873 A1 | 6/2018 | Seger et al. |
| 2018/0230344 A1 | 8/2018 | Sumnicht et al. |
| 2019/0100878 A1 | 4/2019 | Shannon et al. |
| 2019/0100883 A1 | 4/2019 | Shannon et al. |
| 2019/0169798 A1 | 6/2019 | Rouse et al. |
| 2019/0249367 A1 | 8/2019 | Rouse et al. |
| 2019/0264395 A1 | 8/2019 | Rouse et al. |
| 2019/0276985 A1 | 9/2019 | Anderson et al. |
| 2020/0040529 A1 | 2/2020 | Rouse et al. |
| 2020/0102705 A1 | 4/2020 | Rouse et al. |
| 2020/0115853 A1 | 4/2020 | Shannon et al. |
| 2020/0129013 A1 | 4/2020 | Mitchell et al. |
| 2020/0131707 A1 | 4/2020 | Mitchell et al. |
| 2020/0181848 A1 | 6/2020 | Polat et al. |
| 2020/0232166 A1* | 7/2020 | Rouse ................... D21H 11/12 |
| 2020/0270813 A1* | 8/2020 | Rekoske .............. D21F 11/006 |
| 2021/0001597 A1 | 1/2021 | Kleinwaechter et al. |
| 2021/0017710 A1 | 1/2021 | Seger et al. |
| 2021/0054572 A1* | 2/2021 | Zawadzki ............. D21H 21/20 |
| 2021/0071364 A1* | 3/2021 | Martin ................... B32B 5/262 |
| 2021/0087748 A1 | 3/2021 | Sze et al. |
| 2021/0140114 A1 | 5/2021 | Redd et al. |
| 2021/0140115 A1 | 5/2021 | Redd et al. |
| 2021/0237964 A1 | 8/2021 | Sheehan et al. |
| 2021/0285156 A1 | 9/2021 | Laleg et al. |
| 2021/0292973 A1 | 9/2021 | Rouse |
| 2021/0321831 A1* | 10/2021 | Vogt ...................... B32B 7/08 |
| 2021/0332531 A1* | 10/2021 | Bailey .................. D21H 27/30 |
| 2021/0370637 A1 | 12/2021 | Kleinwaechter et al. |
| 2021/0381172 A1 | 12/2021 | Goulet et al. |
| 2022/0010495 A1 | 1/2022 | Bailey et al. |
| 2022/0356648 A1 | 11/2022 | Pande et al. |
| 2023/0071802 A1 | 3/2023 | Husmark et al. |
| 2023/0320539 A1* | 10/2023 | Young ................... D21H 27/30 162/111 |
| 2023/0320540 A1* | 10/2023 | Young ................... D21H 21/20 162/111 |
| 2023/0320541 A1* | 10/2023 | Young ................... D21H 27/30 162/100 |
| 2023/0323598 A1* | 10/2023 | Young ................... D21H 27/004 162/109 |
| 2023/0323604 A1* | 10/2023 | Young ................... D21H 27/30 162/148 |
| 2023/0323605 A1* | 10/2023 | Kien .................... D21H 27/30 162/217 |
| 2024/0076077 A1* | 3/2024 | Ross .................... B65D 85/671 |
| 2024/0110336 A1* | 4/2024 | Young ................... D21H 27/40 |
| 2025/0116067 A1 | 4/2025 | Kreider et al. |

FOREIGN PATENT DOCUMENTS

| | | | |
|---|---|---|---|
| CN | 104116454 A | 10/2014 | |
| DE | 9300201 U1 | 5/1994 | |
| DE | 102008053858 A1 | 5/2010 | |
| DE | 112023001829 T5 * | 1/2025 | ............ A47K 10/16 |
| DE | 112023001835 T5 * | 1/2025 | ............ A47K 10/16 |
| DE | 112023001845 T5 * | 1/2025 | ............ A47K 10/16 |
| EP | 1319749 A1 | 6/2003 | |
| EP | 2758593 B1 | 3/2019 | |
| EP | 3929261 A1 | 12/2021 | |
| EP | 4234812 A1 * | 8/2023 | ............ D21H 19/20 |
| GB | 1374198 A | 11/1974 | |
| GB | 2574744 A | 12/2019 | |
| GB | 2632071 A * | 1/2025 | ............ A47K 10/16 |
| GB | 2633521 A * | 3/2025 | ............ A47K 10/18 |
| JP | 10102392 A | 4/1998 | |
| JP | 05321190 A | 7/2001 | |
| JP | 07197400 A | 10/2003 | |
| JP | 4202892 B2 | 10/2008 | |
| KR | 20050002715 A | 1/2005 | |
| KR | 100547592 B1 | 1/2006 | |
| KR | 20090036284 A | 4/2009 | |
| KR | 100933462 B1 | 12/2009 | |
| KR | 20100070240 A | 6/2010 | |
| KR | 1020110060510 A | 1/2016 | |
| MX | 2010001159 A | 7/2011 | |
| WO | 1996006223 A1 | 2/1996 | |
| WO | 9704956 A1 | 2/1997 | |
| WO | 2007004757 A1 | 1/2007 | |
| WO | 2007059789 A1 | 5/2007 | |
| WO | 2007112916 A1 | 10/2007 | |
| WO | 2008003343 A1 | 1/2008 | |
| WO | 2008044860 A1 | 4/2008 | |
| WO | 2008063014 A1 | 5/2008 | |
| WO | 10008331 A1 | 1/2010 | |
| WO | 2010021572 A1 | 2/2010 | |
| WO | 12010181 A1 | 1/2012 | |
| WO | 2013041986 A2 | 3/2013 | |
| WO | 2014043947 A1 | 4/2014 | |
| WO | 14200455 A | 12/2014 | |
| WO | 14200456 A | 12/2014 | |
| WO | 2016173641 A1 | 11/2016 | |
| WO | 16195625 A | 12/2016 | |
| WO | 16195627 A1 | 12/2016 | |
| WO | 16195629 A1 | 12/2016 | |
| WO | 2016195625 A1 | 12/2016 | |
| WO | 2016195627 A1 | 12/2016 | |
| WO | 2016195629 A1 | 12/2016 | |
| WO | WO-2017019421 A1 * | 2/2017 | ............ D21H 25/08 |
| WO | 2018039623 A1 | 3/2018 | |
| WO | 18080492 A1 | 5/2018 | |
| WO | WO-2018144309 A1 * | 8/2018 | ............ B31F 1/126 |
| WO | WO-2018156109 A1 * | 8/2018 | ............ D21F 11/04 |
| WO | WO-2018200501 A1 * | 11/2018 | ............ D21H 11/18 |
| WO | 2018229336 A1 | 12/2018 | |
| WO | 2021061718 A1 | 4/2021 | |
| WO | 2022236005 A1 | 11/2022 | |
| WO | 2023282811 A1 | 1/2023 | |
| WO | 2023282812 A1 | 1/2023 | |
| WO | 2023282813 A1 | 1/2023 | |
| WO | 2023282818 A1 | 1/2023 | |
| WO | 2023196449 A1 | 10/2023 | |
| WO | 2023196450 A1 | 10/2023 | |
| WO | 2023196451 A1 | 10/2023 | |
| WO | 2023245027 A1 | 12/2023 | |
| WO | WO-2025165801 A1 * | 8/2025 | |

OTHER PUBLICATIONS

PCT Search Report and Written Opinion for PCT/US2023/017659 dated Jun. 21, 2023, 10 pages.

PCT Search Report and Written Opinion for PCT/US2023/017660 dated Jun. 20, 2023, 10 pages.

Darraga, G. et al., "Pulp and Paper from Blue Agave Waste from Tequila Production," Journal of Agricultural androod Chemistry, vol. 47, No. 10, Sep. 4, 1999, pp. 4450-4455.

(56) References Cited

OTHER PUBLICATIONS

Deniz et al. in "Kraft and Modified Kraft Pulping of Bamboo (*Phyllostachys bambusoides*),", vol. 60, No. 200, 2017, 17 Pages.
Economic Research Services, "Natural Fibers Hesperaloe Has Properties That Interest Papermakers", Online retrieved from "https://www.ers.usda.gov/webdoc,s/Jublications/37342/32911 jus6d_002.pdf?v=41471", XP055526919, Sep. 1, 1996, pp. 24-26.
Escoto-Garcia, T. et al., "Fermentative-Chemical and Mechanical Treatment of Agave Bagasse (Agave TequilanaNeber) for its Application in Hand Crafted Paper," Revista Mexicana de Ingenieria Quimica, Nov. 30, 2006, vol. 5, No. Suppl. 1, pp. 23-27.
Eugenio et al., in "Evalution of Hesperaloe funifera pulps obtained by a low energy consumption process as a-einforcement material in reycled pulps," Forest Systems 21(3), No Known Date, pp. 460-467.
Ghosh, A. K., "Fundamentals of Paper Drying—Theory and Application from Industrial Perspective," Evaporation, Sondensation and Heat Transfer, Sep. 12, 2011, 50 Pages.
Haun, J.R. et al., "Fiber and Papermaking Characteristics of Bamboo." Technical Bulletin No. 1361, Agriculture Research Service, USDA, Aug. 1966, 26 Pages.
Horn et al., "Fiber Morphology and New Crops," Internet webpage "http://www.hort.purdue.edu/newcrop/proceedings1990/v1-270.html", Aug. 28, 1997, pp. 270-275.
Hurter, Robert W., in "Nonwood Plant Fiber Characteristics" HurterConsult, No Known Date, 4 Pages.
Iniguez-Covarrubias, G. et al., "Utilization of By-Products from the Tequila Industry. Part 2: Potential Value of° gave Tequilana Weber Azul Leaves," Bioresource Technology, vol. 77, No. 2, Jan. 4, 2001, pp. 61-74.
Jaouadi, M. et al., "A Study of the Physical and Mechanical Properties of Paper Made from *Agave americana* L .= fibers," Materials and Manufacturing Processes, vol. 26, No. 4, Apr. 22, 2011, pp. 567-572.
Kamthai, Suphatand Pratung Puthson, "Effect of Beating Revolution on Sweet Bamboo (*Dendrocalamus asper* Backer) Kraft Pulp Properties." CMU Journal, vol. 4, No. 2, 2005, 11 Pages.
Mclaughlin, Steven, in "Properties of Paper Made From Fibers of Hesperaloe Funifera (Agavaceae)," Economicbotany, 54(20), No Known Date, 1 Page.
Morphology, Online retrieved from "http://www.inbar.int/publication/txt/tr18/MORPHOLOGY.htm", Mar. 31, 2011, 4 Pages.
Protasio et al. in "Brazilian Lignocellulosic Wastes for Bioenergy Production: Characterization and Comparison with Fossil Fuels," Bio Resources 8(1), No Known Date, 20 Pages.
Sekyere, Daniel, Potential of Bamboo (*Bambusa vulgaris*) as a Source of Raw Material for Pulp and Paper in Ghana, Ghana Journal of Forestry, vol. 1, 1994, 8 Pages.
Sood, Y.V. et al., "Quality Improvement of Paper from Bamboo and Hardwood Furnish Through Fiber Fractionation." Journal of Scientific & Industrial Research, vol. 64, Apr. 2005, pp. 299-305.
Tamolang, Francisco N. et al., Properties and Utilization of Philippine Erect Bamboos. Bamboo Research in Asia, proceedings of workshop, Singapore, May 28-30, 1980, pp. 189-200.
Unpublished U.S. Appl. No. 18/131,382, filed on Apr. 6, 2023, Christopher Michael Young et al.
Unpublished U.S. Appl. No. 18/131,384, filed on Apr. 6, 2023, Christopher Michael Youn et al.
Unpublished U.S. Appl. No. 18/209,506, filed on Jun. 14, 2023, to Katherine L. Schwerdtfeger et al.
Unpublished U.S. Appl. No. 18/209,508, filed on Jun. 14, 2023, to Katherine L. Schwerdtfeger et al.
Unpublished U.S. Appl. No. 18/209,509, filed on Jun. 14, 2023, to Katherine L. Schwerdtfeger et al.
Unpublished U.S. Appl. No. 18/209,510, filed on Jun. 14, 2023, to Katherine L. Schwerdtfeger et al.
Zhao, Guanglei et al., "Replacement of Softwood Kraft Pulp with ECF-Bleached Bamboo Kraft Pulp in Fine Paper." Bio Resources, vol. 5, No. 3, 2010, pp. 1733-1744.
Non-Final Office Action; U.S. Appl. No. 18/131,381, dated Apr. 10, 2025.
Non-Final Office Action; U.S. Appl. No. 18/131,382, dated Apr. 10, 2025.
Non-Final Office Action; U.S. Appl. No. 18/131,384, dated Apr. 10, 2025.
Non-Final Office Action; U.S. Appl. No. 18/131,387, dated Apr. 17, 2025.
Non-Final Office Action; U.S. Appl. No. 18/131,388, dated Jan. 30, 2025.
Non-Final Office Action; U.S. Appl. No. 18/131,392, dated Apr. 10, 2025.
Non-Final Office Action; U.S. Appl. No. 18/209,506, dated Jan. 16, 2025.
Non-Final Office Action; U.S. Appl. No. 18/209,506, dated May 14, 2025.
Non-Final Office Action; U.S. Appl. No. 18/209,508, dated Jan. 17, 2025.
Non-Final Office Action; U.S. Appl. No. 18/209,509, dated Jan. 22, 2025.
Notice of Allowance; U.S. Appl. No. 18/209,508, dated May 20, 2025.
Unpublished U.S. Appl. No. 19/039,908, filed on Jan. 29, 2025, to Christopher Michael Young et al.

\* cited by examiner

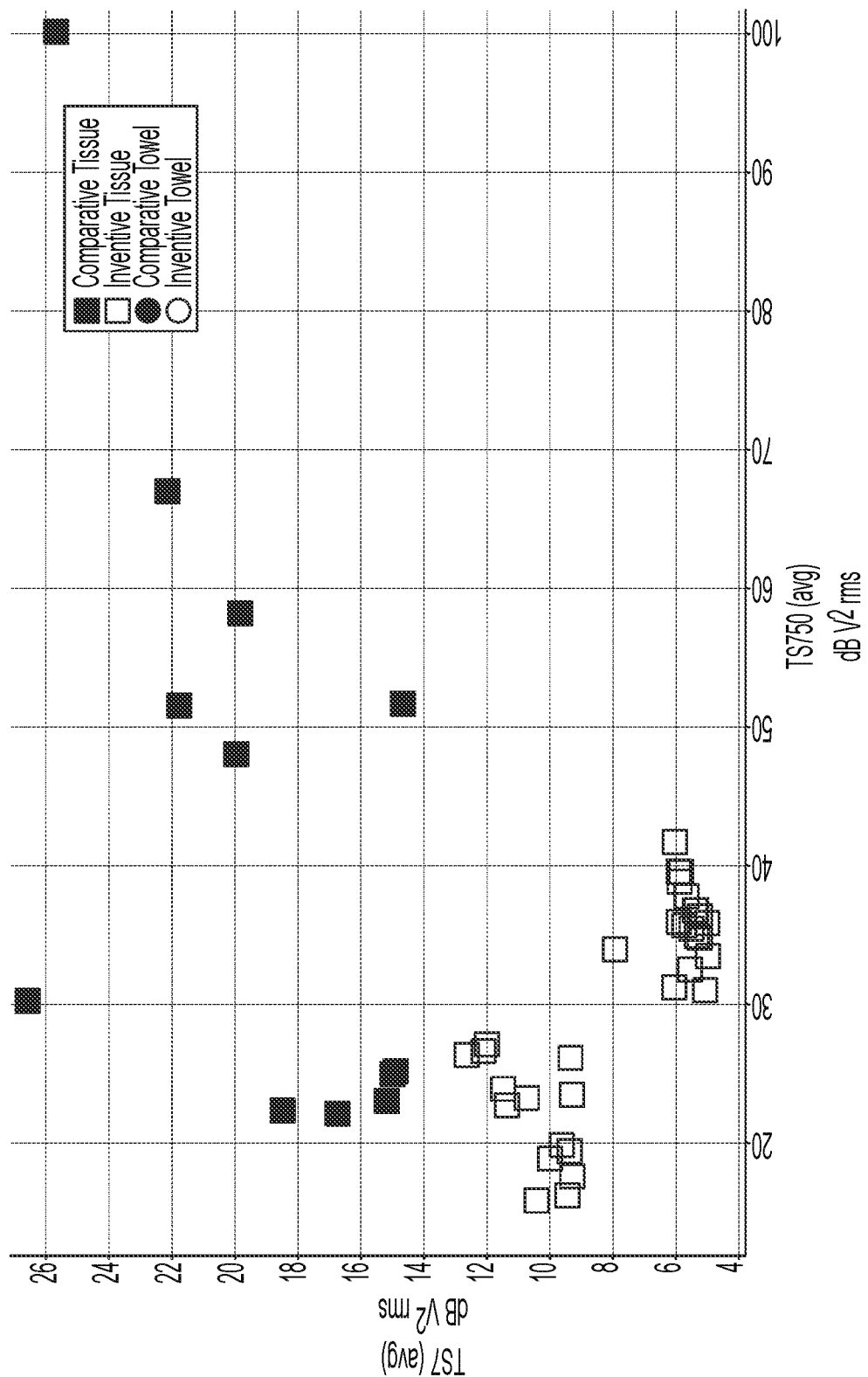

| Substrate | Type | Sample ID | Fractionation | # Unique Layers | Non-wood | Fabric Layer EUC | Fabric Layer NSK/SW | Fabric Layer Non-wood | Center Layer EUC | Center Layer NSK/SW | Center Layer Non-wood | Wire Layer EUC | Wire Layer NSK/SW | Wire Layer Non-wood | % of total Sheet EUC | % of total Sheet Softwood | % of total Sheet Non-wood | FSO/WSO |
|---|---|---|---|---|---|---|---|---|---|---|---|---|---|---|---|---|---|---|
| Bath tissue | Inventive | 1 | Accepts to fabric | 2 | Bamboo | 84% | 0% | 16% | 32% | 54% | 14% | 32% | 54% | 14% | 52% | 33% | 15% | FSO |
| Bath tissue | Inventive | 2 | Accepts to fabric | 2 | Bamboo | 69% | 0% | 31% | 32% | 39% | 29% | 32% | 39% | 29% | 46% | 24% | 30% | FSO |
| Bath tissue | Inventive | 3 | Rejects to fabric | 2 | Bamboo | 77% | 0% | 23% | 32% | 59% | 10% | 32% | 59% | 10% | 49% | 36% | 15% | FSO |
| Bath tissue | Inventive | 4 | Rejects to fabric | 2 | Bamboo | 53% | 0% | 47% | 32% | 49% | 19% | 32% | 49% | 19% | 40% | 30% | 30% | FSO |
| Bath tissue | Inventive | 5 | Accepts to C/W, sewer rejects | 2 | Bamboo | 100% | 0% | 0% | 27% | 49% | 24% | 27% | 49% | 24% | 55% | 30% | 15% | FSO |
| Bath tissue | Inventive | 6 | Accepts to C/W, sewer rejects | 2 | Bamboo | 100% | 0% | 0% | 13% | 39% | 48% | 13% | 39% | 48% | 46% | 24% | 30% | FSO |
| Bath tissue | Inventive | 7 | No fractionation | 2 | Bamboo | 100% | 0% | 0% | 27% | 49% | 24% | 27% | 49% | 24% | 55% | 30% | 15% | FSO |
| Bath tissue | Inventive | 8 | No fractionation | 2 | Bamboo | 100% | 0% | 0% | 13% | 39% | 48% | 13% | 39% | 48% | 46% | 24% | 30% | FSO |
| Bath tissue | Inventive | 15 | No fractionation | 2 | Bamboo | 100% | 0% | 0% | 13% | 39% | 48% | 13% | 39% | 48% | 46% | 24% | 30% | FSO |
| Bath tissue | Inventive | 16 | Rejects to fabric | 2 | Bamboo | 53% | 0% | 47% | 32% | 49% | 19% | 32% | 49% | 19% | 40% | 30% | 30% | FSO |
| Bath tissue | Inventive | 17 | Rejects to fabric | 2 | Bamboo | 53% | 0% | 47% | 32% | 49% | 19% | 32% | 49% | 19% | 40% | 30% | 30% | FSO |
| Bath tissue | Inventive | 18 | Rejects to fabric | 2 | Bamboo | 21% | 0% | 79% | 32% | 36% | 32% | 32% | 36% | 32% | 28% | 22% | 50% | FSO |
| Bath tissue | Inventive | 19 | Rejects to fabric | 2 | Bamboo | 0% | 0% | 100% | 0% | 0% | 100% | 0% | 0% | 100% | 0% | 0% | 100% | FSO |
| Bath tissue | Inventive | 20 | Rejects to Wire | 2 | Bamboo | 47% | 35% | 18% | 47% | 35% | 18% | 47% | 0% | 53% | 47% | 23% | 30% | WSO |
| Bath tissue | Inventive | 21 | No frac, C/F only | 2 | Bamboo | 20% | 35% | 45% | 20% | 35% | 45% | 100% | 0% | 0% | 47% | 23% | 30% | WSO |
| Bath tissue | Inventive | 22 | No frac, both layers | 2 | Bamboo | 47% | 35% | 18% | 47% | 35% | 18% | 47% | 0% | 53% | 47% | 23% | 30% | WSO |
| Bath tissue | Inventive | 23 | Rejects to wire | 2 | Bamboo | 0% | 0% | 100% | 0% | 0% | 100% | 0% | 0% | 100% | 0% | 0% | 100% | WSO |

FIG. 18A-1

| Bath tissue | Inventive | # | Fractionation | Fiber # | Fiber | No fractionation | | | | | | | | | | | |
|---|---|---|---|---|---|---|---|---|---|---|---|---|---|---|---|---|---|
| Bath tissue | Inventive | 24 | No fractionation | 1 | Bamboo | 100% | | | | | | | | 0% | 0% | 100% | WSO |
| Bath tissue | Inventive | 25 | | 1 | Bamboo | 100% | | | | | | | | 0% | 0% | 100% | WSO |
| Bath tissue | Inventive | 26 | | 1 | Bamboo | 100% | | | | | | | | 0% | 0% | 100% | WSO |
| Bath tissue | Inventive | 27 | | 1 | Bamboo | 100% | | | | | | | | 0% | 0% | 100% | WSO |
| Bath tissue | Inventive | 28 | | 2 | Abaca | 0% | 0% | 67% | 67% | 33% | 0% | 0% | 33% | 55% | 37% | 8.0% | FSO |
| Bath tissue | Inventive | 29 | | 2 | Abaca | 0% | 0% | 33% | 33% | 50% | 17% | 17% | 50% | 55% | 22.5% | 22.5% | FSO |
| Bath tissue | Inventive | 30 | | 2 | Abaca | 0% | 0% | 25% | 25% | 38% | 38% | 38% | 38% | 55% | 22.5% | 22.5% | FSO |
| Bath tissue | Inventive | 31 | | 2 | Abaca | 0% | 0% | 25% | 25% | 25% | 75% | 75% | 0% | 55% | 0% | 45% | FSO |
| Bath tissue | Inventive | 32 | | 2 | Abaca | 0% | 0% | 25% | 25% | 25% | 75% | 75% | 0% | 55% | 0% | 45% | FSO |
| Bath tissue | Inventive | 33 | | 2 | Abaca | 0% | 0% | 25% | 25% | 25% | 75% | 75% | 0% | 55% | 0% | 45% | FSO |

FIG. 18A-2

| Substrate | Type | Sample ID | Fractionation | # Unique Layers | Non-wood | Fabric Layer EUC | Fabric Layer NSK/SW | Fabric Layer Non-wood | Center Layer EUC | Center Layer NSK/SW | Center Layer Non-wood | Wire Layer EUC | Wire Layer NSK/SW | Wire Layer Non-wood | % of total Sheet EUC | % of total Sheet Softwood | % of total Sheet Non-wood | FSO/WSO |
|---|---|---|---|---|---|---|---|---|---|---|---|---|---|---|---|---|---|---|
| Bath tissue | Inventive | 34 | | 2 | Abaca | 23% | 65% | 12% | 23% | 65% | 12% | 100% | 0% | 0% | 50% | 42.5% | 7.5% | WSO |
| Bath tissue | Inventive | 35 | | 2 | Abaca | 23% | 54% | 23% | 23% | 54% | 23% | 100% | 0% | 0% | 50% | 35% | 15% | WSO |
| Bath tissue | Inventive | 36 | | 2 | Abaca | 23% | 38% | 38% | 23% | 38% | 38% | 100% | 0% | 0% | 50% | 25% | 25% | WSO |
| Bath tissue | Inventive | 37 | | 2 | Abaca | 23% | 38% | 38% | 23% | 38% | 38% | 100% | 0% | 0% | 50% | 25% | 25% | WSO |
| Bath tissue | Inventive | 38 | | 2 | Abaca | 23% | 0% | 77% | 23% | 0% | 77% | 100% | 0% | 0% | 50% | 0% | 50% | WSO |
| Bath tissue | Inventive | 39 | | 2 | Abaca | 23% | 0% | 77% | 23% | 0% | 77% | 100% | 0% | 0% | 50% | 0% | 50% | WSO |
| Bath tissue | Inventive | 40 | | 2 | Unbleached Bamboo | 67% | 33% | 0% | 67% | 33% | 0% | 0% | 0% | 100% | 43% | 21% | 36% | WSO |
| Bath tissue | Inventive | 41 | | 2 | Hemp | 67% | 33% | 0% | 67% | 33% | 0% | 0% | 0% | 100% | 44% | 22% | 34% | WSO |
| Bath tissue | Inventive | 42 | | 2 | Bagasse | 75% | 25% | 0% | 75% | 25% | 0% | 0% | 0% | 100% | 47% | 16% | 37% | WSO |
| Bath tissue | Inventive | 43 | | 2 | Cotton | 67% | 33% | 0% | 67% | 33% | 0% | 0% | 0% | 100% | 34% | 17% | 49% | WSO |
| Bath tissue | Inventive | 44 | | 3 | Bleached Bamboo | 0% | 0% | 100% | 0% | 100% | 0% | 0% | 0% | 100% | 0% | 11% | 89% | WSO |
| Bath tissue | Inventive | 50 | | 2 | Bamboo | 0% | 0% | 100% | 0% | 0% | 100% | 80% | 0% | 20% | 20% | 0% | 80% | WSO |
| Bath tissue | Inventive | 51 | | 2 | Bamboo | 0% | 0% | 100% | 0% | 0% | 100% | 80% | 0% | 20% | 20% | 0% | 80% | WSO |
| Bath tissue | Inventive | 52 | | 1 | Bamboo | 0% | 0% | 100% | | | | | | | 0% | 0% | 100% | WSO |
| Bath tissue | Inventive | 53 | | 1 | Bamboo | 0% | 0% | 100% | | | | | | | 0% | 0% | 100% | WSO |
| Bath tissue | Inventive | 54 | | 2 | Bamboo | 0% | 0% | 100% | 0% | 0% | 100% | 80% | 0% | 20% | 20% | 0% | 80% | WSO |
| Bath tissue | Inventive | 55 | | 2 | Bamboo | 0% | 0% | 100% | 0% | 0% | 100% | 80% | 0% | 20% | 20% | 0% | 80% | WSO |

FIG. 18B-1

| | | | | | | | | | | | | | | | | |
|---|---|---|---|---|---|---|---|---|---|---|---|---|---|---|---|---|
| Bath tissue | Traditional | Z01 | | 2 | 100% | 0% | 0% | 32% | 68% | 0% | 32% | 68% | 0% | 58% | 0% | 42% | FSO |
| Bath tissue | Traditional | Z03 | | 2 | 47% | 53% | 0% | 47% | 53% | 0% | 100% | 0% | 0% | 65% | 0% | 35% | WSO |
| Bath tissue | Traditional | Z04 | | 2 | 47% | 53% | 0% | 47% | 53% | 0% | 100% | 0% | 0% | 65% | 0% | 35% | WSO |
| Bath tissue | Traditional | Z05 | | 2 | 47% | 53% | 0% | 47% | 53% | 0% | 100% | 0% | 0% | 65% | 0% | 35% | WSO |
| Bath tissue | Traditional | Z06 | | 2 | 47% | 53% | 0% | 47% | 53% | 0% | 100% | 0% | 0% | 65% | 0% | 35% | WSO |
| Bath tissue | Traditional | Z07 | | 2 | 100% | 0% | 0% | 25% | 75% | 0% | 25% | 75% | 0% | 55% | 0% | 45% | FSO |
| Bath tissue | Traditional | Z08 | | 2 | 23% | 77% | 0% | 23% | 77% | 0% | 100% | 0% | 0% | 50% | 0% | 50% | WSO |
| Bath tissue | Traditional | Z09 | | 2 | 68% | 32% | 0% | 68% | 32% | 0% | 100% | 0% | 0% | 79% | 0% | 21% | WSO |
| Bath tissue | Traditional | Z10 | | 2 | 66% | 34% | 0% | 66% | 34% | 0% | 100% | 0% | 0% | 78% | 0% | 22% | WSO |
| Bath tissue | Traditional | Z11 | | 3 | 100% | 0% | 0% | 0% | 100% | 0% | 100% | 0% | 0% | 80% | 0% | 20% | WSO |
| Bath tissue | Traditional | Z13 | | 2 | 100% | 0% | 0% | 32% | 68% | 0% | 32% | 68% | 0% | 58% | 0% | 42% | FSO |

FIG. 18B-2

| Substrate | Type | Sample ID | # Unique Layers | Non-wood | % of total Sheet | | | FSO/WSO |
|---|---|---|---|---|---|---|---|---|
| | | | | | Euc | Softwood | Non-wood | |
| Towel | Inventive | 9 | 1 | Bamboo | 37% | 53% | 10% | FSO |
| Towel | Inventive | 10 | 1 | Bamboo | 42% | 48% | 10% | FSO |
| Towel | Inventive | 11 | 1 | Bamboo | 34% | 46% | 20% | FSO |
| Towel | Inventive | 12 | 1 | Bamboo | 44% | 36% | 20% | FSO |
| Towel | Inventive | 13 | 1 | Bamboo | 31% | 40% | 30% | FSO |
| Towel | Inventive | 14 | 1 | Bamboo | 46% | 24% | 30% | FSO |
| Towel | Inventive | 45 | 1 | Bagasse | 40% | 25% | 35% | WSO |
| Towel | Inventive | 46 | 1 | Flax | 40% | 25% | 35% | WSO |
| Towel | Inventive | 47 | 1 | Hemp | 40% | 25% | 35% | WSO |
| Towel | Inventive | 48 | 1 | Unbleached Bamboo | 40% | 25% | 35% | WSO |
| Towel | Inventive | 49 | 1 | Abaca | 40% | 25% | 35% | WSO |
| Towel | Inventive | 56 | 1 | Abaca | 35% | 0% | 65% | FSO |
| Towel | Inventive | 57 | 1 | Abaca | 34% | 36% | 30% | FSO |
| Towel | Inventive | 58 | 1 | Abaca | 36% | 33% | 31% | FSO |
| Towel | Inventive | 59 | 1 | Abaca | 36% | 33% | 31% | FSO |
| Towel | Inventive | 60 | 1 | Abaca | 36% | 33% | 31% | FSO |
| Towel | Inventive | 61 | 1 | Abaca | 35% | 0% | 65% | FSO |
| Towel | Inventive | 62 | 1 | Abaca | 40% | 0% | 60% | FSO |
| Towel | Inventive | 63 | 1 | Abaca | 45% | 0% | 55% | FSO |
| Towel | Inventive | 64 | 1 | Abaca | 35% | 0% | 65% | FSO |
| Towel | Traditional | Z02 | 1 | | 40% | 60% | 0% | FSO |
| Towel | Traditional | Z12 | 1 | | 40% | 60% | 0% | WSO |
| Towel | Traditional | Z14 | 1 | | 35% | 65% | 0% | FSO |
| Towel | Traditional | Z15 | 1 | | 35% | 65% | 0% | FSO |
| Towel | Traditional | Z16 | 1 | | 35% | 65% | 0% | FSO |

FIG. 19

| Substrate | Type | Non-wood | Sample ID | Ply Count | Process | Crepe | Differential Density | Dry Tensile Ratio | PVD 2.5-100 micron PVD Hysteresis | PVD 2.5-160 micron PVD Absorption | PVD 2.5-160 micron PVD Desorption |
|---|---|---|---|---|---|---|---|---|---|---|---|
| Bath tissue | Comparative | Bamboo | A | 2 | CWP | Y | N | 3.9 | 236 | 621 | 702 |
| Bath tissue | Comparative | Bamboo | B | 2 | CWP | Y | N | 4.4 | 110 | 791 | 814 |
| Bath tissue | Comparative | Bamboo | C | 2 | CWP | Y | N | 2.2 | 139 | 449 | 561 |
| Bath tissue | Comparative | Bamboo | D | 3 | CWP | Y | N | 2.2 | 50 | 797 | 828 |
| Bath tissue | Comparative | Bamboo | E | 3 | CWP | Y | N | 2.8 | 47 | 633 | 671 |
| Bath tissue | Comparative | Bamboo | F | 1 | UCTAD | N | N | 1.1 | 42 | 656 | 667 |
| Bath tissue | Comparative | Bamboo | G | 2 | CWP | Y | N | 3.4 | 79 | 402 | 536 |
| Bath tissue | Comparative | Bamboo/Sugarcane | H | 2 | CWP | Y | N | 4.1 | 82 | 439 | 573 |
| Bath tissue | Comparative | Wheat Straw | AA | 3 | CWP | Y | N | 2.7 | 92 | 725 | 691 |
| Bath tissue | Comparative | Wheat Straw | BB | 4 | CWP | Y | N | 2.4 | 292 | 993 | 1062 |
| Bath tissue | Inventive | Bamboo | 16 | 2 | TAD | Y | Y | 1.5 | 492 | 1095 | 1411 |
| Bath tissue | Inventive | Bamboo | 18 | 2 | TAD | Y | Y | 1.5 | 545 | 1034 | 1373 |
| Bath tissue | Inventive | Bamboo | 19 | 2 | TAD | Y | Y | 1.4 | 573 | 933 | 1453 |
| Bath tissue | Inventive | Bamboo | 22 | 2 | TAD | Y | Y | 2 | 517 | 1173 | 1372 |
| Bath tissue | Inventive | Bamboo | 25 | 2 | TAD | Y | Y | 1.2 | 645 | 1177 | 1444 |
| Bath tissue | Inventive | Bamboo | 26 | 2 | TAD | Y | Y | 1.3 | 629 | 1192 | 1490 |
| Bath tissue | Traditional |  | Z6 | 2 | TAD | Y | Y | 1.7 | 390 | 1132 | 1279 |
| Bath tissue | Inventive | Bamboo | 27 | 2 | TAD | Y | Y | 1.4 | 765 | 967 | 1526 |
| Bath tissue | Inventive | Bamboo | 20 | 2 | TAD | Y | Y | 2.1 | 587 | 1037 | 1352 |
| Bath tissue | Inventive | Bamboo | 21 | 2 | TAD | Y | Y | 1.9 | 512 | 1024 | 1296 |
| Bath tissue | Inventive | Bamboo | 21 | 2 | TAD | Y | Y | 1.9 | 482 | 1036 | 1262 |
| Bath tissue | Inventive | Bamboo | 23 | 2 | TAD | Y | Y | 1.7 | 720 | 956 | 1433 |
| Bath tissue | Inventive | Bamboo | 24 | 2 | TAD | Y | Y | 1.6 | 816 | 896 | 1557 |
| Towel | Inventive | Abaca | 59 | 2 | TAD | Y | Y |  | 292 | 785 | 1496 |
| Towel | Inventive | Abaca | 56 | 2 | TAD | Y | Y |  | 435 | 874 | 1618 |
| Towel | Inventive | Abaca | 57 | 2 | TAD | Y | Y |  | 362 | 787 | 1631 |
| Towel | Inventive | Abaca | 61 | 2 | TAD | Y | Y | 1.35 | 421 | 1060 | 1599 |
| Towel | Inventive | Abaca | 64 | 2 | TAD | Y | Y | 1.38 | 423 | 1023 | 1551 |
| Towel | Inventive | Bamboo | 10 | 2 | TAD | Y | Y | 1.44 | 552 | 885 | 1611 |
| Towel | Inventive | Bamboo | 12 | 2 | TAD | Y | Y | 1.41 | 519 | 835 | 1583 |
| Towel | Inventive | Bamboo | 14 | 2 | TAD | Y | Y | 1.68 | 430 | 835 | 1561 |
| Bath tissue | Inventive | Abaca | 31 | 2 | TAD | Y | Y | 1.51 | 473 | 1296 | 1487 |
| Bath tissue | Traditional |  | Z8 | 2 | TAD | Y | Y | 1.73 | 405 | 812 | 1088 |
| Bath tissue | Inventive | Abaca | 39 | 2 | TAD | Y | Y | 1.83 | 383 | 844 | 1075 |
| Towel | Comparative | Bamboo/Sugarcane | U | 2 | CWP | Y | N |  | 147 | 582 | 735 |
| Towel | Comparative | Bamboo | V | 2 | CWP | Y | N |  | 138 | 466 | 696 |
| Towel | Comparative | Bamboo | W | 2 | CWP | Y | N |  | 17 | 482 | 745 |
| Towel | Comparative | Bamboo/Sugarcane | X | 2 | CWP | Y | N |  | 133 | 524 | 689 |
| Towel | Comparative | Bamboo | Y | 2 | CWP | Y | N |  | 130 | 502 | 679 |

FIG. 20A

| Substrate | Type | Non-wood | Sample Id | Roll Bulk | Percent Roll Compressibility | Roll Firmness | Formation Index Outside | Formation Index Inside | Formation Index Average | Coverage (Fiber Layers) | Fiber Count -area (C(n)) | Fiber Count -area (C(l)) |
|---|---|---|---|---|---|---|---|---|---|---|---|---|
| Bath tissue | Comparative | Bamboo | A | 7.1 | 1.24 | 3.38 | 157 | 171 | 164 | 4.21 | 714 | 265 |
| Bath tissue | Comparative | Bamboo | B | 8.3 | 4.81 | 7.52 | 141 | 130 | 136 | 4.67 | 779 | 294 |
| Bath tissue | Comparative | Bamboo | C | 8.4 | 3.07 | 7.03 | 115 | 113 | 114 | 3.22 | 550 | 200 |
| Bath tissue | Comparative | Bamboo | D | 6.1 | 1.54 | 3.09 | 123 | 116 | 120 | 6.59 | 762 | 534 |
| Bath tissue | Comparative | Bamboo | E | 7.7 | 2.22 | 4.50 | 98 | 103 | 101 | 4.71 | 805 | 289 |
| Bath tissue | Comparative | Bamboo | F | 12.5 | 6.36 | 10.55 | 73 | 67 | 70 | 4.94 | 815 | 256 |
| Bath tissue | Comparative | Bamboo | G | 8.0 | 3.76 | 6.15 | 149 | 142 | 146 | 2.88 | 502 | 177 |
| Bath tissue | Comparative | Bamboo/Sugarcane | H | 8.3 | 3.32 | 5.65 | 142 | 136 | 139 | 2.80 | 374 | 162 |
| Bath tissue | Comparative | Wheat Straw | AA | 10.0 | 2.82 | 8.14 | 111.5 | 110 | 111 | 6.38 | 714 | 367 |
| Bath tissue | Comparative | Wheat Straw | BB | 9.0 | 3.46 | 9.25 | 113 | 94 | 104 | 6.84 | 723 | 374 |
| Bath tissue | Inventive | Bamboo | 16 | 9.0 | 3.88 | 7.63 | 72 | 72 | 72 | 8.34 | 895 | 457 |
| Bath tissue | Inventive | Bamboo | 18 | 9.3 | 3.90 | 8.22 | 68 | 68 | 68 | 7.27 | 872 | 391 |
| Bath tissue | Inventive | Bamboo | 19 | 9.3 | 4.07 | 7.21 | 64 | 66 | 65 | 6.89 | 1027 | 367 |
| Bath tissue | Inventive | Bamboo | 22 | 9.4 | 2.88 | 5.27 | 56 | 57 | 57 | 8.23 | 923 | 491 |
| Bath tissue | Inventive | Bamboo | 25 | 8.9 | 2.58 | 5.54 | 74 | 67 | 71 | 5.60 | 779 | 281 |
| Bath tissue | Inventive | Bamboo | 26 | 10.0 | 3.27 | 6.54 | 69 | 67 | 68 | 6.07 | 850 | 291 |
| Bath tissue | Traditional | | 76 | 9.7 | 3.20 | 6.14 | 78 | 79 | 79 | 8.93 | 834 | 527 |
| Bath tissue | Inventive | Bamboo | 27 | 9.8 | 2.99 | 6.23 | 67 | 65 | 66 | 5.74 | 806 | 285 |
| Bath tissue | Inventive | Bamboo | 20 | | | | 60 | 56 | 58 | | | |
| Bath tissue | Inventive | Bamboo | 21 | | | | | | | | | |
| Bath tissue | Inventive | Bamboo | 21 | | | | 64 | 62 | 63 | | | |
| Bath tissue | Inventive | Bamboo | 23 | | | | 69 | 63 | 66 | | | |
| Bath tissue | Inventive | Bamboo | 24 | | | | 52 | 50 | 51 | | | |
| Towel | Inventive | Abaca | 59 | | | | | | | | | |
| Towel | Inventive | Abaca | 56 | 19.2 | 4.13 | 10.12 | 47 | 47 | 47 | | | |
| Towel | Inventive | Abaca | 57 | 19.3 | 4.13 | 10.07 | 48 | 47 | 48 | | | |
| Towel | Inventive | Abaca | 61 | 17.4 | 3.66 | 7.97 | 38 | 38 | 38 | | | |
| Towel | Inventive | Abaca | 64 | 18.0 | 3.78 | 8.87 | 37 | 36 | 37 | | | |
| Towel | Inventive | Bamboo | 10 | 18.9 | 3.70 | 8.68 | 51 | 50 | 51 | | | |
| Towel | Inventive | Bamboo | 12 | | | | | | | | | |
| Towel | Inventive | Bamboo | 14 | 20.9 | 4.03 | 9.70 | 47 | 43 | 45 | | | |
| Bath tissue | Inventive | Abaca | 31 | 9.3 | 3.33 | 6.83 | 76 | 76 | 76 | | | |
| Bath tissue | Traditional | | 78 | 12.4 | 4.55 | 8.97 | 74 | 72 | 73 | | | |
| Bath tissue | Inventive | Abaca | 39 | 12.1 | 4.36 | 8.19 | 55 | 53 | 54 | | | |
| Towel | Comparative | Bamboo/Sugarcane | U | 8.3 | 4.48 | 6.88 | 120 | 115.5 | 118 | | | |
| Towel | Comparative | Bamboo | V | 10.1 | 4.12 | 6.22 | 99 | 102 | 100 | | | |
| Towel | Comparative | Bamboo | W | 8.8 | 3.02 | 5.67 | 67.5 | 71 | 69 | | | |
| Towel | Comparative | Bamboo/Sugarcane | X | 7.7 | 2.28 | 4.77 | 121 | 118 | 120 | | | |
| Towel | Comparative | Bamboo | Y | 7.8 | 1.98 | 3.81 | 102 | 101 | 102 | | | |

FIG. 20B

| Sample ID | Type | Non-wood | Substrate | Basis Weight | Compressive Modulus slope | Dry Caliper | Wet Caliper | Peak Load CD Tensile | CD Elongation (dry) | CD TEA | CD Modulus |
|---|---|---|---|---|---|---|---|---|---|---|---|
| 1 | Inventive | Bamboo | Bath tissue | 33.3 | -7.8 | 22.6 | | 190 | 11.4 | 13.2 | 784 |
| 2 | Inventive | Bamboo | Bath tissue | 32.9 | -7.8 | 22.2 | | 188 | 11.4 | 13.0 | 769 |
| 3 | Inventive | Bamboo | Bath tissue | 33.0 | -8.1 | 22.6 | | 212 | 11.1 | 14.0 | 900 |
| 4 | Inventive | Bamboo | Bath tissue | 33.7 | -8.6 | 22.3 | | 256 | 11.4 | 17.7 | 1120 |
| 5 | Inventive | Bamboo | Bath tissue | 33.0 | -8.8 | 23.0 | | 180 | 11.6 | 12.7 | 705 |
| 6 | Inventive | Bamboo | Bath tissue | 33.7 | -8.6 | 22.6 | | 181 | 11.9 | 13.3 | 739 |
| 7 | Inventive | Bamboo | Bath tissue | 33.3 | -9.0 | 22.4 | | 184 | 11.6 | 13.0 | 756 |
| 8 | Inventive | Bamboo | Bath tissue | 33.0 | -8.8 | 22.2 | | 182 | 11.8 | 13.3 | 746 |
| 15 | Inventive | Bamboo | Bath tissue | 31.2 | -9.4 | 20.7 | | 206 | 14.2 | 16.7 | 697 |
| 16 | Inventive | Bamboo | Bath tissue | 32.7 | -9.7 | 20.6 | | 233 | 12.9 | 17.0 | 870 |
| 17 | Inventive | Bamboo | Bath tissue | 32.7 | -9.4 | 21.0 | | 229 | 12.3 | 15.9 | 886 |
| 18 | Inventive | Bamboo | Bath tissue | 32.0 | -8.4 | 20.1 | | 194 | 12.2 | 13.4 | 755 |
| 19 | Inventive | Bamboo | Bath tissue | 32.8 | -9.1 | 20.9 | | 260 | 11.4 | 17.1 | 1135 |
| 20 | Inventive | Bamboo | Bath tissue | 28.7 | -6.0 | 22.8 | | 166 | 14.5 | 13.7 | 549 |
| 21 | Inventive | Bamboo | Bath tissue | 31.1 | -5.5 | 23.1 | | 179 | 11.8 | 12.0 | 732 |
| 22 | Inventive | Bamboo | Bath tissue | 31.0 | -5.5 | 23.1 | | 171 | 14.4 | 14.1 | 561 |
| 23 | Inventive | Bamboo | Bath tissue | 31.5 | -5.6 | 23.7 | | 223 | 11.3 | 14.1 | 945 |
| 24 | Inventive | Bamboo | Bath tissue | 32.3 | -5.9 | 24.7 | | 177 | 15.2 | 15.6 | 589 |
| 25 | Inventive | Bamboo | Bath tissue | 34.7 | -5.4 | 23.4 | | 247 | 15.0 | 20.8 | 751 |
| 26 | Inventive | Bamboo | Bath tissue | 30.2 | -4.8 | 21.6 | | 225 | 14.9 | 18.8 | 703 |
| 27 | Inventive | Bamboo | Bath tissue | 29.9 | -6.1 | 21.5 | | 194 | 12.5 | 13.6 | 761 |
| 28 | Inventive | Abaca | Bath tissue | 34.7 | -9.0 | 24.3 | | 264 | 9.6 | 15.2 | 1220 |
| 29 | Inventive | Abaca | Bath tissue | 33.6 | -9.0 | 23.5 | | 246 | 9.7 | 14.3 | 1149 |
| 30 | Inventive | Abaca | Bath tissue | 33.1 | -8.7 | 24.1 | | 235 | 11.1 | 15.3 | 897 |
| 31 | Inventive | Abaca | Bath tissue | 34.3 | -7.7 | 24.1 | | 257 | 10.5 | 16.6 | 1170 |
| 32 | Inventive | Abaca | Bath tissue | 33.0 | -7.3 | 23.8 | | 234 | 10.9 | 15.7 | 1003 |
| 33 | Inventive | Abaca | Bath tissue | 32.6 | -9.0 | 24.7 | | 234 | 10.3 | 15.2 | 1081 |
| 34 | Inventive | Abaca | Bath tissue | 24.7 | -7.9 | 20.7 | | 307 | 9.7 | 17.2 | 1261 |
| 35 | Inventive | Abaca | Bath tissue | 24.8 | -8.0 | 20.9 | | 295 | 9.6 | 16.5 | 1240 |
| 36 | Inventive | Abaca | Bath tissue | 25.1 | -7.2 | 23.1 | | 293 | 9.2 | 15.7 | 1283 |
| 37 | Inventive | Abaca | Bath tissue | 24.5 | -8.1 | 22.5 | | 254 | 10.4 | 15.7 | 1035 |
| 38 | Inventive | Abaca | Bath tissue | 24.5 | -6.5 | 20.0 | | 297 | 9.0 | 15.9 | 1396 |
| 39 | Inventive | Abaca | Bath tissue | 24.8 | -6.7 | 21.6 | | 283 | 10.0 | 17.1 | 1250 |
| 40 | Inventive | Unbleached Bamboo | Bath tissue | 29.0 | -4.87 | 21.1 | | 149 | | | |
| 41 | Inventive | Hemp | Bath tissue | 28.9 | -5.17 | 20.7 | | 310 | | | |
| 42 | Inventive | Bagasse | Bath tissue | 28.6 | -4.27 | 20.8 | | 198 | | | |
| 43 | Inventive | Cotton | Bath tissue | 29.6 | -6.10 | 21.4 | | 128 | | | |
| 44 | Inventive | Bleached Bamboo | Bath tissue | 29.8 | -5.03 | 23.5 | | 385 | 10.5 | 22.4 | 1874 |

FIG. 21A

| Sample ID | Peak Load MD Tensile | MD Elongation (dry) | MD TEA | MD Modulus | Total Dry Tensile | Geometric Mean (GM) Dry Modulus | Tensile Ratio | Flexural Rigidity- MD mg-cm | Flexural Rigidity- CD mg-cm | Flexural Rigidity- Avg mg-cm |
|---|---|---|---|---|---|---|---|---|---|---|
| 1 | 297 | 21.5 | 36.9 | 747 | 487 | 765 | 1.57 | | | |
| 2 | 259 | 19.2 | 29.9 | 747 | 447 | 758 | 1.38 | | | |
| 3 | 293 | 20.7 | 35.3 | 770 | 505 | 832 | 1.38 | | | |
| 4 | 340 | 20.9 | 41.9 | 897 | 596 | 1002 | 1.33 | | | |
| 5 | 262 | 20.4 | 31.1 | 673 | 443 | 689 | 1.45 | | | |
| 6 | 250 | 20.5 | 30.6 | 656 | 431 | 696 | 1.38 | | | |
| 7 | 263 | 20.4 | 30.9 | 628 | 446 | 689 | 1.43 | | | |
| 8 | 251 | 19.0 | 28.5 | 691 | 433 | 718 | 1.38 | | | |
| 15 | 294 | 18.7 | 31.7 | 842 | 500 | 766 | 1.43 | 42.4 | 46.3 | 44.3 |
| 16 | 339 | 18.2 | 35.7 | 962 | 572 | 914 | 1.46 | 45.6 | 52.3 | 49.0 |
| 17 | 345 | 19.9 | 38.5 | 875 | 573 | 880 | 1.51 | 48.9 | 57.2 | 53.0 |
| 18 | 299 | 17.6 | 29.5 | 845 | 493 | 797 | 1.55 | 44.2 | 50.0 | 47.1 |
| 19 | 354 | 23.1 | 45.1 | 777 | 614 | 939 | 1.36 | 51.9 | 71.5 | 61.7 |
| 20 | 346 | 24.1 | 49.0 | 1044 | 512 | 756 | 2.09 | 225.6 | 94.2 | 159.9 |
| 21 | 345 | 22.8 | 43.3 | 877 | 523 | 801 | 1.93 | 201.9 | 117.8 | 159.9 |

FIG. 21B-1

| 22 | 339 | 25.8 | 52.5 | 1002 | 509 | 750 | 1.99 | 263.7 | 121.8 | 192.7 |
| 23 | 370 | 26.1 | 53.2 | 907 | 593 | 915 | 1.66 | 256.9 | 186.3 | 221.6 |
| 24 | 281 | 20.5 | 39.0 | 1310 | 458 | 878 | 1.59 | 338.1 | 150.2 | 244.1 |
| 25 | 295 | 19.5 | 38.4 | 1012 | 541 | 872 | | 207.2 | 139.9 | 173.5 |
| 26 | 287 | 20.4 | 39.4 | 1000 | 512 | 837 | | 221.7 | 138.0 | 179.8 |
| 27 | 269 | 29.0 | 45.2 | 636 | 463 | 693 | 1.39 | | | |
| 28 | 363 | 25.5 | 54.3 | 866 | 627 | 1028 | 1.37 | 64.8 | 98.0 | 81.4 |
| 29 | 345 | 24.9 | 51.0 | 861 | 591 | 994 | 1.40 | 58.7 | 80.1 | 69.4 |
| 30 | 338 | 24.1 | 48.4 | 892 | 573 | 893 | 1.44 | 57.5 | 70.7 | 64.1 |
| 31 | 387 | 27.2 | 59.6 | 842 | 645 | 992 | 1.51 | 58.5 | 82.5 | 70.5 |
| 32 | 378 | 25.8 | 55.8 | 918 | 612 | 959 | 1.62 | 56.4 | 66.8 | 61.6 |
| 33 | 344 | 25.1 | 49.7 | 843 | 579 | 954 | 1.47 | 52.2 | 68.7 | 60.5 |
| 34 | 537 | 19.4 | 56.7 | 1348 | 844 | 1303 | 1.75 | 248.0 | 201.2 | 224.6 |
| 35 | 515 | 19.3 | 54.2 | 1320 | 810 | 1279 | 1.74 | 243.3 | 201.4 | 222.3 |

FIG. 21B-2

| 36 | 504 | 19.7 | 54.7 | 1298 | 797 | 1290 | 1.72 | 273.9 | 226.5 | 250.2 |
|----|-----|------|------|------|-----|------|------|-------|-------|-------|
| 37 | 463 | 18.9 | 48.7 | 1272 | 717 | 1146 | 1.82 | 249.0 | 208.2 | 228.6 |
| 38 | 530 | 18.6 | 54.5 | 1447 | 827 | 1420 | 1.79 | 251.1 | 207.5 | 229.3 |
| 39 | 519 | 19.5 | 55.3 | 1335 | 802 | 1291 | 1.83 | 273.8 | 199.3 | 236.5 |
| 40 | 254 |      |      |      | 403 | 195  | 1.71 |       |       |       |
| 41 | 421 |      |      |      | 731 | 361  | 1.36 |       |       |       |
| 42 | 302 |      |      |      | 500 | 245  | 1.53 |       |       |       |
| 43 | 265 |      |      |      | 393 | 184  | 2.08 |       |       |       |
| 44 | 491 | 19.0 | 49.3 | 1236 | 876 | 435  | 1.28 |       |       |       |

FIG. 21B-3

| Sample ID | L | A | B | Lint-outside | Lint-Average | HFS g/sht | HFS g/g | VFS g/sht | VFS g/g | CRT capacity g/g | CRT capacity g/in | CRT rate g/s | Residual Water (%) | Wet Burst Strength | Wet Burst Strength/Total Dry Tensile |
|---|---|---|---|---|---|---|---|---|---|---|---|---|---|---|---|
| 1 | 97.0 | -0.8 | 3.6 | 9.6 | 9.1 | 11.1 | 19.5 | 6.2 | 11.0 | | | | | | |
| 2 | 96.9 | -0.9 | 3.7 | 7.9 | 7.9 | 10.8 | 18.7 | 6.0 | 10.3 | | | | | | |
| 3 | 96.9 | -0.7 | 3.4 | 9.1 | 9.3 | 10.7 | 18.4 | 6.0 | 10.3 | | | | | | |
| 4 | 96.9 | -0.8 | 3.6 | 7.5 | 8.0 | 10.5 | 17.6 | 5.7 | 9.6 | | | | | | |
| 5 | 96.8 | -0.7 | 3.5 | 9.6 | 9.4 | 11.5 | 19.8 | 6.4 | 11.0 | | | | | | |
| 6 | 96.8 | -0.7 | 3.5 | 9.6 | 9.4 | 11.5 | 19.4 | 6.5 | 11.0 | | | | | | |
| 7 | 96.8 | -0.8 | 3.6 | 9.5 | 9.0 | 11.1 | 18.5 | 6.4 | 10.6 | | | | | | |
| 8 | 96.8 | -0.8 | 3.6 | 9.2 | 9.2 | 11.3 | 19.3 | 6.3 | 10.8 | | | | | | |
| 15 | 96.7 | -0.9 | 3.8 | 10.1 | 10.0 | 10.2 | 19.8 | 5.8 | 11.2 | | | | | 33 | 0.065 |
| 16 | 96.9 | -0.9 | 3.8 | 8.8 | 8.7 | 9.6 | 17.9 | 5.5 | 10.3 | | | | | 39 | 0.068 |
| 17 | 96.7 | -0.7 | 3.5 | 9.4 | 9.4 | 9.7 | 17.9 | 5.5 | 10.2 | | | | | 36 | 0.063 |
| 18 | 96.8 | -0.9 | 3.7 | 10.3 | 10.1 | 9.4 | 17.8 | 5.3 | 10.1 | | | | | 31 | 0.063 |
| 19 | 96.5 | -0.9 | 3.7 | 4.7 | 4.9 | 8.9 | 16.1 | 5.1 | 9.2 | | | | | 36 | 0.058 |
| 20 | 96.7 | -0.8 | 3.0 | 6.1 | 7.1 | 11.0 | 17.5 | 6.2 | 9.8 | | | | | 40 | 0.078 |

FIG. 21C-1

| | | | | | | | | | | | | |
|---|---|---|---|---|---|---|---|---|---|---|---|---|
| 21 | 96.7 | -0.6 | 2.6 | 7.1 | 7.3 | 10.5 | 16.6 | 5.8 | 9.2 | | | 45 | 0.086 |
| 22 | 96.7 | -0.8 | 3.1 | 6.8 | 6.5 | 11.7 | 18.3 | 6.6 | 10.3 | | | 41 | 0.080 |
| 23 | 96.5 | -0.9 | 2.6 | 5.1 | 4.4 | 10.5 | 15.6 | 5.8 | 8.6 | | | 33 | 0.056 |
| 24 | 96.3 | -0.7 | 2.3 | 3.5 | 3.5 | 11.3 | 17.4 | 6.5 | 10.1 | | | 25 | 0.054 |
| 25 | 96.7 | -0.9 | 4.1 | | | 11.8 | 20.8 | 6.7 | 11.8 | | | 34 | 0.063 |
| 26 | 96.5 | -1.1 | 4.0 | | | 10.6 | 21.2 | 6.4 | 12.6 | | | 34 | 0.066 |
| 27 | | | | 5.2 | 5.1 | 9.7 | 18.9 | 5.5 | 10.7 | | | 38 | 0.083 |
| 28 | 96.5 | -0.8 | 4.3 | 10.2 | 10.8 | 11.6 | 20.1 | 6.4 | 11.2 | | | 34 | 0.054 |
| 29 | 96.0 | -0.6 | 4.6 | 8.4 | 8.6 | 11.8 | 20.9 | 6.3 | 11.2 | | | 37 | 0.062 |
| 30 | 95.8 | -0.6 | 4.6 | 9.8 | 8.7 | 12.5 | 22.6 | 6.6 | 12.0 | | | 37 | 0.064 |
| 31 | 95.2 | -0.6 | 5.4 | 7.9 | 8.0 | 12.2 | 20.6 | 6.7 | 11.3 | | | 38 | 0.059 |
| 32 | 95.2 | -0.5 | 5.4 | 8.3 | 8.4 | 12.1 | 21.9 | 6.5 | 11.8 | | | 40 | 0.065 |
| 33 | 95.3 | -0.6 | 5.2 | 8.2 | 8.4 | 12.6 | 23.0 | 6.6 | 12.0 | | | 39 | 0.068 |
| 34 | 95.8 | -0.4 | 3.3 | 3.3 | 3.1 | 10.5 | 25.4 | 5.3 | 12.9 | | | 47 | 0.056 |
| 35 | 95.5 | -0.4 | 3.7 | 2.9 | 3.0 | 10.4 | 25.1 | 5.3 | 12.7 | | | 44 | 0.054 |

FIG. 21C-2

| | | | | | | | | | | | | |
|---|---|---|---|---|---|---|---|---|---|---|---|---|
| 36 | 95.1 | -0.2 | 4.1 | 3.0 | 3.1 | 10.4 | 24.3 | 5.4 | 12.6 | | | | 43 | 0.054 |
| 37 | 95.1 | -0.6 | 4.3 | 4.6 | 4.6 | 10.7 | 25.2 | 5.4 | 12.8 | | | | 52 | 0.073 |
| 38 | 94.6 | -0.1 | 5.0 | 3.0 | 3.1 | 9.6 | 23.2 | 4.9 | 12.0 | | | | 41 | 0.049 |
| 39 | 94.6 | -0.1 | 4.9 | 3.0 | 3.1 | 9.9 | 23.7 | 5.1 | 12.1 | | | | 39 | 0.049 |
| 40 | | | | 7.5 | 7.2 | 11.1 | 21.2 | 6.5 | 12.5 | | | | 27 | 0.067 |
| 41 | | | | 2.5 | 2.7 | 11.3 | 21.7 | 6.2 | 11.9 | | | | 43 | 0.058 |
| 42 | | | | 2.9 | 2.9 | 11.4 | 22.2 | 6.5 | 12.6 | | | | 30 | 0.060 |
| 43 | | | | 8.0 | 7.8 | 12.5 | 24.0 | 6.8 | 13.0 | | | | 28 | 0.072 |
| 44 | | | | 2.8 | | 11.5 | 20.8 | 6.4 | 11.5 | | | | 37 | 0.042 |

FIG. 21C-3

| Sample ID | CD Wet Tensile Strength-Finch | CD Wet Peak Elongation-Finch | CD Wet Peak TEA-Finch | MD Wet Tensile Strength-Finch | MD Wet Peak Elongation-Finch | MD Wet Peak TEA-Finch | Total Wet Tensile-Finch | Total Wet Tensile Decay-Finch | SST |
|---|---|---|---|---|---|---|---|---|---|
| 1 | 19.0 | 12.9 | 1.9 | 30.3 | 13.9 | 2.7 | 49.3 | | 0.38 |
| 2 | 17.7 | 12.0 | 1.7 | 25.3 | 12.7 | 2.1 | 43.0 | | 0.38 |
| 3 | 20 | 12.3 | 1.9 | 30 | 14.7 | 2.8 | 50.7 | | 0.41 |
| 4 | 23 | 12.5 | 2.1 | 34 | 15.1 | 3.1 | 57.7 | | 0.38 |
| 5 | 17 | 12.0 | 1.7 | 27 | 13.6 | 2.4 | 44.0 | | 0.43 |
| 6 | 16 | 12.5 | 1.7 | 24 | 12.5 | 2.1 | 40.3 | | 0.41 |
| 7 | 18 | 12.3 | 1.8 | 28 | 13.1 | 2.4 | 46.3 | | 0.42 |
| 8 | 18 | 12.9 | 1.8 | 26 | 14.2 | 2.4 | 44.3 | | 0.45 |
| 15 | 19 | 12.3 | 1.8 | 28 | 13.8 | 2.7 | 46.8 | 21.0 | 0.42 |
| 16 | 22 | 12.2 | 2.0 | 34 | 15.0 | 3.3 | 56.5 | 24.5 | 0.37 |
| 17 | 22 | 12.6 | 2.2 | 33 | 14.6 | 3.0 | 55.0 | 23.0 | 0.36 |
| 18 | 18 | 12.3 | 1.9 | 27 | 13.4 | 2.4 | 45.0 | 20.8 | 0.36 |
| 19 | 25 | 12.1 | 2.2 | 34 | 14.6 | 3.2 | 58.0 | 28.0 | 0.34 |
| 20 | 15 | 12.1 | 1.6 | 31 | 14.1 | 2.9 | 45.3 | 15.8 | 0.57 |
| 21 | 19 | 11.8 | 1.8 | 35 | 12.1 | 2.7 | 53.8 | 18.8 | 0.52 |

FIG. 21D-1

| 22 | 18 | 13.4 | 2.0 | 36 | 15.2 | 3.3 | 53.5 | 19.3 | 0.59 |
| 23 | 17 | 9.6 | 1.4 | 27 | 9.7 | 1.9 | 43.8 | 22.3 | 0.71 |
| 24 | 13 | 11.1 | 1.4 | 23 | 14.1 | 2.4 | 35.5 | 20.5 | 0.70 |
| 25 | 20 | 12.9 | 2.0 | 32 | 18.0 | 3.6 | | | |
| 26 | 23 | 13.9 | 2.4 | 35 | 19.9 | 4.2 | | | |
| 27 | 21 | 12.6 | 2.0 | 32 | 13.3 | 2.6 | 52.7 | | |
| 28 | 27 | 11.9 | 2.2 | 40 | 15.9 | 3.5 | 66.3 | 21.8 | 0.39 |
| 29 | 24 | 11.1 | 1.9 | 38 | 16.2 | 3.5 | 61.3 | 20.0 | 0.41 |
| 30 | 22 | 11.7 | 2.0 | 35 | 14.8 | 3.0 | 56.8 | 18.8 | 0.43 |
| 31 | 23 | 11.5 | 2.0 | 41 | 15.0 | 3.3 | 63.5 | 22.5 | 0.40 |
| 32 | 23 | 13.6 | 2.3 | 41 | 15.9 | 3.4 | 63.5 | 22.3 | 0.47 |
| 33 | 23 | 12.1 | 2.1 | 38 | 16.0 | 3.2 | 60.8 | 22.0 | 0.43 |
| 34 | 36 | 12.8 | 2.9 | 58 | 16.1 | 4.9 | 93.5 | 26.0 | 0.65 |
| 35 | 35 | 13.0 | 2.9 | 56 | 15.6 | 4.7 | 90.5 | 23.5 | 0.66 |

FIG. 21D-2

| | | | | | | | | | |
|---|---|---|---|---|---|---|---|---|---|
| 36 | 33 | 12.7 | 2.8 | 55 | 16.0 | 4.7 | 88.0 | 24.3 | 0.61 |
| 37 | 28 | 12.4 | 2.4 | 45 | 14.3 | 3.6 | 72.3 | 24.5 | 0.68 |
| 38 | 31 | 11.6 | 2.4 | 53 | 14.5 | 4.2 | 84.0 | 25.3 | 0.53 |
| 39 | 28 | 12.2 | 2.4 | 52 | 15.0 | 4.2 | 79.8 | 23.0 | 0.52 |
| 40 | | | | | | | 52 | 12.7 | |
| 41 | | | | | | | 66 | 16.0 | |
| 42 | | | | | | | 56 | 15.7 | |
| 43 | | | | | | | 53 | 13.0 | |
| 44 | 32 | 10.8 | 2.2 | 39 | 12.7 | 2.7 | 71 | 26.7 | |

FIG. 21D-3

| Sample ID | Stack Compressibility | Resilient Bulk | Stack Compressibility x Resilient Bulk | TS7 Avg | TS750 Avg | Plate Stiffness | Slip Stick CoF Avg | Kinetic CoF Avg | Bulk (cc/g) |
|---|---|---|---|---|---|---|---|---|---|
| 1 | 37.0 | 50.8 | 1881 | 5.2 | 36.4 | 1.9 | 346 | 0.96 | 10.6 |
| 2 | 36.0 | 50.2 | 1806 | 5.9 | 38.9 | 2.1 | 353 | 1.01 | 10.5 |
| 3 | 40.0 | 51.5 | 2063 | 5.6 | 37.8 | 2.1 | 333 | 1.02 | 10.7 |
| 4 | 35.9 | 49.3 | 1771 | 5.9 | 36.0 | 2.2 | 325 | 0.98 | 10.3 |
| 5 | 38.5 | 52.5 | 2020 | 5.3 | 36.8 | 1.9 | 387 | 1.07 | 10.9 |
| 6 | 38.9 | 51.3 | 1997 | 5.0 | 35.9 | 2.1 | 290 | 1.00 | 10.5 |
| 7 | 39.9 | 52.0 | 2074 | 5.3 | 34.9 | 2.1 | 282 | 0.98 | 10.5 |
| 8 | 37.2 | 51.6 | 1918 | 5.0 | 33.5 | 2.0 | 301 | 1.04 | 10.5 |
| 15 | 33.8 | 53.0 | 1792 | 5.1 | 31.0 | 1.8 | 331 | 1.00 | 10.3 |
| 16 | 34.2 | 51.2 | 1748 | 5.7 | 35.7 | 1.9 | 373 | 0.94 | 9.9 |
| 17 | 33.8 | 51.6 | 1743 | 5.5 | 32.5 | 2.1 | 388 | 1.04 | 10.0 |
| 18 | 33.9 | 51.4 | 1742 | 6.0 | 31.2 | 2.0 | 410 | 1.03 | 9.8 |
| 19 | 34.9 | 50.7 | 1770 | 7.9 | 34.0 | 2.1 | 537 | 1.03 | 9.9 |
| 20 | 30.3 | 65.9 | 1993 | 9.4 | 19.4 | 3.2 | 404 | 0.94 | 12.4 |
| 21 | 30.0 | 62.0 | 1859 | 9.3 | 26.1 | 3.1 | 371 | 0.90 | 11.6 |

FIG. 21E-1

| | | | | | | | | |
|---|---|---|---|---|---|---|---|---|
| 22 | 29.0 | 63.0 | 1828 | 9.6 | 19.9 | 3.6 | 417 | 0.95 | 11.6 |
| 23 | 32.1 | 62.9 | 2016 | 9.3 | 17.6 | 3.9 | 491 | 0.99 | 11.7 |
| 24 | 31.9 | 65.4 | 2082 | 10.4 | 15.9 | 4.4 | 534 | 0.96 | 11.9 |
| 25 | 29.2 | 58.2 | 1697 | 9.3 | 23.5 | 3.2 | 465 | 1.06 | 10.5 |
| 26 | 28.2 | 60.1 | 1695 | 9.4 | 16.2 | 3.3 | 462 | 1.01 | 11.1 |
| 27 | 30.1 | 61.4 | 1847 | 10.0 | 18.9 | 3.2 | 463 | 1.02 | 11.2 |
| 28 | 33.4 | 56.2 | 1876 | 6.0 | 41.7 | 2.2 | 391 | 0.95 | 10.9 |
| 29 | 33.1 | 56.8 | 1882 | 5.9 | 39.6 | 2.1 | 373 | 0.96 | 10.9 |
| 30 | 37.6 | 57.5 | 2159 | 5.4 | 36.8 | 2.3 | 407 | 1.03 | 11.3 |
| 31 | 32.2 | 58.3 | 1878 | 5.8 | 39.6 | 2.5 | 410 | 0.99 | 10.9 |
| 32 | 34.1 | 59.1 | 2014 | 5.5 | 35.5 | 2.2 | 437 | 0.99 | 11.2 |
| 33 | 34.4 | 60.5 | 2081 | 5.2 | 34.8 | 2.1 | 378 | 1.02 | 11.8 |
| 34 | 43.0 | 67.2 | 2887 | 12.6 | 26.3 | 4.9 | 472 | 0.88 | 13.0 |
| 35 | 40.6 | 67.9 | 2756 | 12.1 | 26.6 | 4.8 | 452 | 0.93 | 13.2 |

FIG. 21E-2

| 36 | 41.4 | 68.6 | 2841 | 12.0 | 27.1 | 5.3 | 443 | 0.87 | 14.3 |
|----|------|------|------|------|------|-----|-----|------|------|
| 37 | 35.2 | 64.9 | 2283 | 10.7 | 23.3 | 5.2 | 450 | 0.89 | 14.3 |
| 38 | 36.4 | 66.7 | 2427 | 11.4 | 23.9 | 5.0 | 489 | 0.90 | 12.7 |
| 39 | 39.1 | 67.6 | 2640 | 11.4 | 22.7 | 4.7 | 464 | 0.87 | 13.5 |
| 40 |      |      |      |      |      |     |     |      | 11.4 |
| 41 |      |      |      |      |      |     |     |      | 11.2 |
| 42 |      |      |      |      |      |     |     |      | 11.4 |
| 43 |      |      |      |      |      |     |     |      | 11.3 |
| 44 |      |      |      |      |      |     |     |      | 12.3 |

FIG. 21E-3

| Sample ID | Type | Non-wood | Substrate | Basis Weight | Compressive Modulus slope | Dry Caliper | Wet Caliper | Peak Load CD Tensile | CD Elongation (dry) | CD TEA | CD Modulus |
|---|---|---|---|---|---|---|---|---|---|---|---|
| A.1 | Comparative | Bamboo | Bath Tissue | 17.2 | -4.0 | 8.9 | | 251 | 7.6 | 12.2 | 2119 |
| A.2 | Comparative | Bamboo | Bath Tissue | 16.4 | | | | 232 | 9.0 | 14.2 | 1953 |
| B.1 | Comparative | Bamboo | Bath Tissue | 27.1 | | 14.4 | | 185 | 8.6 | 10.0 | 1308 |
| B.2 | Comparative | Bamboo | Bath Tissue | 26.3 | | | | 178 | 8.5 | 9.5 | 1285 |
| E.1 | Comparative | Bamboo | Bath Tissue | 26.2 | | | | 218 | 11.5 | 15.7 | 1188 |
| F.1 | Comparative | Bamboo | Bath Tissue | 23.7 | -9.8 | 24.4 | | 226 | 11.3 | 9.8 | 534 |
| H.1 | Comparative | Bamboo/Sugar Cane | Bath Tissue | 20.5 | | 11.8 | | 151 | 3.4 | 5.8 | 1394 |
| I | Comparative | Bamboo | Bath Tissue | 18.1 | -4.1 | 12.7 | | 172 | 6.8 | 7.1 | 1561 |
| I.1 | Comparative | Bamboo | Bath Tissue | 18.2 | | | | 213 | 5.5 | 7.4 | 2148 |
| I.2 | Comparative | Bamboo | Bath Tissue | 18.1 | -4.6 | | | 148 | 8.3 | 8.0 | 1128 |
| I.3 | Comparative | Bamboo | Bath Tissue | 19.1 | | 11.9 | | 199 | 9.8 | 12.3 | 1322 |
| J | Comparative | Bamboo | Bath Tissue | 18.0 | | | | 180 | 5.1 | 5.3 | 1903 |
| K | Comparative | Bamboo/Sugar Cane | Bath Tissue | 28.4 | | 17.2 | | 212 | 9.3 | 12.2 | 1428 |
| M | Comparative | Bamboo/Sugar Cane | Bath Tissue | 27.0 | | 17.2 | | 411 | 4.8 | 11.6 | 3729 |
| N | Comparative | Bamboo | Bath Tissue | 27.2 | -4.3 | 15.0 | | 285 | 9.0 | 16.8 | 2056 |

FIG. 21F-1

| | | | | | | | | | | |
|---|---|---|---|---|---|---|---|---|---|---|
| O | Comparative | Bamboo/Sugar Cane | Bath Tissue | 17.3 | | 11.1 | | | | |
| P | Comparative | Bamboo/Sugar Cane | Bath Tissue | 27.3 | | 23.2 | | | | |
| Q | Comparative | Bamboo/Sugar Cane | Bath Tissue | 25.7 | | 14.0 | | | | |
| Q.1 | Comparative | Bamboo | Bath Tissue | 27.4 | | | | | | |
| Q.2 | Comparative | Bamboo/Sugar Cane | Bath Tissue | 23.3 | | 14.8 | | | | |
| AA | Comparative | Wheat Straw | Bath Tissue | 29.6 | -5.2 | 17.8 | 151 | 7.3 | 6.8 | 1193 |
| BB | Comparative | Wheat Straw | Bath Tissue | 30.2 | -3.4 | 19.0 | 340 | 12.0 | 21.7 | 1134 |
| Z01 | Traditional | | Bath Tissue | 32.9 | -7.8 | 23.0 | 162 | 6.8 | 6.4 | 1288 |
| Z03 | Traditional | | Bath Tissue | 30.4 | -5.9 | 22.6 | 217 | 10.1 | 13.9 | 1392 |
| Z06 | Traditional | | Bath Tissue | 31.3 | -5.1 | 22.1 | 210 | 7.7 | 10.1 | 1587 |
| Z07 | Traditional | | Bath Tissue | 33.2 | -7.9 | 23.4 | 407 | 7.9 | 18.3 | 2289.8 |
| Z08 | Traditional | | Bath Tissue | 24.4 | -8.6 | 20.3 | 555 | 6.5 | 20.2 | 3232.9 |
| Z09 | Traditional | | Bath Tissue | 28.6 | -4.37 | 21.8 | 216 | 11.8 | 15.4 | 847 |
| Z10 | Traditional | | Bath Tissue | 29.4 | -4.53 | 20.8 | 189 | 10.5 | 11.3 | 860 |
| Z11 | Traditional | | Bath Tissue | 29.8 | -6.43 | 23.5 | 198 | 9.4 | 10.6 | 994 |
| Z13 | Traditional | | Bath Tissue | 31.9 | -8.7 | 21.1 | 221 | 10.2 | 13.4 | 964 |
| | | | | | | | 298 | 10.6 | 18.2 | 1157 |
| | | | | | | | 227 | | | |
| | | | | | | | 251 | | | |
| | | | | | | | 215 | 10.5 | 13.3 | 1176 |
| | | | | | | | 242 | 12.1 | 16.0 | 914 |

FIG. 21F-2

| Sample ID | Peak Load MD Tensile | MD Elongation (dry) | MD TEA | MD Modulus | Total Dry Tensile | Geometric Mean (GM) Dry Modulus | Tensile Ratio | Flexural Rigidity-MD mg-cm | Flexural Rigidity-CD mg-cm | Flexural Rigidity-Avg mg-cm |
|---|---|---|---|---|---|---|---|---|---|---|
| A.1 | 687 | 63.3 | 233.4 | 1011 | 937 | 1460 | 2.74 | 44.2 | 59.3 | 51.8 |
| A.2 | 648 | 72.6 | 236.4 | 720 | 881 | 1186 | 2.79 | | | |
| B.1 | 817 | 22.0 | 96.3 | 1735 | 992 | 1487 | 4.41 | | | |
| B.2 | 792 | 22.9 | 105.3 | 1919 | 970 | 375 | 4.46 | 79.2 | 68.4 | 73.8 |
| E.1 | 708 | 57.0 | 203.1 | 778 | 926 | 960 | 3.25 | | | |
| F.1 | 248 | 19.4 | 25.8 | 622 | 475 | 576 | 1.10 | 112.8 | 40.3 | 76.6 |
| H.1 | 617 | 19.7 | 64.7 | 1425 | 768 | 1409 | 4.10 | 26.7 | 44.7 | 35.7 |
| I | 445 | 19.6 | 44.0 | 1004 | 618 | 1252 | 2.58 | 58.9 | 50.9 | 54.9 |
| I.1 | 359 | 22.4 | 51.0 | 1190 | 572 | 1599 | 1.68 | | | |
| I.2 | 332 | 19.4 | 35.8 | 853 | 480 | 979 | 2.24 | 30.5 | 46.2 | 38.4 |
| I.3 | 659 | 22.4 | 85.3 | 1719 | 858 | 1497 | 3.31 | 57.2 | 44.8 | 51.0 |
| J | 722 | 33.7 | 114.5 | 1030 | 902 | 1389 | 4.02 | | | |
| K | 935 | 39.2 | 169.6 | 1274 | 1147 | 1349 | 4.42 | 84.0 | 79.0 | 81.0 |
| M | 688 | 33.9 | 112.1 | 839 | 1099 | 1769 | 1.67 | 37.0 | 243.0 | 140.0 |

FIG. 21G-1

| | | | | | | | | | |
|---|---|---|---|---|---|---|---|---|---|
| N | 699 | 18.1 | 78.9 | 2444 | 984 | 2239 | 2.45 | 114.7 | 83.0 | 98.9 |
| O | 421 | 33.0 | 76.9 | 943 | 572 | 1061 | 2.79 | 30.0 | 49.0 | 40.0 |
| P | | | | | | | | 194.2 | 76.4 | 135.3 |
| Q | 660 | 19.1 | 64.9 | 1574 | 822 | 1424 | 4.07 | 30.5 | 56.7 | 43.6 |
| Q.1 | | | | | | | | | | |
| Q.2 | 368 | 23.6 | 46.2 | 727 | 578 | 1074 | 1.75 | 65.0 | 89.6 | 77.3 |
| AA | 1111.0 | 14.4 | 83 | 2426 | 1518 | 2357 | 2.7 | 206.1 | 314.8 | 260.5 |
| BB | 1325.5 | 17.0 | 114 | 2638 | 1880 | 2920 | 2.4 | 238.4 | 391.8 | 315.1 |
| Z01 | 316 | 22.9 | 40.2 | 698 | 532 | 769 | 1.46 | | | |
| Z03 | 306 | 22.4 | 39.9 | 892 | 495 | 875 | 1.62 | 205.8 | 128.7 | 167.3 |
| Z06 | 340 | 25.4 | 46.2 | 741 | 538 | 858 | 1.72 | 170.5 | 164.9 | 167.7 |
| Z07 | 301 | 23.3 | 42.6 | 816 | 521 | 886 | 1.36 | 56.5 | 75.3 | 65.9 |
| Z08 | 516 | 19.5 | 54.4 | 1281 | 814 | 1217 | 1.73 | 234.4 | 183.2 | 208.8 |
| Z09 | 336 | | | | 562 | 276 | 1.48 | | | |
| Z10 | 315 | | | | 566 | 281 | 1.25 | | | |
| Z11 | 344 | 18.8 | 32.0 | 772 | 559 | 272 | 1.60 | 46.9 | 59.9 | 53.4 |
| Z13 | 331 | 17.4 | 33.3 | 992 | 572 | 952 | 1.37 | | | |

FIG. 21G-2

| Sample ID | L | A | B | Lint-outside | Lint-Average | HFS g/sht | HFS g/g | VFS g/sht | VFS g/g | CRT capacity g/g | CRT capacity g/in | CRT rate g/s | Residual Water (%) | Wet Burst Strength | Wet Burst Strength/Total Dry Tensile |
|---|---|---|---|---|---|---|---|---|---|---|---|---|---|---|---|
| A.1 | 95.1 | -0.9 | 4.4 | 1.1 | 1.1 | 6.7 | 24.3 | 2.7 | 9.7 | | | | | 16 | 0.017 |
| A.2 | | | | | | | | | | | | | | | |
| B.1 | | | | | | | | | | | | | | | |
| B.2 | | | | 2.0 | | | | | | | | | | 10 | 0.010 |
| E.1 | | | | | | | | | | | | | | | |
| F.1 | | | | 5.4 | 4.9 | 7.4 | 18.5 | 3.4 | 8.7 | | | | | 16 | 0.033 |
| H.1 | | | | 1.0 | 1.0 | 5.0 | 17.6 | 2.3 | 8.1 | | | | | 9 | 0.011 |
| I | 93.9 | -0.9 | 5.6 | 1.3 | 1.3 | 6.4 | 20.9 | 2.5 | 8.3 | | | | | 4 | 0.007 |
| I.1 | | | | | | | | | | | | | | | |
| I.2 | | | | 1.2 | 1.2 | 7.2 | 23.6 | 2.9 | 9.6 | | | | | 3 | 0.006 |
| I.3 | | | | 1.1 | 1.1 | 6.3 | 18.6 | 2.9 | 8.5 | | | | | 4 | 0.005 |
| J | | | | | | | | | | | | | | | |
| K | | | | 1.4 | 1.4 | 8.7 | 4.2 | 17.5 | 8.5 | | | | | 9 | 0.008 |

FIG. 21H-1

| | | | | | | | | | | | | | | | | |
|---|---|---|---|---|---|---|---|---|---|---|---|---|---|---|---|---|
| M | | | | | | | | | | | | | | | 13 | 0.012 |
| N | 96.2 | -0.8 | 3.7 | | 1.0 | 1.0 | 7.8 | 16.9 | 3.6 | 7.7 | | | | | 6 | 0.006 |
| O | | | | | 1.5 | 1.7 | 6.3 | 13.8 | 3.7 | 8.0 | | | | | 5 | 0.009 |
| P | | | | | 1.0 | 1.0 | 6.8 | 22.6 | 2.6 | 8.7 | | | | | 22 | |
| Q | | | | | 0.9 | 0.9 | 9.0 | 18.7 | 4.0 | 8.4 | | | | | 9 | 0.011 |
| Q.1 | | | | | 2.3 | 2.3 | 6.7 | 15.7 | 3.4 | 8.1 | | | | | | |
| Q.2 | | | | | | | | | | | | | | | 3 | 0.005 |
| AA | 94.3 | -1.4 | 6.9 | | 3.7 | 3.7 | 8.4 | 19.8 | 3.7 | 8.7 | | | | | 9.4 | 0.006 |
| BB | 94.3 | -1.4 | 7.2 | | 0.9 | 1.4 | | | | | | | | | 7.2 | 0.004 |
| Z01 | 96.9 | -0.8 | 3.6 | | 0.2 | 0.5 | | | | | | | | | | 0.000 |
| Z03 | 96.7 | -0.8 | 3.5 | | 10.3 | 9.8 | 11.8 | 21.2 | 6.4 | 11.4 | | | | | 30 | 0.060 |
| Z06 | 96.8 | -0.9 | 3.4 | | 9.6 | 10.5 | 11.0 | 20.3 | 6.3 | 11.6 | | | | | 29 | 0.053 |
| Z07 | 96.8 | -0.8 | 4.1 | | 11.8 | 11.2 | 11.0 | 20.6 | 6.1 | 11.5 | | | | | 28 | 0.053 |
| Z08 | 96.1 | -0.5 | 3.0 | | 3.5 | 3.4 | 11.8 | 21.3 | 6.4 | 11.5 | | | | | 45 | 0.056 |
| Z09 | | | | | 7.7 | 7.6 | 11.0 | 26.8 | 5.5 | 13.4 | | | | | 30 | 0.053 |
| Z10 | | | | | 7.3 | 7.6 | 10.9 | 20.9 | 6.6 | 12.7 | | | | | 26 | 0.046 |
| Z11 | | | | | 7.1 | | 11.8 | 22.3 | 6.4 | 12.0 | | | | | 28 | 0.049 |
| Z13 | 96.8 | -0.7 | 3.3 | | 9.7 | 10.1 | 10.4 | 19.5 | 5.9 | 11.1 | | | | | 34 | 0.059 |

| Sample ID | CD Wet Tensile Strength - Finch | CD Wet Peak Elongation - Finch | CD Wet Peak TEA - Finch | MD Wet Tensile Strength - Finch | MD Wet Peak Elongation - Finch | MD Wet Peak TEA - Finch | Total Wet Tensile - Finch | Total Wet Tensile Decay - Finch | SST |
|---|---|---|---|---|---|---|---|---|---|
| A1 | 11 | 6.1 | 0.73 | 43 | 15.1 | 3.6 | 53.7 | | |
| A2 | 10 | 5.6 | 0.63 | 38 | 15.3 | 3.5 | 48.0 | | |
| B1 | 8 | 2.8 | 0.37 | 32 | 5.9 | 1.3 | 39.7 | | |
| B2 | 7.3 | 2.6 | 0.40 | 21.3 | 5.1 | 0.9 | 28.6 | | |
| E1 | 6 | 2.4 | 0.40 | 20 | 8.1 | 1.3 | 26.0 | | |
| F1 | 13 | 5.1 | 0.77 | 14 | 12.4 | 1.6 | 27.3 | | |
| H1 | 6 | 1.6 | 0.37 | 16 | 5.8 | 0.8 | 21.7 | 19.0 | |
| I | 8 | 3.4 | 0.43 | 13 | 4.4 | 0.7 | 21.3 | | |
| I1 | 7 | 2.1 | 0.33 | 13 | 4.2 | 0.6 | 19.7 | | |
| I2 | 3 | | 0.15 | 8 | 2.0 | 0.4 | 10.5 | | |
| I3 | 4 | | 0.23 | 11 | 3.5 | 0.5 | 15.0 | | |
| J | 8 | 2.1 | 0.27 | 26 | 5.3 | 1.0 | 34.0 | | |
| K | 7 | 2.6 | 0.27 | 25 | 5.9 | 1.1 | 31.3 | | |
| M | 18 | 4.3 | 0.40 | 31 | 6.9 | 1.4 | 48.7 | | |
| N | 7 | 3.2 | 0.67 | 17 | 4.0 | 0.6 | 23.8 | 20.3 | |
| O | 5 | | 0.28 | 16 | 6.3 | 0.9 | 21.3 | | |
| P | 15 | 7.6 | 1.00 | 48 | 10.6 | 3.1 | 63.3 | | |
| Q | 5 | 2.6 | 0.20 | 21 | 4.4 | 0.7 | 25.5 | | |
| Q1 | 6 | 13.8 | 0.30 | 22 | 4.8 | 0.9 | 27.3 | | |
| Q2 | 3 | 2.5 | 0.20 | 9 | 17.7 | 0.6 | 11.5 | | |
| AA | 7.4 | 2.6 | 0.3 | 20.3 | 5.3 | 1.0 | 27.7 | 22.0 | 0.44 |
| BB | 7.1 | 12.9 | 0.3 | 14.3 | 5.1 | 0.7 | 21.4 | 9.8 | 0.47 |
| 201 | 22.0 | 8.9 | 2.1 | 33.0 | 14.5 | 2.9 | 55.0 | 17.0 | |
| 203 | 13 | 10.3 | 1.2 | 21 | 11.0 | 1.9 | 34.5 | 17.0 | 0.35 |
| 206 | 21 | 11.7 | 1.7 | 37 | 11.6 | 2.6 | 57.3 | 25.0 | 0.73 |
| 207 | 21 | 11.7 | 1.9 | 31 | 16.3 | 3.0 | 52.3 | 16.7 | |
| 208 | 35 | 13.4 | 3.0 | 53 | 16.1 | 4.7 | 88.5 | 14.7 | |
| 209 | | | | | | | 60 | | |
| 210 | | | | | | | 57 | | |
| 211 | 21 | 11.5 | 1.6 | 30 | 13.5 | 2.1 | 52 | 15.3 | |
| 213 | 23 | 11.7 | 2.0 | 34 | 14.5 | 3.1 | 56.5 | 22.8 | 0.38 |

| Sample ID | Stack Compressibility | Resilient Bulk | Stack Compressibility x Resilient Bulk | TS7 Avg | TS750 Avg | Plate Stiffness | Slip Stick CoF Avg | Kinetic CoF Avg | Bulk (cc/g) |
|---|---|---|---|---|---|---|---|---|---|
| A.1 | | | | | | | | | 8.1 |
| A.2 | | | | | | | | | |
| B.1 | | | | | | | | | |
| B.2 | 16.5 | 45.9 | | 16.7 | 22.2 | 1.49 | 647 | | 8.5 |
| E.1 | | | | | | | | | |
| F.1 | 44.8 | 59.0 | 2647 | 14.7 | 51.7 | 3.5 | 675 | 1.00 | 16.1 |
| H.1 | 15.6 | 47.5 | 741 | 15.0 | 25.2 | 1.4 | 587 | | 9.0 |
| I | | | | | | | | | 11.0 |
| I.1 | | | | | | | | | |
| I.2 | | | | | | | | | |
| I.3 | | | | | | | | | 9.7 |
| J | | | | | | | | | |
| K | 23.1 | 64.6 | 1492 | 19.8 | 58.3 | 2.3 | 907 | | 9.4 |
| M | 16.3 | 49.8 | 812 | 15.0 | 25.0 | 1.5 | 625 | | 10.0 |
| N | 17.67 | 45.85 | 810 | 22.2 | 66.9 | 4.12 | 940 | 1.01 | 8.6 |
| O | 13.3 | 52.6 | 700 | 26.6 | 30.2 | 1.2 | 741 | | 10.0 |
| P | 31.5 | 53.7 | 1692 | 25.7 | 100.1 | 3.6 | 920 | | 13.3 |
| Q | 10.8 | 34.6 | 374 | 18.5 | 22.4 | 1.1 | 486 | | 8.5 |
| Q.1 | | | | | | | | | |
| Q.2 | 13.6 | 46.1 | 627 | 15.2 | 23.1 | 1.2 | 543 | | 9.9 |
| AA | 10.2 | 50.8 | 518 | 21.8 | 51.6 | 7.0 | 529 | 0.69 | 9.4 |
| BB | 17.0 | 47.1 | 807 | 19.9 | 48.1 | 6.2 | 636 | 0.82 | 9.8 |
| Z01 | 35.8 | 52.0 | 1860 | 5.6 | 38.1 | 2.3 | 305 | 1.03 | 10.9 |
| Z03 | 28.9 | 63.9 | 1848 | 8.1 | 21.9 | 2.8 | 327 | 0.92 | 11.6 |
| Z06 | 28.2 | 60.5 | 1708 | 7.8 | 22.5 | 2.9 | 333 | 0.96 | 11.0 |
| Z07 | 34.2 | 57.3 | 1958 | 5.8 | 40.8 | 2.2 | 325 | 0.95 | 11.0 |
| Z08 | 44.3 | 68.6 | 3039 | 12.3 | 24.5 | 4.7 | 487 | 0.91 | 13.0 |
| Z09 | | | | | | | | | 11.9 |
| Z10 | | | | | | | | | 11.0 |
| Z11 | | | | | | | | | 12.3 |
| Z13 | 31.9 | 53.9 | 1719 | 5.4 | 35.8 | 2.0 | 303 | 0.92 | 10.3 |

FIG. 21J

| Sample ID | Type | Non-wood | Substrate | Basis Weight | Compressive Modulus slope | Dry Caliper | Wet Caliper | Peak Load CD Tensile | CD Elongation (dry) |
|---|---|---|---|---|---|---|---|---|---|
| 9 | Inventive | Bamboo | Towel | 35.0 | -10.8 | 45.9 | 35.2 | 855 | 12.3 |
| 10 | Inventive | Bamboo | Towel | 35.2 | -11.3 | 47.0 | 34.0 | 871 | 12.2 |
| 11 | Inventive | Bamboo | Towel | 35.1 | -10.9 | 51.2 | 35.2 | 904 | 12.9 |
| 12 | Inventive | Bamboo | Towel | 35.0 | -10.8 | 49.9 | 33.8 | 800 | 14.9 |
| 13 | Inventive | Bamboo | Towel | 34.5 | -10.7 | 48.3 | 31.3 | 794 | 12.2 |
| 14 | Inventive | Bamboo | Towel | 35.0 | -11.3 | 50.2 | 34.7 | 723 | 16.3 |
| 45 | Inventive | Bagasse | Towel | 33.2 | -8.07 | 32.3 | 29.6 | 644 | 13.5 |
| 46 | Inventive | Flax | Towel | 33.2 | -7.17 | 30.7 | 27.3 | 480 | 13.7 |
| 47 | Inventive | Hemp | Towel | 32.7 | -8.60 | 30.8 | 28.2 | 563 | 13.3 |
| 48 | Inventive | Unbleached Bamboo | Towel | 32.6 | -8.17 | 30.8 | 28.1 | 478 | 14.8 |
| 49 | Inventive | Abaca | Towel | 34.3 | -7.67 | 29.5 | 24.6 | 499 | 10.3 |
| 56 | Inventive | Abaca | Towel | 34.6 | -12.1 | 43.9 | 32.4 | 978 | 11.5 |
| 57 | Inventive | Abaca | Towel | 34.1 | -12.4 | 44.3 | 32.3 | 871 | 10.8 |
| 58 | Inventive | Abaca | Towel | 34.3 | -10.6 | 44.9 | 32.2 | 799 | 13.2 |
| 59 | Inventive | Abaca | Towel | 34.8 | -10.5 | 44.3 | 33.4 | 1081 | 12.2 |
| 60 | Inventive | Abaca | Towel | 34.6 | -10.8 | 44.4 | 32.6 | 1110 | 11.3 |
| 61 | Inventive | Abaca | Towel | 38.9 | -11.8 | 49.2 | 30.6 | 1061 | 9.1 |
| 62 | Inventive | Abaca | Towel | 38.8 | -12.4 | 49.0 | 32.0 | 961 | 9.9 |
| 63 | Inventive | Abaca | Towel | 39.2 | -12.1 | 49.4 | 32.5 | 961 | 9.9 |
| 64 | Inventive | Abaca | Towel | 38.2 | -13.4 | 49.9 | 34.3 | 998 | 10.2 |
| R | Comparative | | Towel | 28.9 | -4.6 | 24.3 | 8.93 | 311 | 7.2 |
| S | Comparative | Bamboo | Towel | 31.3 | -6.9 | 24.1667 | 13.6 | 442 | 6.2 |
| T | Comparative | Bamboo | Towel | 27.2 | -4.8 | 16.1667 | 8.3 | 1057 | 4.8 |
| U | Comparative | Bamboo/Sugar Cane | Towel | 32.7 | -5.7 | 20.9 | 11.2 | 720 | 4.7 |
| V | Comparative | Bamboo | Towel | 27.7 | -5.7 | 21.8 | 11.5 | 699 | 6.0 |
| W | Comparative | Bamboo | Towel | 34.2 | -5.4 | 25.6 | 13.4 | 509 | 6.3 |
| X | Comparative | Bamboo/Sugar Cane | Towel | 30.4 | -5.3 | 19.1 | 10.6 | 672 | 6.0 |
| Y | Comparative | Bamboo | Towel | 28.0 | 5.8 | 17.7 | 11.5 | 836 | 5.1 |
| Z02 | Traditional | | Towel | 35.5 | -11.3 | 46.4 | 35.9 | 935 | 12.7 |
| Z12 | Traditional | | Towel | 33.4 | -8.3 | 28.0 | 26.6 | 616 | 14.5 |
| Z14 | Traditional | | Towel | 34.1 | -11.5 | 45.2 | 30.6 | 1034 | 10.7 |
| Z15 | Traditional | | Towel | 34.8 | -11.3 | 47.0 | 34.6 | 1144 | 11.9 |
| Z16 | Traditional | | Towel | 39.0 | -14.2 | 50.3 | 35.2 | 840 | 11.2 |

FIG. 22A

| Sample ID | CD TEA | CD Modulus | Peak Load MD Tensile | MD Elongation (dry) | MD TEA | MD Modulus | Total Dry Tensile | Geometric Mean (GM) Dry Modulus | Tensile Ratio |
|---|---|---|---|---|---|---|---|---|---|
| 9 | 55.3 | 2289 | 1250 | 14.8 | 94.4 | 2043 | 2105 | 2163 | 1.46 |
| 10 | 56.3 | 2460 | 1250 | 16.3 | 104.3 | 1949 | 2121 | 2189 | 1.44 |
| 11 | 62.2 | 2434 | 1272 | 16.6 | 106.7 | 1893 | 2176 | 2146 | 1.41 |
| 12 | 66.0 | 2305 | 1131 | 16.0 | 94.4 | 2020 | 1931 | 2157 | 1.41 |
| 13 | 51.3 | 2349 | 1129 | 15.8 | 90.9 | 1866 | 1923 | 2093 | 1.42 |
| 14 | 65.0 | 1998 | 1218 | 15.5 | 98.8 | 2247 | 1942 | 2118 | 1.68 |
| 45 | 44.9 | 1970 | 587 | 18.7 | 56.7 | 1190 | 1231 | 615 | 0.91 |
| 46 | 33.8 | 1266 | 639 | 17.9 | 57.1 | 1116 | 1119 | 554 | 1.33 |
| 47 | 38.5 | 1605 | 733 | 18.8 | 68.5 | 1281 | 1295 | 642 | 1.30 |
| 48 | 38.5 | 1526 | 570 | 17.6 | 54.0 | 1311 | 1047 | 522 | 1.19 |
| 49 | 28.7 | 1982 | 813 | 16.1 | 65.3 | 1490 | 1312 | 637 | 1.63 |
| 56 | 65.7 | 3500 | 1705 | 15.2 | 131.7 | 2470 | 2683 | 2941 | 1.74 |
| 57 | 53.0 | 3229 | 1418 | 13.4 | 96.8 | 2482 | 2289 | 2831 | 1.63 |
| 58 | 60.5 | 2273 | 1292 | 17.8 | 112.9 | 1446 | 2090 | 1812 | 1.62 |
| 59 | 75.7 | 3234 | 1720 | 18.4 | 152.9 | 1868 | 2800 | 2457 | 1.59 |
| 60 | 70.9 | 3442 | 1600 | 18.2 | 144.7 | 1883 | 2771 | 2545 | 1.44 |
| 61 | 47.1 | 2842 | 1428 | 13.0 | 90.2 | 2269 | 2489 | 2539 | 1.35 |
| 62 | 47.0 | 2511 | 1338 | 13.1 | 88.4 | 2433 | 2300 | 2472 | 1.39 |
| 63 | 48.4 | 2601 | 1277 | 13.6 | 86.8 | 2226 | 2238 | 2407 | 1.33 |
| 64 | 51.1 | 2403 | 1377 | 13.4 | 92.1 | 2227 | 2375 | 2313 | 1.38 |
| R | 14.3 | 2653 | 773 | 12.6 | 51.1 | 2782 | 1084 | 2717 | 2.49 |
| S | 16.5 | 3280 | 1731 | 17.8 | 154.5 | 3367 | 2174 | 3323 | 3.9 |
| T | 30.8 | 9159 | 2062 | 22.7 | 244.9 | 4301 | 3119 | 6276 | 2.0 |
| U | 21.0 | 6481 | 1384 | 28.7 | 200.3 | 2248 | 2104 | 3808.6 | 1.9 |
| V | 24.3 | 4333 | 1786 | 35.9 | 284.3 | 1949 | 2485 | 2876.0 | 2.6 |
| W | 18.6 | 2876 | 1797 | 20.0 | 167.3 | 2654 | 2306 | 2762.7 | 3.5 |
| X | 22.5 | 4313 | 1535 | 30.1 | 252.6 | 2540 | 2207 | 3289.2 | 2.3 |
| Y | 25.0 | 6121 | 2291 | 27.7 | 286.9 | 3184 | 3127 | 4409.6 | 2.7 |
| Z02 | 63.1 | 2553 | 1373 | 14.7 | 102.5 | 2069 | 2308 | 2295 | 1.47 |
| Z12 | 46.3 | 1727 | 767 | 19.7 | 76.6 | 1285 | 1383 | 687 | 1.24 |
| Z14 | 60.1 | 3439 | 1368 | 12.9 | 86.1 | 2305 | 2401 | 1189 | 1.32 |
| Z15 | 73.6 | 3034 | 1525 | 18.6 | 136.8 | 1653 | 2669 | 1321 | 1.33 |
| Z16 | 46.8 | 1936 | 1309 | 12.9 | 84.2 | 2535 | 2149 | 2215 | 1.56 |

FIG. 22B

| Sample ID | Flexural Rigidity- MD mg-cm | Flexural Rigidity - CD mg-cm | Flexural Rigidity - Avg mg-cm | L | A | B | Lint- outside | Lint - Average | HFS g/sht | HFS g/g |
|---|---|---|---|---|---|---|---|---|---|---|
| 9 | 922.9 | 1356.5 | 1139.7 | | | | | | 55.4 | 23.9 |
| 10 | 902.2 | 1447.7 | 1174.9 | | | | | | 56.5 | 23.7 |
| 11 | 1091.1 | 1616.1 | 1353.6 | | | | | | 52.5 | 22.0 |
| 12 | 1382.6 | 1478.7 | 1430.6 | | | | | | 56.4 | 25.0 |
| 13 | 964.7 | 1438.3 | 1201.5 | | | | | | 55.9 | 25.4 |
| 14 | 1361.6 | 1420.2 | 1390.9 | | | | 1.5 | | 54.7 | 24.8 |
| 45 | | | | | | | 1.7 | | 92.3 | 23.6 |
| 46 | | | | | | | 1.5 | | 88.8 | 23.5 |
| 47 | | | | | | | 1.6 | | 90.7 | 24.3 |
| 48 | | | | | | | 2.6 | | 95.0 | 25.3 |
| 49 | | | | | | | | | 81.5 | 20.9 |
| 56 | 744.1 | 1209.5 | 977 | | | | | | 52.4 | 22.8 |
| 57 | 727.1 | 1003.3 | 865 | | | | | | 53.7 | 23.7 |
| 58 | | | 717 | | | | | | 51.2 | 22.4 |
| 59 | | | 1091 | | | | | | 51.5 | 22.0 |
| 60 | | | 1073 | | | | | | 49.2 | 21.5 |
| 61 | 845.7 | 1259.7 | 1052.7 | 92.0 | -0.5 | 5.8 | | | 57.5 | 22.2 |
| 62 | 865.8 | 1077.4 | 971.6 | 92.2 | -0.6 | 5.8 | | | 58.3 | 22.9 |
| 63 | 817.6 | 1162.2 | 989.9 | 92.6 | -0.6 | 5.6 | | | 59.6 | 22.7 |
| 64 | 755.7 | 1004.8 | 880.2 | 92.0 | -0.6 | 5.8 | | | 56.5 | 22.2 |
| R | | | | | | | | | 32.0 | 10.6 |
| S | 670.9 | 693.5 | 682.2 | | | | | | 23.0 | 12.4 |
| T | 242.0 | 617.0 | 429.S | | | | | | 20.8 | 11.3 |
| U | 167.0 | 591.1 | 379.0 | | | | | | 40.6 | 12.8 |
| V | 213.3 | 754.2 | 483.7 | | | | | | 27.8 | 15.1 |
| W | 350.7 | 486.6 | 418.6 | | | | | | 23.7 | 11.5 |
| X | 280.5 | 575.4 | 427.9 | | | | | | 26.7 | 12.6 |
| Y | 279.5 | 692.6 | 486.1 | | | | | | 23.3 | 12.3 |
| Z02 | 966.5 | 1683.6 | 1325.0 | | | | | | 58.6 | 24.0 |
| Z12 | | | | | | | 1.8 | | 85.0 | 22.9 |
| Z14 | 678.5 | 1203.8 | 941.2 | | | | | | 54.6 | 24.5 |
| Z15 | | | 1342 | | | | | | 52.9 | 23.4 |
| Z16 | 765.8 | 824.4 | 795.1 | 94.17 | -0.83 | 3.1 | | | 59.9 | 23.0 |

FIG. 22C

| Sample ID | VFS g/sht | VFS g/g | CRT capacity g/g | CRT capacity g/in | CRT rate g/s | Residual Water(%) | Wet Burst Strength | Wet Burst Strength/Total Dry Tensile | SST |
|---|---|---|---|---|---|---|---|---|---|
| 9 | 22.1 | 9.6 | 22.0 | 0.8 | 0.93 | 2.7 | 488 | 0.232 | 2.06 |
| 10 | 21.1 | 8.9 | 21.8 | 0.8 | 0.87 | 2.8 | 455 | 0.214 | 2.09 |
| 11 | 21.1 | 8.8 | 22.2 | 0.8 | 0.89 | 3.4 | 521 | 0.239 | 2.19 |
| 12 | 21.7 | 9.6 | 22.9 | 0.8 | 0.93 | 3.1 | 506 | 0.262 | 2.35 |
| 13 | 21.1 | 9.6 | 22.1 | 0.8 | 0.83 | 3.3 | 443 | 0.231 | 2.10 |
| 14 | 21.0 | 9.5 | 23.4 | 0.9 | 0.84 | 3.8 | 503 | 0.259 | 2.40 |
| 45 | 37.9 | 9.7 | 21.1 | | 0.51 | | 273 | 0.222 | |
| 46 | 36.6 | 9.7 | 21.0 | | 0.38 | | 292 | 0.261 | |
| 47 | 37.0 | 9.9 | 20.2 | | 0.44 | | 320 | 0.247 | |
| 48 | 39.1 | 10.4 | 21.6 | | 0.47 | | 233 | 0.223 | |
| 49 | 40.2 | 10.3 | 17.2 | | 0.38 | | 307 | 0.234 | |
| 56 | 21.2 | 9.2 | 19.0 | 0.67 | 0.58 | 2.5 | 692 | 0.258 | 1.69 |
| 57 | 19.9 | 8.8 | 19.6 | 0.69 | 0.62 | 2.6 | 553 | 0.242 | 1.80 |
| 58 | 20.9 | 9.1 | 18.9 | 0.67 | 0.60 | 2.5 | 481 | 0.230 | 1.58 |
| 59 | 20.6 | 8.8 | 18.6 | 0.67 | 0.58 | 2.7 | 634 | 0.226 | 1.67 |
| 60 | 20.0 | 8.7 | 18.3 | 0.65 | 0.57 | 2.7 | 533 | 0.192 | 1.61 |
| 61 | 24.0 | 9.2 | | 0.8 | 0.7 | 1.6 | 580 | 0.233 | 2.01 |
| 62 | 23.6 | 9.3 | | 0.8 | 0.7 | 1.7 | 539 | 0.234 | 2.06 |
| 63 | 24.6 | 9.4 | | 0.8 | 0.7 | 1.8 | 558 | 0.249 | 1.98 |
| 64 | 23.7 | 9.3 | | 0.8 | 0.8 | 1.7 | 565 | 0.238 | 1.99 |
| R | 14.1 | 4.7 | | | | | 50 | 0.046 | |
| S | 9.5 | 5.2 | 7.1 | 0.23 | 0.24 | 5.33 | 176.7 | 0.081 | |
| T | 9.0 | 4.9 | 5.4 | 0.15 | 0.13 | 12.1 | 98.3 | 0.032 | |
| U | 18.4 | 5.8 | 7.2 | 0.2 | 0.2 | 5.1 | 64.2 | 0.031 | 0.26 |
| V | 12.1 | 6.6 | 8.4 | 0.2 | 0.2 | 3.8 | 105.9 | 0.043 | 0.29 |
| W | 9.5 | 4.6 | 6.3 | 0.2 | 0.3 | 3.8 | 172.9 | 0.075 | 0.38 |
| X | 12.1 | 5.7 | 8.0 | 0.3 | 0.2 | 3.8 | 60.6 | 0.027 | 0.27 |
| Y | 11.4 | 6.0 | 7.7 | 0.2 | 0.2 | 6.4 | 93.4 | 0.030 | 0.27 |
| Z02 | 22.6 | 9.3 | 22.3 | 0.8 | 0.89 | 2.5 | 497 | 0.215 | 2.07 |
| Z12 | 37.9 | 10.2 | 19.6 | | 0.39 | | 282 | 0.204 | |
| Z14 | 21.0 | 9.4 | 18.5 | 0.64 | 0.66 | 2.8 | 488 | 0.203 | 1.73 |
| Z15 | 20.3 | 8.9 | 19.2 | 0.68 | 0.68 | 2.8 | 492 | 0.184 | 1.72 |
| Z16 | 24.1 | 9.3 | | 0.84 | 0.94 | 2.19 | 414 | 0.193 | 2.34 |

FIG. 22D

| Sample ID | Stack Compressibility | Resilient Bulk | Stack Compressibility x Resilient Bulk | TS7 Avg | TS750 Avg | Plate Stiffness | Slip Stick CoF Avg | Kinetic CoF Avg | Bulk (cc/g) |
|---|---|---|---|---|---|---|---|---|---|
| 9 | 70.6 | 100.4 | 7086 | 18.3 | 43.6 | 12.5 | 964 | 0.99 | 20.5 |
| 10 | 71.6 | 100.8 | 7218 | 17.8 | 43.0 | 13.8 | 812 | 0.94 | 20.8 |
| 11 | 76.9 | 108.6 | 8354 | 19.3 | 41.5 | 15.9 | 810 | 0.94 | 22.8 |
| 12 | 75.4 | 107.9 | 8140 | 19.9 | 45.0 | 15.2 | 766 | 0.91 | 22.3 |
| 13 | 69.8 | 97.6 | 6812 | 20.2 | 43.3 | 13.5 | 827 | 0.94 | 21.9 |
| 14 | 71.6 | 105.0 | 7514 | 20.3 | 49.7 | 15.2 | 808 | 0.90 | 22.4 |
| 45 | | | | | | | | | 15.2 |
| 46 | | | | | | | | | 14.4 |
| 47 | | | | | | | | | 14.7 |
| 48 | | | | | | | | | 14.8 |
| 49 | | | | | | | | | 13.4 |
| 56 | 73.4 | 96.7 | 7098 | 16.6 | 49.3 | 11.3 | 1329 | 1.311 | 19.8 |
| 57 | 72.3 | 99.9 | 7223 | 18.1 | 49.8 | 11.2 | 1034 | 1.129 | 20.3 |
| 58 | 68.8 | 97.1 | 6680 | 17.9 | 43.95 | 10.2 | 1227 | 1.181 | 20.4 |
| 59 | 66.6 | 99 | 6593 | 20.52 | 52.89 | 13.2 | 872 | 1.06 | 19.9 |
| 60 | 67.3 | 96.9 | 6521 | 19.53 | 50.82 | 13.6 | 1117 | 1.059 | 20.0 |
| 61 | 80.2 | 92.4 | 7415 | 12.50 | 47.46 | 14.0 | 932 | 1.247 | 19.7 |
| 62 | 80.6 | 91.5 | 7375 | 11.94 | 45.20 | 13.5 | 990 | 1.240 | 19.7 |
| 63 | 74.1 | 91.7 | 6792 | 12.66 | 50.83 | 13.2 | 910 | 1.140 | 19.7 |
| 64 | 79.9 | 92.5 | 7388 | 12.97 | 44.31 | 13.1 | 892 | 1.154 | 20.4 |
| R | | | | | | | | | 13.1 |
| S | | | | | | | | | 12.0 |
| T | | | | | | | | | 9.3 |
| U | 35.1 | 43.6 | 1533 | 25.86 | 95.12 | 6.6 | 573 | 0.732 | |
| V | 30.9 | 51.4 | 1588 | 32.97 | 132.16 | 7.0 | 808 | 0.754 | |
| W | 40.6 | 56.2 | 2282 | 30.51 | 242.26 | 11.1 | 711 | 0728 | |
| X | 27.3 | 42.4 | 1158 | 34.39 | 113.71 | 6.8 | 679 | 0.741 | |
| Y | 22.5 | 47.0 | 1057 | 24.74 | 87.06 | 7.6 | 764 | 0.749 | |
| Z02 | 72.7 | 97.8 | 7115 | 17.3 | 45.9 | 14.3 | 812 | 0.95 | 20.4 |
| Z12 | | | | | | | | | 13.1 |
| Z14 | 68.3 | 101.2 | 6913 | 15.7 | 62.2 | 11.6 | 899.0 | 1.17 | 20.7 |
| Z15 | 71 | 106.3 | 7547 | 19.5 | 53.67 | 14.0 | 1071 | 1.023 | 21.1 |
| Z16 | 80.3 | 86.2 | 6918 | 13.62 | 41.17 | 11.7 | 845 | 1.053 | 20.2 |

FIG. 22E

| Sample ID | Total Wet Tensile | Wet Tensile Geometric Mean Modulus (38.1g/in) | MD Wet Tensile Strength | CD Wet Tensile Strength | MD Wet Peak Elongation | CD Wet Peak Elongation | MD Wet Peak TEA | CD Wet Peak TEA | MD Wet Modulus (38.1g/in) | CD Wet Modulus (38.1g/in) |
|---|---|---|---|---|---|---|---|---|---|---|
| 9 | 723 | 401 | 424 | 299 | 23.2 | 18.4 | 37.5 | 22.9 | 380 | 423 |
| 10 | 730 | 404 | 419 | 311 | 23.0 | 19.3 | 37.4 | 25.3 | 389 | 420 |
| 11 | 770 | 395 | 451 | 319 | 24.0 | 19.2 | 40.6 | 25.7 | 372 | 420 |
| 12 | 738 | 370 | 428 | 310 | 23.5 | 22.6 | 38.5 | 29.8 | 375 | 364 |
| 13 | 713 | 390 | 423 | 290 | 22.9 | 19.3 | 36.0 | 23.9 | 374 | 406 |
| 14 | 774 | 347 | 472 | 302 | 24.6 | 24.8 | 43.5 | 32.2 | 359 | 335 |
| 45 | | | | | | | | | | |
| 46 | | | | | | | | | | |
| 47 | | | | | | | | | | |
| 48 | | | | | | | | | | |
| 49 | | | | | | | | | | |
| 56 | 854 | 464 | 555 | 299 | 21.7 | 17.6 | 45.6 | 24.5 | 428 | 502 |
| 57 | 782 | 440 | 491 | 291 | 21.3 | 18.9 | 38.4 | 26.2 | 420 | 460 |
| 58 | 704 | 390 | 440 | 263 | 24.7 | 21.7 | 38.5 | 28.7 | 363 | 420 |
| 59 | 979 | 442 | 606 | 373 | 24.1 | 19.3 | 48.9 | 34.4 | 382 | 512 |
| 60 | 914 | 459 | 526 | 388 | 24.6 | 17.2 | 46.9 | 29.7 | 380 | 554 |
| 61 | 936 | 569 | 534 | 402 | 18.8 | 13.8 | 37.5 | 24.5 | 502 | 646 |
| 62 | 858 | 525 | 489 | 370 | 19.0 | 15.7 | 34.9 | 26.6 | 477 | 578 |
| 63 | 838 | 521 | 481 | 357 | 20.0 | 15.4 | 36.5 | 24.7 | 473 | 574 |
| 64 | 826 | 522 | 474 | 352 | 18.7 | 15.3 | 33.4 | 23.8 | 484 | 563 |
| R | | | | | | | | | | |
| S | | | | | | | | | | |
| T | | | | | | | | | | |
| U | 232 | 421 | 144.8 | 87.6 | 14.1 | 8.8 | 8.5 | 3.9 | 325.5 | 544.4 |
| V | 295 | 385 | 194.0 | 101.1 | 17.8 | 11.4 | 14.2 | 6.4 | 306.9 | 481.8 |
| W | 426 | 494 | 332.0 | 93.8 | 15.4 | 10.8 | 20.0 | 5.7 | 519.8 | 470.2 |
| X | 205 | 336 | 135.5 | 69.5 | 16.6 | 8.2 | 9.9 | 3.0 | 255.3 | 443.0 |
| Y | 303 | 498 | 196.4 | 107.1 | 15.1 | 9.6 | 12.8 | 5.7 | 405.3 | 611.2 |
| Z02 | 733 | 420 | 431 | 303 | 21.6 | 18.9 | 36.2 | 24.8 | 416 | 424 |
| Z12 | | | | | | | | | | |
| Z14 | | | | | | | | | | |
| Z15 | 791 | 425 | 450 | 341 | 21.5 | 17.1 | 33.7 | 26.0 | 362 | 500 |
| Z16 | 660 | 450 | 390 | 270 | 18.0 | 16.3 | 25.9 | 18.7 | 452 | 447 |

| Fiber | Description | Sample IDs | Length-weighted Fiber Length L(l) | Fiber Width (microns) | Cell Wall Thickness (microns) | Coarseness mg/m | L/W | Fiber Count (million/g) number average | Fiber Count (million/g) length average | Instrument |
|---|---|---|---|---|---|---|---|---|---|---|
| Bamboo | Bleached | 1-19 | 1.42 | 18.7 | | 0.170 | 76 | 11.5 | 4.14 | Valmet FS5 |
| Bamboo | Bleached | 20-24 | 1.51 | 19.0 | | 0.200 | 80 | 14.0 | 3.31 | Valmet FS5 |
| Bamboo | Bleached | 25-27, 50-55 | 1.54 | 19.4 | | 0.210 | 80 | 13.5 | 3.09 | Valmet FS5 |
| Bamboo | Unbleached | | 1.51 | 19.1 | | 0.204 | 79 | 13.5 | 3.25 | Valmet FS5 |
| Hemp | Bleached | | 1.26 | 23.9 | 6.66 | 0.216 | 53 | 10.1 | 3.67 | Valmet FS5 |
| Hemp | Unbleached | | 1.26 | 25.5 | 5.09 | 0.211 | 49 | 10.4 | 3.76 | Valmet FS5 |
| Bagasse | Bleached | | 0.92 | 18.5 | 3.27 | 0.094 | 50 | 30.3 | 11.51 | Valmet FS5 |
| Abaca | Bleached | 28-39 | 2.55 | 22.5 | 5.46 | 0.170 | 114 | 7.5 | 2.31 | Valmet FS5 |
| NSK | | 1-39, 50-55 | 2.21 | 22.9 | 4.2 | 0.153 | 96 | 5.6 | 2.96 | Valmet FS5 |
| SSK | | | 2.38 | 27.5 | 5.2 | 0.246 | 87 | 4.3 | 1.71 | Valmet FS5 |
| Euc | | 1-39, 50-55 | 0.72 | 15.7 | 3.0 | 0.060 | 46 | 39.4 | 23.31 | Valmet FS5 |
| Wheat Straw | Never dried | | 0.839 | 20.69 | | | 41 | 14.3 | 5.30 | Valmet FS5 |
| Bamboo | Unbleached | 40, 48 | 0.88 | 16.7 | 7.3 | | 53 | | | Kajaani Fiber Lab |
| Bamboo | Unbleached | | 0.88 | 16.4 | 7.3 | 0.099 | 54 | 18.1 | 11.48 | Kajaani Fiber Lab |
| Bamboo | Bleached | 44 | 0.93 | 19.8 | 7.7 | | 47 | | | Kajaani Fiber Lab |
| NSK | | | 2.24 | 24.7 | 6.9 | 0.162 | 91 | 3.7 | 2.75 | Kajaani Fiber Lab |
| SSK | | | 2.29 | 29.1 | 8.2 | 0.250 | 78 | 17.7 | 1.75 | Kajaani Fiber Lab |
| SSK | | | 2.40 | 28.3 | 11.9 | 0.308 | 85 | 4.8 | 1.35 | Kajaani Fiber Lab |
| Hemp | | 41 | 0.96 | 19.0 | 7.1 | 0.101 | 51 | 10.31 | | Kajaani Fiber Lab |
| Abaca | | 49 | 3.13 | 19.3 | 7.8 | 0.185 | 162 | 4.8 | 1.73 | Kajaani Fiber Lab |
| Bagasse | | 42, 45 | 0.96 | 19.0 | 7.1 | 0.101 | 51 | 15.4 | 10.31 | Kajaani Fiber Lab |
| Bamboo (edulis) | Bamboo | | 1.23 | 8.4 | | 0.105 | 146 | | 7.72 | Kajaani FS-100 or FS-200 |
| Bamboo (vulgaris) | Bamboo | | 2.09 | 10.9 | | 0.104 | 192 | | 4.61 | Kajaani FS-100 or FS-200 |
| Bamboo (nigra) | Bamboo | | 1.65 | 9.0 | | 0.109 | 183 | | 5.59 | Kajaani FS-100 or FS-200 |
| Bamboo | | | 1.3 | | | 0.092 | | | 8.39 | FQA |

| Effective Radius µm | Sample ID | 26 | | 27 | | 16 | | 18 | | 19 | |
|---|---|---|---|---|---|---|---|---|---|---|---|
| | Direction | weight (mg) | 147 | weight (mg) | 149 | weight (mg) | 163 | weight (mg) | 156.2 | weight (mg) | 162.2 |
| | | Pore Vol. mg | Thickness µm | Pore Vol. mg | Thickness µm | Pore Vol. mg | Thickness µm | Pore Vol. mg | Thickness µm | Pore Vol. mg | Thickness µm |
| 2.5 | | 13 | 645 | 17.9 | 677 | 18.9 | 654 | 16.9 | 616 | 15.9 | 653 |
| 5 | | 19 | 652 | 23 | 686 | 23 | 663 | 21 | 624 | 21 | 663 |
| 10 | | 28 | 660 | 33 | 698 | 28 | 670 | 25 | 629 | 25 | 671 |
| 15 | | 61 | 672 | 66 | 717 | 139.9 | 707 | 29 | 634 | 100.9 | 719 |
| 20 | | 121.7 | 684 | 120.9 | 732 | 195.5 | 707 | 137.5 | 664 | 156.5 | 722 |
| 30 | | 196.9 | 684 | 191.9 | 734 | 279.1 | 707 | 221.9 | 664 | 236.9 | 722 |
| 40 | | 252.9 | 682 | 243.9 | 734 | 362.9 | 705 | 290.9 | 662 | 303.6 | 722 |
| 50 | | 289.9 | 680 | 276.9 | 733 | 422.8 | 703 | 342.8 | 659 | 346.8 | 721 |
| 60 | | 337 | 678 | 321.2 | 731 | 495.8 | 699 | 403.8 | 656 | 395.8 | 720 |
| 70 | | 402.8 | 675 | 386.8 | 730 | 572.8 | 697 | 483 | 654 | 461.8 | 719 |
| 80 | | 467.9 | 673 | 451.9 | 728 | 653.8 | 694 | 566.9 | 651 | 528.8 | 717 |
| 90 | | 534.9 | 671 | 520.9 | 727 | 723.8 | 692 | 639 | 649 | 588.8 | 716 |
| 100 | | 598.9 | 669 | 586.9 | 725 | 788.8 | 690 | 712.8 | 646 | 647.8 | 715 |
| 120 | | 724.9 | 666 | 720.8 | 722 | 909.7 | 687 | 837.7 | 643 | 755.7 | 712 |
| 140 | Advancing | 858.8 | 663 | 856 | 719 | 1013.7 | 685 | 953.7 | 640 | 857.7 | 710 |
| 160 | | 998.8 | 658 | 984.8 | 716 | 1113.6 | 683 | 1050.9 | 638 | 948.8 | 709 |
| 180 | | 1136.8 | 655 | 1109.7 | 714 | 1196.6 | 682 | 1143.6 | 637 | 1035.8 | 708 |
| 200 | | 1265.9 | 653 | 1220.7 | 712 | 1273.6 | 681 | 1221.6 | 636 | 1122.6 | 707 |
| 225 | | 1402.7 | 650 | 1341.7 | 710 | 1355.5 | 680 | 1306.5 | 635 | 1220.5 | 706 |
| 250 | | 1474.7 | 650 | 1421.6 | 710 | 1413.5 | 680 | 1382.9 | 635 | 1311.5 | 705 |
| 275 | | 1522.7 | 650 | 1484.6 | 710 | 1453.5 | 680 | 1427.5 | 635 | 1387.4 | 705 |
| 300 | | 1549.6 | 650 | 1533.6 | 710 | 1483.5 | 681 | 1460.5 | 635 | 1449.4 | 705 |
| 350 | | 1575 | 651 | 1602.6 | 710 | 1523.4 | 681 | 1502.4 | 636 | 1544.3 | 705 |
| 400 | | 1594.6 | 652 | 1647.5 | 710 | 1553.4 | 682 | 1523.4 | 637 | 1610.3 | 705 |
| 500 | | 1609.6 | 654 | 1705.5 | 712 | 1584.4 | 684 | 1544.4 | 639 | 1670.3 | 707 |
| 600 | | 1619.7 | 655 | 1739.6 | 713 | 1602.5 | 685 | 1554.5 | 640 | 1692.4 | 707 |
| 800 | | 1628.7 | 657 | 1771.6 | 714 | 1615.5 | 687 | 1564.5 | 642 | 1707.4 | 709 |
| 1000 | | 1639.3 | 659 | 1784.2 | 715 | 1623.1 | 689 | 1570.1 | 644 | 1716 | 710 |

FIG. 24A-1

| | | | | | | | | | | |
|---|---|---|---|---|---|---|---|---|---|---|
| 1000 | | 1639.3 | 659 | 1784.2 | 715 | 1623.1 | 689 | 1570.1 | 644 | 1716 | 710 |
| 800 | | 1635.7 | 658 | 1781.6 | 715 | 1623.5 | 689 | 1569.5 | 643 | 1714.4 | 710 |
| 600 | | 1629.7 | 658 | 1776.5 | 715 | 1620.5 | 688 | 1565.5 | 642 | 1708.4 | 709 |
| 500 | | 1625.6 | 657 | 1769.5 | 714 | 1616.9 | 687 | 1562.5 | 642 | 1703.3 | 708 |
| 400 | | 1618 | 655 | 1757.5 | 712 | 1610.4 | 686 | 1554.4 | 640 | 1695.3 | 707 |
| 350 | | 1611.6 | 654 | 1746.5 | 711 | 1604.4 | 685 | 1549.4 | 639 | 1687.3 | 706 |
| 300 | | 1602 | 652 | 1733.5 | 709 | 1596.4 | 683 | 1541.4 | 638 | 1677.3 | 704 |
| 275 | | 1595.6 | 650 | 1720.5 | 707 | 1589.4 | 682 | 1535.4 | 636 | 1668.3 | 703 |
| 250 | | 1586.6 | 648 | 1709.5 | 705 | 1580.4 | 681 | 1528.4 | 635 | 1656.3 | 701 |
| 225 | | 1576.6 | 646 | 1690.5 | 702 | 1570.4 | 679 | 1518.4 | 633 | 1644.3 | 699 |
| 200 | | 1563.7 | 643 | 1667.2 | 699 | 1553.5 | 676 | 1506.5 | 630 | 1624.4 | 697 |
| 180 | | 1548.7 | 640 | 1643.5 | 695 | 1537.5 | 674 | 1494.5 | 628 | 1595 | 694 |
| 160 | | 1524.2 | 634 | 1618.5 | 691 | 1515.5 | 670 | 1474.3 | 624 | 1557.3 | 690 |
| 140 | | 1495.6 | 628 | 1579.5 | 685 | 1475.4 | 665 | 1447.4 | 619 | 1506.3 | 686 |
| 120 | Receding | 1455.6 | 618 | 1523.5 | 677 | 1432.4 | 658 | 1405 | 612 | 1430.1 | 681 |
| 100 | | 1395.6 | 606 | 1426.5 | 667 | 1366.4 | 648 | 1342.4 | 602 | 1309.5 | 674 |
| 90 | | 1337.6 | 599 | 1335.4 | 663 | 1317.4 | 642 | 1292.4 | 595 | 1218.3 | 672 |
| 80 | | 1199.5 | 594 | 1208.4 | 658 | 1258.8 | 635 | 1249.4 | 590 | 1110.2 | 671 |
| 70 | | 1006.5 | 594 | 1055.4 | 657 | 1173.9 | 631 | 1140.3 | 585 | 1004.2 | 671 |
| 60 | | 839.5 | 594 | 862.3 | 658 | 1057.3 | 627 | 1013.3 | 583 | 897.2 | 670 |
| 50 | | 697.4 | 595 | 726.3 | 659 | 919.3 | 627 | 885.3 | 582 | 773.2 | 670 |
| 40 | | 577.4 | 594 | 598.3 | 659 | 779.3 | 627 | 746.3 | 582 | 656.2 | 670 |
| 30 | | 459.4 | 594 | 471.3 | 659 | 635.2 | 627 | 601.3 | 581 | 538.1 | 670 |
| 20 | | 316.5 | 595 | 322.4 | 660 | 437.3 | 627 | 405.3 | 581 | 378.2 | 670 |
| 15 | | 237.5 | 595 | 241.4 | 660 | 319.3 | 627 | 296.3 | 582 | 283.2 | 670 |
| 10 | | 167.5 | 595 | 169.4 | 660 | 213.5 | 627 | 200.3 | 582 | 196.2 | 670 |
| 5 | | 115.5 | 594 | 114.3 | 660 | 132.3 | 626 | 127.3 | 581 | 128.2 | 669 |
| 2.5 | | 94.4 | 592 | 92.3 | 656 | 103.9 | 623 | 101.3 | 578 | 104.2 | 666 |

FIG. 24A-2

| Effective Radius μm | Sample ID | 22 | | A | | H | | C | | D | |
|---|---|---|---|---|---|---|---|---|---|---|---|
| | Direction | weight (mg) | 154.8 | weight (mg) | 95 | weight (mg) | 91 | weight (mg) | 81 | weight (mg) | 135 |
| | | Pore Vol. mg | Thickness μm | Pore Vol. mg | Thickness μm | Pore Vol. mg | Thickness μm | Pore Vol. mg | Thickness μm | Pore Vol. mg | Thickness μm |
| 2.5 | | 11.9 | 620 | 12 | 248 | 17 | 331 | 11.9 | 364 | 12.9 | 498 |
| 5 | | 17 | 630 | 23 | 287 | 28.4 | 352 | 23 | 372 | 34 | 560 |
| 10 | | 51 | 658 | 71 | 338 | 67 | 371 | 66 | 382 | 114 | 609 |
| 15 | | 138.9 | 682 | 92 | 341 | 94 | 373 | 84 | 382 | 159 | 613 |
| 20 | | 186.5 | 683 | 108.6 | 343 | 110.6 | 373 | 100.6 | 382 | 192.5 | 613 |
| 30 | | 266.9 | 683 | 137 | 343 | 137 | 373 | 129 | 381 | 247.9 | 613 |
| 40 | | 342.1 | 681 | 157 | 343 | 156.9 | 373 | 153 | 380 | 301.9 | 611 |
| 50 | | 395.9 | 679 | 161.9 | 343 | 160.9 | 371 | 156.9 | 379 | 348.9 | 608 |
| 60 | | 456.8 | 676 | 178.9 | 342 | 173.9 | 370 | 169.9 | 378 | 406.9 | 606 |
| 70 | | 534.6 | 673 | 220.9 | 341 | 206.9 | 370 | 200.9 | 376 | 479.3 | 606 |
| 80 | | 610.9 | 671 | 270 | 340 | 241 | 369 | 235 | 376 | 544 | 605 |
| 90 | | 685.9 | 668 | 319 | 340 | 273 | 369 | 267 | 375 | 592.9 | 605 |
| 100 | | 757.9 | 666 | 366 | 339 | 302 | 368 | 297 | 374 | 636.1 | 605 |
| 120 | | 909.8 | 662 | 459 | 339 | 358 | 368 | 353 | 374 | 706.9 | 605 |
| 140 | Advancing | 1055.8 | 658 | 547.9 | 338 | 409 | 368 | 406 | 373 | 761.9 | 605 |
| 160 | | 1184.8 | 656 | 632.9 | 337 | 456 | 368 | 461 | 372 | 809.5 | 605 |
| 180 | | 1296.7 | 654 | 683.9 | 337 | 502.9 | 368 | 512.9 | 372 | 848.9 | 605 |
| 200 | | 1363.7 | 653 | 716.9 | 337 | 545.9 | 368 | 558.9 | 372 | 885.9 | 605 |
| 225 | | 1416.7 | 653 | 746.9 | 338 | 602.9 | 368 | 607.9 | 372 | 932.4 | 605 |
| 250 | | 1447.7 | 654 | 769.9 | 338 | 660.9 | 368 | 650.9 | 372 | 974.8 | 605 |
| 275 | | 1468.7 | 654 | 785.9 | 339 | 736.9 | 368 | 693.9 | 372 | 1013.8 | 605 |
| 300 | | 1487.6 | 655 | 795.8 | 339 | 820.8 | 368 | 726.9 | 372 | 1056.2 | 605 |
| 350 | | 1509.6 | 657 | 806.8 | 340 | 888.8 | 368 | 755.9 | 373 | 1212.8 | 606 |
| 400 | | 1523 | 658 | 813.8 | 341 | 905.8 | 368 | 764.9 | 374 | 1350.7 | 606 |
| 500 | | 1539.6 | 660 | 822.8 | 342 | 914.8 | 369 | 773.9 | 375 | 1446.7 | 607 |
| 600 | | 1550.7 | 662 | 827.9 | 343 | 917.9 | 370 | 779.9 | 376 | 1479.8 | 608 |
| 800 | | 1563.7 | 664 | 833.7 | 345 | 920.9 | 371 | 785.9 | 377 | 1491.8 | 610 |
| 1000 | | 1573.3 | 667 | 837.5 | 346 | 922.5 | 371 | 791.5 | 378 | 1502.4 | 611 |

FIG. 24B-1

| | | | | | | | | | |
|---|---|---|---|---|---|---|---|---|---|
| 1000 | | 1573.3 | 667 | 837.5 | 346 | 922.5 | 371 | 791.5 | 378 | 1502.4 | 611 |
| 800 | | 1570.7 | 667 | 835.9 | 346 | 921.9 | 372 | 788.9 | 379 | 1498.8 | 611 |
| 600 | | 1565.6 | 666 | 833.9 | 346 | 921.9 | 372 | 783.9 | 378 | 1492.7 | 611 |
| 500 | | 1561.6 | 665 | 830.9 | 345 | 919.9 | 371 | 780.9 | 378 | 1485.7 | 610 |
| 400 | | 1553.6 | 664 | 827.8 | 344 | 917.8 | 371 | 773.9 | 377 | 1475.7 | 609 |
| 350 | | 1547.6 | 662 | 823.8 | 344 | 913.8 | 370 | 768.9 | 376 | 1465.5 | 608 |
| 300 | | 1540.6 | 661 | 819.8 | 343 | 908.8 | 369 | 760.9 | 375 | 1438.7 | 607 |
| 275 | | 1533.6 | 659 | 814.8 | 343 | 901.8 | 368 | 752.9 | 374 | 1388.7 | 606 |
| 250 | | 1524.6 | 658 | 809.8 | 342 | 892.8 | 367 | 738.8 | 373 | 1326.7 | 605 |
| 225 | | 1516.6 | 656 | 804.8 | 342 | 866.8 | 366 | 716.8 | 372 | 1227.7 | 605 |
| 200 | | 1504.7 | 653 | 795.9 | 341 | 815.9 | 365 | 685.9 | 370 | 1127.7 | 604 |
| 180 | | 1488.7 | 650 | 785.9 | 340 | 739.9 | 364 | 654.9 | 369 | 1015.7 | 603 |
| 160 | | 1470.6 | 646 | 767.9 | 339 | 644 | 363 | 614.9 | 368 | 932.7 | 603 |
| 140 | | 1450.6 | 642 | 740.9 | 337 | 556.8 | 362 | 568.9 | 366 | 883.7 | 602 |
| 120 | Receding | 1407.6 | 633 | 701.6 | 335 | 498.8 | 362 | 532.9 | 364 | 827.7 | 602 |
| 100 | | 1361.6 | 623 | 655.8 | 332 | 437.8 | 362 | 477.9 | 361 | 777.7 | 602 |
| 90 | | 1322.6 | 615 | 617.8 | 331 | 414.8 | 361 | 450.8 | 360 | 754.6 | 601 |
| 80 | | 1276.5 | 607 | 568.8 | 330 | 385.8 | 361 | 421.8 | 359 | 730.6 | 601 |
| 70 | | 1180.5 | 600 | 466.8 | 331 | 354.8 | 361 | 372.8 | 359 | 698.6 | 600 |
| 60 | | 1028.5 | 598 | 393.8 | 332 | 320.7 | 361 | 316.8 | 359 | 667.6 | 600 |
| 50 | | 826.5 | 599 | 310.8 | 333 | 272.7 | 361 | 265.8 | 359 | 631.6 | 599 |
| 40 | | 690.4 | 599 | 242.7 | 333 | 233.7 | 361 | 222.8 | 360 | 578.6 | 598 |
| 30 | | 563.4 | 600 | 199.7 | 333 | 204.7 | 360 | 192.8 | 360 | 469.6 | 597 |
| 20 | | 400.5 | 600 | 157.8 | 334 | 163.8 | 361 | 151.9 | 360 | 315.6 | 597 |
| 15 | | 298.5 | 600 | 133.8 | 334 | 138.8 | 360 | 122.9 | 360 | 248.6 | 597 |
| 10 | | 203.5 | 600 | 109.8 | 334 | 113.8 | 360 | 95.8 | 360 | 192.6 | 597 |
| 5 | | 128.5 | 600 | 82.8 | 333 | 87.8 | 360 | 69.8 | 359 | 136.6 | 597 |
| 2.5 | | 98.4 | 597 | 65.8 | 330 | 70.8 | 357 | 53.8 | 356 | 104.6 | 594 |

FIG. 24B-2

| Sample ID | | F | | G | | E | | B | | 25 | |
|---|---|---|---|---|---|---|---|---|---|---|---|
| Effective Radius µm | Direction | weight (mg) | 120.5 | weight (mg) | 75.4 | weight (mg) | 123 | weight (mg) | 134 | weight (mg) | 166 |
| | | Pore Vol. mg | Thickness µm | Pore Vol. mg | Thickness µm | Pore Vol. mg | Thickness µm | Pore Vol. mg | Thickness µm | Pore Vol. mg | Thickness µm |
| 2.5 | Advancing | 10.9 | 704 | 15.9 | 357 | 11.9 | 563 | 10.9 | 397 | 16.5 | 699 |
| 5 | | 16 | 709 | 24 | 366 | 23 | 578 | 18 | 412 | 21 | 707 |
| 10 | | 38 | 717 | 75 | 377 | 102 | 620 | 80 | 458 | 28 | 717 |
| 15 | | 121.9 | 726 | 95 | 378 | 132 | 620 | 125 | 461 | 70 | 738 |
| 20 | | 158.5 | 725 | 114.4 | 378 | 161.6 | 621 | 159.5 | 461 | 152.9 | 750 |
| 30 | | 227.9 | 724 | 147 | 376 | 210.9 | 620 | 211.9 | 461 | 226.5 | 750 |
| 40 | | 298.9 | 722 | 175 | 374 | 257.9 | 619 | 261.9 | 458 | 290.9 | 749 |
| 50 | | 344.9 | 720 | 182.9 | 373 | 285.9 | 618 | 301.9 | 455 | 332.8 | 748 |
| 60 | | 385.9 | 717 | 195.9 | 372 | 320.9 | 617 | 353.9 | 453 | 381.8 | 746 |
| 70 | | 432.8 | 714 | 225.9 | 371 | 370.9 | 616 | 427.9 | 451 | 457.9 | 743 |
| 80 | | 473.9 | 712 | 254 | 371 | 418 | 615 | 497.9 | 449 | 539.9 | 741 |
| 90 | | 508.9 | 710 | 280 | 370 | 460 | 614 | 558.5 | 448 | 624.9 | 738 |
| 100 | | 539.9 | 709 | 303 | 370 | 497 | 614 | 605.9 | 448 | 707.8 | 735 |
| 120 | | 589.9 | 707 | 344 | 370 | 557 | 614 | 690.9 | 447 | 870.8 | 730 |
| 140 | | 630.9 | 706 | 382 | 369 | 604.9 | 613 | 755.9 | 447 | 1036.8 | 725 |
| 160 | | 666.9 | 705 | 418 | 369 | 644.9 | 613 | 801.9 | 447 | 1193.7 | 721 |
| 180 | | 698.9 | 704 | 455.5 | 369 | 679.9 | 613 | 833.9 | 447 | 1314.9 | 719 |
| 200 | | 726.9 | 703 | 495.3 | 369 | 715.7 | 613 | 858.9 | 447 | 1406.7 | 718 |
| 225 | | 761.8 | 702 | 548.9 | 369 | 759.5 | 613 | 883.8 | 448 | 1471.7 | 717 |
| 250 | | 792.8 | 702 | 623.9 | 369 | 799.9 | 612 | 909.8 | 449 | 1509.6 | 718 |
| 275 | | 823.8 | 702 | 725.9 | 369 | 840.9 | 612 | 924.8 | 449 | 1530.6 | 718 |
| 300 | | 854.8 | 701 | 792.9 | 369 | 894.9 | 612 | 939 | 450 | 1548.6 | 718 |
| 350 | | 913.8 | 701 | 833.8 | 369 | 1012.8 | 612 | 954.8 | 451 | 1564.6 | 719 |
| 400 | | 977.6 | 701 | 845.8 | 370 | 1151.2 | 612 | 961.8 | 452 | 1577.6 | 720 |
| 500 | | 1487.7 | 694 | 854.8 | 370 | 1370.8 | 612 | 971.8 | 453 | 1592.7 | 722 |
| 600 | | 1974.7 | 692 | 861.5 | 371 | 1397.9 | 612 | 979.9 | 455 | 1604.1 | 724 |
| 800 | | 2093.7 | 692 | 866.9 | 372 | 1416.9 | 613 | 989.9 | 457 | 1615.6 | 726 |
| 1000 | | 2098.3 | 693 | 870.9 | 373 | 1424.4 | 614 | 999.5 | 459 | 1626.6 | 728 |

FIG. 24C-1

| | | | | | | | | | | |
|---|---|---|---|---|---|---|---|---|---|---|
| 1000 | | 2098.3 | 693 | 870.9 | 373 | 1424.4 | 614 | 999.5 | 459 | 1626.6 | 728 |
| 800 | | 2093.7 | 692 | 869.9 | 373 | 1420.8 | 614 | 995.8 | 459 | 1626.6 | 729 |
| 600 | | 2080.7 | 691 | 865.9 | 373 | 1410.8 | 613 | 990.8 | 458 | 1623.6 | 728 |
| 500 | | 2065.5 | 689 | 861.9 | 372 | 1401.4 | 612 | 985.8 | 458 | 1618.2 | 727 |
| 400 | | 2005.6 | 683 | 852.9 | 371 | 1364.8 | 610 | 979.8 | 456 | 1611.6 | 725 |
| 350 | | 1908.6 | 680 | 847.8 | 371 | 1323.6 | 609 | 975.2 | 456 | 1605.6 | 724 |
| 300 | | 1443.6 | 678 | 838.8 | 370 | 1246.4 | 607 | 969.8 | 455 | 1596.6 | 722 |
| 275 | | 1146.5 | 679 | 831.8 | 369 | 1167.7 | 606 | 964.8 | 454 | 1589.7 | 721 |
| 250 | | 992.5 | 679 | 817.8 | 368 | 1079.7 | 605 | 958.8 | 453 | 1583.7 | 720 |
| 225 | | 846.5 | 679 | 799.2 | 367 | 988.7 | 604 | 951.8 | 452 | 1575.6 | 718 |
| 200 | | 805.6 | 679 | 767.9 | 366 | 897.8 | 603 | 937.9 | 451 | 1564.6 | 715 |
| 180 | | 779.6 | 679 | 717.9 | 365 | 836.8 | 602 | 920.8 | 450 | 1553.6 | 712 |
| 160 | | 752.6 | 678 | 597.9 | 365 | 770.8 | 602 | 899.8 | 448 | 1538.4 | 708 |
| 140 | | 723.6 | 678 | 497.8 | 364 | 716.8 | 602 | 870.8 | 446 | 1512.6 | 703 |
| 120 | Receding | 691.5 | 678 | 456.8 | 363 | 667.8 | 602 | 840.8 | 443 | 1480.4 | 695 |
| 100 | | 656.5 | 677 | 427.8 | 362 | 631.7 | 601 | 791 | 439 | 1430.6 | 682 |
| 90 | | 635.5 | 677 | 408.8 | 361 | 613.7 | 601 | 758.8 | 437 | 1388.5 | 673 |
| 80 | | 613.5 | 676 | 387.8 | 360 | 589.7 | 601 | 721.8 | 436 | 1337.3 | 666 |
| 70 | | 587.5 | 676 | 347.8 | 360 | 561.7 | 601 | 669.7 | 435 | 1242.5 | 657 |
| 60 | | 559.5 | 675 | 312.8 | 360 | 524.7 | 600 | 622.7 | 434 | 1002.1 | 657 |
| 50 | | 524.5 | 675 | 269.8 | 360 | 465.7 | 600 | 544.7 | 435 | 815.4 | 658 |
| 40 | | 487.1 | 675 | 238.8 | 360 | 403.7 | 600 | 476.7 | 435 | 675.4 | 658 |
| 30 | | 434.5 | 674 | 212.8 | 360 | 337.7 | 600 | 389.7 | 435 | 531.5 | 658 |
| 20 | | 318.5 | 674 | 169.8 | 360 | 250.4 | 600 | 275.8 | 435 | 352.5 | 659 |
| 15 | | 234.5 | 674 | 139.8 | 360 | 201.7 | 600 | 218.8 | 436 | 262.5 | 659 |
| 10 | | 162.5 | 674 | 110.8 | 360 | 157.7 | 600 | 165.7 | 436 | 181.5 | 659 |
| 5 | | 107.5 | 673 | 79.8 | 359 | 118.9 | 599 | 112.7 | 435 | 118.5 | 659 |
| 2.5 | | 85.5 | 670 | 61.8 | 357 | 99.7 | 596 | 85.7 | 432 | 94.4 | 656 |

FIG. 24C-2

| Effective Radius µm | Sample ID | 20 | | 23 | | 24 | | 21 | | 59 | |
|---|---|---|---|---|---|---|---|---|---|---|---|
| | Direction | weight (mg) | 145 | weight (mg) | 156.5 | weight (mg) | 154 | weight (mg) | 151.2 | weight (mg) | 167.7 |
| | | Pore Vol. mg | Thickness µm | Pore Vol. mg | Thickness µm | Pore Vol. mg | Thickness µm | Pore Vol. mg | Thickness µm | Pore Vol. mg | Thickness µm |
| 2.5 | Advancing | 9.9 | 661 | 10.9 | 629 | 12.9 | 728 | 10.9 | 597 | 12.8 | 1155 |
| 5 | | 15 | 668 | 17 | 636 | 18 | 738 | 16 | 604 | 17 | 1154 |
| 10 | | 21 | 675 | 29 | 648 | 31 | 754 | 55 | 626 | 25.8 | 1154 |
| 15 | | 86 | 701 | 68 | 667 | 59 | 767 | 131.9 | 641 | 134.7 | 1155 |
| 20 | | 148.9 | 705 | 129.1 | 683 | 118.3 | 788 | 180.9 | 641 | 193.7 | 1155 |
| 30 | | 223.9 | 704 | 194.9 | 684 | 193.9 | 789 | 257.9 | 641 | 260.7 | 1154 |
| 40 | | 290.9 | 702 | 252.9 | 684 | 254.9 | 789 | 328.9 | 640 | 310.8 | 1153 |
| 50 | | 334 | 699 | 288.8 | 682 | 290.8 | 787 | 372.8 | 638 | 344.6 | 1152 |
| 60 | | 375.8 | 696 | 321.8 | 681 | 322.8 | 785 | 419 | 635 | 361.6 | 1151 |
| 70 | | 438.9 | 694 | 377.9 | 679 | 375.9 | 784 | 480.9 | 633 | 397.6 | 1149 |
| 80 | | 507.9 | 692 | 439.9 | 678 | 433.9 | 783 | 547.3 | 631 | 443.7 | 1147 |
| 90 | | 575.9 | 689 | 504.3 | 676 | 491.9 | 781 | 615.9 | 629 | 489.7 | 1146 |
| 100 | | 642.8 | 686 | 569.8 | 674 | 551.8 | 780 | 680 | 627 | 535.7 | 1145 |
| 120 | | 780.8 | 682 | 702.8 | 671 | 670.8 | 777 | 805.8 | 624 | 623.6 | 1143 |
| 140 | | 920.8 | 678 | 828.8 | 669 | 785.8 | 775 | 929.8 | 620 | 711.6 | 1140 |
| 160 | | 1046.7 | 674 | 966.7 | 666 | 908.7 | 772 | 1046.7 | 617 | 797.6 | 1139 |
| 180 | | 1170.7 | 671 | 1094.7 | 664 | 1040.7 | 769 | 1145.7 | 616 | 884 | 1136 |
| 200 | | 1270.7 | 669 | 1213.7 | 661 | 1165.1 | 767 | 1216.7 | 615 | 972.6 | 1134 |
| 225 | | 1346.8 | 669 | 1329.6 | 660 | 1315.6 | 765 | 1273.6 | 615 | 1080.6 | 1132 |
| 250 | | 1392 | 669 | 1392.6 | 660 | 1439.6 | 763 | 1305.6 | 615 | 1197.7 | 1131 |
| 275 | | 1425.6 | 670 | 1439.6 | 660 | 1523.5 | 763 | 1334.6 | 615 | 1331.5 | 1128 |
| 300 | | 1447.6 | 670 | 1479.6 | 660 | 1571.5 | 763 | 1355.6 | 616 | 1463.7 | 1127 |
| 350 | | 1477.6 | 671 | 1533.5 | 661 | 1642.5 | 764 | 1382.6 | 617 | 1736.5 | 1125 |
| 400 | | 1502.6 | 672 | 1567.5 | 662 | 1699.4 | 764 | 1402.6 | 618 | 1918 | 1124 |
| 500 | | 1533.6 | 674 | 1619.6 | 664 | 1779.5 | 765 | 1422.7 | 620 | 2100.5 | 1124 |
| 600 | | 1549.6 | 676 | 1639.6 | 665 | 1815.5 | 766 | 1435.6 | 622 | 2214.3 | 1125 |
| 800 | | 1567.6 | 678 | 1657.6 | 667 | 1848.5 | 768 | 1448.6 | 624 | 2319.5 | 1127 |
| 1000 | | 1580.6 | 680 | 1671.6 | 668 | 1868.5 | 769 | 1461.6 | 626 | 2339.4 | 1128 |

FIG. 24D-1

| 1000 | | 1580.6 | 680 | 1671.6 | 668 | 1868.5 | 769 | 1461.6 | 626 | 2339.4 | 1128 |
|---|---|---|---|---|---|---|---|---|---|---|---|
| 800 | | 1576.6 | 680 | 1667.6 | 668 | 1861.5 | 769 | 1459.6 | 626 | 2326.4 | 1128 |
| 600 | | 1569.6 | 679 | 1660.5 | 667 | 1850.5 | 768 | 1456.6 | 625 | 2302.8 | 1126 |
| 500 | | 1563.6 | 678 | 1653.5 | 666 | 1840.4 | 766 | 1451.6 | 624 | 2265.4 | 1124 |
| 400 | | 1553.6 | 676 | 1642.5 | 664 | 1824.4 | 765 | 1443.6 | 623 | 2184.4 | 1121 |
| 350 | | 1545.6 | 675 | 1634.5 | 663 | 1810.4 | 764 | 1436.6 | 622 | 2133.4 | 1119 |
| 300 | | 1534.5 | 673 | 1622.5 | 661 | 1793.4 | 762 | 1426.6 | 620 | 2021.4 | 1116 |
| 275 | | 1524.6 | 671 | 1613.6 | 660 | 1780.5 | 760 | 1418.7 | 619 | 1969.3 | 1113 |
| 250 | | 1514.6 | 670 | 1602.6 | 658 | 1762.5 | 758 | 1411.6 | 618 | 1934.4 | 1110 |
| 225 | | 1502.6 | 668 | 1588.6 | 656 | 1737.5 | 755 | 1401.6 | 616 | 1883.2 | 1105 |
| 200 | | 1485.6 | 665 | 1568.6 | 652 | 1713.5 | 752 | 1388.6 | 613 | 1817.4 | 1101 |
| 180 | | 1466.6 | 661 | 1549.5 | 648 | 1687.4 | 747 | 1375.6 | 611 | 1733 | 1097 |
| 160 | | 1442 | 656 | 1527.3 | 644 | 1650.2 | 742 | 1357.4 | 607 | 1598.4 | 1093 |
| 140 | | 1408.6 | 650 | 1495.5 | 639 | 1607.4 | 736 | 1328.6 | 602 | 1284.3 | 1093 |
| 120 | Receding | 1367.3 | 642 | 1450.3 | 630 | 1554.2 | 727 | 1299.4 | 596 | 1108.3 | 1092 |
| 100 | | 1309.5 | 631 | 1373.5 | 620 | 1448 | 717 | 1246.5 | 584 | 917.3 | 1093 |
| 90 | | 1269.5 | 623 | 1320.5 | 613 | 1341.3 | 711 | 1214.5 | 578 | 848.3 | 1093 |
| 80 | | 1217.5 | 616 | 1231.4 | 606 | 1159.1 | 711 | 1166.5 | 569 | 777.9 | 1093 |
| 70 | | 1143.4 | 607 | 1085.4 | 603 | 973.3 | 712 | 1079.5 | 563 | 708.3 | 1093 |
| 60 | | 965.4 | 604 | 865.4 | 605 | 823.3 | 713 | 915 | 561 | 635.3 | 1094 |
| 50 | | 773.4 | 607 | 710.1 | 606 | 697.2 | 713 | 756.4 | 563 | 556.2 | 1094 |
| 40 | | 650.4 | 607 | 591.3 | 606 | 589.2 | 713 | 644.4 | 564 | 481.2 | 1094 |
| 30 | | 533.5 | 608 | 474.4 | 606 | 478.3 | 713 | 538.5 | 564 | 407.3 | 1094 |
| 20 | | 368.3 | 608 | 322.4 | 607 | 326.3 | 713 | 380.5 | 565 | 300.3 | 1095 |
| 15 | | 272.5 | 608 | 244.4 | 607 | 246.3 | 713 | 288.5 | 565 | 240.3 | 1095 |
| 10 | | 185.4 | 609 | 173.4 | 607 | 172.7 | 714 | 198.5 | 565 | 178.3 | 1095 |
| 5 | | 116.4 | 608 | 116.4 | 607 | 116.3 | 712 | 124.4 | 565 | 121.3 | 1094 |
| 2.5 | | 89.4 | 604 | 94.3 | 604 | 93.2 | 709 | 95.4 | 562 | 102.2 | 1091 |

FIG. 24D-2

| Effective Radius μm | Sample ID | 61 | | 10 | | 12 | | 14 | | 39 | |
|---|---|---|---|---|---|---|---|---|---|---|---|
| | Direction | weight (mg) | 120.5 | weight (mg) | 75.4 | weight (mg) | 123 | weight (mg) | 134 | weight (mg) | 166 |
| | | Pore Vol. mg | Thickness μm | Pore Vol. mg | Thickness μm | Pore Vol. mg | Thickness μm | Pore Vol. mg | Thickness μm | Pore Vol. mg | Thickness μm |
| 2.5 | | 12.2 | 1347 | 12.2 | 1309 | 14.2 | 1341 | 12.3 | 1325 | 12.2 | 573 |
| 5 | | 16.4 | 1346 | 16.4 | 1310 | 18.4 | 1341 | 16.4 | 1327 | 16.4 | 578 |
| 10 | | 22.2 | 1346 | 26.2 | 1311 | 32.2 | 1345 | 36.2 | 1337 | 42.2 | 586 |
| 15 | | 117.1 | 1347 | 150.7 | 1329 | 154.1 | 1358 | 189.1 | 1356 | 114.2 | 600 |
| 20 | | 217.5 | 1346 | 209.1 | 1329 | 219.7 | 1358 | 241.1 | 1356 | 156.1 | 600 |
| 30 | | 312 | 1345 | 281.1 | 1329 | 293.1 | 1358 | 311.1 | 1355 | 226.1 | 598 |
| 40 | | 391 | 1343 | 333.1 | 1328 | 345 | 1357 | 359.1 | 1354 | 293.7 | 596 |
| 50 | | 455 | 1341 | 366 | 1328 | 376 | 1356 | 388 | 1354 | 346.3 | 594 |
| 60 | | 499 | 1339 | 382 | 1327 | 387 | 1355 | 398 | 1353 | 380.1 | 592 |
| 70 | | 559 | 1337 | 418 | 1326 | 418 | 1354 | 427 | 1352 | 432 | 589 |
| 80 | | 626 | 1335 | 466.1 | 1324 | 461.1 | 1353 | 469.1 | 1351 | 488.1 | 587 |
| 90 | | 690 | 1333 | 517.1 | 1322 | 506.1 | 1351 | 513.1 | 1349 | 541.1 | 585 |
| 100 | | 750 | 1330 | 569.1 | 1320 | 554.1 | 1348 | 558.1 | 1347 | 591.1 | 583 |
| 120 | | 865 | 1327 | 681.1 | 1317 | 653 | 1346 | 655.1 | 1344 | 685.1 | 581 |
| 140 | Advancing | 971 | 1324 | 792 | 1314 | 755 | 1343 | 756.1 | 1342 | 774 | 579 |
| 160 | | 1072 | 1322 | 897 | 1311 | 849 | 1341 | 847 | 1340 | 856 | 577 |
| 180 | | 1170.9 | 1319 | 991 | 1310 | 934 | 1339 | 930 | 1338 | 941 | 575 |
| 200 | | 1270.9 | 1316 | 1080.4 | 1308 | 1012 | 1338 | 1006 | 1337 | 1015 | 574 |
| 225 | | 1387.9 | 1314 | 1183 | 1306 | 1103 | 1336 | 1096 | 1336 | 1077.9 | 574 |
| 250 | | 1503.9 | 1311 | 1284.6 | 1305 | 1191 | 1335 | 1184.6 | 1335 | 1129.7 | 574 |
| 275 | | 1617.9 | 1310 | 1385.9 | 1304 | 1278.9 | 1334 | 1278 | 1333 | 1161.9 | 574 |
| 300 | | 1728.2 | 1308 | 1487.9 | 1303 | 1371.9 | 1333 | 1367.9 | 1332 | 1182.9 | 574 |
| 350 | | 1951.8 | 1306 | 1748.9 | 1301 | 1592.9 | 1331 | 1592.3 | 1331 | 1211.9 | 575 |
| 400 | | 2153.8 | 1305 | 2087.8 | 1298 | 1892.8 | 1329 | 1920.8 | 1329 | 1230.3 | 576 |
| 500 | | 2448.6 | 1305 | 2597.9 | 1298 | 2651.9 | 1325 | 2648.9 | 1327 | 1253.9 | 578 |
| 600 | | 2536.6 | 1306 | 2703.7 | 1298 | 2943.6 | 1325 | 2840.5 | 1327 | 1261.7 | 579 |
| 800 | | 2598.8 | 1309 | 2741.9 | 1300 | 3117.8 | 1326 | 2886.9 | 1328 | 1273.9 | 581 |
| 1000 | | 2633.8 | 1311 | 2765.8 | 1302 | 3139.8 | 1328 | 2910.8 | 1330 | 1282.9 | 583 |

FIG. 24E-1

| | | | | | | | | | | |
|---|---|---|---|---|---|---|---|---|---|---|
| 1000 | | 2633.8 | 1311 | 2765.8 | 1302 | 3139.8 | 1328 | 2910.8 | 1330 | 1282.9 | 583 |
| 800 | | 2614.8 | 1311 | 2744.8 | 1301 | 3119.8 | 1327 | 2888.8 | 1329 | 1280.9 | 583 |
| 600 | | 2583.8 | 1308 | 2716.8 | 1299 | 3081.8 | 1325 | 2856.8 | 1327 | 1278.9 | 582 |
| 500 | | 2548.7 | 1305 | 2687.8 | 1297 | 3046.7 | 1322 | 2829.8 | 1325 | 1275.7 | 582 |
| 400 | | 2470.7 | 1301 | 2623.8 | 1293 | 2896.7 | 1318 | 2766.8 | 1321 | 1267.9 | 580 |
| 350 | | 2408.7 | 1297 | 2571.8 | 1290 | 2776.7 | 1314 | 2714.8 | 1318 | 1260.9 | 579 |
| 300 | | 2329.7 | 1291 | 2496.7 | 1285 | 2656.7 | 1309 | 2580.7 | 1314 | 1250.8 | 577 |
| 275 | | 2261.6 | 1286 | 2445.7 | 1281 | 2562.7 | 1307 | 2494.7 | 1310 | 1242.8 | 576 |
| 250 | | 2170.7 | 1282 | 2393.8 | 1278 | 2415.7 | 1304 | 2425.4 | 1307 | 1231.9 | 574 |
| 225 | | 2061.7 | 1277 | 2154.8 | 1275 | 2294.7 | 1300 | 2117.8 | 1307 | 1216.9 | 572 |
| 200 | | 1932.7 | 1274 | 1880.8 | 1273 | 1905.7 | 1300 | 1934.8 | 1305 | 1198.9 | 569 |
| 180 | | 1810.7 | 1270 | 1793.7 | 1271 | 1796.7 | 1298 | 1795.3 | 1303 | 1181.9 | 567 |
| 160 | | 1710.4 | 1267 | 1711.7 | 1268 | 1691.7 | 1296 | 1680.7 | 1301 | 1156.9 | 563 |
| 140 | | 1540.6 | 1263 | 1609.7 | 1264 | 1580.6 | 1293 | 1546.7 | 1299 | 1128.9 | 558 |
| 120 | Receding | 1408.6 | 1260 | 1429.7 | 1261 | 1433.6 | 1289 | 1364.7 | 1296 | 1095.8 | 552 |
| 100 | | 1270.6 | 1258 | 1209.7 | 1259 | 1167.6 | 1288 | 1095.7 | 1296 | 1043.6 | 542 |
| 90 | | 1183.6 | 1257 | 1075.6 | 1259 | 1029 | 1288 | 955.7 | 1296 | 1013.4 | 537 |
| 80 | | 1091.5 | 1257 | 933.6 | 1258 | 869.1 | 1289 | 822.6 | 1298 | 972.8 | 532 |
| 70 | | 1002.5 | 1257 | 781.6 | 1260 | 752.5 | 1290 | 719.6 | 1299 | 892.8 | 529 |
| 60 | | 907.5 | 1257 | 687.6 | 1260 | 653.5 | 1291 | 638.6 | 1299 | 782.6 | 528 |
| 50 | | 801.5 | 1257 | 589.6 | 1261 | 568.5 | 1291 | 561.6 | 1300 | 662.7 | 529 |
| 40 | | 695.5 | 1257 | 505.6 | 1261 | 496.5 | 1292 | 497.6 | 1300 | 561.7 | 530 |
| 30 | | 574.6 | 1257 | 428.7 | 1262 | 432.6 | 1292 | 440.7 | 1301 | 472.8 | 530 |
| 20 | | 399.6 | 1258 | 319.1 | 1262 | 331.6 | 1293 | 345.7 | 1301 | 333.8 | 531 |
| 15 | | 305.6 | 1258 | 256.6 | 1262 | 271.6 | 1293 | 286.7 | 1301 | 247.8 | 531 |
| 10 | | 216.5 | 1258 | 190.6 | 1262 | 203.6 | 1293 | 218.7 | 1301 | 166.8 | 531 |
| 5 | | 140.5 | 1258 | 124.6 | 1262 | 132.5 | 1292 | 144.6 | 1300 | 104.8 | 530 |
| 2.5 | | 111.5 | 1254 | 100.4 | 1259 | 108.5 | 1289 | 119.6 | 1297 | 81.7 | 528 |

FIG. 24E-2

| Effective Radius µm | Direction | Sample ID | 64 | | 56 | | 57 | | 31 | | V | |
|---|---|---|---|---|---|---|---|---|---|---|---|---|
| | | | weight (mg) | 184 | weight (mg) | 172.2 | weight (mg) | 166.5 | weight (mg) | 167 | weight (mg) | 133 |
| | | | Pore Vol. mg | Thickness µm | Pore Vol. mg | Thickness µm | Pore Vol. mg | Thickness µm | Pore Vol. mg | Thickness µm | Pore Vol. mg | Thickness µm |
| 2.5 | Advancing | | 9.9 | 1352 | 10.9 | 1147 | 12.9 | 1151 | 10.4 | 685 | 11.9 | 570 |
| 5 | | | 15 | 1350 | 16 | 1144 | 18 | 1149 | 15.4 | 691 | 33 | 624 |
| 10 | | | 20 | 1348 | 21 | 1142 | 22 | 1148 | 19.4 | 696 | 110.2 | 674 |
| 15 | | | 126.9 | 1345 | 66 | 1140 | 69.4 | 1148 | 80.4 | 729 | 140 | 674 |
| 20 | | | 206.9 | 1342 | 152.9 | 1137 | 160.3 | 1144 | 164.3 | 735 | 157 | 674 |
| 30 | | | 289.8 | 1340 | 226.9 | 1135 | 227.9 | 1143 | 260.5 | 734 | 181.9 | 675 |
| 40 | | | 360.8 | 1338 | 277.8 | 1134 | 274.3 | 1141 | 356.3 | 732 | 198.9 | 674 |
| 50 | | | 406.8 | 1337 | 305.8 | 1132 | 295.8 | 1140 | 440.2 | 729 | 194.9 | 674 |
| 60 | | | 456.8 | 1335 | 339.8 | 1130 | 322.8 | 1138 | 525.2 | 726 | 199.9 | 672 |
| 70 | | | 521.8 | 1332 | 392.8 | 1128 | 367.8 | 1137 | 630.2 | 721 | 223.9 | 671 |
| 80 | | | 586.8 | 1330 | 449.9 | 1126 | 415.9 | 1135 | 727.2 | 718 | 250 | 671 |
| 90 | | | 648.8 | 1327 | 506.9 | 1124 | 464.9 | 1133 | 816.2 | 715 | 280 | 670 |
| 100 | | | 708.8 | 1325 | 563.9 | 1122 | 512.9 | 1132 | 904.2 | 712 | 309 | 669 |
| 120 | | | 821.8 | 1322 | 674.8 | 1119 | 610.8 | 1129 | 1063.1 | 707 | 364 | 668 |
| 140 | | | 928.8 | 1319 | 778.8 | 1116 | 704.8 | 1127 | 1188.1 | 705 | 421.9 | 667 |
| 160 | | | 1032.8 | 1316 | 884.8 | 1113 | 799.8 | 1124 | 1306 | 703 | 477.9 | 667 |
| 180 | | | 1131.8 | 1313 | 989.8 | 1110 | 894.8 | 1121 | 1396.2 | 702 | 538.9 | 666 |
| 200 | | | 1227.7 | 1311 | 1093.8 | 1108 | 991.8 | 1118 | 1469.9 | 701 | 603.9 | 666 |
| 225 | | | 1343.7 | 1309 | 1233.7 | 1104 | 1119.7 | 1115 | 1529.9 | 701 | 692.9 | 665 |
| 250 | | | 1461.7 | 1306 | 1374.7 | 1102 | 1249.7 | 1113 | 1563.9 | 701 | 782.9 | 665 |
| 275 | | | 1590.7 | 1303 | 1518.7 | 1100 | 1393.7 | 1110 | 1589.9 | 702 | 869.8 | 664 |
| 300 | | | 1725.6 | 1300 | 1662.7 | 1098 | 1563.7 | 1107 | 1606.3 | 703 | 948.4 | 664 |
| 350 | | | 1967.6 | 1298 | 1889.6 | 1097 | 1863.6 | 1104 | 1631.8 | 704 | 1091 | 664 |
| 400 | | | 2171.6 | 1297 | 2001.6 | 1097 | 2039.6 | 1104 | 1650.8 | 705 | 1226.8 | 664 |
| 500 | | | 2391.1 | 1298 | 2128.6 | 1097 | 2218.1 | 1104 | 1675.8 | 707 | 1374.9 | 665 |
| 600 | | | 2484.6 | 1299 | 2190.7 | 1099 | 2308.6 | 1105 | 1687.9 | 709 | 1407.8 | 665 |
| 800 | | | 2547.6 | 1301 | 2226.7 | 1101 | 2378.6 | 1107 | 1703.9 | 712 | 1433.8 | 667 |
| 1000 | | | 2576.6 | 1304 | 2238.7 | 1102 | 2393.6 | 1108 | 1713.9 | 714 | 1447.8 | 668 |

FIG. 24F-1

| | | | | | | | | | | |
|---|---|---|---|---|---|---|---|---|---|---|
| 1000 | | 2576.6 | 1304 | 2238.7 | 1102 | 2393.6 | 1108 | 1713.9 | 714 | 1447.8 | 668 |
| 800 | | 2560.6 | 1303 | 2228.6 | 1102 | 2382.6 | 1108 | 1711.9 | 714 | 1436.4 | 668 |
| 600 | | 2532.6 | 1301 | 2209.6 | 1101 | 2362.6 | 1106 | 1709.8 | 713 | 1420.8 | 667 |
| 500 | | 2502.6 | 1298 | 2189.6 | 1099 | 2331.6 | 1104 | 1705.8 | 712 | 1406.8 | 666 |
| 400 | | 2422.3 | 1294 | 2151.4 | 1096 | 2256.4 | 1101 | 1698.6 | 711 | 1369.6 | 664 |
| 350 | | 2372.1 | 1290 | 2102.6 | 1093 | 2194.5 | 1098 | 1690.8 | 709 | 1316.7 | 663 |
| 300 | | 2246.5 | 1285 | 2061.4 | 1089 | 2101.5 | 1094 | 1681.8 | 708 | 1235.7 | 661 |
| 275 | | 2206.5 | 1281 | 2018.6 | 1086 | 2057.5 | 1091 | 1674.8 | 706 | 1189.7 | 660 |
| 250 | | 2143.4 | 1276 | 1967.5 | 1082 | 2019.5 | 1088 | 1666.8 | 705 | 1139.7 | 658 |
| 225 | | 2063.5 | 1271 | 1922.6 | 1078 | 1954.6 | 1083 | 1655.1 | 703 | 1008.8 | 657 |
| 200 | | 1943.5 | 1266 | 1878.6 | 1073 | 1899.5 | 1079 | 1639.9 | 700 | 925.8 | 656 |
| 180 | | 1828.5 | 1263 | 1807.6 | 1068 | 1824.5 | 1074 | 1623.9 | 698 | 868.7 | 655 |
| 160 | | 1659.9 | 1260 | 1719.4 | 1061 | 1732.9 | 1068 | 1598.2 | 693 | 800.1 | 654 |
| 140 | | 1512.2 | 1257 | 1592.5 | 1056 | 1378.5 | 1067 | 1572.8 | 689 | 738.7 | 653 |
| 120 | Receding | 1354.4 | 1255 | 1275.5 | 1056 | 1159.4 | 1067 | 1535.8 | 682 | 668.7 | 652 |
| 100 | | 1231.4 | 1252 | 1089.5 | 1056 | 964.4 | 1067 | 1478.8 | 672 | 539.3 | 653 |
| 90 | | 1140.4 | 1251 | 992.5 | 1056 | 893.2 | 1067 | 1444.4 | 666 | 494.7 | 653 |
| 80 | | 1040.4 | 1251 | 893.5 | 1056 | 798.4 | 1067 | 1397.8 | 659 | 458.7 | 653 |
| 70 | | 952.4 | 1251 | 804.5 | 1056 | 720.4 | 1067 | 1342.7 | 651 | 405.6 | 653 |
| 60 | | 864.3 | 1251 | 715.4 | 1056 | 636.4 | 1067 | 1254.7 | 642 | 352.6 | 653 |
| 50 | | 761.3 | 1251 | 617.4 | 1056 | 547.4 | 1068 | 1083.7 | 642 | 279.6 | 654 |
| 40 | | 663.3 | 1251 | 524.4 | 1056 | 469.4 | 1068 | 924.7 | 641 | 253.6 | 654 |
| 30 | | 544.3 | 1251 | 422.4 | 1057 | 387.3 | 1068 | 727.6 | 641 | 238.6 | 655 |
| 20 | | 379.4 | 1252 | 293.5 | 1057 | 280.4 | 1068 | 477.7 | 641 | 200.7 | 655 |
| 15 | | 291.4 | 1252 | 228.5 | 1057 | 222.4 | 1068 | 342.7 | 641 | 178.7 | 656 |
| 10 | | 208.4 | 1252 | 167.5 | 1057 | 168.4 | 1068 | 226.7 | 641 | 155.7 | 656 |
| 5 | | 133.3 | 1251 | 117.4 | 1057 | 118.4 | 1068 | 140.7 | 640 | 126.6 | 655 |
| 2.5 | | 109.3 | 1248 | 101.4 | 1054 | 102.4 | 1065 | 111.7 | 638 | 104.6 | 653 |

FIG. 24F-2

| Sample ID | | U | | Y | | W | | X | | AA | | BB | |
|---|---|---|---|---|---|---|---|---|---|---|---|---|---|
| Effective Radius | Direction | weight (mg) | 160.1 | weight (mg) | 137.1 | weight (mg) | 171 | weight (mg) | 151.1 | weight (mg) | 148.2 | weight (mg) | 151.1 |
| | | Pore Vol. | Thickness | Pore Vol. | Thickness | Pore Vol. | Thickness | Pore Vol. | Thickness | Pore Vol. | Thickness | Pore Vol. | Thickness |
| µm | | mg | µm | mg | µm | mg | µm | mg | µm | mg | µm | mg | µm |
| 2.5 | | 10.9 | 456 | 10.9 | 444 | 11.5 | 673 | 8.9 | 529 | 12.9 | 424 | 14.9 | 598 |
| 5 | | 43 | 523 | 46 | 514 | 47 | 684 | 25 | 563 | 27 | 435 | 30 | 612 |
| 10 | | 130 | 556 | 126 | 544 | 153 | 684 | 98 | 619 | 140 | 462 | 160.9 | 652 |
| 15 | | 161 | 557 | 147 | 545 | 187 | 684 | 131.9 | 621 | 173 | 462 | 206.9 | 654 |
| 20 | | 182.9 | 558 | 163.9 | 546 | 204.9 | 683 | 151.9 | 622 | 197 | 462 | 237.9 | 654 |
| 30 | | 212.9 | 558 | 187.9 | 546 | 231.9 | 682 | 176.9 | 623 | 242.9 | 459 | 284.9 | 653 |
| 40 | | 232.9 | 558 | 205.5 | 546 | 248.9 | 680 | 193.9 | 623 | 282.9 | 456 | 327.9 | 650 |
| 50 | | 232.5 | 558 | 202.9 | 546 | 243.9 | 679 | 191.9 | 622 | 321.9 | 454 | 371.8 | 647 |
| 60 | | 241.9 | 557 | 208.9 | 545 | 243.9 | 677 | 199.9 | 622 | 366.9 | 451 | 420.8 | 644 |
| 70 | | 272.9 | 557 | 233.9 | 544 | 263.9 | 676 | 227.9 | 621 | 409.5 | 449 | 473 | 642 |
| 80 | | 308 | 556 | 263 | 543 | 286 | 675 | 260 | 620 | 456 | 447 | 536.9 | 639 |
| 90 | | 347 | 555 | 292 | 543 | 310 | 674 | 294.9 | 620 | 502.8 | 446 | 595.9 | 637 |
| 100 | | 382.9 | 554 | 323 | 542 | 334 | 673 | 328.9 | 619 | 548.9 | 445 | 658.3 | 635 |
| 120 | | 457.9 | 554 | 384.9 | 541 | 364.9 | 672 | 399.9 | 618 | 632.9 | 445 | 771.9 | 633 |
| 140 | Advancing | 524.9 | 553 | 446.9 | 540 | 457.9 | 670 | 466.9 | 618 | 699.9 | 445 | 893.8 | 631 |
| 160 | | 592.9 | 552 | 512.9 | 540 | 493.9 | 669 | 532.9 | 617 | 737.9 | 445 | 1007.4 | 630 |
| 180 | | 662.9 | 552 | 584.9 | 539 | 555.9 | 668 | 602.1 | 617 | 762.3 | 445 | 1101.2 | 629 |
| 200 | | 730.9 | 551 | 649.3 | 539 | 618.9 | 667 | 665.9 | 617 | 779.9 | 446 | 1159.8 | 629 |
| 225 | | 803.9 | 551 | 729.9 | 539 | 699.9 | 666 | 743.8 | 616 | 799.9 | 447 | 1205.7 | 630 |
| 250 | | 865.8 | 551 | 805.9 | 539 | 781.8 | 665 | 819.8 | 616 | 812.9 | 448 | 1226.7 | 630 |
| 275 | | 911.8 | 551 | 869.8 | 539 | 870.8 | 664 | 888.8 | 616 | 822.8 | 448 | 1248.7 | 631 |
| 300 | | 965.8 | 552 | 934.8 | 539 | 936.8 | 663 | 957.8 | 616 | 830.8 | 449 | 1260.7 | 632 |
| 350 | | 1049.8 | 552 | 1058.8 | 539 | 1029.8 | 663 | 1081.8 | 616 | 842.9 | 450 | 1278.8 | 633 |
| 400 | | 1098.8 | 553 | 1111.8 | 539 | 1096.8 | 663 | 1219.9 | 616 | 851.9 | 452 | 1291.8 | 634 |
| 500 | | 1124.8 | 554 | 1136.8 | 540 | 1211.7 | 663 | 1368.7 | 617 | 859.9 | 453 | 1305.8 | 636 |
| 600 | | 1134.9 | 555 | 1148.8 | 541 | 1231.8 | 664 | 1389.8 | 618 | 868.9 | 455 | 1317.8 | 638 |
| 800 | | 1148.8 | 557 | 1161.8 | 543 | 1254.8 | 665 | 1409.4 | 619 | 875.9 | 457 | 1331.8 | 640 |
| 1000 | | 1156.8 | 558 | 1167.8 | 544 | 1265.8 | 665 | 1418.8 | 620 | 882.9 | 459 | 1343.7 | 642 |

FIG. 24G-1

| | | | | | | | | | | | |
|---|---|---|---|---|---|---|---|---|---|---|---|
| 1000 | | 1156.8 | 558 | 1167.8 | 544 | 1265.8 | 665 | 1418.8 | 620 | 882.9 | 459 | 1343.7 | 642 |
| 800 | | 1151.8 | 558 | 1162.8 | 544 | 1253.8 | 664 | 1412.8 | 620 | 881.9 | 459 | 1340.7 | 642 |
| 600 | | 1147.8 | 557 | 1157.8 | 543 | 1242.8 | 663 | 1404.7 | 620 | 879.7 | 458 | 1335.5 | 641 |
| 500 | | 1141.8 | 557 | 1151.8 | 542 | 1228.8 | 661 | 1395.7 | 619 | 876.8 | 458 | 1331.7 | 641 |
| 400 | | 1131.6 | 556 | 1140.6 | 541 | 1201.6 | 658 | 1374.5 | 617 | 872.8 | 457 | 1324.7 | 639 |
| 350 | | 1120.8 | 555 | 1125.4 | 540 | 1169.7 | 656 | 1340.7 | 616 | 868.9 | 456 | 1317.8 | 638 |
| 300 | | 1097.8 | 553 | 1099.8 | 538 | 1115.7 | 654 | 1275.7 | 615 | 862.9 | 455 | 1308.8 | 637 |
| 275 | | 1075.8 | 552 | 1075.7 | 537 | 1068.7 | 653 | 1216.7 | 614 | 855.9 | 455 | 1300.8 | 636 |
| 250 | | 1037.7 | 551 | 1041.1 | 536 | 1042.5 | 651 | 1147.7 | 613 | 850.9 | 454 | 1291.8 | 634 |
| 225 | | 993.8 | 550 | 976.8 | 535 | 1003.8 | 649 | 1073.7 | 612 | 840.9 | 453 | 1279.7 | 633 |
| 200 | | 953.4 | 548 | 917.8 | 534 | 960.8 | 646 | 955.7 | 610 | 832.9 | 451 | 1262.7 | 631 |
| 180 | | 902.2 | 546 | 851.8 | 533 | 917.2 | 643 | 878.7 | 610 | 821.9 | 450 | 1245.7 | 629 |
| 160 | | 848.2 | 545 | 788.2 | 532 | 868.1 | 640 | 791.1 | 609 | 809.3 | 448 | 1220.7 | 626 |
| 140 | | 794.8 | 543 | 726.8 | 530 | 785.7 | 638 | 709.5 | 609 | 792.8 | 446 | 1187.7 | 623 |
| 120 | Receding | 724.7 | 541 | 640.7 | 530 | 626.7 | 639 | 642.7 | 609 | 774.8 | 444 | 1145.3 | 617 |
| 100 | | 632.3 | 541 | 551.7 | 530 | 462.7 | 641 | 555.6 | 609 | 746.8 | 440 | 1093.7 | 611 |
| 90 | | 584.7 | 541 | 505.7 | 530 | 421.7 | 641 | 528.6 | 609 | 729.8 | 437 | 1057.6 | 607 |
| 80 | | 532.7 | 541 | 455.7 | 530 | 382.7 | 641 | 482.2 | 609 | 710.8 | 434 | 1000.6 | 602 |
| 70 | | 467.7 | 542 | 398.7 | 530 | 348.7 | 641 | 445.6 | 609 | 684.8 | 431 | 877.6 | 600 |
| 60 | | 417.7 | 542 | 341.7 | 530 | 315.6 | 642 | 390.6 | 609 | 614.9 | 429 | 745.7 | 600 |
| 50 | | 365.7 | 543 | 283.7 | 531 | 260.6 | 642 | 308.6 | 609 | 497.8 | 430 | 626.7 | 601 |
| 40 | | 311.7 | 544 | 256.7 | 531 | 275.6 | 643 | 252.6 | 609 | 433.8 | 431 | 522.7 | 603 |
| 30 | | 278.6 | 544 | 237.6 | 532 | 276.6 | 643 | 229.5 | 610 | 360.8 | 431 | 421.6 | 604 |
| 20 | | 234.7 | 545 | 202.7 | 532 | 249.7 | 644 | 192.6 | 611 | 284.8 | 431 | 330.6 | 605 |
| 15 | | 210.7 | 545 | 183.7 | 533 | 228.3 | 644 | 173.6 | 611 | 243 | 432 | 285.8 | 606 |
| 10 | | 181.7 | 545 | 162.7 | 533 | 201.7 | 644 | 152.6 | 611 | 198.8 | 432 | 240.6 | 607 |
| 5 | | 140.7 | 544 | 132.7 | 532 | 158.7 | 643 | 123.6 | 610 | 148.8 | 432 | 189.6 | 607 |
| 2.5 | | 113.7 | 541 | 109.7 | 529 | 123.6 | 640 | 102.6 | 606 | 118.7 | 430 | 158.6 | 605 |

FIG. 24G-2

| Fiber | Never Dried? | BWCT | | Breaking Length | Fiber Length [L(l)] – FS5 | | Breaking Length/ Fiber Length (Breaking Length Ratio) |
|---|---|---|---|---|---|---|---|
| | | g/in | kN/m | m | mm | micron | m/micron |
| Wheat Straw | Y | 1857 | 0.717 | 2725 | 0.839 | 839 | 3.25 |
| Bagasse | N | 1132 | 0.437 | 1661 | 0.924 | 924 | 1.80 |
| Hemp | N | 915 | 0.353 | 1343 | 1.26 | 1260 | 1.07 |
| Abaca | N | 712 | 0.275 | 1045 | 2.55 | 2550 | 0.41 |
| Bamboo | N | 461 | 0.178 | 676 | 1.51 | 1510 | 0.45 |
| Acacia | N | 558 | 0.215 | 819 | 0.722 | 722 | 1.13 |
| SSK | N | 485 | 0.187 | 712 | 2.38 | 2380 | 0.30 |
| NSK | N | 821 | 0.317 | 1205 | 2.205 | 2205 | 0.55 |
| Euc | N | 428 | 0.165 | 628 | 0.715 | 715 | 0.88 |

FIG. 25

SOFT SANITARY TISSUE PRODUCTS COMPRISING NON-WOOD FIBERS

CROSS REFERENCE TO RELATED APPLICATIONS

This application claims the benefit of U.S. Provisional Application No. 63/329,222, filed Apr. 8, 2022, U.S. Provisional Application No. 63/329,718, filed Apr. 11, 2022, U.S. Provisional Application No. 63/330,077, filed Apr. 12, 2022, U.S. Provisional Application No. 63/353,183, filed Jun. 17, 2022, and U.S. Provisional Application No. 63/456,020, filed Mar. 31, 2023, the entire disclosures of which are fully incorporated by reference herein.

FIELD

The present disclosure generally relates to fibrous structures and, more particularly, to fibrous structures comprising non-wood fibers, including sanitary tissue products comprising non-wood fibers.

BACKGROUND

Of particular interest is the softness of sanitary tissue products. But, this is where so many sustainable sanitary tissue products comprising non-woods fail. The art does not disclose how to achieve soft fibrous structures comprising bamboo, abaca, or other sustainable non-wood fibers; incorporation of non-woods into sanitary tissue products is a real challenge, even for experienced papermakers. This becomes truer as non-wood fiber inclusion increases. The inventors of the present disclosure have, however, found that adding coarse bamboo fibers (bamboo is especially coarse versus eucalyptus) into the fibrous structure, even at high inclusion levels, and/or even disposed at a consumer-facing side of a sheet, can result in sanitary tissue products with good softness, even with premium softness. There are a number of ways the inventors have accomplished this, including creation of differential densities, utilizing unique layering, and/or fiber mixes, as well as other ways disclosed herein.

The inventors of the present disclosure have found that they are able to deliver soft sustainable fibrous structures that also have low lint values. Typically, higher lint values accompany greater softness values (e.g., TS7, TS750). Beyond the difficulties of processing fibrous structures that are linty, lint can cause unwanted debris at the point of use, which can be messy and can be aesthetically undesirable. Thus, it is a real benefit to achieve greater softness while maintaining lower lint values. The inventors of the present disclosure have not only improved sustainable fibrous structures, but have improved the general offering of fibrous structures beyond what is otherwise available today, even versus what is available on the shelf today as high-tier offerings consisting only of wood fibers.

Related to softness, another consumer-desired characteristic is surface smoothness/glide. Slip-stick is a good metric for quantifying how much "glide" a substrate has. Low slip-stick values in a fibrous structure are consumer preferred. Typical design levers for improving the slip stick of a substrate include calendaring and/or to replace coarser softwood fibers with shorter, thinner, and lower coarseness hardwood fibers, such as eucalyptus. Conventionally, eucalyptus is used to balance softwood incorporation, such as NSK, which provides strength characteristics. However, upon experimentation, the inventors of the present disclosure have shown that the introduction of coarse, non-wood fibers such as bamboo (even at high inclusion amounts) can still create low slip stick substrates while still maintaining acceptable strength characteristics.

So, despite the shortcomings of so many manufacturers and the poorly performing non-wood products that they market, which are not soft and/or have higher lint values, the inventive sustainable offerings as disclosed herein may be used to offer the public the soft and/or low lint sanitary tissue products they desire. And, the inventive sanitary tissue products disclosed herein may, in many instances, be considered high-tier due to the properties (including improved TS7, TS750, slip stick, etc.) the inventors of the present disclosure have achieved.

SUMMARY

In a first aspect of the present disclosure, a sanitary tissue product may comprise non-wood fibers selected from the group consisting of bamboo, abaca, and mixtures thereof, and may have a TS7 of less than about 14 dB $V^2$ rms.

In a second aspect of the present disclosure, a sanitary tissue product may comprise bamboo fibers and may have a TS750 less than about 20 dB $V^2$ rms.

In a third aspect of the present disclosure, a sanitary tissue product may be structured and may comprise non-wood fibers selected from the group consisting of bamboo, abaca, and mixtures thereof, and may have a TS750 less than about 45 dB $V^2$ rms.

In a fourth aspect of the present disclosure, a sanitary tissue product may comprise non-wood fibers selected from the group consisting of bamboo, abaca, and mixtures thereof, and may have a slip stick less than about 435.

In a fifth aspect of the present disclosure, a sanitary tissue product may comprise non-wood fibers selected from the group consisting of bamboo, abaca, and mixtures thereof, and may have a slip stick less than about 605.

BRIEF DESCRIPTION OF THE DRAWINGS

The above-mentioned and other features and advantages of this disclosure, and the manner of attaining them, will become more apparent and the disclosure itself will be better understood by reference to the following description of non-limiting examples of the disclosure taken in conjunction with the accompanying drawings, wherein.

21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J

FIG. 1E is a graph illustrating TS7 (y-axis) and TS750 (x-axis) values of inventive and comparative non-wood tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J.

Figure 2A:
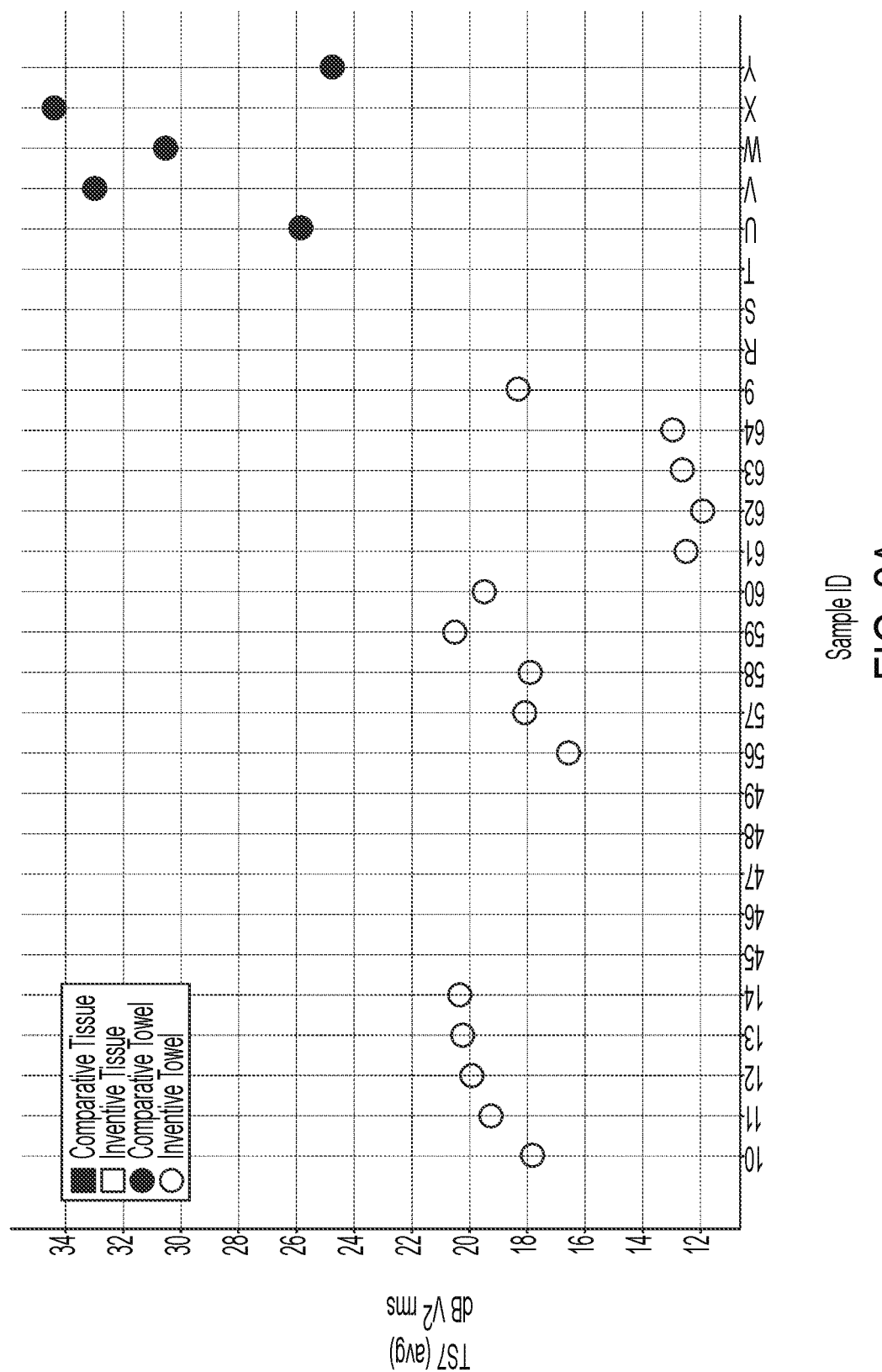

FIG. 2A is a TS7 (y-axis) graph illustrating inventive and comparative non-wood (paper) towel samples of FIGS. 22A, 22B, 22C, 22D, 22E, 22F.

Figure 2B:
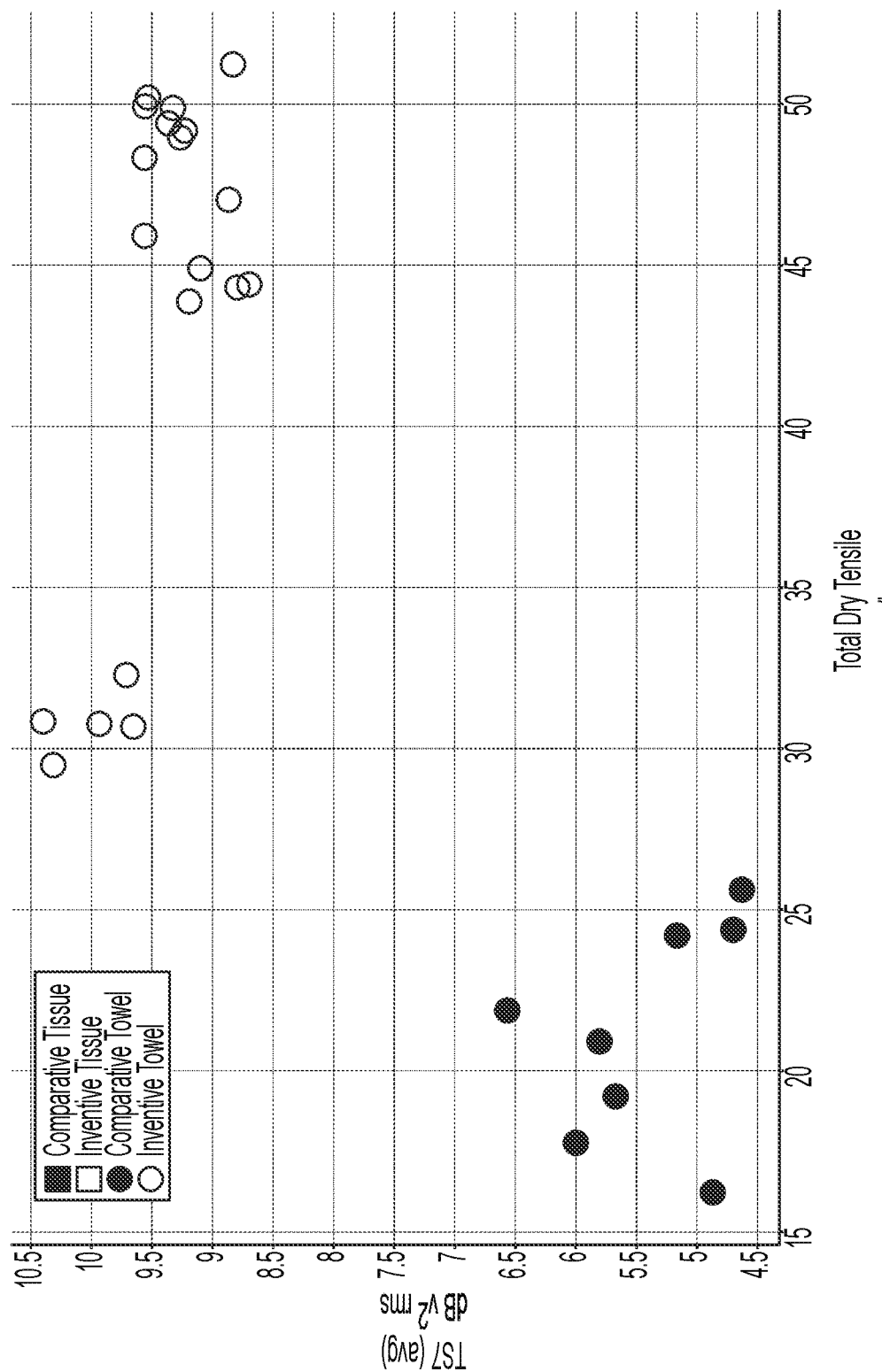

FIG. 2B is a graph illustrating TS7 (y-axis) and total dry tensile (x-axis) values of inventive and comparative non-wood (paper) towel samples of FIGS. 22A, 22B, 22C, 22D, 22E, 22F.

Figure 1A:
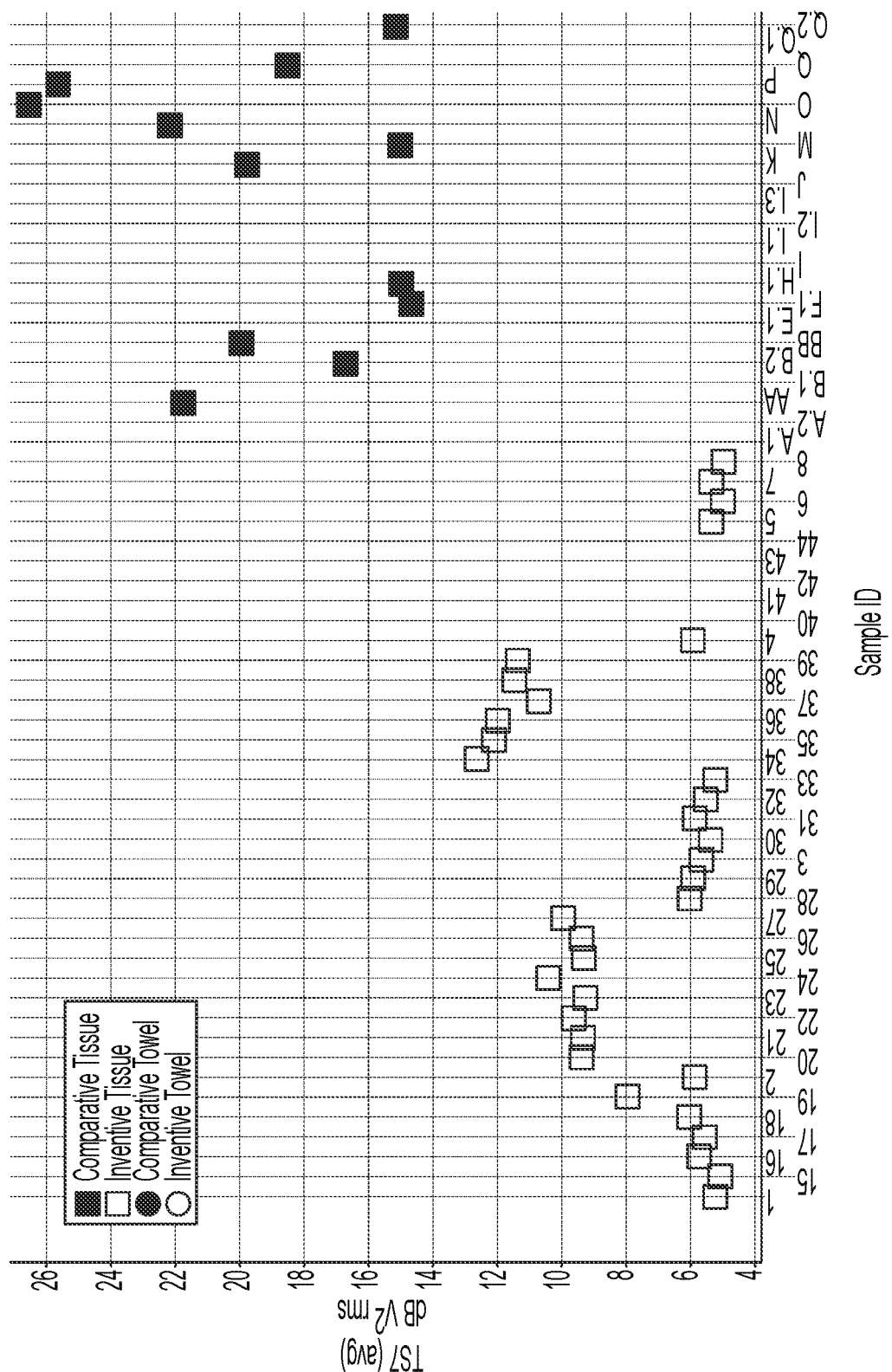
FIG. 1A is a TS7 (y-axis) graph illustrating inventive and comparative non-wood tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J.
Figure 1B:
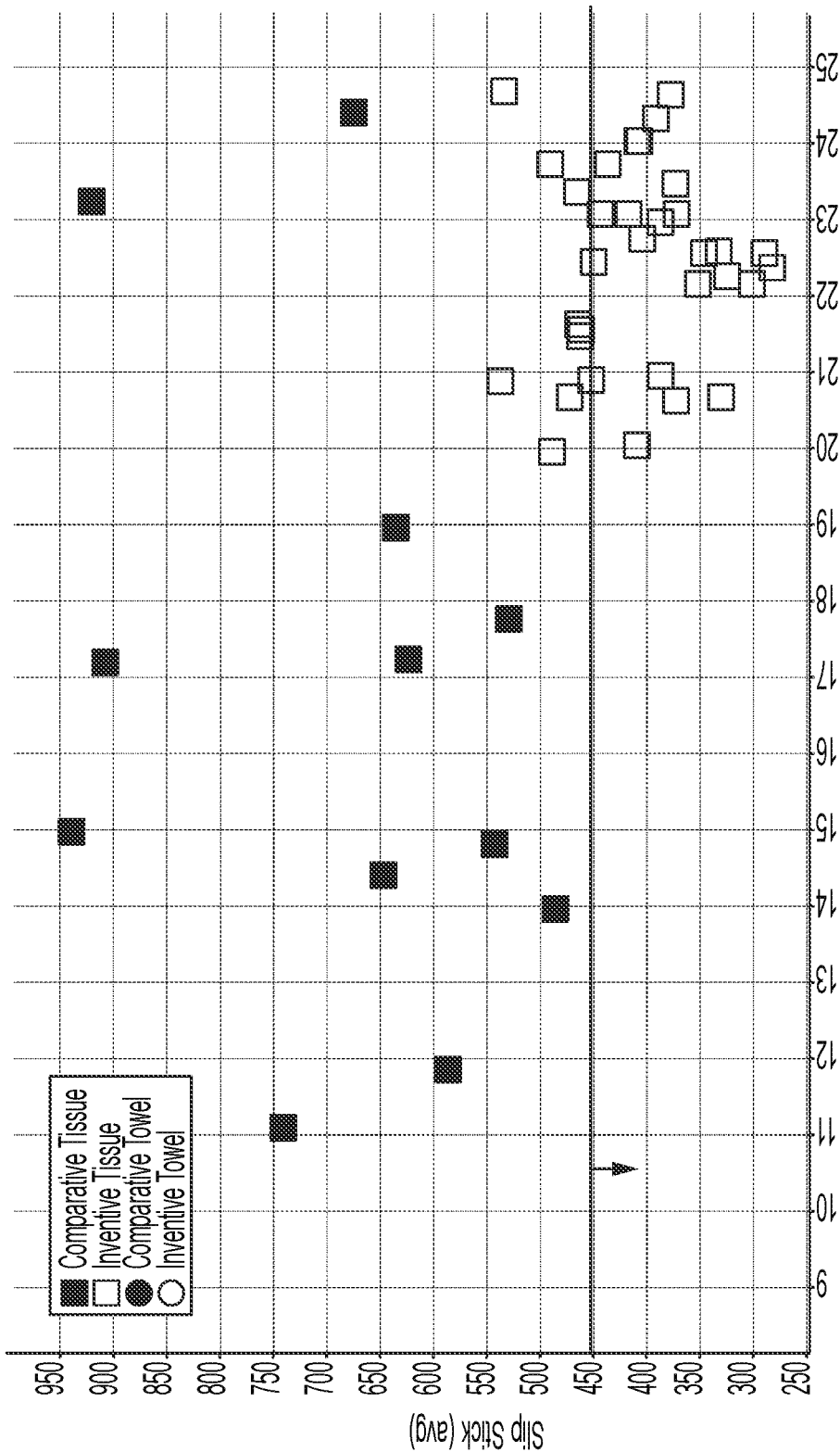
FIG. 1B is a graph illustrating slip stick (y-axis) and dry caliper (x-axis) values of inventive and comparative non-wood tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J.
Figure 1C:
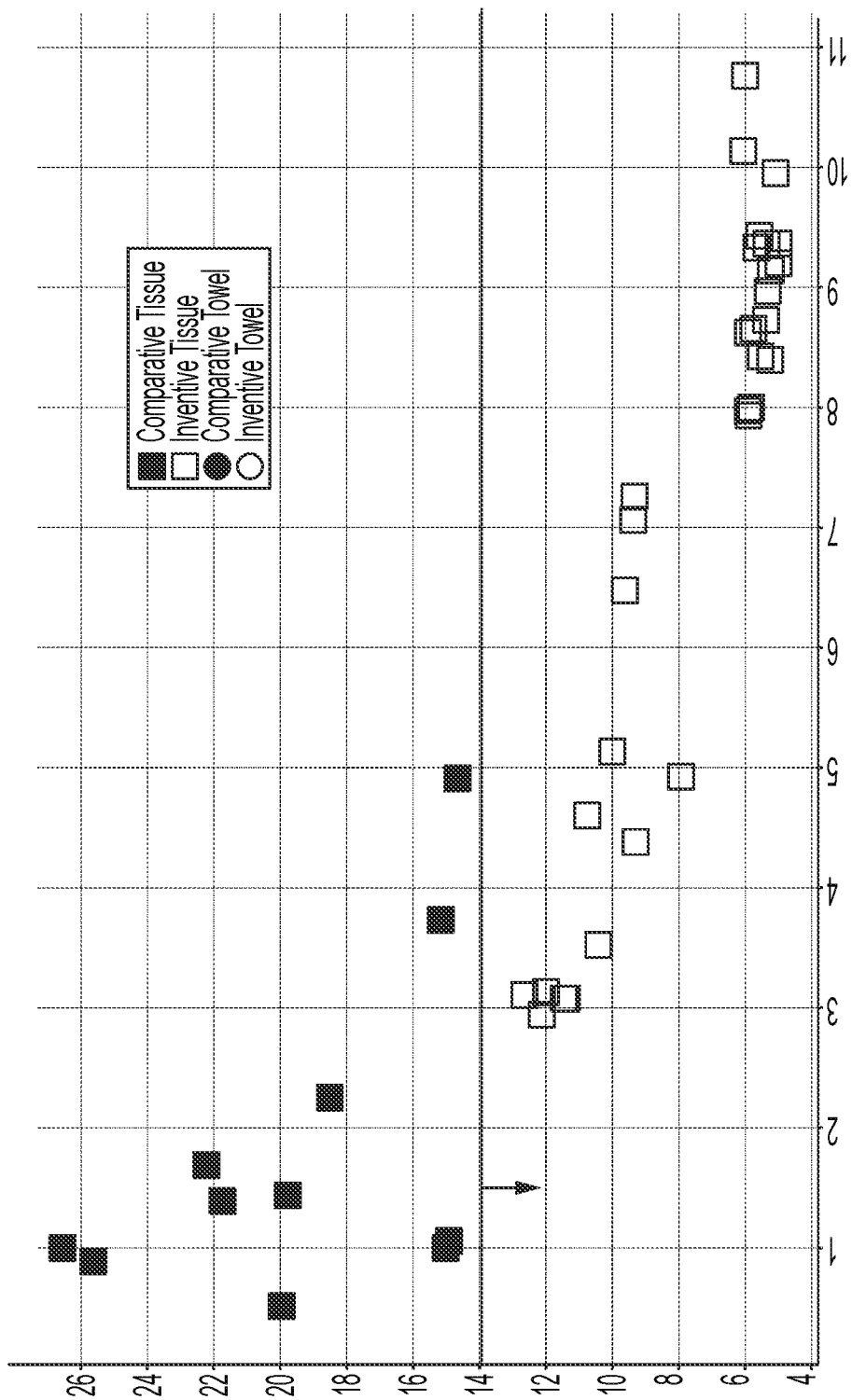
FIG. 1C is a graph illustrating TS7 (y-axis) and lint (x-axis) values of inventive and comparative non-wood tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J.
Figure 1D:
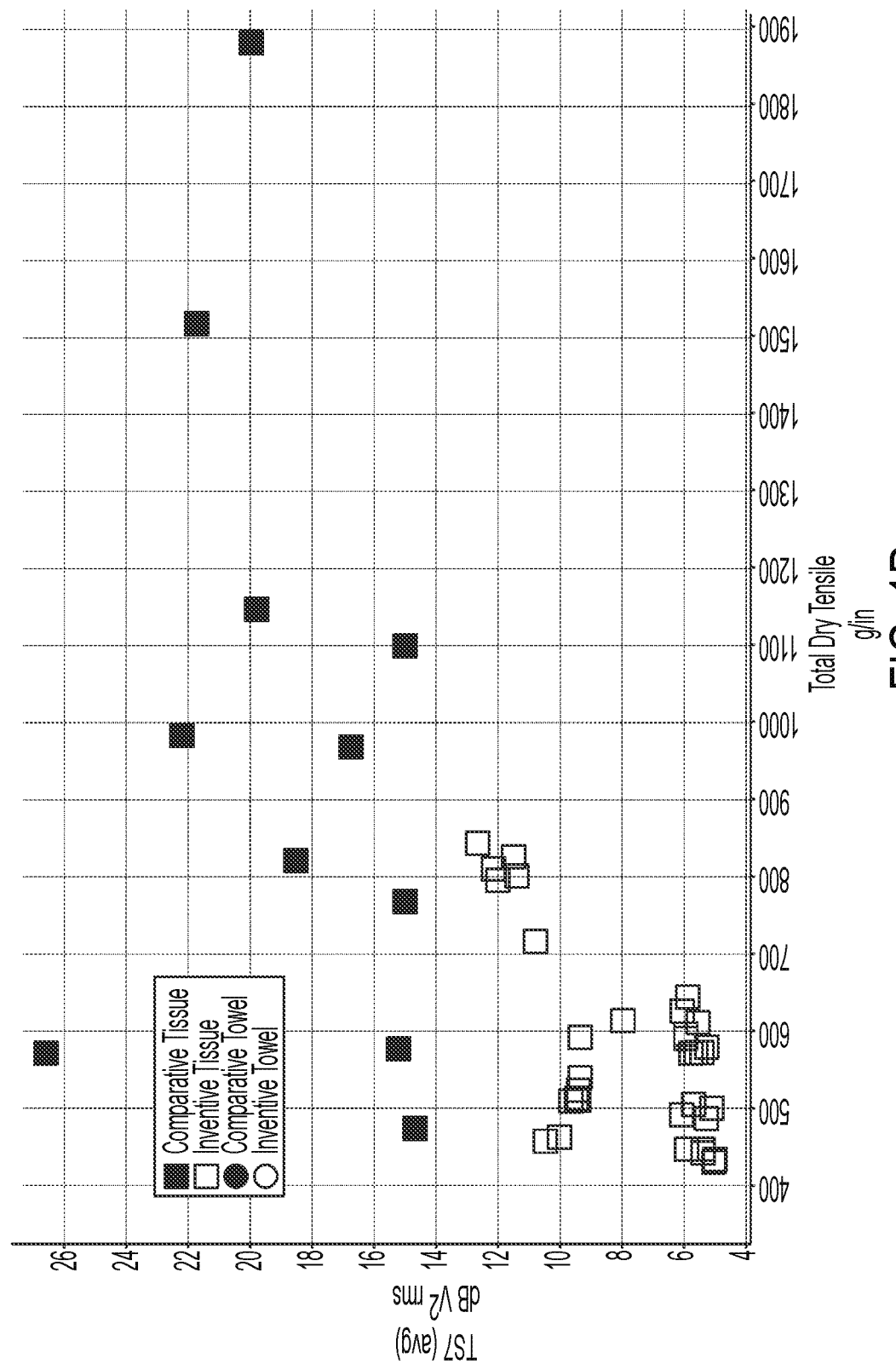
FIG. 1D is a graph illustrating TS7 (y-axis) and total dry tensile (x-axis) values of inventive and comparative non-wood tissue (bath) samples of FIGS. 21A, 21B-1, 21B-2.
Figure 2C:
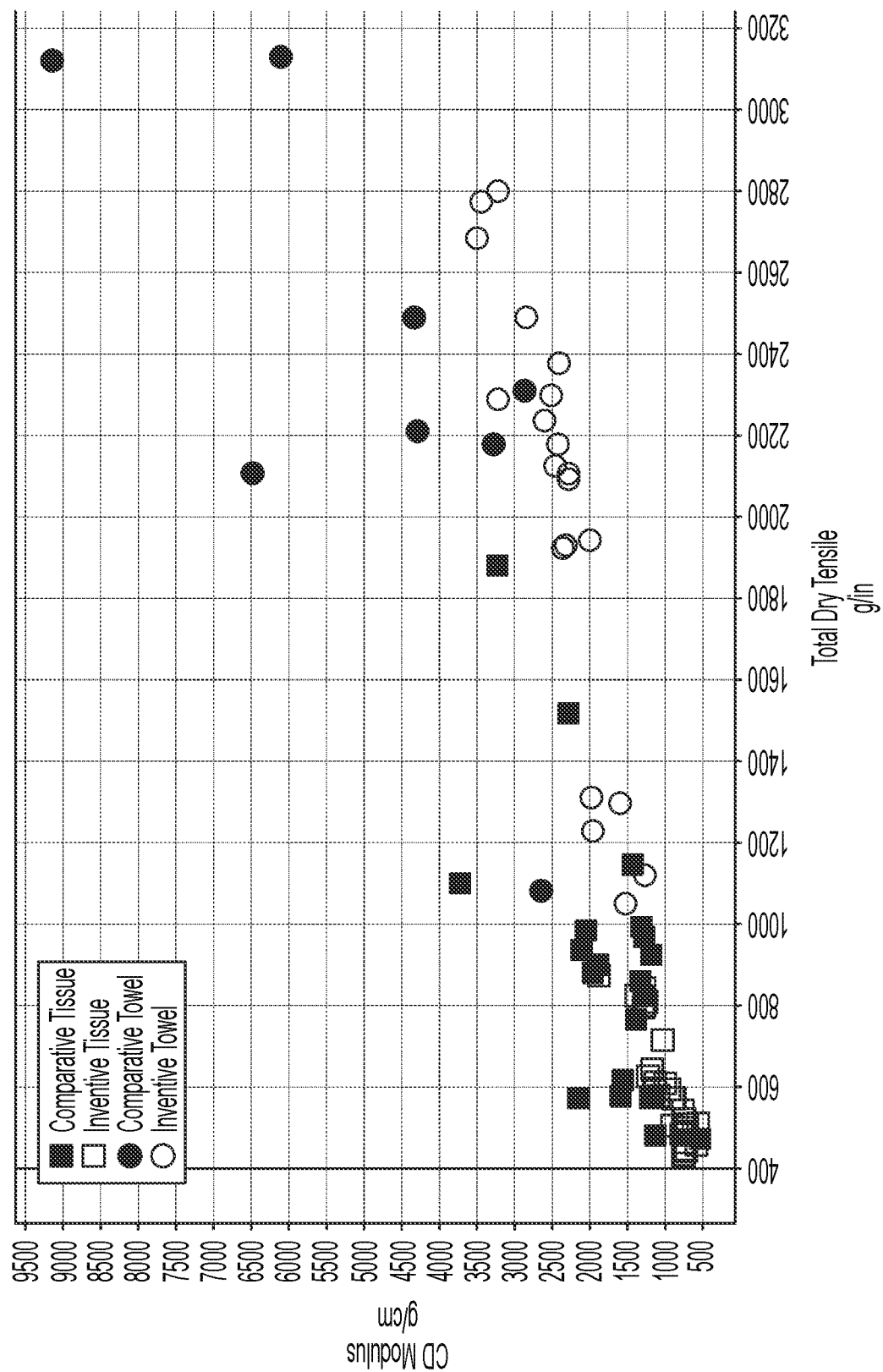

FIG. 2C is a graph illustrating CD modulus (y-axis) and total dry tensile (x-axis) values of inventive and comparative non-wood (paper) towel and tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J and 22A, 22B, 22C, 22D, 22E, 22F.

Figure 2D:
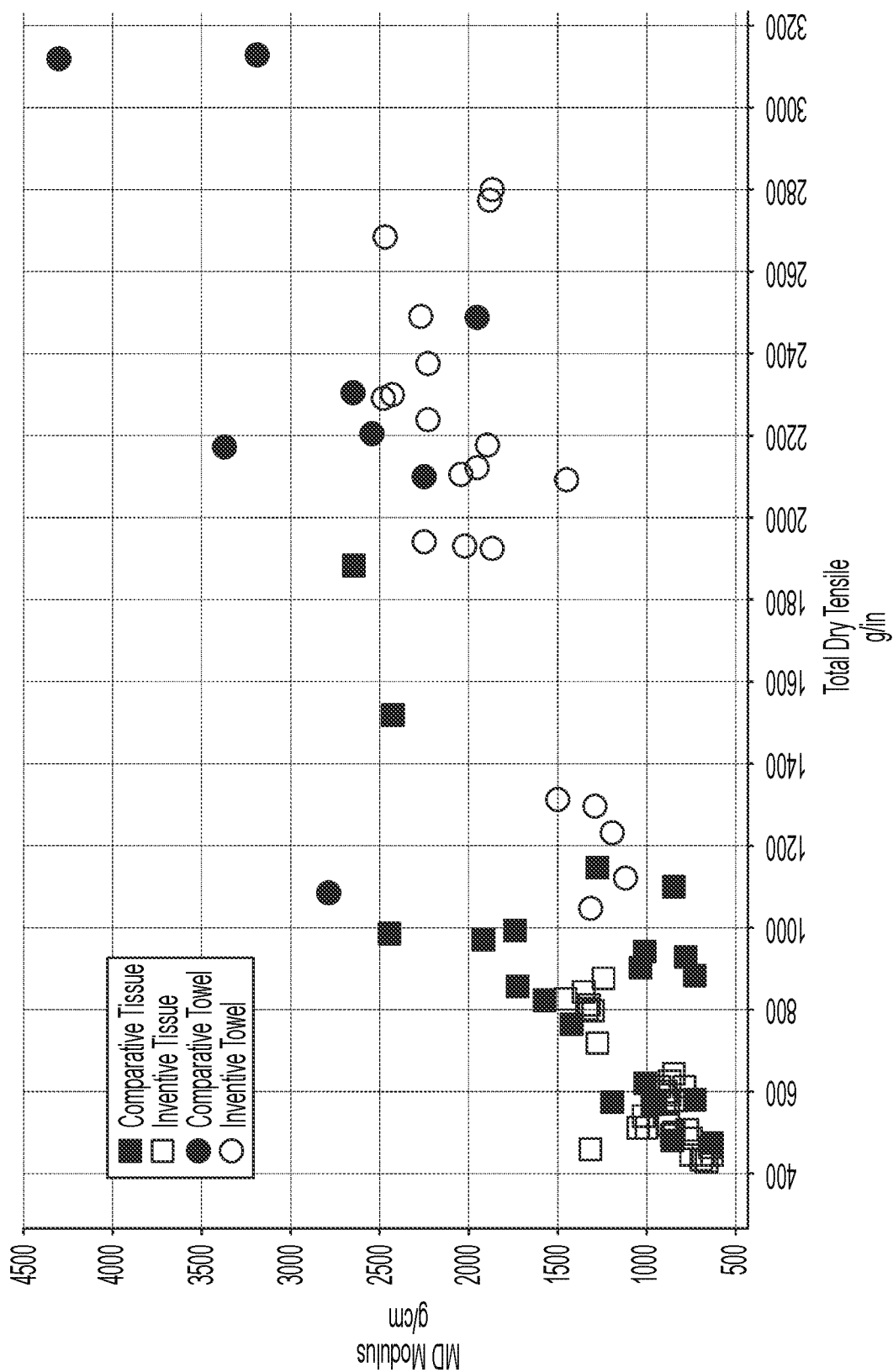

FIG. 2D is a graph illustrating MD modulus (y-axis) and total dry tensile (x-axis) values of inventive and comparative non-wood (paper) towel and tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J and 22A, 22B, 22C, 22D, 22E, 22F.

Figure 2E:
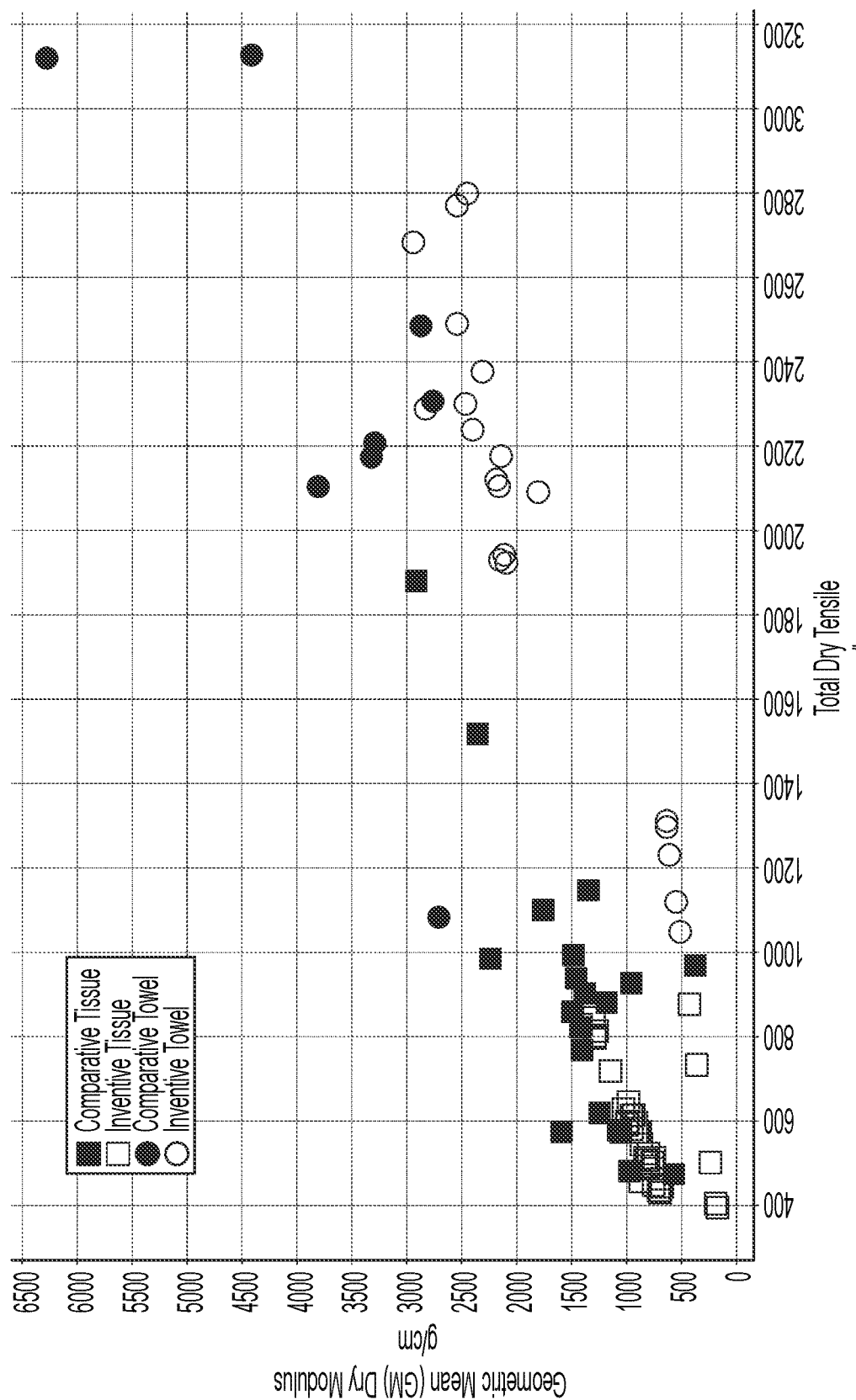

FIG. 2E is a graph illustrating geometric mean (GM) dry modulus (y-axis) and total dry tensile (x-axis) values of inventive and comparative non-wood (paper) towel and tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J and 22A, 22B, 22C, 22D, 22E, 22F.

Figure 2F:
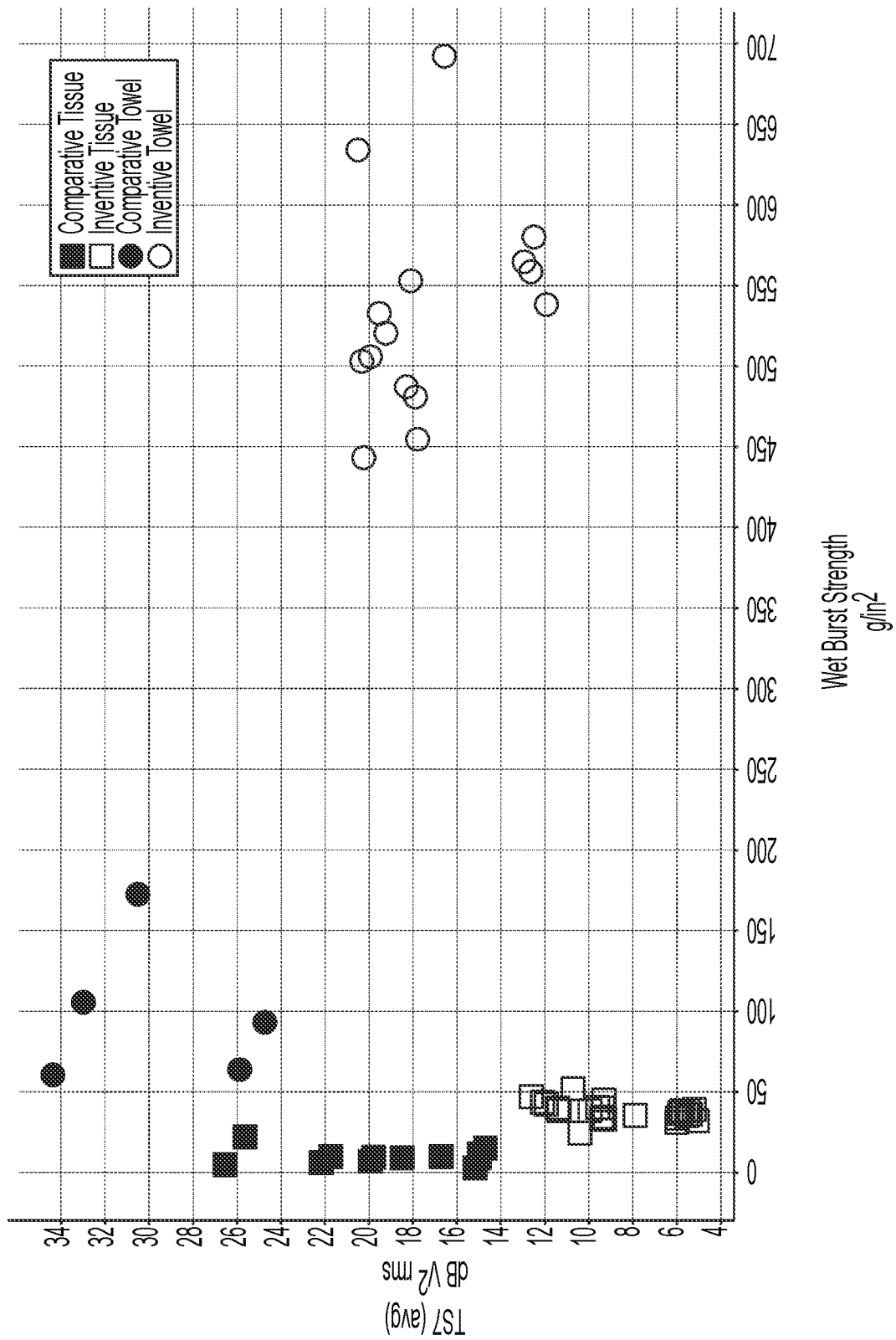

FIG. 2F is a graph illustrating TS7 (y-axis) and wet burst strength (x-axis) values of inventive and comparative non-wood (paper) towel and tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J and 22A, 22B, 22C, 22D, 22E, 22F.

Figure 2G:
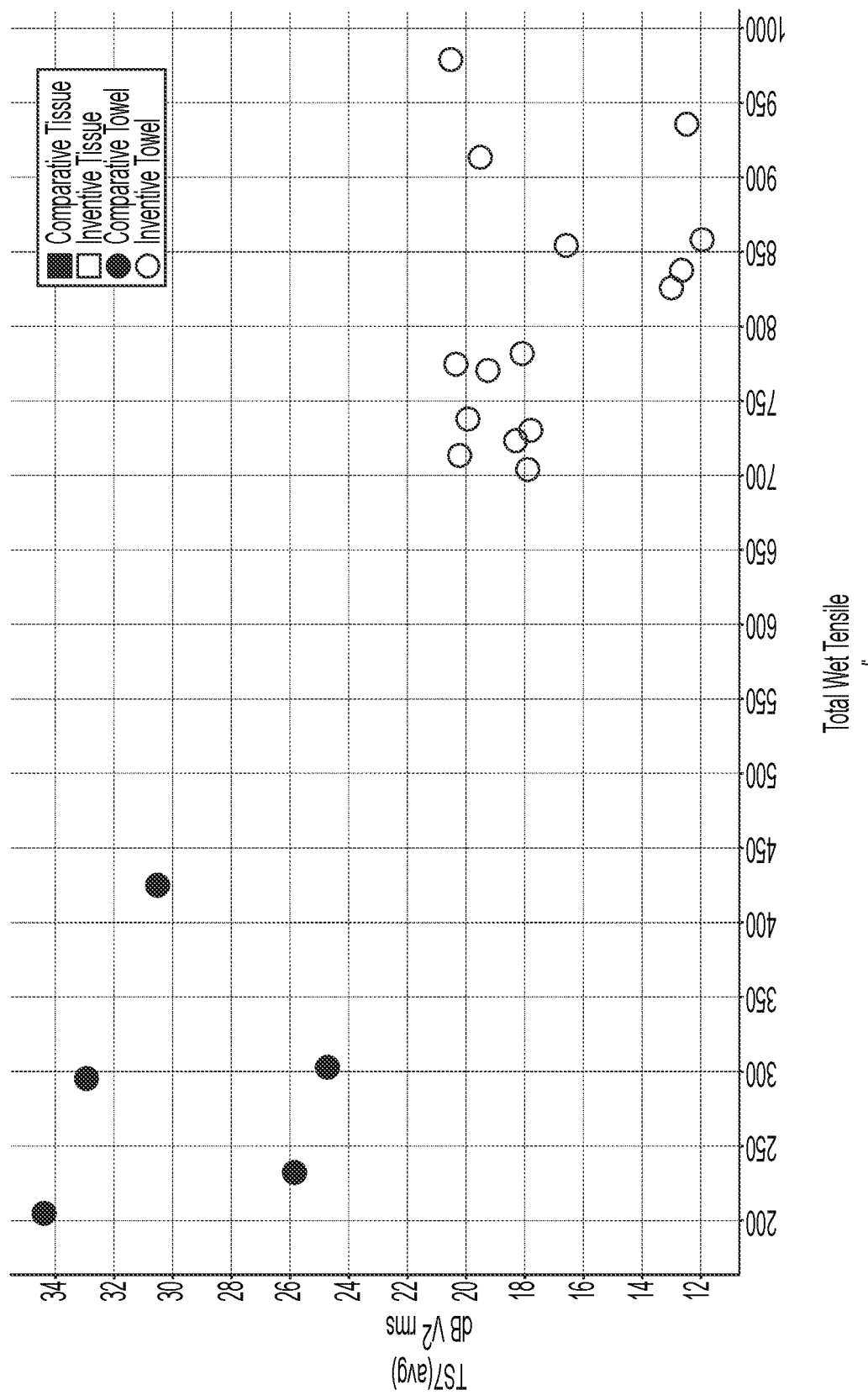

FIG. 2G is a graph illustrating TS7 (y-axis) and total wet tensile (x-axis) values of inventive and comparative non-wood (paper) towel samples of FIGS. 22A, 22B, 22C, 22D, 22E, 22F.

Figure 2H:
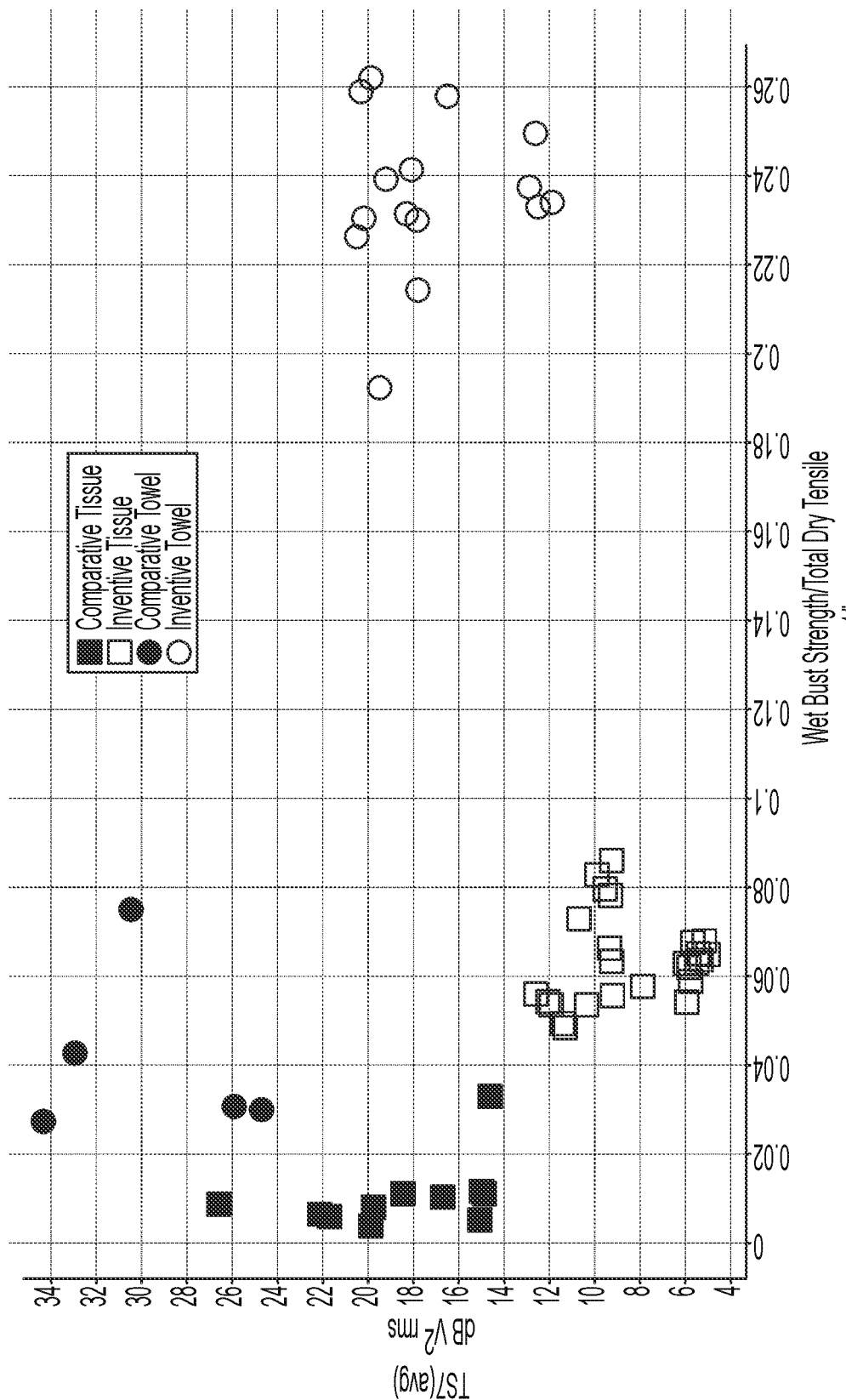

FIG. 2H is a graph illustrating TS7 (y-axis) and Wet Bust Strength/Total Dry Tensile (x-axis) values of inventive and comparative non-wood (paper) towel and tissue (bath) samples of FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J and 22A, 22B, 22C, 22D, 22E, 22F.

Figure 3A:
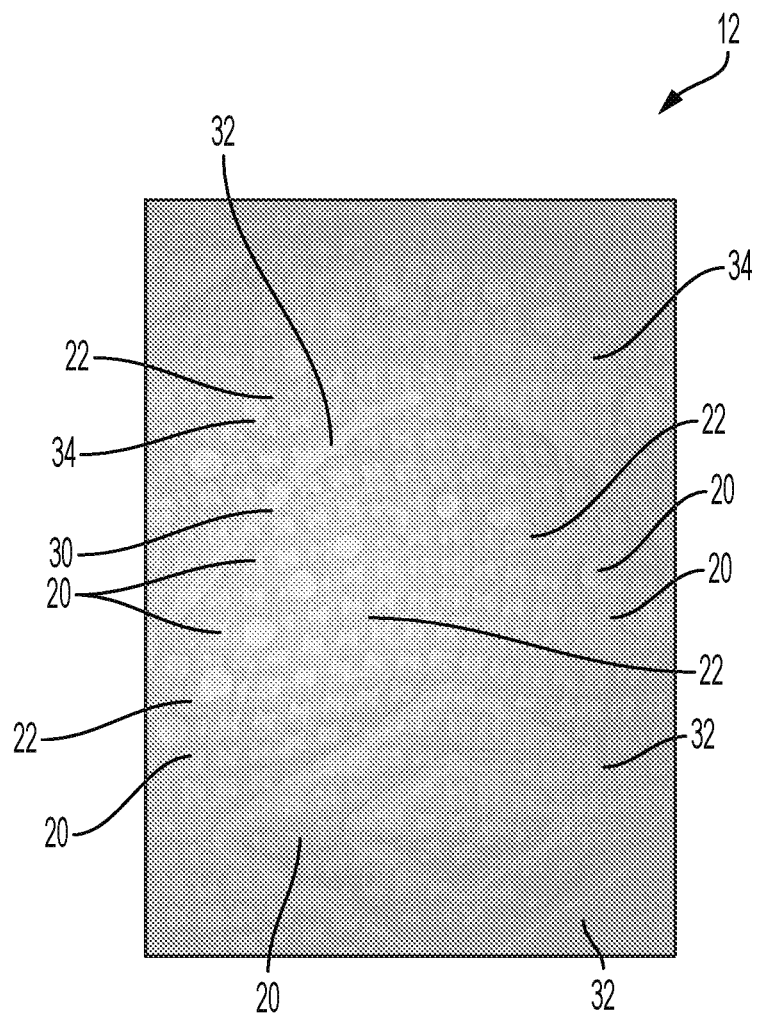

FIG. 3A is a photograph of a portion of a fibrous structure, particularly a paper towel, comprising non-wood fiber(s) and comprising knuckles and pillows.

Figure 3B:
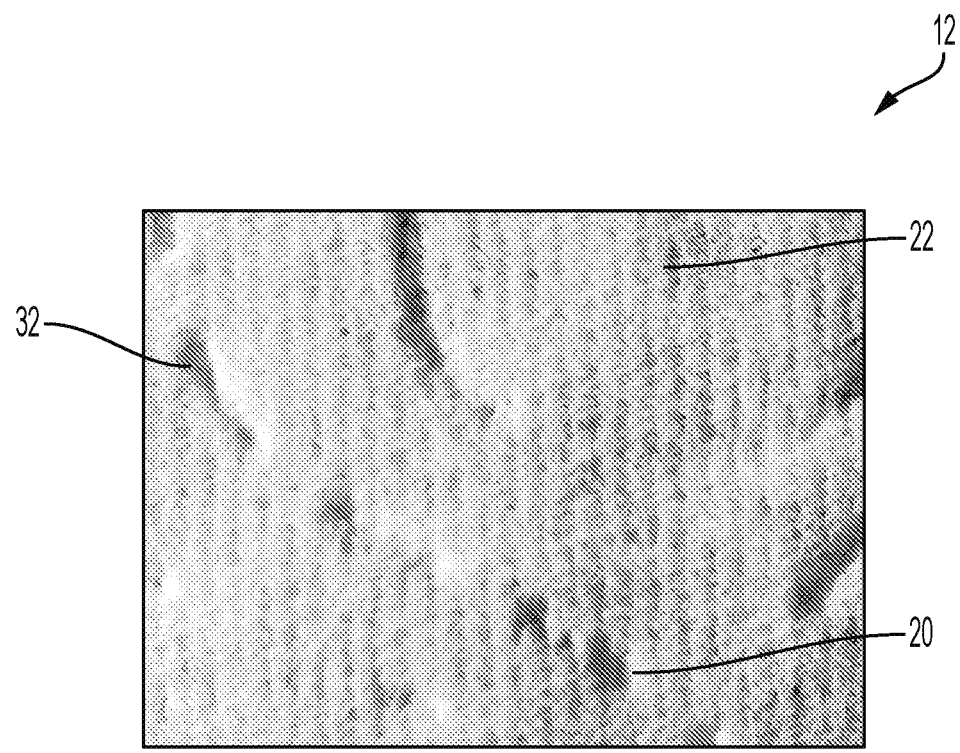

FIG. 3B is a photograph of a portion of a fibrous structure, particularly a WSO bath tissue, comprising non-wood fiber(s) and comprising knuckles and pillows.

Figure 3C:
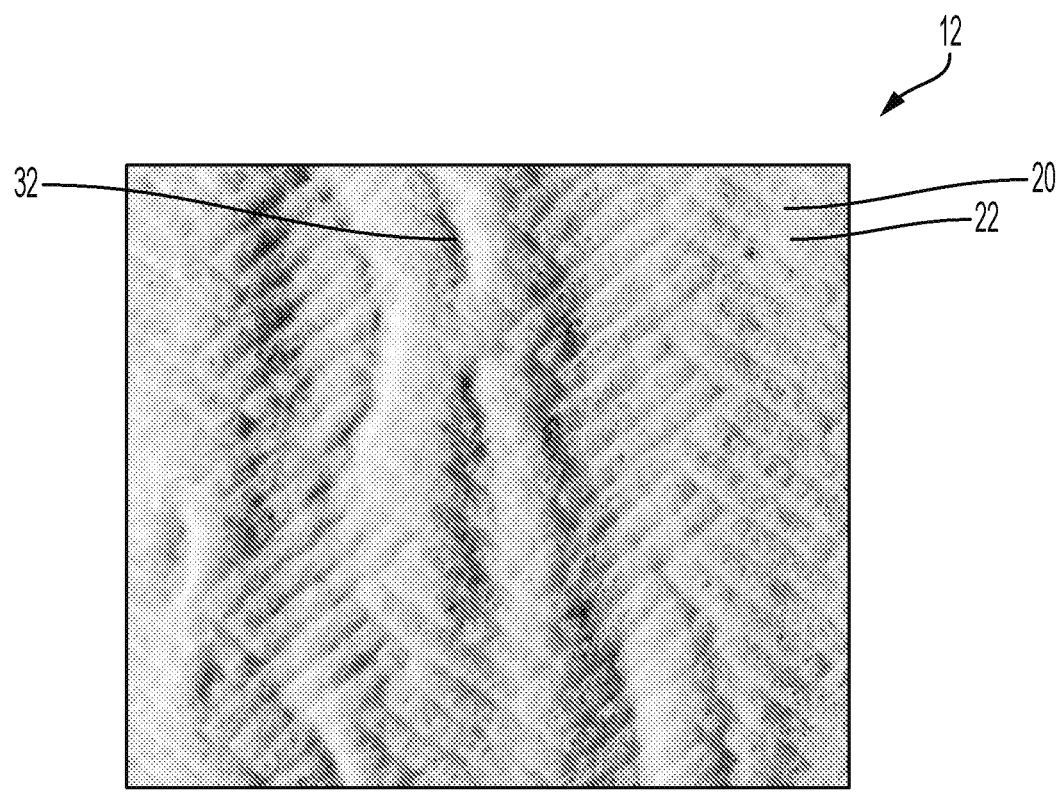

FIG. 3C is a photograph of a portion of a fibrous structure, particularly a FSO bath tissue, comprising non-wood fiber(s) and comprising knuckles and pillows.

Figure 4A:
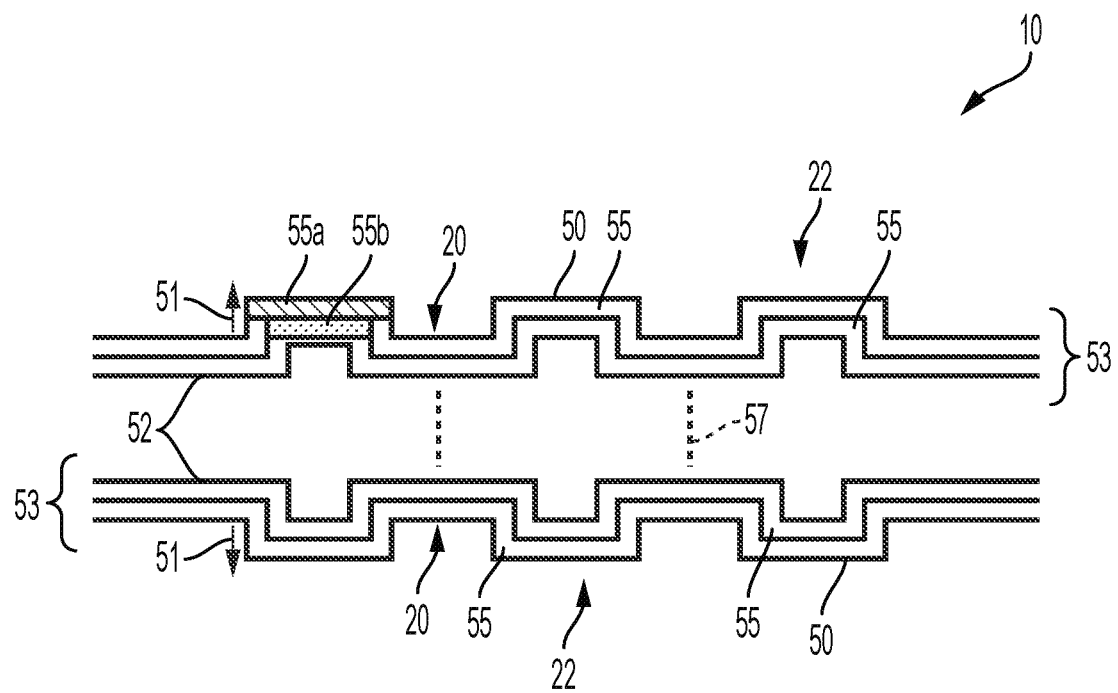
Figure 6A:
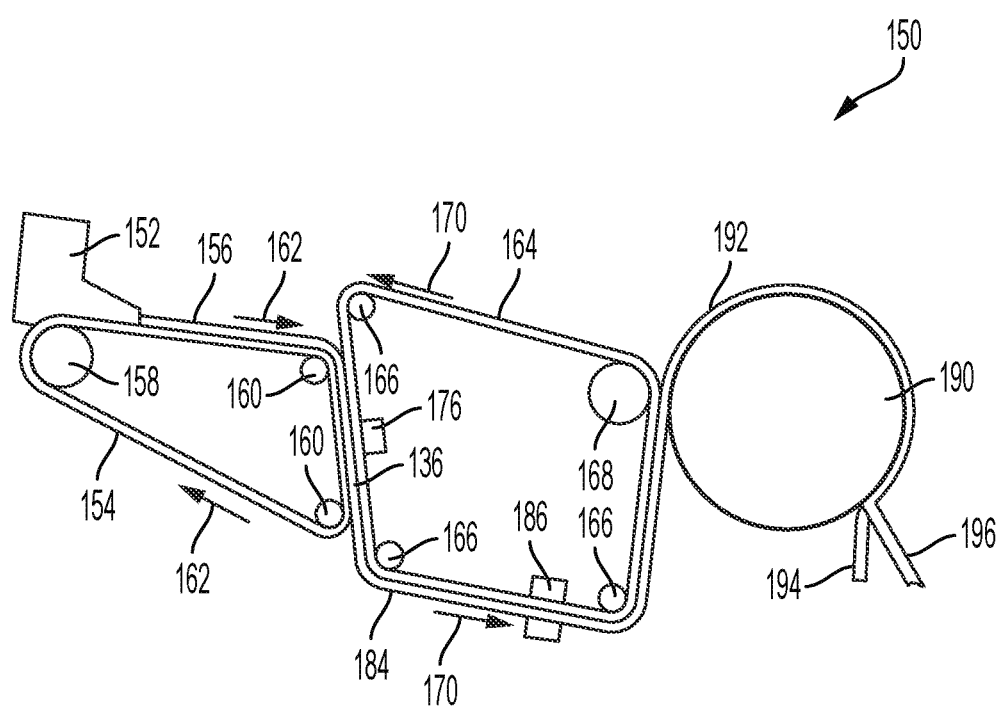

FIG. 4A is a representative cross-section view of a sanitary tissue product comprising knuckles and pillows and made according to a typical TAD process such as the one illustrated in FIG. 6A. In FIG. 4A, each ply 53 is fabric side out (FSO).

Figure 4B:
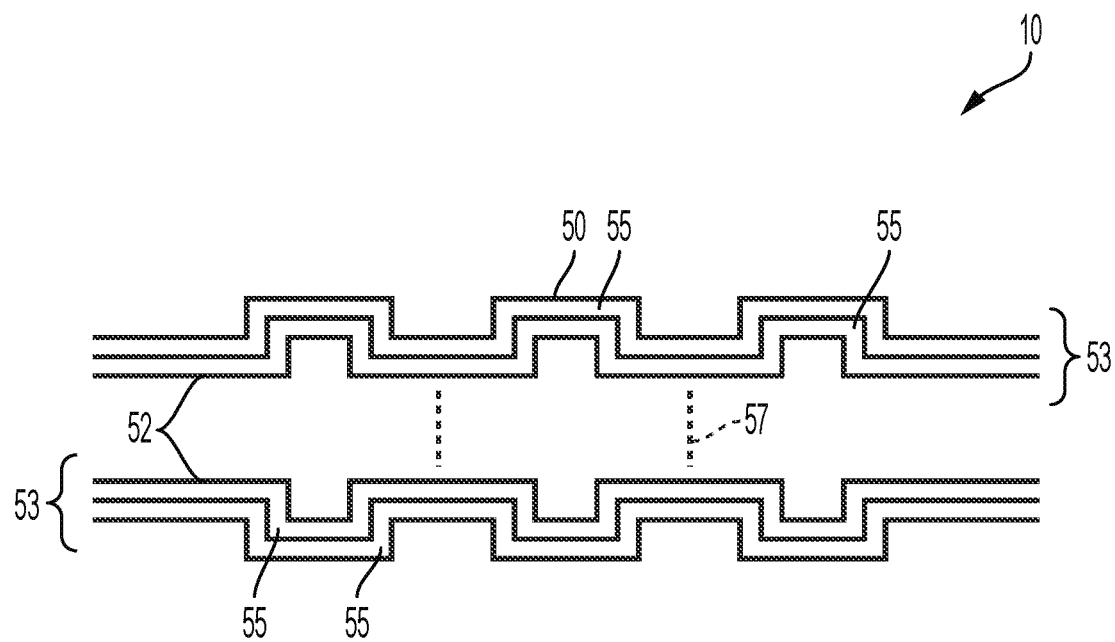
Figure 6B:
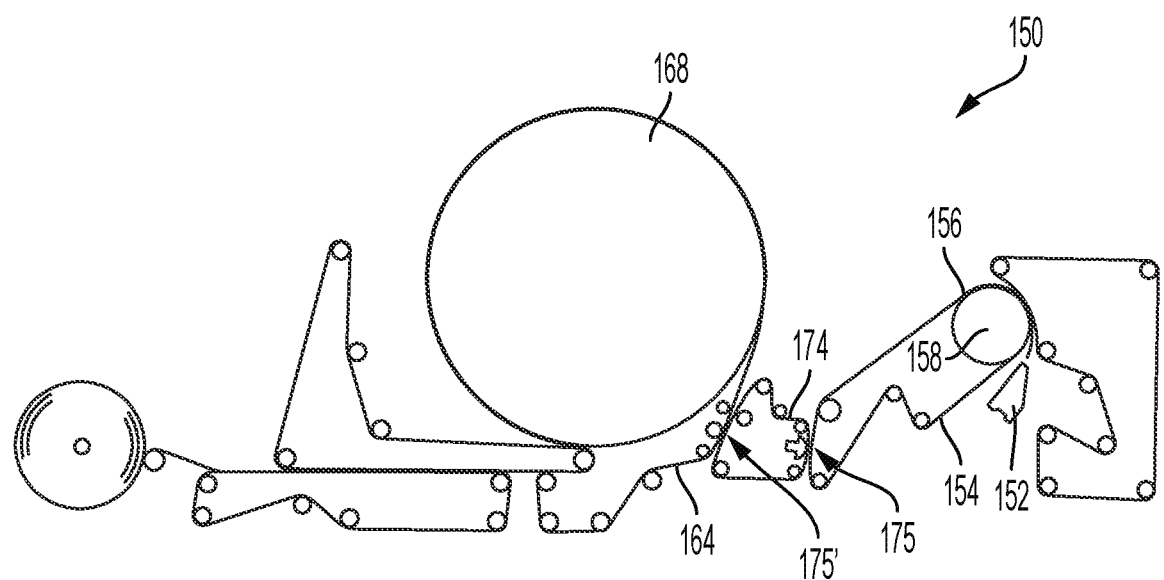
Figure 6C:
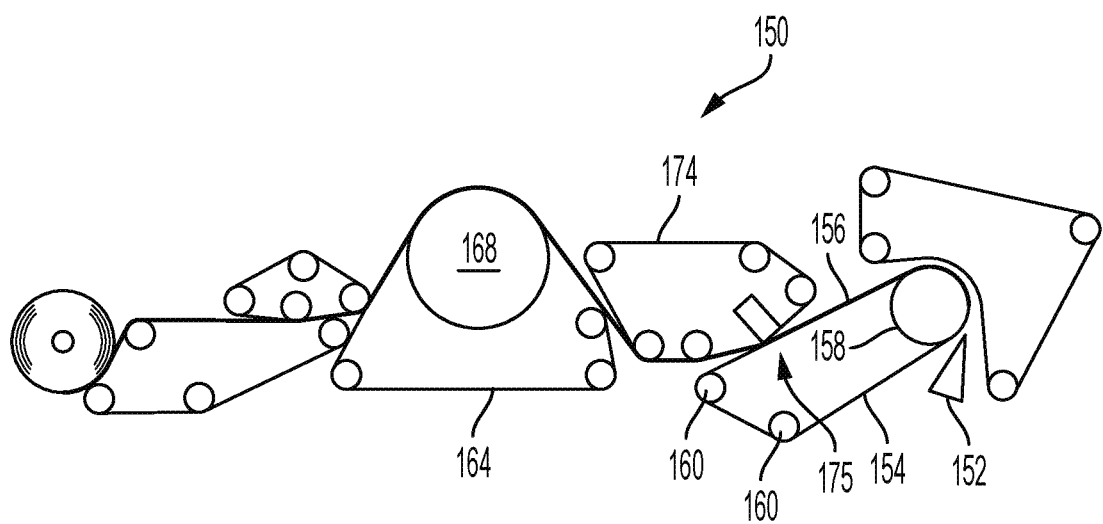

FIG. 4B is a representative cross-section view of a sanitary tissue product made according to an UCTAD process such as the one illustrated in FIGS. 6B and 6C—this sanitary tissue product does not have distinct knuckle and pillow regions or zones.

Figure 4C:
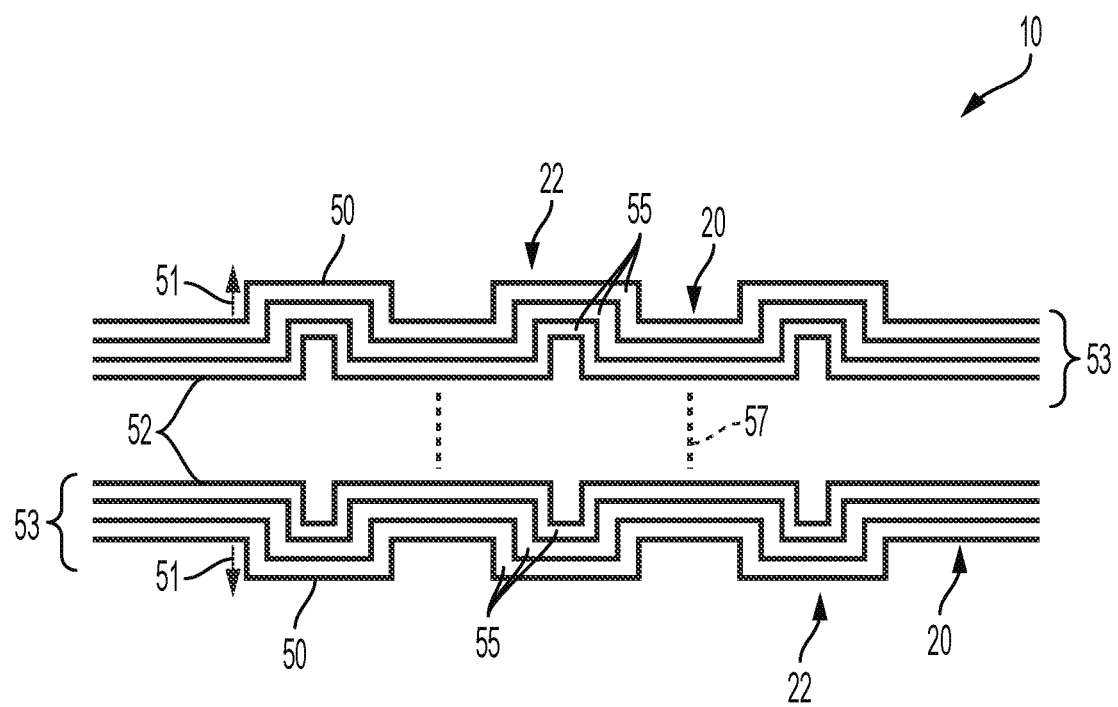

FIG. 4C is a representative cross-section view of a sanitary tissue product comprising knuckles and pillows and made according to a typical TAD process such as the one illustrated in FIG. 6A. In FIG. 4C, ply 53 is wire side out (WSO) and ply 53' is FSO.

Figure 4D:
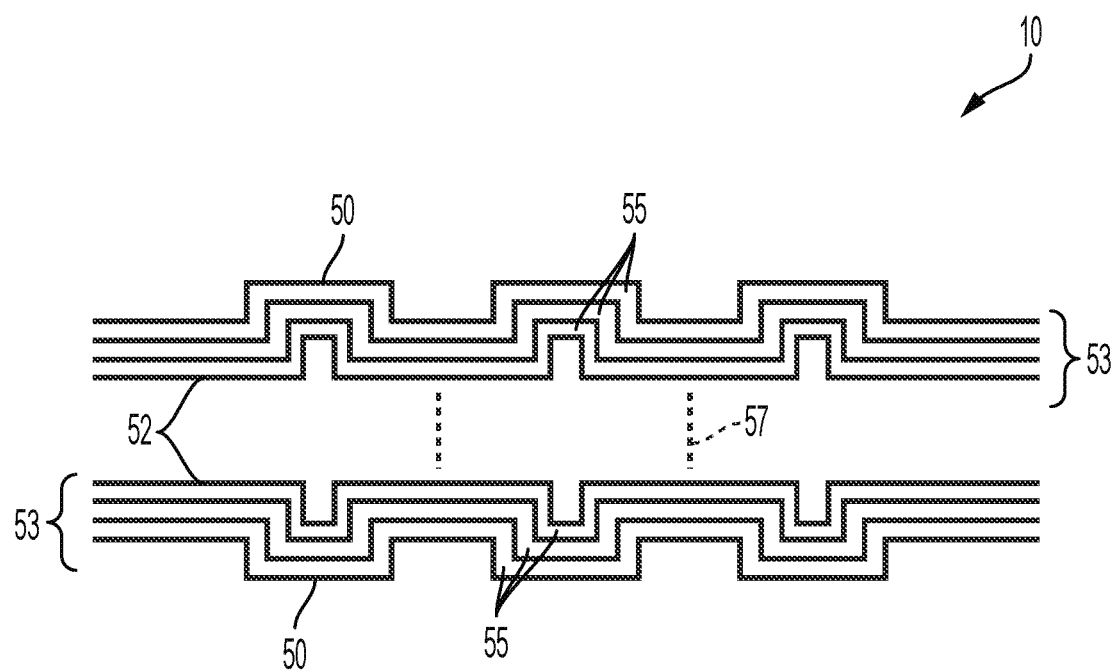

FIG. 4D is a representative cross-section view of a sanitary tissue product made according to an UCTAD process such as the one illustrated in FIGS. 6B and 6C— this sanitary tissue product does not have distinct knuckle and pillow regions or zones.

Figure 4E:
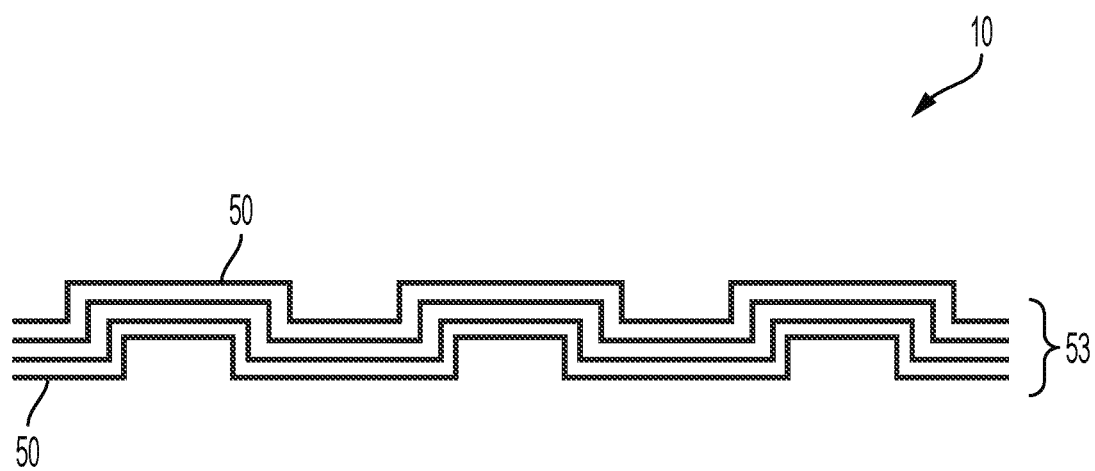

FIG. 4E is a representative cross-section view of a sanitary tissue product made according to an UCTAD process such as the one illustrated in FIGS. 6B and 6C— this sanitary tissue product does not have distinct knuckle and pillow regions or zones.

Figure 4F:
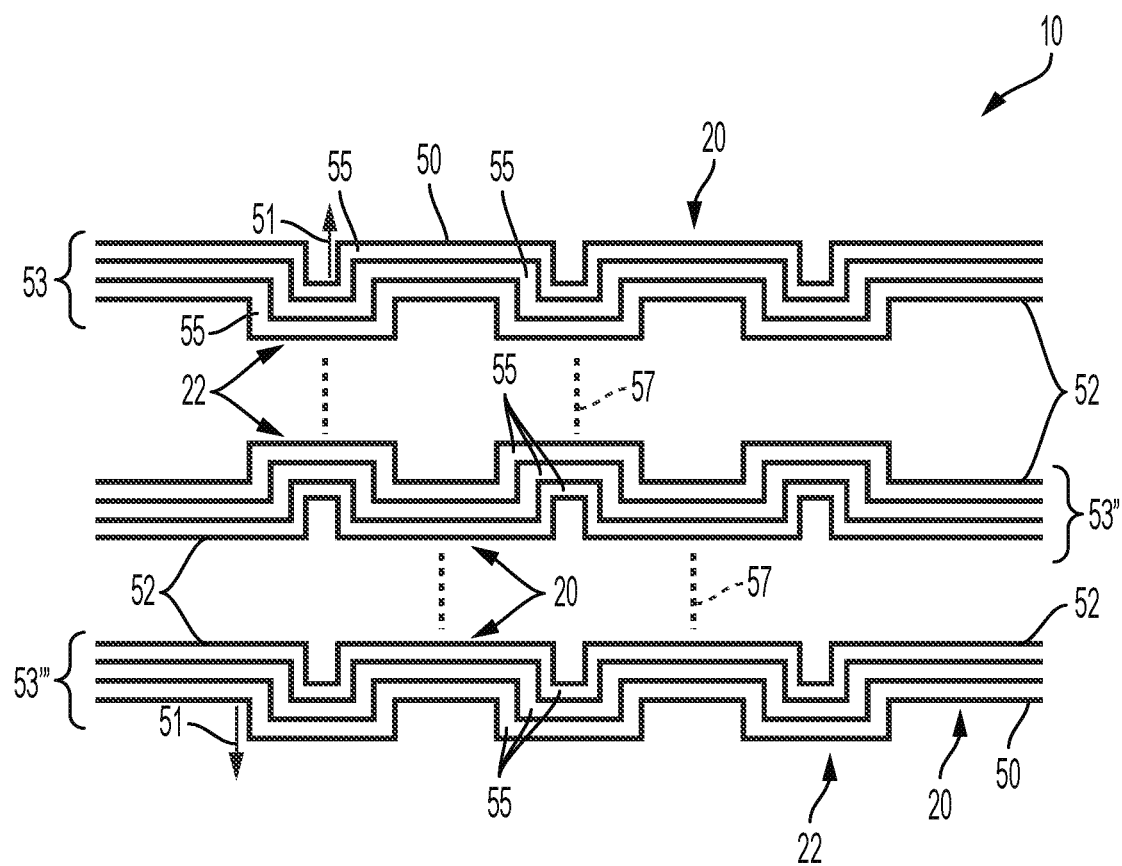

FIG. 4F is a representative cross-section view of a sanitary tissue product comprising knuckles and pillows and made according to a typical TAD process such as the one illustrated in FIG. 6A.

Figure 4G:
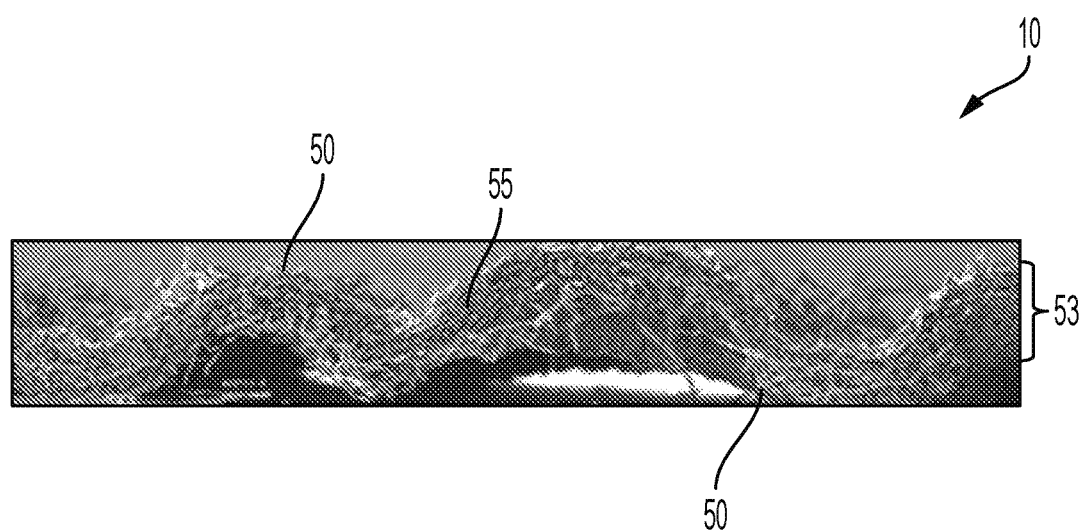

FIG. 4G is a cross-section view of a sanitary tissue product made according to an UCTAD process such as the one illustrated in FIGS. 6B and 6C—this sanitary tissue product does not have distinct knuckle and pillow regions or zones.

Figure 4H:
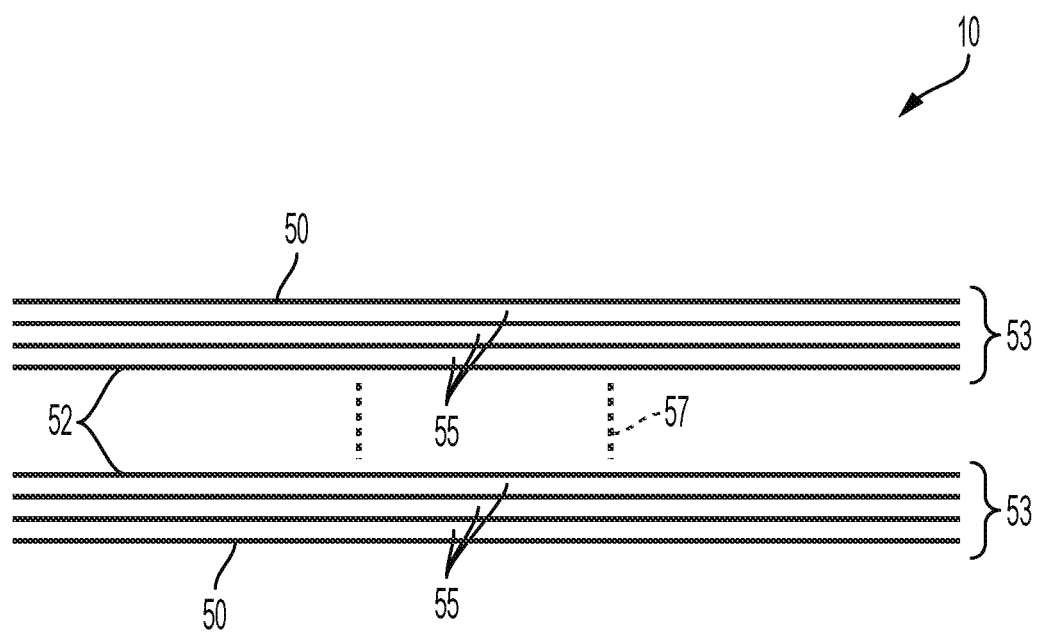
Figure 41:
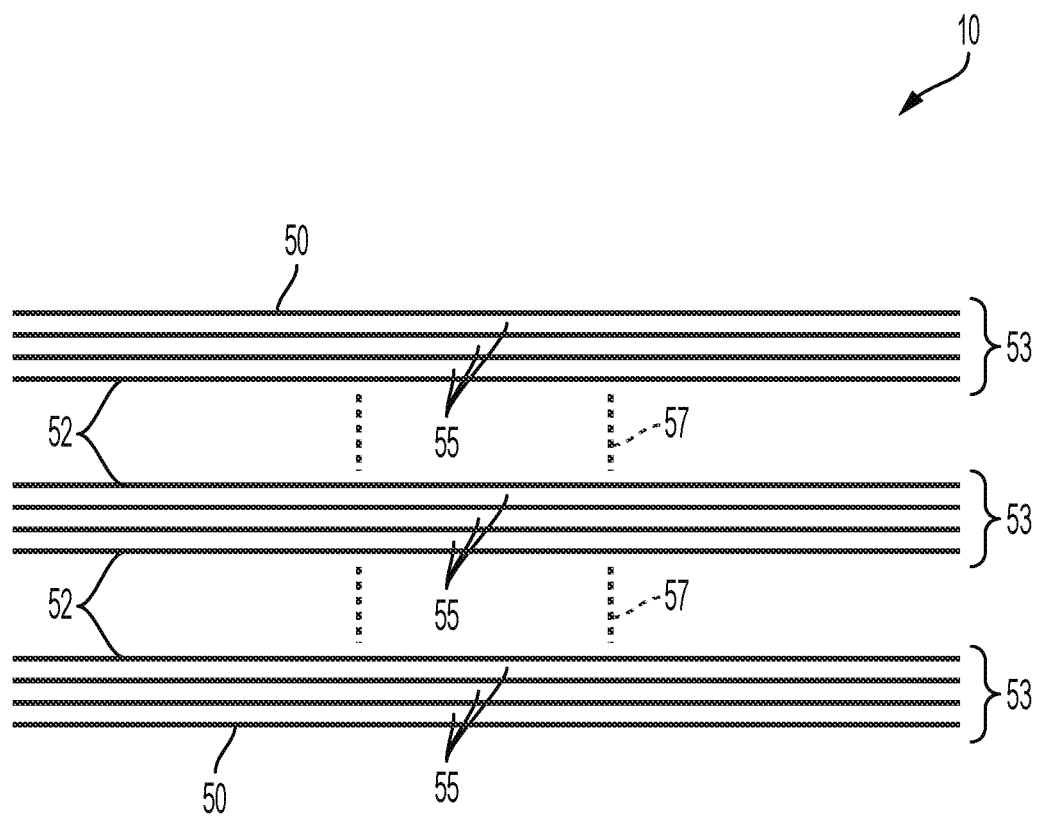

FIG. 4H is a representative cross-section view of a sanitary tissue product made according to a conventional wet press process—this sanitary tissue product does not have distinct knuckle and pillow regions or zones.

FIG. 4I is a representative cross-section view of a sanitary tissue product made according to a conventional wet press process—this sanitary tissue product does not have distinct knuckle and pillow regions or zones.

Figure 5:
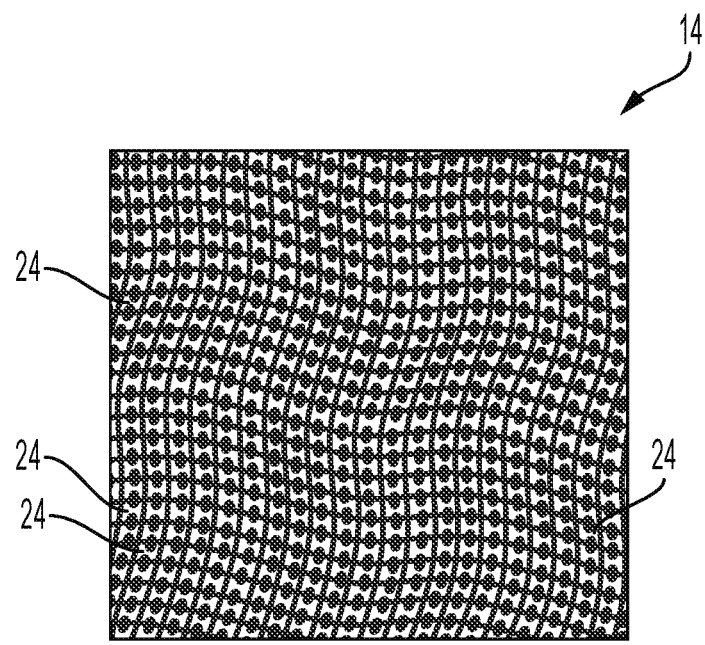

FIG. 5 is a plan view of a portion of a mask pattern used to make the papermaking belt that produced the fibrous structure of FIG. 3A.

FIG. 6A is a schematic representation of one method for making the new fibrous structures detailed herein. Specific details of the process and equipment represented by FIG. 6A can be found in U.S. Pat. Nos. 5,714,041; 9,217,226; 9,435,081; 9,631,323; 9,752,281; 10,240,296; and U.S. Publication Nos. 2013-0048239; 2022-0010497.

FIG. 6B is a schematic representation of one method for making the new fibrous structures detailed herein. Specific details of the process and equipment represented by FIG. 6B can be found in U.S. Pat. No. 7,972,474.

FIG. 6C is a schematic representation of one method for making the new fibrous structures detailed herein.

Figure 7:
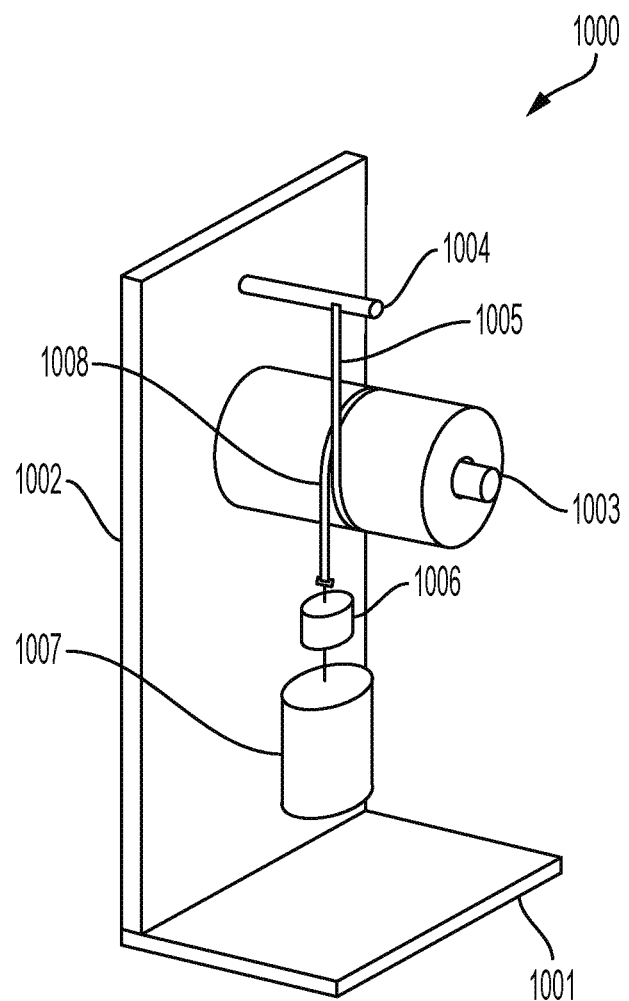

FIG. 7 is a perspective view of a test stand for measuring roll compressibility properties as detailed herein.

Figure 8:
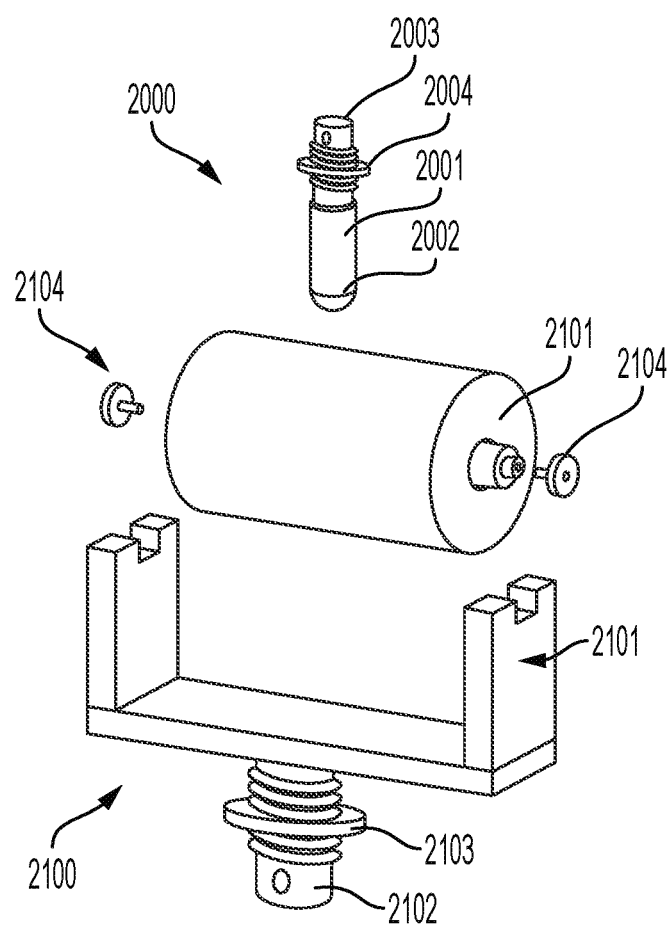

FIG. 8 is perspective view of the testing device used in the roll firmness measurement detailed herein.

Figure 9:
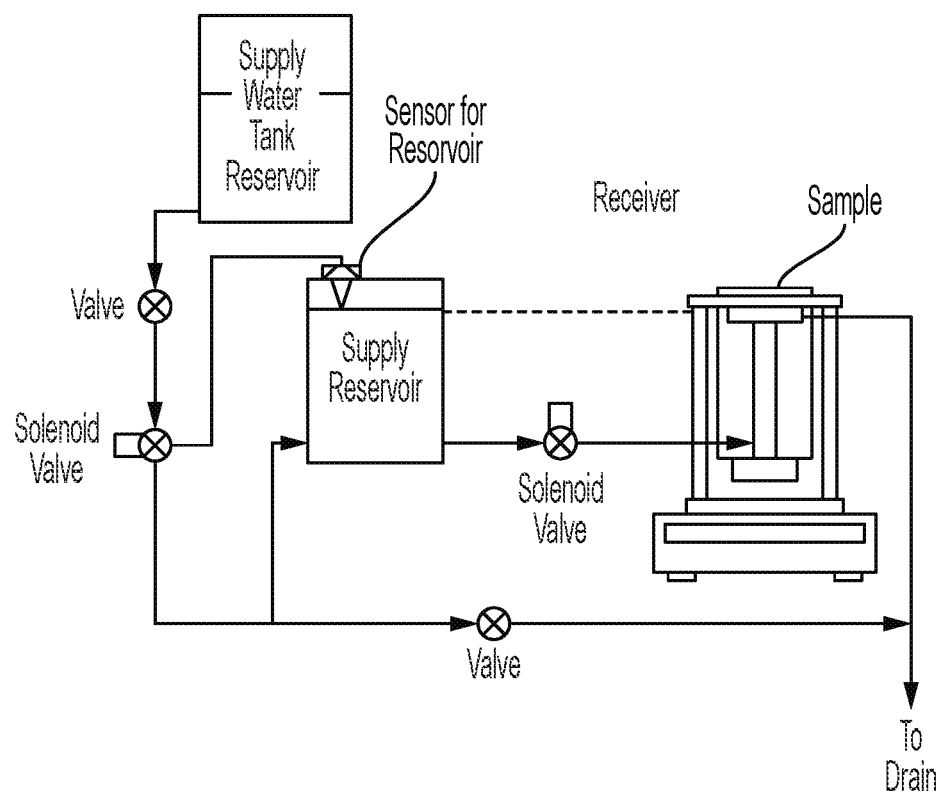

FIG. 9 is a diagram of an SST Test Method set up as detailed herein.

Figure 10:
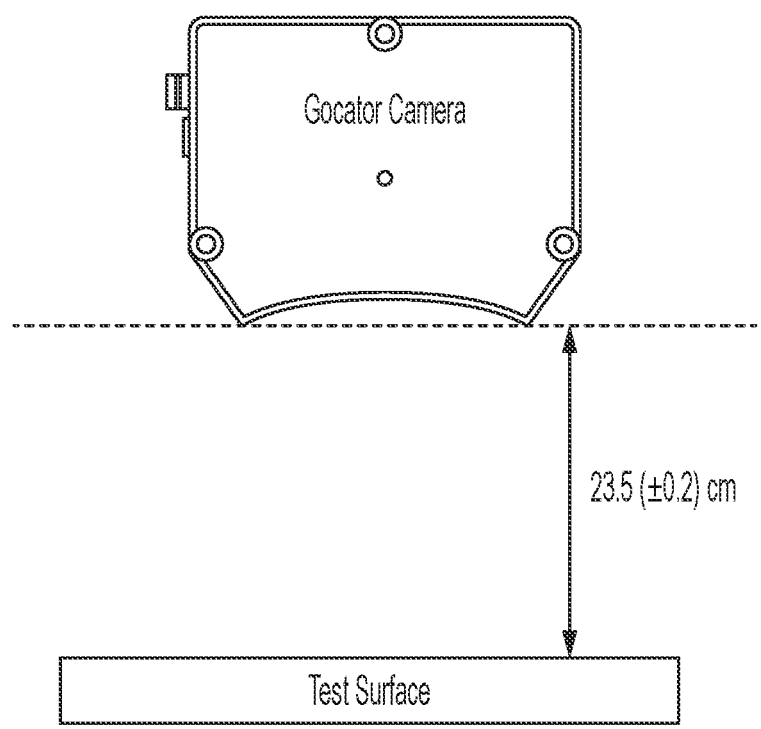

FIG. 10 is a schematic illustrating the Position of Gocator camera to a testing surface relating to the Moist Towel Surface Structure Method.

Figure 11:
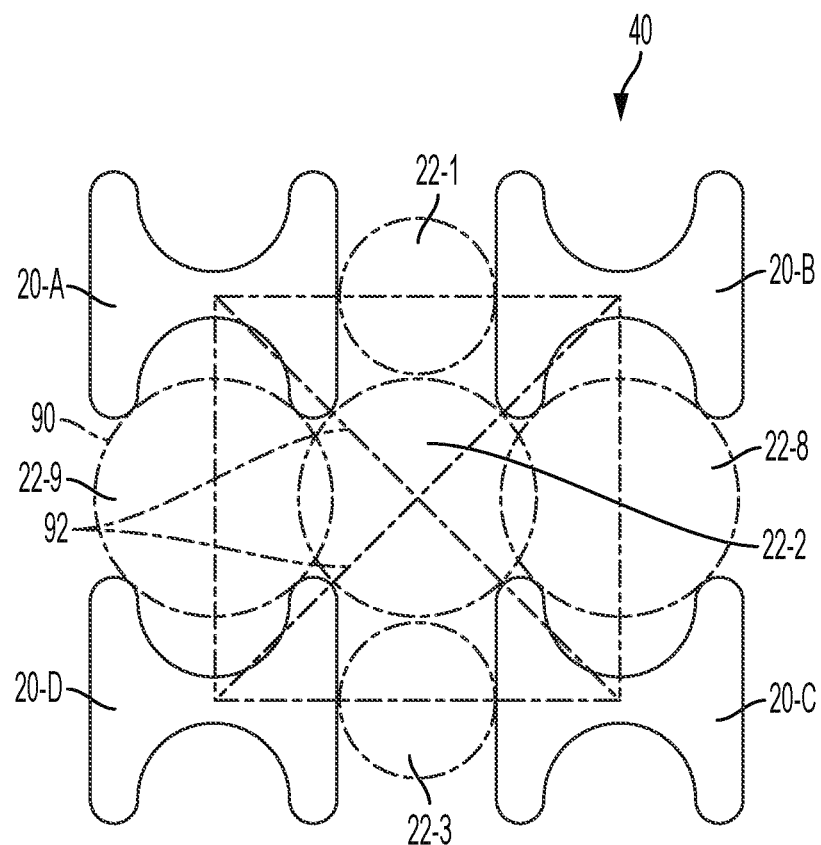

FIG. 11 is an enlarged view of a cell group overlapped by a quadrilateral related to the Continuous Region Density Difference Measurement.

Figure 12:
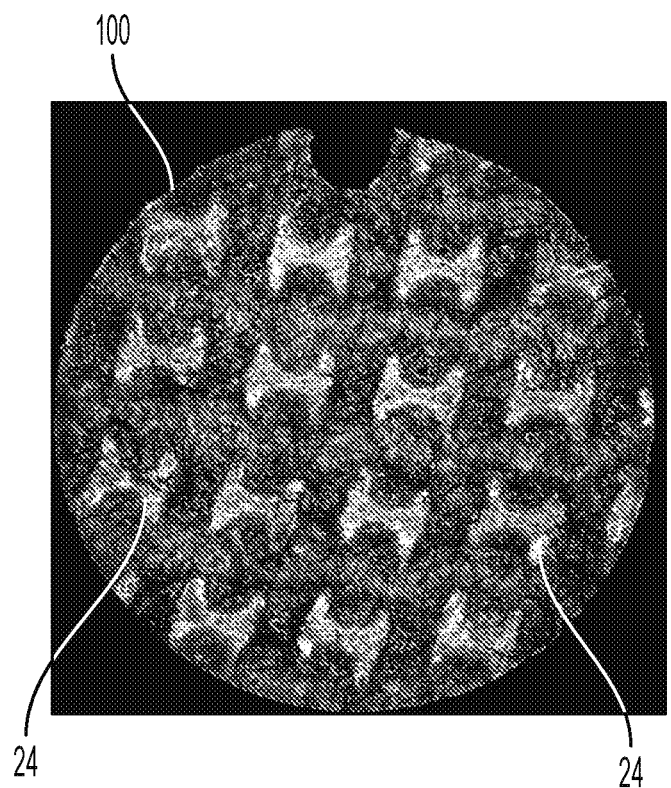

FIG. 12 is a density image for use in the Micro-CT Intensive Property Measurement Method.

Figure 13:
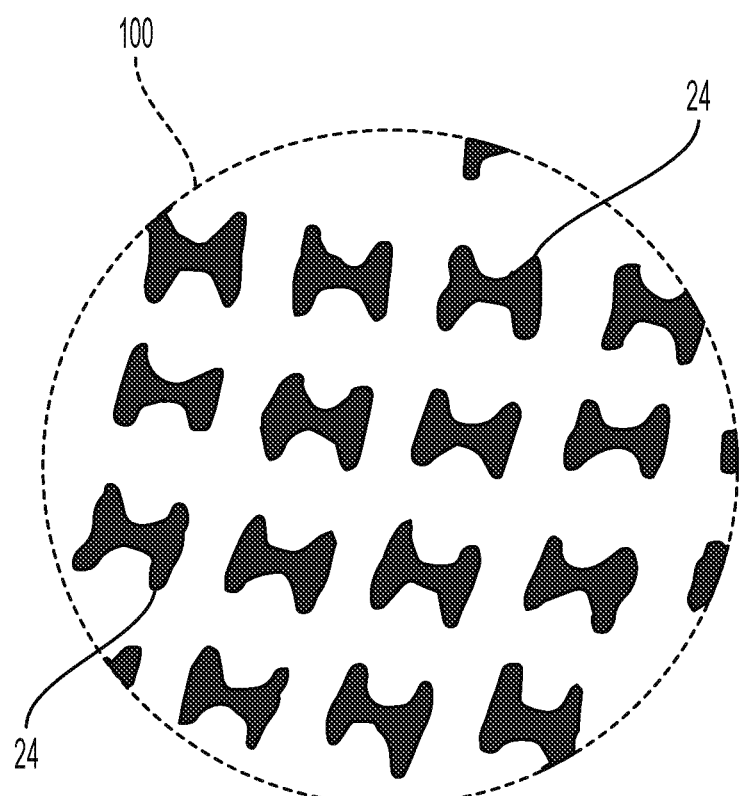

FIG. 13 is a binary image for use in the Micro-CT Intensive Property Measurement Method.

Figure 14:
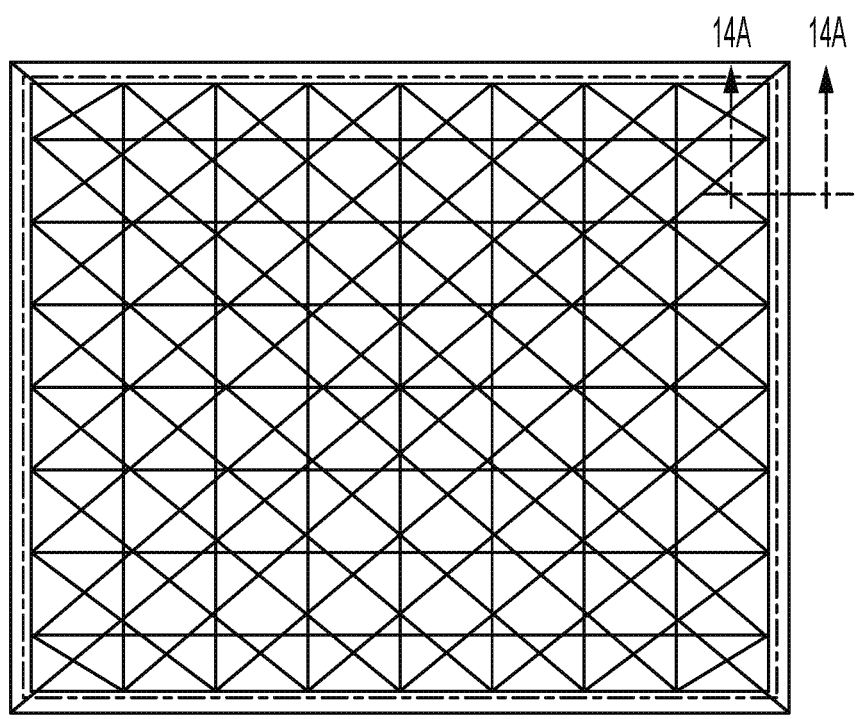

FIG. 14 is an example of a sample support rack used in the HFS and VFS Test Methods.

Figure 14A:
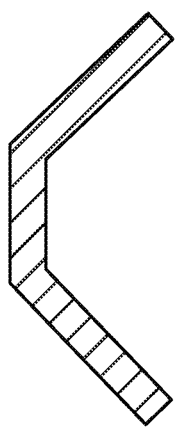

FIG. 14A is a cross-sectional view of the sample support rack of FIG. 14.

Figure 15:
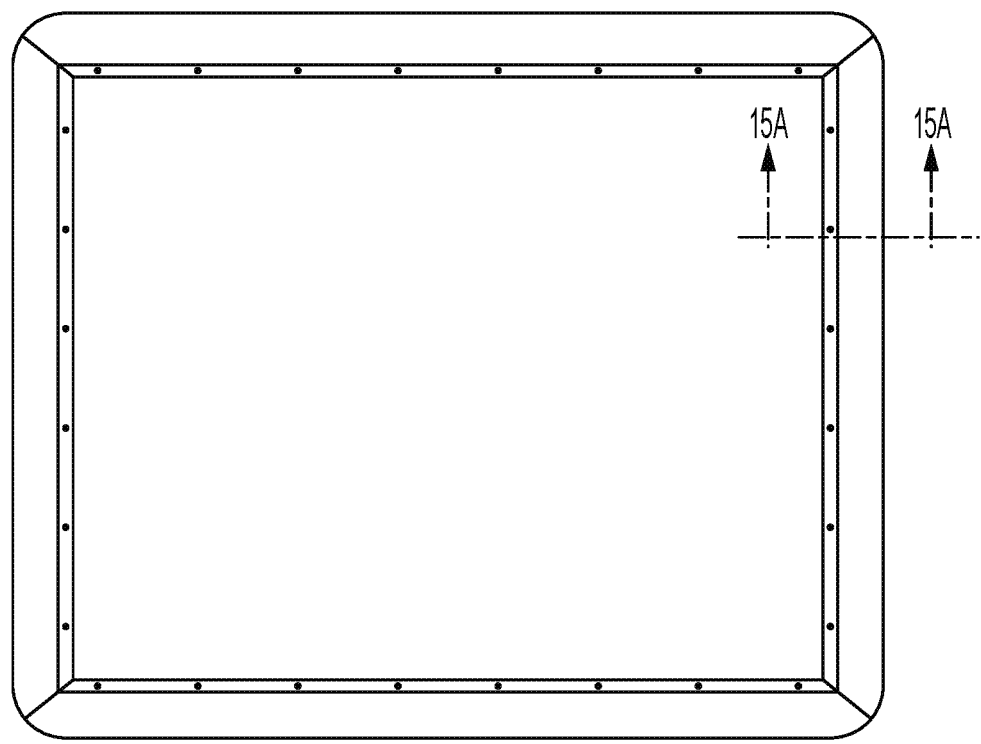

FIG. 15 is an example of a sample support rack cover used in the HFS and VFS Test Methods.

Figure 15A:
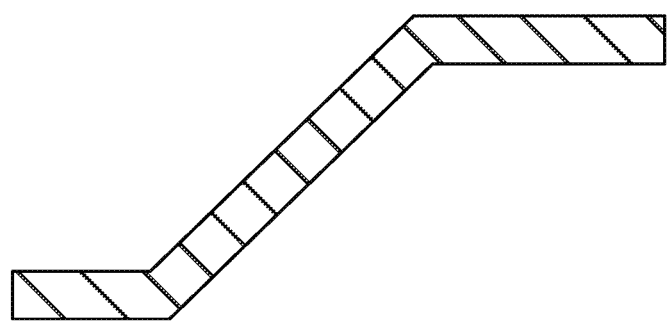

FIG. 15A is a cross-sectional view of the sample support rack cover of FIG. 15.

Figure 16A:
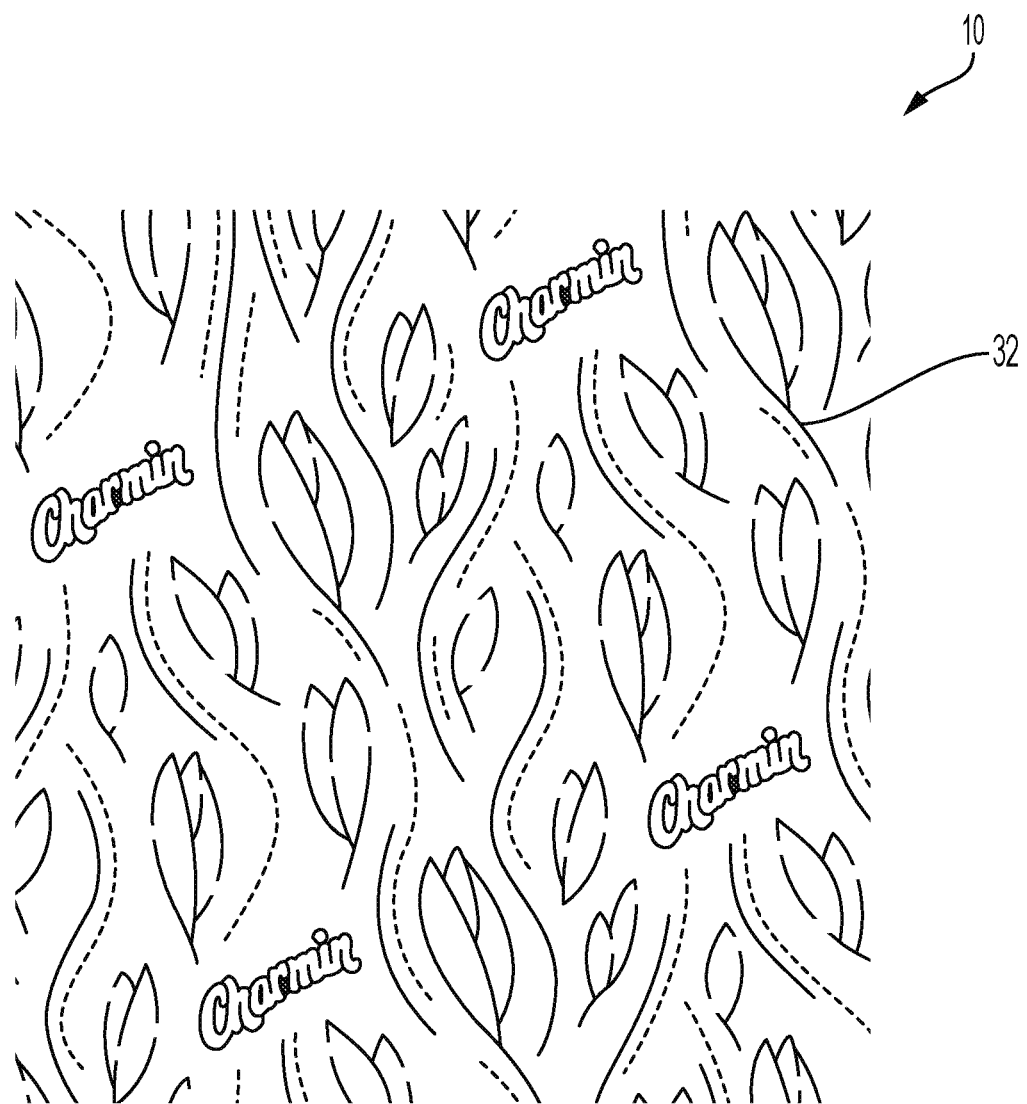

FIG. 16A is a portion of a fibrous structure of the present disclosure comprising an emboss pattern.

Figure 16B:
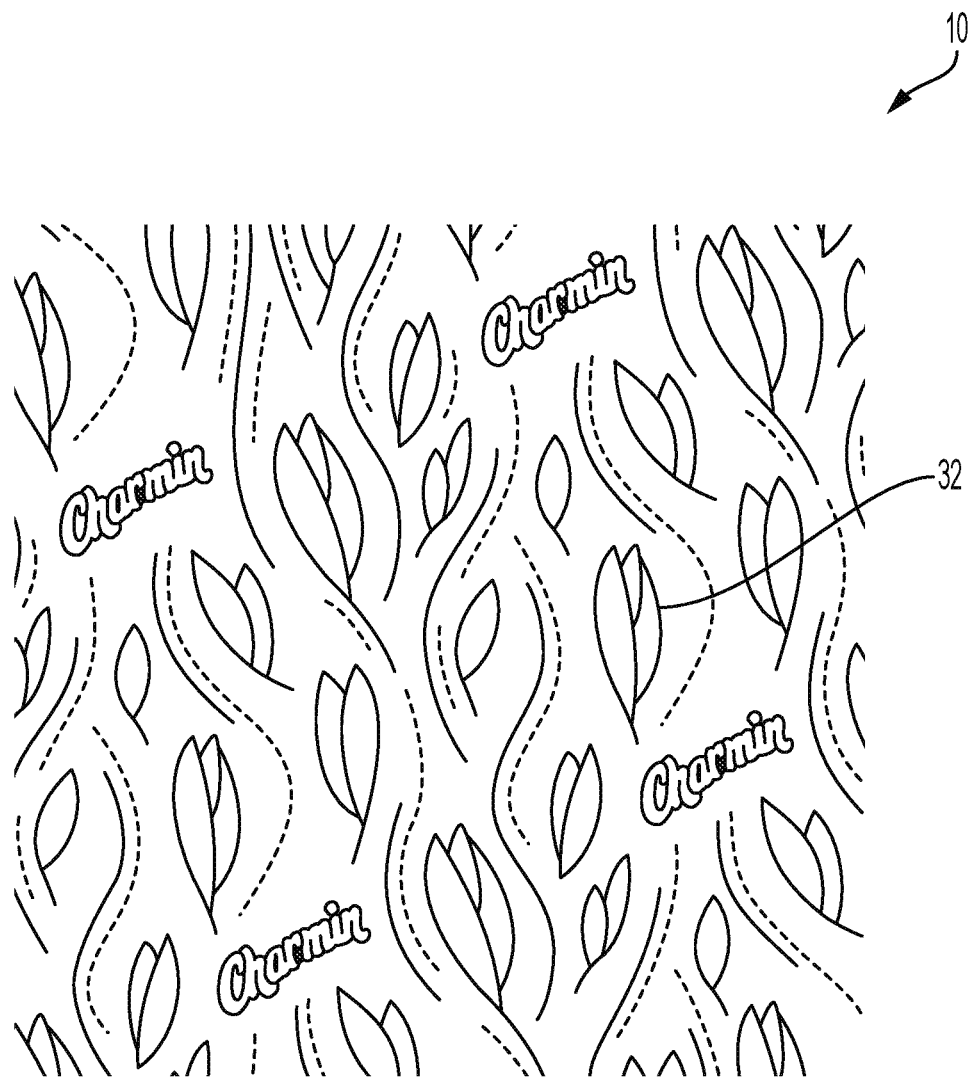

FIG. 16B is a portion of a fibrous structure of the present disclosure comprising an emboss pattern.

Figure 17:
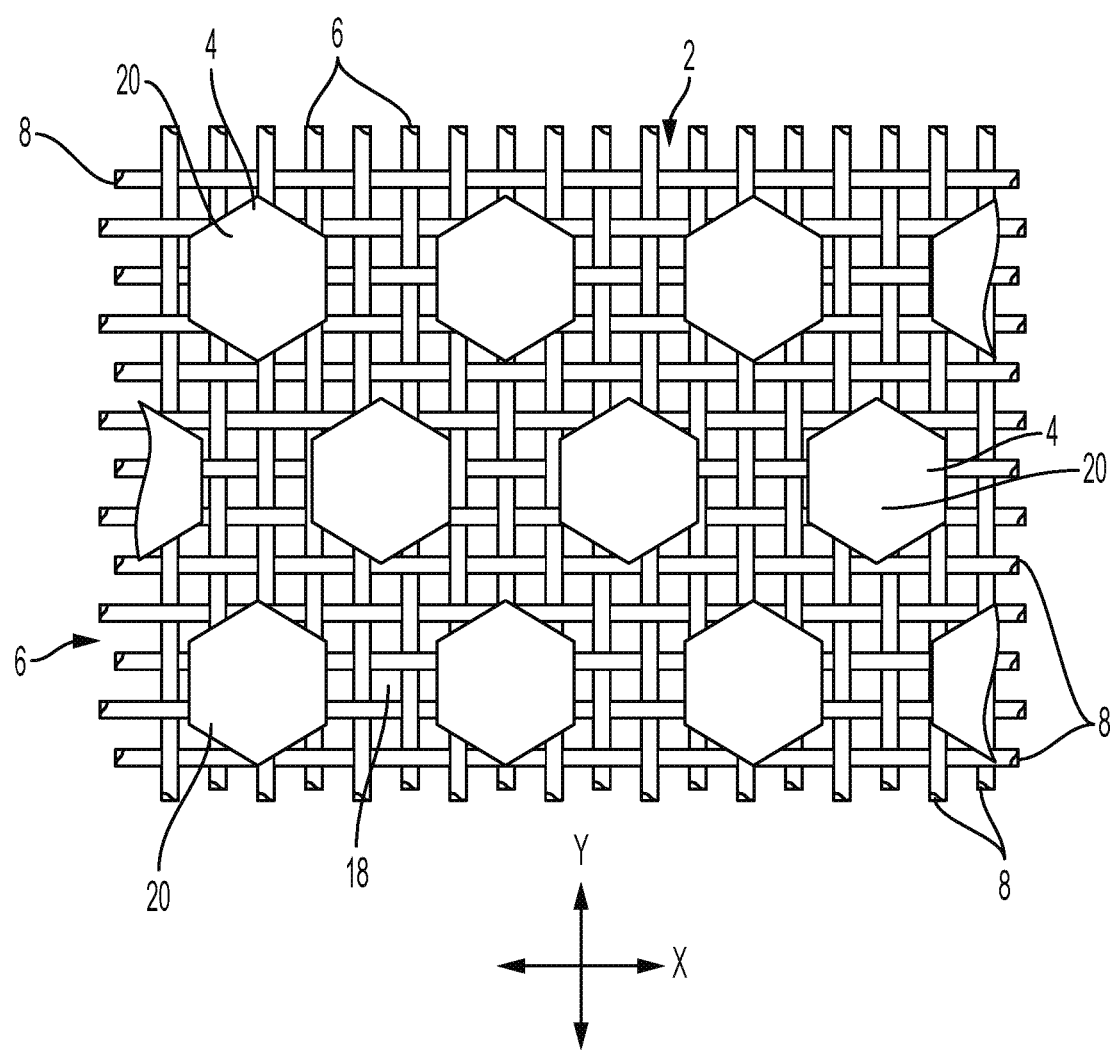

FIG. 17 is a representative papermaking belt of the kind useful to make fibrous structures comprising non-wood fibers of the present disclosure.

FIGS. 18A-1 and 18A-2 are two segments of a table that details multiple inventive sanitary tissue product embodiments, specifically detailing fiber type and percent incorporation into specific layers and plies of the sanitary tissue product.

FIGS. 18B-1 and 18B-2 are two segments of a table that details multiple inventive sanitary tissue product embodiments, specifically detailing fiber type and percent incorporation into specific layers and plies of the sanitary tissue product.

FIG. 19 is a table that details multiple inventive sanitary tissue product embodiments, specifically detailing fiber type and percent incorporation into specific layers and plies of the sanitary tissue product.

FIG. 20A is a table that details multiple inventive and comparative sanitary tissue product embodiments comprising non-wood fibers, specifically detailing multiple properties (note: common numbers between the tables indicate the same sample).

FIG. 20B is a table that details multiple inventive and comparative sanitary tissue product embodiments comprising non-wood fibers, specifically detailing multiple properties (note: common numbers between the tables indicate the same sample).

FIG. 21A is a table that details multiple inventive and comparative sanitary tissue product embodiments comprising non-wood fibers, specifically detailing multiple properties (note: common numbers between the tables indicate the same sample).

FIGS. 21B-1, 21B-2, and 21B-3 are three segments of a table that details multiple inventive and comparative sanitary tissue product embodiments comprising non-wood fibers, specifically detailing multiple properties (note: common numbers between the tables indicate the same sample).

FIGS. 21C-1, 21C-2, and 21C-3 are three segments of a table that details multiple inventive and comparative sanitary tissue product embodiments comprising non-wood fibers, specifically detailing multiple properties (note: common numbers between the tables indicate the same sample).

FIGS. 21D-1, 21D-2, and 21D-3 are three segments of a table that details multiple inventive and comparative sanitary tissue product embodiments comprising non-wood fibers, specifically detailing multiple properties (note: common numbers between the tables indicate the same sample).

FIGS. 21E-1, 21E-2, and 21E-3 are three segments of a table that details multiple inventive and comparative sanitary tissue product embodiments comprising non-wood fibers, specifically detailing multiple properties (note: common numbers between the tables indicate the same sample).

FIGS. 21F-1 and 21F-2 are two segments of a table that details multiple inventive and comparative sanitary tissue product embodiments comprising non-wood fibers, specifically detailing multiple properties (note: common numbers between the tables indicate the same sample).

FIGS. 21G-1 and 21G-2 are two segments of a table that details multiple inventive and comparative sanitary tissue product embodiments comprising non-wood fibers, specifically detailing multiple properties (note: common numbers between the tables indicate the same sample).

FIGS. 21H-1 and 21H-2 are two segments of a table that details multiple inventive and comparative sanitary tissue product embodiments comprising non-wood fibers, specifically detailing multiple properties (note: common numbers between the tables indicate the same sample).

FIG. 21I is a table that details multiple inventive and comparative sanitary tissue product embodiments comprising non-wood fibers, specifically detailing multiple properties (note: common numbers between the tables indicate the same sample).

FIG. 21J is a table that details multiple inventive and comparative sanitary tissue product embodiments comprising non-wood fibers, specifically detailing multiple properties (note: common numbers between the tables indicate the same sample).

FIG. 22A is a table that details multiple inventive and comparative sanitary tissue product embodiments comprising non-wood fibers, specifically detailing multiple properties (note: common numbers between the tables indicate the same sample).

FIG. 22B is a table that details multiple inventive and comparative sanitary tissue product embodiments comprising non-wood fibers, specifically detailing multiple properties (note: common numbers between the tables indicate the same sample).

FIG. 22C is a table that details multiple inventive and comparative sanitary tissue product embodiments comprising non-wood fibers, specifically detailing multiple properties (note: common numbers between the tables indicate the same sample).

FIG. 22D is a table that details multiple inventive and comparative sanitary tissue product embodiments comprising non-wood fibers, specifically detailing multiple properties (note: common numbers between the tables indicate the same sample).

FIG. 22E is a table that details multiple inventive and comparative sanitary tissue product embodiments comprising non-wood fibers, specifically detailing multiple properties (note: common numbers between the tables indicate the same sample).

FIG. 22F is a table that details multiple inventive and comparative sanitary tissue product embodiments comprising non-wood fibers, specifically detailing multiple properties (note: common numbers between the tables indicate the same sample).

FIG. 23 is a table that details fiber morphology of the fibers used in sanitary tissue products comprising non-wood fibers (note: common numbers between the tables indicate the same sample). In FIG. 23, fiber count (length average, million/g) is calculated from length weighted fiber average and coarseness via the following equation (where L(1) has the units of mm/fiber and coarseness has the units of mg/m): Fiber count=$1/(L(1) \times coarseness)$. And, fiber count (number average, million/g) is calculated from length weighted fiber average and coarseness via the following equation (where L(n) has the units of mm/fiber and coarseness has the units of mg/m): Fiber count=1/(L(n)×coarseness).

FIGS. 24A-1 and 24A-2 are two segments of a table that details PVD data of sanitary tissue products comprising non-wood fibers (common numbers between the tables indicate the same sample).

FIGS. 24B-1 and 24B-2 are two segments of a table that details PVD data of sanitary tissue products of the present disclosure comprising non-wood fibers (common numbers between the tables indicate the same sample).

FIGS. 24C-1 and 24C-2 are two segments of a table that details PVD data of sanitary tissue products of the present disclosure comprising non-wood fibers (common numbers between the tables indicate the same sample).

FIGS. 24D-1 and 24D-2 are two segments of a table that details PVD data of sanitary tissue products of the present disclosure comprising non-wood fibers (common numbers between the tables indicate the same sample).

FIGS. 24E-1 and 24E-2 are two segments of a table that details PVD data of sanitary tissue products of the present disclosure comprising non-wood fibers (common numbers between the tables indicate the same sample).

FIGS. 24F-1 and 24F-2 are two segments of a table that details PVD data of sanitary tissue products of the present disclosure comprising non-wood fibers (common numbers between the tables indicate the same sample).

FIGS. 24G-1 and 24G-2 are two segments of a table that details PVD data of sanitary tissue products of the present disclosure comprising non-wood fibers (common numbers between the tables indicate the same sample).

FIG. 25 is a table that details the fiber characteristic differences between non-wood fibers that are never-dried and that have been once-dried.

Beyond the figures of the present application and their descriptions disclosed above, the figures and their descriptions, including FIGS. 1A-2JJ, disclosed in U.S. Provisional Patent Application Ser. No. 63/456,020, titled "Fibrous Structures Comprising Non-wood Fibers," filed on Mar. 31, 2023, Young as the first-named inventor, are herein incorporated by reference.

DETAILED DESCRIPTION

Various non-limiting examples of the present disclosure will now be described to provide an overall understanding of the principles of the structure, function, manufacture, and use of the fibrous structures comprising non-woods disclosed herein. One or more non-limiting examples are illustrated in the accompanying drawings. Those of ordinary skill in the art will understand that the fibrous structures described herein and illustrated in the accompanying drawings are non-limiting examples. The features illustrated and/or described in connection with one non-limiting example can be combined with the features of other non-limiting examples. Such modifications and variations are intended to be included within the scope of the present disclosure.

Making Fibrous Structures of the Present Disclosure

"Machine Direction" or "MD" as used herein means the direction parallel to the flow of the fibrous structure through the papermaking machine and/or product manufacturing equipment.

"Cross Machine Direction" or "CD" as used herein means the direction perpendicular to the machine direction in the same plane of the fibrous structure.

Generally, fibrous structures of the present disclosure are typically made in "wet-laid" papermaking processes. In such papermaking processes, a fiber slurry, usually wood pulp fibers, is deposited onto a forming wire and/or one or more papermaking belts such that an embryonic fibrous structure is formed. After drying and/or bonding the fibers of the embryonic fibrous structure together, a fibrous structure is formed. Further processing of the fibrous structure can then be carried out after the papermaking process. For example, the fibrous structure can be wound on the reel and/or ply-bonded and/or embossed. As further discussed herein, visually distinct features may be imparted to the fibrous structures in different ways. In a first method, the fibrous structures can have visually distinct features added during the papermaking process. In a second method, the fibrous structures can have visually distinct features added during the converting process (i.e., after the papermaking process). Some fibrous structure examples disclosed herein may have visually distinct features added only during the papermaking process, and some fibrous structure examples may have visually distinct features added both during the papermaking process and the converting process.

Regarding the first method, a wet-laid papermaking process can be designed such that the fibrous structure has visually distinct features "wet-formed" during the papermaking process. Any of the various forming wires and papermaking belts utilized can be designed to leave physical, three-dimensional features within the fibrous structure. Such three-dimensional features are well known in the art, particularly in the art of "through air drying" (TAD) papermaking processes, with such features often being referred to in terms of "knuckles" and "pillows." "Knuckles" or "knuckle regions" or "knuckle zones" are typically relatively high-density regions that are wet-formed within the fibrous structure (extending from a pillow surface of the fibrous structure) and correspond to the knuckles of a papermaking belt, i.e., the filaments or resinous structures that are raised at a higher elevation than other portions of the belt. "Relatively high density" as used herein means a portion of a fibrous structure having a density that is higher than a relatively low-density portion of the fibrous structure. Relatively high density zones or regions can be about 30%, about 35%, about 40%, about 45%, about 50%, about 55%, about 60, or about 65% higher than relatively low density regions or zones. For instance, discrete knuckles, measured according to Micro-CT Intensive Property Measurement Method, may have a density greater than about ("greater than about" used interchangeably with "at least about" herein) 30%, about 35%, about 40%, about 45%, about 50%, about 55%, about 60, or about 65% higher than pillows. Whether one is substituting short or long wood fibers with non-wood fibers, there are not direct non-wood substitutions available for several reasons, such as morphology differences between wood and non-wood fibers. For instance, even when fiber length is matched by the non-wood replacing the wood fiber, said non-wood fiber likely has important differences such as fiber width, stiffness, etc. For some of these reasons, generally speaking, knuckles and pillows comprising non-wood fibers will be different (e.g., less dense) than knuckles and pillows consisting of non-wood fibers. These are some of the reasons that incorporation of non-wood fibers into established sanitary tissue products is not straightforward and creates unexpected outcomes. This is especially true as one tries to achieve parity (when using non-wood fibers) for multiple key parameters of sanitary tissue products.

Likewise, "pillows" or "pillow regions" or "pillow zones" are typically relatively low-density regions that are wet-formed within the fibrous structure and correspond to the relatively open regions between or around the knuckles of the papermaking belt. The pillow regions form a pillow surface of the fibrous structure from which the knuckle regions extend. "Relatively low density" as used herein means a portion of a fibrous structure having a density that is lower than a relatively high-density portion of the fibrous structure. Further, the knuckles and pillows wet-formed within a fibrous structure can exhibit a range of basis weights and/or densities relative to one another, as varying the size of the knuckles or pillows on a papermaking belt can alter such basis weights and/or densities. A fibrous structure (e.g., sanitary tissue products) made through a TAD papermaking process as detailed herein is known in the art as "TAD paper."

Thus, in the description herein, the terms "knuckles" or "knuckle regions" or "knuckle zones" or the like can be used to reference either the raised portions of a papermaking belt or the densified, raised portions wet-formed within the fibrous structure made on the papermaking belt (i.e., the raised portions that extend from a surface of the fibrous structure), and the meaning should be clear from the context of the description herein. Likewise "pillows" or "pillow regions" or "pillow zones" or the like can be used to reference either the portion of the papermaking belt between or around knuckles (also referred to in the art as "deflection conduits" or "pockets"), or the relatively uncompressed regions wet-formed between or around the knuckles within the fibrous structure made on the papermaking belt, and the meaning should be clear from the context of the description herein. Knuckles or pillows can each be either continuous or discrete, as described herein. As shown in FIGS. 5, such illustrated masks may be used in producing papermaking belts that would create fibrous structures that have discrete knuckles and continuous/substantially continuous pillows. Like masks may be used in producing papermaking belts that would create fibrous structures that have discrete pillows and continuous/substantially continuous knuckles. The term "discrete" as used herein with respect to knuckles and/or pillows means a portion of a papermaking belt or fibrous structure that is defined or surrounded by, or at least mostly defined or surrounded by, a continuous/substantially continuous knuckle or pillow. The term "continuous/substantially continuous" as used herein with respect to knuckles and/or pillows means a portion of a papermaking belt or fibrous structure network that fully, or at least mostly, defines or surrounds a discrete knuckle or pillow. Further, the substantially continuous member can be interrupted by macro patterns formed in the papermaking belt, as disclosed in U.S. Pat. No. 5,820,730 issued to Phan et al. on Oct. 13, 1998.

Knuckles and pillows in paper towels (also referred to as "towel") and bath tissue (also referred to as "toilet tissue," "bath," or "toilet paper") can be visible to the retail consumer of such products. The knuckles and pillows can be imparted to a fibrous structure from a papermaking belt at various stages of the papermaking process (i.e., at various consistencies and at various unit operations during the drying process) and the visual pattern generated by the pattern of knuckles and pillows can be designed for functional performance enhancement as well as to be visually appealing. Such patterns of knuckles and pillows can be made according to the methods and processes described in U.S. Pat. No. 6,610,173, issued to Lindsay et al. on Aug. 26, 2003, or U.S. Pat. No. 4,514,345 issued to Trokhan on Apr. 30, 1985, or U.S. Pat. No. 6,398,910 issued to Burazin et al. on Jun. 4, 2002, or US Pub. No. 2013/0199741; published in the name of Stage et al. on Aug. 8, 2013. The Lindsay, Trokhan, Burazin and Stage disclosures describe belts that are representative of papermaking belts made with cured resin on a woven reinforcing member, of which aspects of the present disclosure are an improvement. But in addition, the improvements detailed herein can be utilized as a fabric crepe belt as disclosed in U.S. Pat. No. 7,494,563, issued to Edwards et al. on Feb. 24, 2009 or U.S. Pat. No. 8,152,958, issued to Super et al. on Apr. 10, 2012, as well as belt crepe belts, as described in U.S. Pat. No. 8,293,072, issued to Super et al on Oct. 23, 2012. When utilized as a fabric crepe belt, a papermaking belt of the present disclosure can provide the relatively large, recessed pockets and sufficient knuckle dimensions to redistribute the fiber upon high impact creping in a creping nip between a backing roll and the fabric to form additional bulk in conventional wet-laid press processes. Likewise, when utilized as a belt in a belt crepe method, a papermaking belt of the present disclosure can provide the fiber enriched dome regions arranged in a repeating pattern corresponding to the pattern of the papermaking belt, as well as the interconnected plurality of surrounding areas to form additional bulk and local basis weight distribution in a conventional wet-laid process. In addition, the improvements detailed herein, can be utilized as an uncreped through air dried (UCTAD) belt. UCTAD (un-creped through air drying) is a variation of the TAD process in which the sheet is not creped, but rather dried up to 99% solids using thermal drying, removed from the structured fabric, and then optionally calendered and reeled. U.S. Pat. No. 6,808,599 describes an uncreped through air dried process. U.S. Pat. No. 10,610,063 describes an uncreped through air dried product made using a belt. In addition, the improvements herein can be utilized as an ATMOS belt. The ATMOS process has been developed by the Voith company and marketed under the name ATMOS. The process/method and paper machine system has several variations, but all involve the use of a structured fabric in conjunction with a belt press. This process is described in numerous patent publications including U.S. Pat. Nos. 7,510,631, 7,686,923, 7,931,781, 8,075,739, and 8,092,652. In addition, the improvements herein can be utilized as an NTT belt. The NTT process has been developed by the Metso company and marketed under the name NTT. The NTT process includes an extended press nip where the sheet is transferred from a press felt onto a texturing belt. Examples of texturing belts used in the NTT process can be viewed in International Publication Number WO 2009/067079 A1 and US Patent Application Publication No. 2010/0065234 A1. An example of a papermaking belt structure of the general type useful in the present disclosure and made according to the disclosure of U.S. Pat. No. 4,514,345 is shown in FIG. 17. As shown, the papermaking belt 17 can include cured resin elements 4 forming knuckles 20 on a woven reinforcing member 6. The reinforcing member 6 can be made of woven filaments 8 as is known in the art of papermaking belts, for example resin coated papermaking belts. The papermaking belt structure shown in FIG. 17 includes discrete knuckles 20 and a continuous deflection conduit, or pillow region (pillow zone). The discrete knuckles 20 can wet-form densified knuckles within the fibrous structure made thereon; and, likewise, the continuous deflection conduit, i.e., pillow region, can wet-form a continuous pillow region within the fibrous structure made thereon. The knuckles can be arranged in a pattern described with reference to an X-Y coordinate plane, and the distance between knuckles 20 in at least one of the X or Y directions can vary according to the examples disclosed herein. For clarity, a fibrous structure's visually distinct knuckle(s) and pillow(s)

that are wet-formed in a wet-laid papermaking process are different from, and independent of, any further structure added to the fibrous structure during later, optional, converting processes (e.g., one or more embossing process). For certain embodiments of the present disclosure, it may be desirable to use the belts disclosed in U.S. Pat. Nos. 9,435,081; 9,631,323; 9,752,281; 10,240,296; and U.S. Publication Nos. 2022-0010497; and 2021-0140114 as some of these belts create sinusoidal and/or serpentine pillow and/or knuckle regions or zones; in some embodiments, these pillow and/or knuckle zones or regions may be continuous and/or semi-continuous. These patterns referenced in the patents and publication of the previous sentence can be particularly useful for achieving the most desirable properties from webs comprising non-woods, even including high non-wood (e.g., bamboo) inclusion.

After completion of the papermaking process, a second way to provide visually distinct features to a fibrous structure is through embossing. Embossing is a well-known converting process in which at least one embossing roll having a plurality of discrete embossing elements extending radially outwardly from a surface thereof can be mated with a backing, or anvil, roll to form a nip in which the fibrous structure can pass such that the discrete embossing elements compress the fibrous structure to form relatively high density discrete elements ("embossed regions") in the fibrous structure while leaving an uncompressed, or substantially uncompressed, relatively low density continuous, or substantially continuous, network ("non-embossed regions") at least partially defining or surrounding the relatively high density discrete elements.

As illustrated in FIGS. 6B and 6C, beyond creating knuckles and pillows with resinous belts described above, and beyond the various types of creping, paper may be transformed in other ways, such that beneficial properties are created, especially as the speed of a belt or a wire transfers the web to a belt or a wire of a different speed, such as, for example, the upstream belt or wire moving faster than the downstream belt or wire. It may be desirable to have multiple such transfers in the same papermaking process. Further, it may be desirable to have different speed differentials at different transfers in such a process. As a more specific example, referring to FIG. 6B, in a first rush transfer 175, the speed of the forming fabric 154 can be travelling at a first rate, while the transfer fabric 174 travels at a second rate (slower than the first rate, but faster than 2,000 feet per minute (fpm), 2,050 fpm, 2,100 fpm, 2,150 fpm, 2.200 fpm, 2,250 fpm, 2,300 fpm, 2,350 fpm, 2,400 fpm, 2,450 fpm, 2,500 fpm, 2,600 fpm, 2,700 fpm, 2,800 fpm, 2,900 fpm, or greater than 3,000 fpm); further, a second rush transfer 175' may occur where the transfer fabric is travelling at the second rate, while the TAD fabric 164 travels at a third rate, which may be the faster or slower (e.g., about 10%, about 15%, about 20%, about 25%, about 30%, about 40, about 50% faster or slower) than the second rate. While the UCTAD process does not form traditional density differentials (e.g., such as knuckles and pillows), said rush transfers can, depending on the speed differentials of the transfers, create fiber orientations within the web such that performance of the fibrous structure is improved, such as, for example, stretch, tensile ratio, tensile, modulus, caliper, bulk.

Embossed features in paper towels and bath tissues can be visible to the retail consumer of such products. Emboss designs as disclosed in U.S. Design. Pat. App. Nos. 29/673,106; 29/673,105; and 29/673,107 may be used to make fibrous structures of the present disclosure. Emboss patterns can be made according to the methods and processes described in US Pub. No. US 2010-0028621 A1 in the name of Byrne et al. or US 2010-0297395 A1 in the name of Mellin, or U.S. Pat. No. 8,753,737 issued to McNeil et al. on Jun. 17, 2014. For clarity, such embossed features originate during the converting process, and are different from, and independent of, the pillow and knuckle features that are wet-formed on a papermaking belt during a wet-laid papermaking process.

More particular papermaking processes are disclosed below and illustrated in FIGS. 6A and 6B, versus the more general description above. FIGS. 6A and 6B are simplified, schematic representations of continuous fibrous structure making processes and machines useful in the practice of the present disclosure. The following description of the process and machine include non-limiting examples of process parameters useful for making a fibrous structure of the present invention.

As shown in FIG. 6A, process and equipment 150 for making fibrous structures according to the present disclosure comprises supplying an aqueous dispersion of fibers (a fibrous furnish) to a headbox 152 which can be of any design known to those of skill in the art. The aqueous dispersion of fibers can include wood and non-wood fibers, northern softwood kraft fibers ("NSK"), eucalyptus fibers, southern softwood kraft (SSK) fibers, Northern Hardwood Kraft (NHK) fibers, acacia, bamboo, straw and bast fibers (wheat, flax, rice, barley, etc.), corn stalks, bagasse, abaca, kenaf, reed, synthetic fibers (PP, PET, PE, bico version of such fibers), regenerated cellulose fibers (viscose, lyocell, etc.), and other fibers known in the papermaking art, including short fibers having an average length less than 1.0 mm (Average Short Fiber Length-ASFL) and including long fibers having an average length greater than 1.0 mm, from about 1.2 mm to about 3.5 mm, or from about 3 mm to about 10 mm (Average Long Fiber Length-ALFL). Depending on the non-wood fibers being used, they may be in the long fiber range of length. For instance, bamboo can have a length from 1.1 to 2.0 mm and sunn hemp is even longer, it can have a length from 2.8 to 3.0 mm and sisal hemp can have a length from 2.5 to 2.7 mm Kenaf can have a length from 2.7 to 3.0 mm, abaca can have a length from 4.0 to 4.3 mm. This becomes significant when short fibers like eucalyptus are replaced with longer non-wood fibers.

From the headbox 152, the aqueous dispersion of fibers can be delivered to a foraminous member 154, which can be a Fourdrinier wire, to produce an embryonic fibrous web 156. Furnish mixes may be useful in the present disclosure may be from about 20% to about 50% short fibers and from about 40% to about 100% long fibers, specifically including all 1% increments between the recited ranges.

The foraminous member 154 can be supported by a breast roll 158 and a plurality of return rolls 160 of which only two are illustrated. The foraminous member 154 can be propelled in the direction indicated by directional arrow 162 by a drive means, not illustrated, at a predetermined velocity, $V_1$. Optional auxiliary units and/or devices commonly associated with fibrous structure making machines and with the foraminous member 154, but not illustrated, comprise forming boards, hydrofoils, vacuum boxes, tension rolls, support rolls, wire cleaning showers, and other various components known to those of skill in the art.

After the aqueous dispersion of fibers is deposited onto the foraminous member 154, the embryonic fibrous web 156 is formed, typically by the removal of a portion of the aqueous dispersing medium by techniques known to those skilled in the art. Vacuum boxes, forming boards, hydrofoils, and other various equipment known to those of skill in the art are useful in effectuating water removal. The embryonic fibrous web 156 can travel with the foraminous member 154 about return roll 160 and can be brought into contact with a papermaking belt 164 in a transfer zone 136, after which the embryonic fibrous web travels on the papermaking belt 164. While in contact with the papermaking belt 164, the embryonic fibrous web 156 can be deflected, rearranged, and/or further dewatered. Depending on the process, mechanical and fluid pressure differential, alone or in combination, can be utilized to deflect a portion of fibers into the deflection conduits of the papermaking belt. For example, in a through-air drying process a vacuum apparatus 176 can apply a fluid pressure differential to the embryonic web 156 disposed on the papermaking belt 164, thereby deflecting fibers into the deflection conduits of the deflection member. The process of deflection may be continued with additional vacuum pressure 186, if necessary, to even further deflect and dewater the fibers of the web 184 into the deflection conduits of the papermaking belt 164.

The papermaking belt 164 can be in the form of an endless belt. In this simplified representation, the papermaking belt 164 passes around and about papermaking belt return rolls 166 and impression nip roll 168 and can travel in the direction indicated by directional arrow 170, at a papermaking belt velocity $V_2$, which can be less than, equal to, or greater than, the foraminous member velocity $V_1$. In the present disclosure, the papermaking belt velocity $V_2$ is less than foraminous member velocity $V_1$ such that the partially-dried fibrous web is foreshortened in the transfer zone 136 by a percentage determined by the relative velocity differential between the foraminous member and the papermaking belt. Associated with the papermaking belt 164, but not illustrated, can be various support rolls, other return rolls, cleaning means, drive means, and other various equipment known to those of skill in the art that may be commonly used in fibrous structure making machines.

The papermaking belts 164 of the present disclosure can be made, or partially made, according to the process described in U.S. Pat. No. 4,637,859, issued Jan. 20, 1987, to Trokhan, and having the patterns of cells as disclosed herein.

The fibrous web 192 can then be creped with a creping blade 194 to remove the web 192 from the surface of the Yankee dryer 190 resulting in the production of a creped fibrous structure 196 in accordance with the present disclosure. As used herein, creping refers to the reduction in length of a dry (having a consistency of at least about 90% and/or at least about 95%) fibrous web which occurs when energy is applied to the dry fibrous web in such a way that the length of the fibrous web is reduced and the fibers in the fibrous web are rearranged with an accompanying disruption of fiber-fiber bonds. Creping can be accomplished in any of several ways as is well known in the art, as the doctor blades can be set at various angles. The creped fibrous structure 196 is wound on a reel, commonly referred to as a parent roll, and can be subjected to post processing steps such as calendaring, tuft generating operations, embossing, and/or converting. The reel winds the creped fibrous structure at a reel surface velocity, $V_4$.

The papermaking belts of the present disclosure can be utilized to form discrete elements and a continuous/substantially continuous network (i.e., knuckles and pillows) into a fibrous structure during a through-air-drying operation. The discrete elements can be knuckles and can be relatively high density relative to the continuous/substantially continuous network, which can be a continuous/substantially pillow having a relatively lower density. In other examples, the discrete elements can be pillows and can be relatively low density relative to the continuous/substantially continuous network, which can be a continuous/substantially continuous knuckle having a relatively higher density. In the example detailed above, the fibrous structure is a homogenous fibrous structure, but such papermaking process may also be adapted to manufacture layered fibrous structures, as is known in the art. As discussed above, the fibrous structure can be embossed during a converting operating to produce the embossed fibrous structures of the present disclosure.

Formation

An area of particular interest is formation of the fibrous structure. This is an area where, as evidenced in the detailed description, so many sustainable sanitary tissue products fail and the art does not disclose how to achieve well-formed fibrous structures comprising bamboo and/or other sustainable non-wood fibers. Formation of non-wood fibers can be challenging due to their morphology, which differs from wood fibers. For instance, bamboo fibers, which may be considered flexible (relative to their length/width ratio versus certain wood fibers and versus their length/width ratio versus certain non-wood fibers such as straw fibers (e.g., wheat straw)) often flocculate in the headbox, which can result in a heterogeneously formed sheet. The inventors of the present disclosure have found ways of overcoming these challenges so that adding bamboo fibers into the fibrous structure, even at high(er) inclusion levels, can result in products having good formation as evidenced by inventive formation index values, as well as by tensile ratio values disclosed herein. It should also be appreciated that the better a sheet's formation, the better its coverage. Such is important, of course, because formation and coverage directly impact hand protection for sanitary tissue products. Details are in the specification below.

As described above, in part, fibers are delivered to and diluted in the headbox. All other things being constant, increasing the dilution of the headbox (decreasing headbox consistency) results in improved formation. Without being bound by theory, one reason for this could be that as the headbox consistency decreases, the fibrous particles in the headbox have less interactions with each other as they flow through the headbox. Because fibers (wood and non-wood) are generally ribbon-like in cross section, if that fiber is allowed to rotate in all three axes then it creates a sphere. This sphere of fibers can be referred to as the swept volume of the fiber. As the headbox consistency increases, assuming perfectly homogenous distribution of fibers in the solution, the spheres of swept volume begin to come closer together, eventually overlapping. As the spheres overlap more and more, the fibers have a higher probability of interacting with each other, creating flocculation, which results in a more heterogeneously formed sheet. This is also referred to as poor formation.

The jet-to-wire ("jet/wire") ratio is known in the art as a velocity ratio between the speed of the jet exiting the headbox and the speed of the wire(s) upon which the jet impinges. The main ways to adjust the jet/wire ratio are (1) to increase the flow rate through the headbox in a fixed headbox geometry, while keeping wire speed constant, (2) to increase the wire speed while keeping the headbox flow and geometry constant, (3) to decrease the flow rate through the headbox in a fixed headbox geometry, while keeping the wire speed constant, or (4) to decrease the wire speed while keeping the headbox flow and geometry constant. Method (1) observes the incompressible fluid dynamic concept of continuity, which says that if the volumetric flow through a fixed area increases, the velocity must increase—the opposite is true for Method (3). For Methods (2) and (4), again via continuity, results in the jet velocity being constant while the wire velocity increases or decreases, respectively. This jet/wire ratio also affects the tensile ratio of the subsequently formed sheet. This mechanism is via fiber orientation on the wire as the fibers are deposited. It is generally known that the higher the speed difference is between the jet/wire (either a jet much faster or a jet much slower), the higher the tensile ratio will be, and that there will be a minimum tensile ratio between the extremes. For this reason, it may be desirable that fibrous structures of the present disclosure have certain tensile ratios, described in more detail below. Fiber orientation can also impact the formation of the sheet through increased heterogeneity of the substrate.

Finally, one of the major costs of papermaking is energy. Pumps, especially fan pumps, consume large amounts of power via the work of increasing the pressure of a volumetric flow (known as PV work). Lowering the flow through the headbox (thereby increasing the consistency and decreasing the jet/wire at constant throughput and headbox geometry) will lower the production costs for the papermaker. Additionally, all other things being equal, less headbox dilution would result in less drying energy and overall water consumption, which are significant cost elements in an increasingly resource constrained world.

Therefore, the papermaker strives to balance these competing priorities. Upon recent experimentation, it has surprisingly been found that the relationships between jet/wire, tensile ratio, and formation are different for non-wood fibers than they are for wood fibers. More specifically, the tensile ratios disclosed below may be achieved by, at least in part, by a jet flow that is slower than a forming wire speed.

As discussed previously in this section, creating premium levels of quality (softness, absorption, strength, bulk characteristics, etc.) toilet tissue by using high coarseness bamboo in the furnish mix is a challenge. It is generally known that substrates with a very even fiber distribution (good formation) are consumer preferred. One reason is that the even distribution of fibers is pleasing to the eye. Another reason is that the even distribution of fibers means that, at a given basis weight, there is a higher minimum fiber coverage area of the sheet, as there are less heavy and light spots of the sheet, contributing to better hand protection. Better formation also equates to better absorbency characteristics through better pore connectivity and pore volume distributions. In most conventional wet press processes, having an even formation lends to better tensile efficiency, allowing for a stronger sheet at a given basis weight. In through-air-drying, sheets are produced that have higher bulk properties. Through conservation of volume, at a given basis weight, a through-air-dried sheet with higher bulk would tend to have a lower formation index than a conventional wet press sheet at similar basis weights and fiber compositions.

Another way to improve formation index is to choose fibers that allow for high coverage (i.e., fibers with low coarseness and wide fiber widths). Bamboo, for instance, is known in the art as a fiber with potential for tissue making use. However, the morphology of the bamboo fiber (high levels of fines, broad fiber length distribution, high coarseness, high fibrillation, etc.) make for a fiber that drains poorly, making it particularly unsuited for through-air-drying machines due to high energy costs associated with the drying of the nascent fiber web. The high coarseness of bamboo, as well as its wide fiber width, make for poorer fiber coverage than sheets that are comprised mainly of eucalyptus. This also leads to a lower formation index than eucalyptus or other high fiber coverage sheets. Thus, toilet tissue sheets that are comprised mostly of eucalyptus fibers, which are short, narrow, and exhibit low coarseness have improved fiber coverage in the sheet and a higher formation index. As the papermaker uses higher levels of bamboo inclusion, one is necessarily replacing the eucalyptus fibers with longer, wider, and coarser bamboo fibers. The fiber coverage in the substrate decreases, and the formation index decreases as well. This is not only true for bamboo, but many of the other non-woods. Surprisingly, the inventors of the present disclosure have discovered that decreasing the tensile ratio of structured fibrous structures comprising non-woods improves the formation index of said fibrous structures. This is the exact opposite of non-structured fibrous structures, in which increasing the tensile ratio improves the formation index. Without being bound by theory, it is thought that the interplay of fiber distribution on the wire, deformation of the sheet into a patterned fabric, and subsequent differential drying and creping of the resultant sheet, at least in part, results in this counterintuitive relationship.

A majority of webs comprising bamboo are made on conventional wet press machines. These machines generate webs of low caliper, and when converted into finished product rolls result in either low bulk and hard rolls or high bulk and extremely soft rolls. A few instances of products can be found comprising bamboo that are made on through-air-dried machines. These examples exhibit a lower formation index and also exhibit other non-consumer preferred characteristics, like low volumetric PVD absorption in the 2.5-160 um range. It is therefore surprising that a low formation index substrate can be made with a coarse non-wood fiber, such as bamboo, and still be able to meet standards for premium quality tissue.

The inventors of the present disclosure have surprisingly shown that substrates comprising non-woods (e.g., bamboo, abaca, etc.) can be created that still maintain strong consumer appeal despite their lower formation indices. As described in greater detail herein, non-wood fibers may be run in a continuous papermaking process at high percentage inclusions of non-wood to form webs. These webs may then be pressed on a structured fabric, creating zones of differential density, which may, in part, contribute to the preferred characteristics of the resulting "structured" fibrous structures. Structured fibrous structures may be achieved using various papermaking processes such as, for example, TAD, fabric crepe, NTT, QRT, creped TAD and UCTAD.

Additionally, preferred characteristics may be achieved, at least in part, through jet/wire velocity adjustments, varying levels of foreshortening at the wire/belt interface wire/belt interface and at creping, through creping geometry changes, and the judicious placement of high and low density zones in the substrate.

Fractionation

It is generally known that substrates comprised of virgin wood pulps are consumer preferred. The substrate developer undergoes a very deliberate process when choosing the fibers that they want to include in their substrate. Generally, for soft and strong tissue products, a blend of low coarseness, low length eucalyptus fibers are included for softness, while low coarseness softwood fibers, for example, NSK fibers, are included for strength, but still permitting good flexibility. In order to maintain the correct ratios of strength, softness, and flexibility, the substrate developer will vary chemistry inclusion, fiber composition by layers, and refining of the wood pulp. Choices in any of these variables (and more) will affect the resultant substrate characteristics, making the substrate more or less consumer desirable.

It is also generally known that non-wood fibers often have different characteristics than wood fibers. Fiber morphology characteristics such as length, cell wall thickness, width, Runkle Ratio, kink, curl, fibrillation, and other characteristics can vary significantly from non-wood to non-wood, as well as compared to wood pulps. It is, therefore, a current problem to develop sanitary tissue products having premium characteristics when utilizing non-wood fibers that have non-premium morphologies.

In order to address this problem, non-wood fibers may be passed through a hydrocyclone and separated in to two different streams and described as "accepts" and "rejects." Despite this nomenclature, both outgoing streams can still be used by the substrate developer via different layering schemes. When passing non-woods through a fractionation unit, one important way that the unit separates the fibers is by degree of fibrillation. Since many non-woods are more fibrillated than wood fibers, choosing to place the less fibrillated non-wood stream close to the consumer may result in a more premium, wood fiber-like experience. Furthermore, it has been observed that less the fibrillated non-wood fraction ends up located in the reject stream, which is usually reserved for longer, denser, and more coarse fibers. Traditional thinking would be to place this reject stream away from the consumer-facing layer, but the inventors of the present disclosure have surprising found that the better option is to place the reject stream to the consumer-facing layer. Without being bound by theory, it is believed that the hydrodynamic differences of fiber fibrillation overcome the hydrodynamic differences of fiber density and length. With fiber fibrillation being dominant, the more fibrillated fibers will follow the majority of the fluid and be carried to the accept portion of the cyclone. The coarser, longer, and less fibrillated fibers will concentrate on the peripheral wall of the cyclone and preferentially go towards the reject stream at the bottom of the cyclone. Yet, these "reject" fibers have better mobility, lower bonding, and are more wood-like due to their lower degree of fibrillation. Using non-wood rejects in the consumer-facing layer can, thus, result in a sanitary tissue product that has premium characteristics (e.g. softness).

Once-Dried Non-Wood Fibers

The challenges associated with non-wood fiber morphology are further complicated by using once-dried (versus never-dried, which comprise greater than about 45% water content) fibers in the paper-making process. Although never-dried and once-dried fibers are chemically similar, they differ greatly in their physical properties. Never-dried fiber walls contain much more water per unit dry mass than those of dried fibers after reslushing. Being more swollen, the never-dried walls are more flexible or conformable. In contrast, the walls of once-dried (and rewetted or reslushed or repulped) fibers are stiff (compared to never-dried fibers). Significant changes in the papermaking properties of fibers occur with water removal as the walls become progressively more rigid and less conformable. FIG. 25 shows the fiber characteristic differences between non-wood fibers that are never-dried and that have been once-dried; see also, for example: A. M. Scallan and G. V. Laivins, The mechanism of hornification of wood pulps in Products of Papermaking, Trans. of the Xth Fund. Res. Symp. Oxford, 1993, (C. F. Baker, ed.), pp 1235-1260, FRC, Manchester, 2018. DOI: 10.15376/frc.1993.2.1235, at page 1242 (Effect of Temperature) states: "Drying-and-reslushing at 25 C dropped the breaking length from 7.3 km for the virgin sheet down to 2.7 km. Raising the drying temperature to 105° and to 150° C. further lowered the breaking length to 1.6 and 0.6 km. From this study it is apparent that the major reduction in sheet strength is due to water removal and that heat causes an additional reduction which is much smaller in magnitude." The same article further states: "Only a few investigations have been carried out, designed to separate the effects of temperature and water removal during drying. Lyne and Gallay avoided this problem by heating without drying; in their experiments wet handsheets were heated to 95° C. for three minutes in an atmosphere saturated with water vapour before air drying (19). The tensile strength of the sheet was lowered by 14% when compared to that of an unheated control. The result shows that the heat treatment led to a reduction in the extent of interfibre bonding which they attributed to a loss of swelling of the pulp upon heating." FIG. 25 also illustrates that never-dried fibers bond to each other better than once-dried fibers. To overcome the effects of temperature and water removal, strength in the web (e.g., sanitary tissue product) may be achieved by temporary and/or permanent wet strength, dry strength additives, furnish blend ratios (e.g., softwood-to-hardwood ratios), process manipulations (refining, formation, calendaring, creping, etc.), etc.

While it may be desirable to use never-dried fibers (see, for example, the following publications assigned to Essity Hygiene and Health Aktiebolag: WO2023282811A1, WO2023282812A1, WO2023282813A1, WO2023282818A1), such requires the pulping facility to be close to the paper-making facility as wet fibers are too expensive to ship. Because this proximity is often impractical, the inventors of the present application used non-wood fibers that were at least once-dried and overcame not only the challenges associated with non-wood fibers, but also overcame the challenges of the non-wood fibers having been at least once-dried at the pulping facility and then shipped as dried sheets before incorporating the fibers into the paper-making process. That is, the non-wood fibers disclosed herein were reslushed from dried sheets before they were sent to a headbox in the paper-making process. Further, on a single fiber basis, the fiber length of once-dried non-wood fibers in the finished product (e.g., sanitary tissue product) will normally be shorter than never-dried non-wood fibers due to the extra processing necessary to rewet once-dried non-wood fibers. These shorter fibers have a materially different characteristics, which, among other things, will impact the strength of the final product.

When using once-dried non-wood pulp, the unit of pulp is typically in a bale, a sheet, or a block, which comprises less than about 45%, 40%, 35%, 25%, 15%, 10%, 5%, or 2% of water (water content). Water content (% moisture) of pulp is measured using an Ohaus MB45 moisture balance, or an equivalent instrument, set to a drying temperature of 130° C., with moisture determined after the weight changes less than 1 mg in 60 seconds (A60 hold time). The unit of once-fired non-wood pulp may then be placed into a repulping unit to be repulped (also called reslushed or rewetted). The repulped non-wood fibers may then be further refined or may be sent directly to a headbox. As referenced above, the reslushed non-wood fibers will likely be stiffer (versus like fibers that were never-dried) due to hornification.

Another benefit of using once-dried fibers instead of never-dried fibers is that once-dried fibers bond less during the paper-making process and are thus less connected, which results in a softer sanitary tissue product, which allows the sanitary tissue product to be more cloth-like and more desirable. For instance, once-dried fibers of the present disclosure may have a breaking length of less than about 2700 m, less than about 2000 m, less than about 1700 m, less than about 1600 m, less than about 1400 m, less than about 1250 m, less than about 1100 m, less than about 900 m, less than about 750 m, or less than about 450 m, while never-dried fibers tend to have higher breaking lengths, such as greater than about 2700 m, greater than about 2800 m, greater than about 3000 m, greater than about 3200 m, or greater than about 3500 m, specifically reciting all 1 m increments within the above-recited ranges of this paragraph and all ranges formed therein or thereby.

Further, once-dried fibers of the present disclosure may have a breaking length ratio (which is the breaking length (m) according to the Breaking Length Test Method divided by the length weighted fiber length (microns) according to the Fiber Length, Width, Coarseness, and Fiber Count Test Method) of less than about 3.25 m/micron, less than about 2.7 m/micron, less than about 2.5 m/micron, less than about 2.0 m/micron, less than about 1.8 m/micron, less than about 1.6 m/micron, less than about 1.5 m/micron, less than about 1.0 m/micron, less than about 0.6 m/micron, or less than about 0.5 m/micron, while never-dried fibers tend to have higher breaking length ratios, such as greater than about 3.0 m/micron, greater than about 3.5 m/micron, greater than about 4.0 m/micron, greater than about 5.0 m/micron, or greater than about 6.0 m/micron, specifically reciting all 0.1 m/micron increments within the above-recited ranges of this paragraph and all ranges formed therein or thereby.

In light of the paragraphs of this Section (Once-dried Non-wood Fibers), a desirable process for making sanitary tissue products of the present disclosure may comprise: re-slushing pulp comprising non-wood fibers prior to sending the pulp to a headbox; forming a web comprising the non-wood fibers; creating zones of differential densities in the web; and creping the web. The once-dried non-wood pulp may be introduced into a repulping unit prior to the step of re-slushing the pulp. The once-dried non-wood pulp comprises non-wood fibers having a water content of less than about 10%, 20%, or 40%. The once-dried non-wood pulp may be in the form of a bale, a sheet, or a block. The non-wood fibers may be selected from the group consisting of bamboo, abaca, and mixtures thereof. The web may be treated with permanent or temporary wet strength. This process of making sanitary tissue products of the present disclosure may further include harvesting non-wood fibers and pulping the non-wood fibers and drying the non-wood fibers. The non-wood fibers may be dried (using, for example a pulp drier (e.g., from Andritz, Valmet, etc.)) at a facility other than a destination paper-making facility (i.e., where the pulp will be used to make the sanitary tissue products, including paper towels, toilet tissue, and/or facial tissue. The dried non-wood fibers may then be shipped to a destination paper-making facility. The shipping distance may be greater than: about 25, about 50, about 75, about 100, about 200, about 500, about 1,000 miles to reach the destination paper-making facility. In some instances, the dried non-wood fibers may be shipped as far as from Asia (e.g., China) to North America (e.g., US).

Structures of the Present Disclosure

"Fiber" as used herein means an elongate physical structure having an apparent length greatly exceeding its apparent diameter, i.e., a length to diameter ratio of at least about 10. Fibers having a non-circular cross-section and/or tubular shape are common; the "diameter" in this case may be considered to be the diameter of a circle having cross-sectional area equal to the cross-sectional area of the fiber. More specifically, as used herein, "fiber" refers to fibrous structure-making fibers. The present disclosure contemplates the use of a variety of fibrous structure-making fibers, such as, for example, naturally-occurring fibers (wood and non-wood), synthetic (human-made) fibers, and/or any other suitable fibers, and any combination thereof.

"Fibrous structure" as used herein means a structure that comprises a plurality of fibers. In one example, a fibrous structure according to the present disclosure means an orderly arrangement of fibers within a structure in order to perform a function. A bag of loose fibers is not a fibrous structure in accordance with the present disclosure. The terms "web," "fibrous web," "embryonic web," and "embryonic fibrous web" are used to describe the web that is in the process of becoming the fibrous structure. Further, fibrous structures may be rolled, interleaved, perforated, and/or packaged to form final product(s), such as a sanitary tissue product.

"Non-woven fibrous structure" as used herein means a fibrous structure wherein fibers forming the fibrous structure are not orderly arranged by weaving and/or knitting the fibers together. In other words, non-woven fibrous structures do not include textiles, garments, and/or apparel. The non-woven fibrous structures of the present disclosure are disposable (i.e., typically thrown away after one or two uses—unlike clothes, rags, cloths, etc.).

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself. A ply may comprise multiple layers. Multiple plies may, for example be formed as follows: fibrous structure of the present disclosure may be combined with one or more additional fibrous structures, which is the same or different from the fibrous structures of the present disclosure to form a multi-ply sanitary tissue product; said additional fibrous structure may be combined with the fibrous structure of the present disclosure by any suitable means.

"Sanitary tissue product" as used herein means a soft, low density (i.e., <about 0.25 g/cm$^3$) fibrous structure useful as a wiping implement for post-urinary and post-bowel movement cleaning (toilet tissue), for otorhinolaryngological discharges (facial tissue), and multi-functional absorbent and cleaning uses (absorbent towels and napkins). The sanitary tissue product may be convolutedly wound upon itself about a core or without a core to form a roll of sanitary tissue product. Further, the fibrous structure making up the sanitary tissue product may be perforated to form interconnected sheets. Sanitary tissue products may consist of fibers having an average length of less than about 1 inch; further sanitary tissue products may not comprise any fibers (or filaments) having a length greater than 1 inch. Sanitary tissue products may be formed according to a wet-laid process as illustrated in FIGS. 6A-C.

"Clothlike" as used herein relates to the feel of the non-woven fibrous structure to a consumer, the appearance of the non-woven fibrous structure to a consumer, and/or the performance (e.g., absorbency, strength, durability, etc.) of the non-woven fibrous structure during use by a consumer.

"Lint" as used herein means any material that originated from a fibrous structure according to the present disclosure that remains on a surface after which the fibrous structure and/or sanitary tissue product has come into contact. The lint value of a fibrous structure and/or sanitary tissue product comprising such fibrous structure is determined according to the Lint Test Method described herein.

"Differential density," as used herein, means a fibrous structure and/or sanitary tissue product that comprises one or more regions of relatively low fiber density, which are referred to as pillow regions, and one or more regions of relatively high fiber density, which are referred to as knuckle regions. In one example, a fibrous structure of the present disclosure comprises a surface comprising a surface pattern comprising a continuous knuckle region and a plurality of discrete pillow regions that exhibit different densities, for example, one or more of the discrete pillow regions may exhibit a density that is different (e.g., 30% different) than the density of the continuous knuckle region.

"Densified," as used herein means a portion of a fibrous structure and/or sanitary tissue product that is characterized by regions of relatively high fiber density (knuckle regions).

"Non-densified," as used herein, means a portion of a fibrous structure and/or sanitary tissue product that exhibits a lesser density (one or more regions of relatively lower fiber density) (pillow regions) than another portion (for example a knuckle region) of the fibrous structure and/or sanitary tissue product.

"Dry fibrous structure" as used herein means that the fibrous structure exhibits a water content (% moisture) of less than 20% and/or less than 15% and/or less than 10% and/or less than 7% and/or less than 5% and/or less than 3% and/or less than 1% to 0% and or to greater than 0%. Water content (% moisture) of a fibrous structure is measured using an Ohaus MB45 moisture balance, or an equivalent instrument, set to a drying temperature of 130° C., with moisture determined after the weight changes less than 1 mg in 60 seconds (A60 hold time). Dry fibrous structures of the present disclosure may exhibit a water content (% moisture) of from about 0.0001% to about 20% and/or from about 0.001% to about 15% and/or from about 0.001% to about 12% and/or from about 0.001% to about 10% and/or from about 0.001% to about 7% and/or from about 0.001% to about 5%, by weight of the dry fibrous structure.

"Stacked product(s)" as used herein include fibrous structures, paper, and sanitary tissue products that are in the form of a web and cut into distinct separate sheets, where the sheets are folded (e.g., z-folded or c-folded) and may be interleaved with each other, such that a trailing edge of one is connected with a leading edge of another. Common examples of stacks of folded and/or interleaved sheets include facial tissues and napkins.

"Percent (%) difference," "X % difference," or "X % different" is calculated by: subtracting the lower value (e.g., common intensive property value) from the higher value (e.g., common intensive property value) and then dividing that value by the average of the lower and higher values, and then multiplying the result by 100.

"Within X %" or "within X percent" is calculated by the following non-limiting example: If first and second sanitary tissue products have a common intensive property (e.g., lint), and if a second lint value of the second sanitary tissue product is 10, then "within 25%" of the second lint value is calculated as follows for this example: multiplying 10 (the second lint value) by 25%, which equals 2.5, and then adding 2.5 to 10 (the second lint value) and subtracting 2.5 from 10 (the second lint value) to get a range, so that "within 25%" of the second lint value for this example means a lint value of or between 12.5 and 7.5). The absolute value of "X % change" can be used to determine if "within X %" is satisfied; for example can also be determined by using the absolute For example, if "X % change" is −25%, then a "within 25%" is satisfied, but if "X % change" is −25%, a "within 20%" is not satisfied.

"Percent (%) change," "X % change," or "X % change" is calculated by: subtracting the reference value (e.g., common intensive property value of a sustainable sanitary tissue product) from the comparative value (e.g., common intensive property value of a sanitary tissue product) and then dividing by the reference value, and then multiplying the result by 100. For example, if a reference value is 18 (e.g., a basis weight of a sustainable sanitary tissue product) and the comparative value is 31 (e.g., a basis weight of a soft sanitary tissue product), then 18 should be subtracted from 31, which equals 13, which should be divided by 18, which equals 0.722, which should be multiplied by 100, which equals 72.2% change.

Fibrous structures of the present disclosure may be used to make sanitary tissue products, including paper towels, bath tissues, napkins, and facial tissues. The fibrous structures can be single-ply or multi-ply and may comprise cellulosic pulp fibers.

Fibrous structures of the present disclosure may be selected from the group consisting of: through-air-dried fibrous structures, differential density fibrous structures, differential basis weight fibrous structures, wet laid fibrous structures, air laid fibrous structures, conventional dried fibrous structures, creped or uncreped fibrous structures, patterned-densified or non-patterned-densified fibrous structures, compacted or uncompacted, especially high bulk uncompacted, fibrous structures, other nonwoven fibrous structures comprising synthetic or multicomponent fibers, homogeneous or multilayered fibrous structures, double re-creped fibrous structures, uncreped fibrous structures, co-form fibrous structures and combinations thereof.

As shown in FIGS. 3A-3C, fibrous structures and/or sanitary tissue products of the present disclosure may comprise a surface that comprises undulations (e.g., knuckles 20 and pillows 22) and/or embossments (e.g., 32, 34). FIGS. 16A and 16B illustrate embossments 32 (where each line and dot illustrated in FIGS. 16A and 16B is an embossment) that may be desirable for use with fibrous structures 10 of the present disclosure.

Fibrous structures of the present disclosure may be air laid and may be selected from the group consisting of thermal bonded air laid (TBAL) fibrous structures, latex bonded air laid (LBAL) fibrous structures and mixed bonded air laid (MBAL) fibrous structures.

Fibrous structures of the present disclosure may exhibit a substantially uniform density or may exhibit differential density regions; in other words, regions of high density compared to other regions within the patterned fibrous structure. Typically, when a fibrous structure is not pressed against a cylindrical dryer, such as a Yankee dryer, while the fibrous structure is still wet and supported by a through-air-drying fabric or by another fabric or when an air laid fibrous structure is not spot bonded, the fibrous structure typically exhibits a substantially uniform density. Differential density regions may contribute to the softness of the fibrous structures of the present disclosure (especially when compared to conventional wet press). As a particular example, the fibrous structures of the present disclosure may comprise knuckles and pillows, which can contribute to softness. Softness may be further enhanced when pillows are disposed on a consumer-facing surface of the fibrous structure, such as a consumer-facing surface of a sanitary tissue product.

As shown in FIGS. 4A, C, and E, fibrous structures of the present disclosure may comprise knuckles 20 and pillows 22, which is one way of achieving differential density. FIG. 5 shows a portion of the pattern on the mask 14 used to make a papermaking belt (not particularly shown, but of the type shown in FIG. 17) that is capable of making the sanitary tissue 12 shown in FIG. 3A. The sanitary tissue 12 of FIG. 3A exhibits a pattern of knuckles 20 and pillows 22 that were formed by discrete cured resin knuckles 20 on a papermaking belt, and which correspond to the white areas, i.e., the cells 24, of the mask 14 shown in FIG. 5.

As depicted in the exemplary fibrous structure shown in FIG. 3A, and more clearly depicted through the masks shown in FIG. 5, the fibrous structures of the present disclosure may have a pattern of discrete knuckles and a continuous/substantially continuous pillow region. However, in other examples the fibrous structures may also have a pattern of discrete pillows and a continuous/substantially continuous knuckle regions.

As shown in FIGS. 4A-F, the fibrous structure may have first and second consumer-facing sides 50. It may be desirable that pillow regions face outwardly, indicated by directional arrow 51, such that the user of the fibrous structure feels the pillows with their skin. It should be understood, that depending on the type of process used to make the fibrous structure, for multi-ply fibrous structures, the consumer-facing side may be the either fabric-side-out ("FSO") or wire-side-out (WSO). For typical TAD, such as illustrated in FIG. 6A, "fabric side" means the side that touches the TAD fabric (164) and "wire side" means the side that touches the forming wire/forming fabric (154); for UCTAD, such as illustrated in FIG. 6B, "sides" are determined in the TAD section, where the "fabric" side touches the TAD fabric (164) and the "air" side does not. For a process like the one illustrated by FIG. 6A, the relevance of whether the consumer-facing side of the fibrous structure is wire side (WSO) or is fabric side (FSO) is whether a flatter surface (non-pillow-facing-outward surface) is desired, or whether a pillow-facing-outward surface is desired. When pillows face outwardly, TS7 values decrease (versus when knuckles are on the consumer-facing surface).

The fibrous structures of the present disclosure may be pattern densified. A pattern densified fibrous structure is characterized by having a relatively high-bulk field of relatively low fiber density and an array of densified zones (regions) of relatively high fiber density. The high-bulk field is alternatively characterized as a field of pillow zones (regions). The densified zones (regions) are alternatively referred to as knuckle zones (regions). The densified zones (regions) may be discretely spaced within the high-bulk field or may be interconnected, either fully or partially, within the high-bulk field.

The fibrous structures of the present disclosure may be uncompacted, non-pattern-densified. The fibrous structure may be of a homogenous or multi-layered construction. The fibrous structure may be made with a fibrous furnish that produces a single layer embryonic fibrous web or a fibrous furnish that produces a multi-layer embryonic fibrous web.

The fibrous structures of the present disclosure may comprise any suitable ingredients known in the art. Non-limiting examples of suitable ingredients that may be included in the fibrous structures include permanent and/or temporary wet strength resins, dry strength resins (e.g., Carboxy Methyl Cellulose (CMC)), softening agents, wetting agents, lint resisting agents, absorbency-enhancing agents, immobilizing agents, especially in combination with emollient lotion compositions, antiviral agents including organic acids, antibacterial agents, polyol polyesters, anti-migration agents, polyhydroxy plasticizers, opacifying agents, bonding agents, debonding agents, colorants, and mixtures thereof. Such ingredients, when present in the fibrous structure of the present disclosure, may be present at any level based on the dry weight of the fibrous structure. Such ingredients, when present, may be present at a level of from about 0.001 to about 50%, and/or from about 0.01 to about 20%, and/or from about 0.01 to about 5%, and/or from about 0.03 to about 3%, and/or from about 0.1 to about 1.0% by weight, on a dry fibrous structure basis. It may be desirable to use one or a combination of said suitable ingredients on a fibrous structure comprising non-wood fibers, such as, for example, certain lotion(s) on a fibrous structures comprising bamboo, where the lotion improves softness or at least improves the perception of softness and may further decrease lint.

Non-Wood Fibers

As used herein the term "non-wood fiber(s)" or "non-wood content" means naturally-occurring fibers derived from non-wood plants, including animal fibers, mineral fibers, plant fibers and mixtures thereof, and specifically excluding non-naturally-occurring fibers (e.g., synthetic fibers). Animal fibers may, for example, be selected from the group consisting of: wool, silk and other naturally-occurring protein fibers and mixtures thereof. The plant fibers may, for example, be obtained directly from a plant. Nonlimiting examples of suitable plants include cotton, cotton linters, flax, sisal, abaca, hemp, *Hesperaloe*, jute, bamboo, bagasse, kudzu, corn, sorghum, gourd, *Agave*, loofah, trichomes, seed-hairs, wheat, and mixtures thereof.

Non-wood fibers of the present disclosure may be derived from one or more non-wood plants of the family Asparagaceae. Suitable non-wood plants may include, but are limited to, one or more plants of the genus *Agave* such as *A. tequilana*, *A. sisalana* and *A. fourcroyde*, and one or more plants of the genus *Hesperaloe* such as *H. funifera*, *H. parviflora*, *H. nocturna*, *H. Changi*, *H. tenuifolia*, *H. engelmannii*, and *H. malacophylla*. Further, the non-wood fibers of the present disclosure may be prepared from one or more plants of the of the genus *Hesperaloe* such as *H. funifera*, *H. parviflora*, *H. nocturna*, *H. chiangii*, *H. tenuifolia*, *H. engelmannii*, and *H. malacophylla*.

As used herein the term "wood fiber(s)" or "wood content" means fibers derived from both deciduous trees (hereinafter, also referred to as "hardwood") and coniferous trees (hereinafter, also referred to as "softwood") may be utilized. Wood fibers may be short (typical of hardwood fibers) or long (typical of softwood fibers). Nonlimiting examples of short fibers include fibers derived from a fiber source selected from the group consisting of Acacia, Eucalyptus, Maple, Oak, Aspen, Birch, Cottonwood, Alder, Ash, Cherry, Elm, Hickory, Poplar, Gum, Walnut, Locust, Sycamore, Beech, *Catalpa, Sassafras, Gmelina, Albizia, Anthocephalus*, and *Magnolia*. Nonlimiting examples of long fibers include fibers derived from Pine, Spruce, Fir, Tamarack, Hemlock, Cypress, and Cedar.

As used herein the term "synthetic fiber(s)" or "synthetic content" means fibers human-made fibers, and specifically excludes "wood fibers" and "non-wood fibers." Synthetic fibers can be used, in combination with non-wood fibers (e.g., bamboo) in the fibrous structures of the present disclosure. Synthetic fibers may be polymeric fibers. Synthetic fibers may comprise elastomeric polymers, polypropylene, polyethylene, polyester, polyolefin, polyvinyl alcohol and nylon, which are obtained from petroleum sources. Additionally, synthetic fibers may be polymeric fibers comprising natural polymers, which are obtained from natural sources, such as starch sources, protein sources and/or cellulose sources may be used in the fibrous structures of the present disclosure. The synthetic fibers may be produced by any suitable methods known in the art.

Fibrous structure(s), web(s) that form the fibrous structure(s), layer(s) of a fibrous structure(s) (including at least one of or each of a first and a second layer of a ply), and/or sheet(s) of a fibrous structure may comprise at least about 5%, about 10%, about 15%, about 20%, about 30%, about 35% about 40%, about 50%, about 75%, about 80%, or about 100% non-wood content, or from about 5% to about 15%, from about 10% to about 30%, from about 20% to about 40%, from about 30% to about 50%, from about 40% to about 60%, from about 50% to about 70%, from about 55% to about 95%, from about 65% to about 85%, from about 60% to about 80%, from about 70% to about 90%, from about 80% to about 100%, from about 90% to about 100%, from about 95% to about 100%, or from about 97.5% to about 100% non-wood content (e.g., bamboo, abaca, hemp, etc.), specifically reciting all 0.1% increments within the above-recited ranges of this paragraph and all ranges formed therein or thereby.

Bamboo

Generally, the "bamboo," "bamboo fibers," "bamboo content," or "bamboo fiber content" incorporated into fibrous structure(s) of the present disclosure are fibrous materials derived from any bamboo species. More particularly, the bamboo fiber species may be selected from the group consisting of: *Acidosasa* sp., *Ampleocalamus* sp., *Arundinaria* sp., *Bambusa* sp., *Bashania* sp., *Borinda* sp., *Brachystachyum* sp., *Cephalostachyum* sp., *Chimonobambusa* sp., *Chusquea* sp., *Dendrocalamus* sp., *Dinochloa* sp., *Drepanostachyum* sp., *Eremitis* sp., *Fargesia* sp., *Gaoligongshania* sp., *Gelidocalamus* sp., *Gigantocloa* sp., *Guadua* sp., *Hibanobambusa* sp., *Himalayacalamus* sp., *Indocalamus* sp., *Indosasa* sp., *Lithachne* sp., *Melocanna* sp., *Menstruocalamus* sp., *Nastus* sp., *Neohouzeaua* sp., *Neomicrocalamus* sp., *Ochlandra* sp., *Oligostachyum* sp., *Olmeca* sp., *Otatea* sp., *Oxytenanthera* sp., *Phyllostachys* sp., *Pleioblastus* sp., *Pseudosasa* sp., *Raddia* sp., *Rhipidocladum* sp., *Sasa* sp., *Sasaella* sp., *Sasamorpha* sp., *Schizostachyum* sp., *Semiarundinaria* sp., *Shibatea* sp., *Sinobambusa* sp., *Thamnocalamus* sp., *Thyrsostachys* sp., *Yushania* sp. *and mixtures thereof.*

The bamboo fibers may be from temperate bamboos of the *Phyllostachys* species, for example *Phyllostachys heterocycla pubescens*, also known as Moso Bamboo. However, it is to be understood that the compositions disclosed herein, unless otherwise stated, are not limited to containing any one bamboo fiber and may comprise a plurality of fibers of different species. For example, the composition may comprise a bamboo from a *Phyllostachys heterocycla pubescens* and a bamboo from a different species such as, for example, *Phyllostachys bambusoides*.

Bamboo fibers for use in the webs, fibrous structures, and products of the present disclosure may be produced by any appropriate methods known in the art. The bamboo fibers may be pulped bamboo fibers, produced by chemical processing of crushed bamboo stalk. The chemical processing may comprise treating the crushed bamboo stalk with an appropriate alkaline solution. The skilled artisan will be capable of selecting an appropriate alkaline solution. Bamboo fiber may also be produced by mechanical processing of crushed bamboo stalk, which may involve enzymatic digestion of the crushed bamboo stalk. Although bamboo fiber may be produced by any appropriate methods known in the art, a desirable method for manufacturing the bamboo pulp may be as a chemical pulping method such as, but not limited to, kraft, sulfite or soda/AQ pulping techniques.

Bamboo fibers of the present disclosure may be bamboo pulp fibers and may have an average fiber length of at least about 0.8 mm. When blends of fibers from various bamboo species are employed, it is noted that blends may comprise two or more species of bamboo, or may comprise three or more species of bamboo, such that the average fiber length is at least about 1.1 mm, at least about 1.5 mm, or from about 1.1 to about 2 mm Fibrous structure(s), web(s) that form the fibrous structure(s), layer(s) of a fibrous structure(s) (including at least one of or each of a first and a second layer of a ply), and/or sheet(s) of a fibrous structure may comprise at least about 5%, about 10%, about 15%, about 20%, about 30%, about 35%, about 40%, about 50%, about 75%, about 80%, or about 100% bamboo content, or from about 5% to about 15%, from about 10% to about 30%, from about 20% to about 40%, from about 30% to about 50%, from about 40% to about 60%, from about 50% to about 70%, from about 60% to about 80%, from about 70% to about 90%, from about 80% to about 100%, from about 90% to about 100%, from about 95% to about 100%, or from about 97.5% to about 100% bamboo content, specifically reciting all 0.1% increments within the above-recited ranges of this paragraph and all ranges formed therein or thereby.

Bamboo fibers may be more desirable to use than other non-wood fibers, such as various straws (e.g., wheat straw) for multiple reasons, one being that bamboo fibers are generally longer than straw fibers, which results in fibrous structures comprising bamboo fibers being stronger (without using strength enhancing chemistry or process manipulations) than like fibrous structures comprising shorter straw fibers.

Abaca

Generally, the "abaca," "abaca fibers," "abaca content," or "abaca fiber content" incorporated into fibrous structure(s) of the present disclosure are fibrous materials derived from *Musa textilis* (a species of banana native to the Philippines). Abaca may also be referred to as Manilla hemp, Cebu hemp, Davao hemp, Banana hemp or *Musa* hemp and can be used to derive abaca cellulose fibers.

Abaca may have a fiber coarseness of greater than 16 mg/100 m (or less than 20 mg/100 m) and a fiber length of 2.5 mm, 2.6 mm, 2.7 mm, 2.8 mm or more. Beyond abaca, sunn hemp, kenaf, and sisal hemp may have these characteristics.

Abaca comprises characteristics that can make it challenging (especially at higher incorporation levels) for incorporating into sanitary tissue products of the present invention as it is better known for being used to produce thin, strong, and porous paper capable of withstanding hard use.

Fibrous structure(s), web(s) that form the fibrous structure(s), layer(s) of a fibrous structure(s) (including at least one of or each of a first and a second layer of a ply), and/or sheet(s) of a fibrous structure may comprise at least about 5%, about 10%, about 15%, about 20%, about 30%, about 40%, about 50%, about 75%, about 80%, or about 100% abaca content, or from about 5% to about 15%, from about 10% to about 30%, from about 20% to about 40%, from about 30% to about 50%, from about 40% to about 60%, from about 50% to about 70%, from about 60% to about 80%, from about 70% to about 90%, from about 80% to about 100%, from about 90% to about 100%, from about 95% to about 100%, or from about 97.5% to about 100% abaca content, specifically reciting all 0.1% increments within the above-recited ranges of this paragraph and all ranges formed therein or thereby.

Abaca fibers may be more desirable to use than other non-wood fibers, such as various straws (e.g., wheat straw) for multiple reasons, one being that abaca fibers are generally longer than straw fibers, which results in fibrous structures comprising abaca fibers being stronger (without using strength enhancing chemistry or process manipulations) than like fibrous structures comprising shorter straw fibers. Further, abaca's length, width, and coarseness make it a more suitable softwood replacement, its higher fibrillation increases specific surface area of the fiber and its carboxyl groups make it better for attaching strength chemistries.

Hemp

Generally, the "hemp," "hemp fibers," "hemp content," or "hemp fiber content" incorporated into fibrous structure(s) of the present disclosure may be made up of hemp cellulose fibers derived from the plants *Cannabis sativa* or *Cannabis sativa* indica. The hemp cellulose fibers may be processed to a particulate fiber pulp.

Hemp cellulose fibers may be derived from one or more of the plant sources *Cannabis, Cannabis sativa, Cannabis sativa indica, Agave sisalana* (i.e., Sisal hemp).

*Cannabis* is a genus of flowering plants that includes three different species, *Cannabis sativa, Cannabis indica,* and *Cannabis ruderalis*. The *Cannabis* stalk (or stem) consists of an open cavity surrounded by an inner layer of core fiber, often referred to as hurd, and an outer layer referred to as the bast. Bast fibers are roughly 20% of the stalk mass and the hurd 80% of the mass. *Cannabis* bast fibers have a large range in length and diameter, but on average are very long with medium coarseness; suitable for making textiles, paper, and nonwovens. The hurd consists of very short, bulky fibers, typically 0.2-0.65 mm in length.

Fibrous structure(s), web(s) that form the fibrous structure(s), layer(s) of a fibrous structure(s) (including at least one of or each of a first and a second layer of a ply), and/or sheet(s) of a fibrous structure may comprise at least about 5%, about 10%, about 15%, about 20%, about 30%. about 40%, about 50%, about 75%, about 80%, or about 100% abaca content, or from about 5% to about 15%, from about 10% to about 30%, from about 20% to about 40%, from about 30% to about 50%, from about 40% to about 60%, from about 50% to about 70%, from about 60% to about 80%, from about 70% to about 90%, from about 80% to about 100%, from about 90% to about 100%, from about 95% to about 100%, or from about 97.5% to about 100% hemp content, specifically reciting all 0.1% increments within the above-recited ranges of this paragraph and all ranges formed therein or thereby.

Bagasse

Generally, the "bagasse," "bagasse fibers," "bagasse content," or "bagasse fiber content" incorporated into fibrous structure(s) of the present disclosure may be made up of "sugar cane bagasse"—the dry pulpy residue left after the extraction of juice from sugar cane or sorghum stalks to extract their juice. *Agave* bagasse is similar, but is the material remnants after extracting blue *Agave* sap.

Fibrous structure(s), web(s) that form the fibrous structure(s), layer(s) of a fibrous structure(s) (including at least one of or each of a first and a second layer of a ply), and/or sheet(s) of a fibrous structure may comprise at least about 5%, about 10%, about 15%, about 20%, about 30%. about 40%, about 50%, about 75%, about 80%, or about 100% abaca content, or from about 5% to about 15%, from about 10% to about 30%, from about 20% to about 40%, from about 30% to about 50%, from about 40% to about 60%, from about 50% to about 70%, from about 60% to about 80%, from about 70% to about 90%, from about 80% to about 100%, from about 90% to about 100%, from about 95% to about 100%, or from about 97.5% to about 100% bagasse content, specifically reciting all 0.1% increments within the above-recited ranges of this paragraph and all ranges formed therein or thereby.

Flax

Generally, the "flax," "flax fibers," "flax content," or "flax fiber content" incorporated into fibrous structure(s) of the present disclosure may be made up of *Linum usitatissimum*, in the family Linaceae. Flax fiber is extracted from the bast beneath the surface of the stem of the flax plant.

Fibrous structure(s), web(s) that form the fibrous structure(s), layer(s) of a fibrous structure(s) (including at least one of or each of a first and a second layer of a ply), and/or sheet(s) of a fibrous structure may comprise at least about 5%, about 10%, about 15%, about 20%, about 30%. about 40%, about 50%, about 75%, about 80%, or about 100% abaca content, or from about 5% to about 15%, from about 10% to about 30%, from about 20% to about 40%, from about 30% to about 50%, from about 40% to about 60%, from about 50% to about 70%, from about 60% to about 80%, from about 70% to about 90%, from about 80% to about 100%, from about 90% to about 100%, from about 95% to about 100%, or from about 97.5% to about 100% flax content, specifically reciting all 0.1% increments within the above-recited ranges of this paragraph and all ranges formed therein or thereby.

Cotton

Generally, the "cotton," "cotton fibers," "cotton content," or "cotton fiber content" incorporated into fibrous structure(s) of the present disclosure may be made up of cotton linters, which are fine, silky fibers that adhere to the seeds of the cotton plant after ginning. These curly fibers typically are less than ⅛ inch (3.2 mm) long. The term also may apply to the longer textile fiber staple lint, as well as the shorter fuzzy fibers from some upland species.

Fibrous structure(s), web(s) that form the fibrous structure(s), layer(s) of a fibrous structure(s) (including at least one of or each of a first and a second layer of a ply), and/or sheet(s) of a fibrous structure may comprise at least about 5%, about 10%, about 15%, about 20%, about 30%. about 40%, about 50%, about 75%, about 80%, or about 100% abaca content, or from about 5% to about 15%, from about 10% to about 30%, from about 20% to about 40%, from about 30% to about 50%, from about 40% to about 60%, from about 50% to about 70%, from about 60% to about 80%, from about 70% to about 90%, from about 80% to about 100%, from about 90% to about 100%, from about 95% to about 100%, or from about 97.5% to about 100% cotton content, specifically reciting all 0.1% increments within the above-recited ranges of this paragraph and all ranges formed therein or thereby.

Morphology

Because non-wood fibers can have high coarseness, they may have poor surface feel and might not mold very well, thus may not have desirable caliper and bulk. Part of this dynamic is that certain non-woods, like bamboo, for instance, is often wider than the wood fibers it is used to replace. Further, bamboo also has a smaller lumen and thicker cell wall versus woods of same fiber width (i.e., a higher Runkel Ratio (i.e., ratio of twice the cell wall thickness to the diameter of the lumen), even greater than 1.0), so non-wood (e.g., bamboo) fibers can behave more stiffly, especially when using wood fiber knowledge. For these reasons, it may be desirable to spread apart knuckles and/or increase molding forces (pick-up shoe (molding vacuum)) and/or increase speed differential at transfer. With these differences, if nothing is done (i.e., if no adjustments are made for incorporating non-woods), caliper drops, and/ or roll bulk drops, and/or the sheet is less compressible, and/or the sheet get stiffer (in-plane and/or bending).

Layers

As shown in FIGS. 4A-4F, and as described in FIGS. 18B-1, 18B-2, and 19, a ply of fibrous structures of the present disclosure may be homogeneous or may be layered. If layered, a ply of the fibrous structures may comprise at least two, at least three, least four, and/or at least five layers. The fibrous structures may comprise a single ply, or two, three plies, four, or five plies.

As used herein, the term "layer" means a plurality of strata of fibers, chemical treatments, or the like, within a ply. As used herein, the terms "layered," "multi-layered," and the like, refer to fibrous sheets prepared from two or more layers of aqueous papermaking furnish which may be comprised of different fiber types. The layers may be formed from the deposition of separate streams of dilute fiber slurries, upon one or more endless foraminous screens. If the individual layers are initially formed on separate foraminous screens, the layers may be subsequently combined (while wet) to form a layered composite web. Naturally-occurring (e.g., wood and certain non-woods) and/or non-naturally (e.g., synthetic) occurring fibers can also be present in the fibrous structures, as will be disclosed in greater detail below. FIG. 4A illustrates a first ply 53 and a second ply 53 of a fibrous structure 10. Each of the plies may comprise 2 layers 55. The plies may be joined together 57 via adhesive, an emboss, or the like. The pillows 22 may face outwardly 51 toward the consumer-facing side 50 of the fibrous structure 10. Knuckles 20 may face inwardly toward the product-facing side 52 of the fibrous structure 10, which is more commonly associated with process and equipment such as disclosed in FIG. 6A. As illustrated in FIG. 4A, both plies 53 are FSO. FIG. 4B is similar to FIG. 4A, except that the fibrous structure 10 does not have distinct knuckle 20 and pillow 22 regions or zones, which is more commonly associated with process and equipment such as disclosed in FIGS. 6A and 6B. FIGS. 4B and 4C are much like FIGS. 4A and 4B, respectively, except that each ply comprises 3 layers 55. FIG. 4E illustrates a single ply comprising 3 layers and is representative of a fibrous structure resulting form process and equipment such as disclosed in FIGS. 6B and 6C; as such, the fibrous structure 10 does not have distinct knuckle 20 and pillow 22 regions or zones. FIG. 4F is like FIG. 4A, except that it comprises 3 plies and, ply 53—is FSO and has outwardly-facing 51 pillows 22, while ply 53 is WSO and has outwardly-facing 51 knuckles. FIG. 4F may, alternatively, have both plies 53 and 53—FSO or both plies WSO; and both plies 53 and 53—may have outwardly-facing 51 pillows 22 or both plies may have outwardly-facing 51 knuckles 20—these FSO/WSO alternatives and pillow/knuckle alternatives are also true for FIGS. 4A and 4C.

It may be desirable to dispose the highest fiber count (million fibers/g) in a most consumer-facing layer of a ply comprising non-wood fibers. A higher fiber count (versus other layer(s) in a ply) may be done in combination with outwardly facing pillows of a consumer-facing side of a fibrous structure of a sanitary tissue product. The outwardly-facing pillow region of a layer (e.g., 55a) may comprise a higher fiber count than an adjacent region of an adjacent layer (e.g., 55b). Further, a pillow may have a greater basis wight than an adjacent knuckle. Alternatively, a knuckle may have a greater basis weight than an adjacent pillow.

Properties of Fibrous Structure(s)

Fibrous structure(s), web(s) that form the fibrous structure(s), layer(s) of a fibrous structure(s) (including at least one of or each of a first and a second layer of a ply), and/or sheet(s) of a fibrous structure(s) as disclosed herein, particularly including various inventive non-wood inclusions, even including greater than 80% non-woods by weight of the fibrous structure, and even including 100% non-woods by weight of the fibrous structure, may have one or a combination of the following properties: a VFS of greater than about 5.5 g/g, greater than about 6.0 g/g, greater than about 7.0 g/g, from about 3 g/g to about 20 g/g, from about 4 g/g to about 18 g/g, from about 5 g/g to about 16 g/g, from about 6 g/g to about 14 g/g, from about 8 g/g to about 12 g/g, or from about 5 g/g to about 6 g/g, specifically reciting all increments of 0.01 g/g within the above-recited ranges and all ranges formed therein or thereby;

an HFS of greater than about 13 g/g, or greater than about 14 g/g, or greater than about 15 g/g, or greater than about 16 g/g, or greater than about 16.5 g/g, or greater than about 17 g/g, or greater than about 17.5 g/g, or greater than about 18 g/g, or greater than about 18.5, g/g or greater than about 19 g/g, or greater than about 20 g/g, or greater than about 21 g/g, or from about 4 g/g to about 30 g/g, from about 6 g/g to about 28 g/g, from about 8 g/g to about 26 g/g, from about 10 g/g to about 24 g/g, from about 12 g/g to about 22 g/g, from about 13 g/g to about 20, from about 14 g/g to about 18 g/g, from about 13 g/g to about 15 g/g, or from about 13 g/g to about 14 g/g, specifically reciting all increments of 0.1 g/g within the above-recited ranges and all ranges formed therein or thereby;

a stack compressibility of greater than about 40 mils/(log (g/in$^2$)), greater than about 41 mils/(log(g/in$^2$)), greater than about 45 mils/(log(g/in$^2$)), greater than about 50 mils/(log(g/in$^2$)), from about 25 mils/(log(g/in$^2$)) to about 100 mils/(log(g/in$^2$)), from about 30 mils/(log(g/in$^2$)) to about 75 mils/(log(g/in$^2$)), from about 40 mils/(log(g/in$^2$)) to about 50 mils/(log(g/in$^2$)), from about 41 mils/(log(g/in$^2$)) to about 48, or from about mils/(log (g/in$^2$)) to about 48 mils/(log(g/in$^2$)), specifically reciting all increments of 0.1 mils/(log(g/in$^2$)) within the above-recited ranges and all ranges formed therein or thereby;

an MD wet peak elongation of greater than about 18%, greater than about 20%, from about 10% to about 30%, from about 14% to about 25%, from about 18% to about 22%, or from about 18% to about 20%, specifically reciting all increments of 0.1% within the above-recited ranges and all ranges formed therein or thereby;

a CD wet peak elongation of greater than about 12%, from about 5% to about 30%, from about 10% to about 25%, from about 12% to about 20%, or from about 12% to about 15%, specifically reciting all increments of 0.1% within the above-recited ranges and all ranges formed therein or thereby;

an MD wet peak TEA of greater than about 21 g*in/in$^2$, greater than about 22 g*in/in$^2$, from about 15 g*in/in$^2$ to about 50 g*in/in$^2$, from about 20 g*in/in$^2$ to about 40 g*in/in$^2$, from about 21 g*in/in$^2$ to about 30 g*in/in$^2$, or from about 21 g*in/in$^2$ to about 25 g*in/in$^2$, specifically reciting all increments of 1 g*in/in$^2$ within the above-recited ranges and all ranges formed therein or thereby;

a CD wet peak TEA of greater than about 7 g*in/in$^2$, from about 6 g*in/in$^2$ to about 40 g*in/in$^2$, from about 6.5 g*in/in$^2$ to about 30 g*in/in$^2$, from about 7 g*in/in$^2$ to about 20 g*in/in$^2$, or from about 7.5 g*in/in$^2$ to about 15 g*in/in$^2$, or from about 8 g*in/in$^2$ to about 12 g*in/in$^2$, specifically reciting all increments of 0.5 g*in/in$^2$ within the above-recited ranges and all ranges formed therein or thereby;

a CD elongation (dry) of greater than about 5%, of greater than about 8%, of greater than about 12%, of greater than about 13.5%, or from about 5% to about 25%, from about 10% to about 20%, from about 12% to about 18%, from about 13% to about 17%, or from about 14% to about 16%, specifically reciting all increments of 0.5% within the above-recited ranges and all ranges formed therein or thereby;

a CD TEA of greater than about 35 in-g/in$^2$, of greater than about 32 in-g/in$^2$, or from about 5 in-g/in$^2$ to about 100 in-g/in$^2$, from about 15 in-g/in$^2$ to about 75 in-g/in$^2$, from about 25 in-g/in$^2$ to about 50 in-g/in$^2$, from about 32 in-g/in$^2$ to about 45 in-g/in$^2$, from about 33 in-g/in$^2$ to about 40 in-g/in$^2$, from about 34 in-g/in$^2$ to about 38 in-g/in$^2$, specifically reciting all increments of 1 in-g/in$^2$ within the above-recited ranges and all ranges formed therein or thereby;

a dry CD tensile modulus/dry CD tensile peak load (derived from the appropriate of: 1) Dry Elongation, Tensile Strength, TEA and Modulus Test Methods for Toilet Paper, 2) Dry Elongation, Tensile Strength, TEA and Modulus Test Methods for Paper Towels, or 3) Dry Elongation, Tensile Strength, TEA and Modulus Test Methods for Facial Tissue) less than about 5.0 g/g, less than about 4.5 g/g, less than about 4.0 g/g, less than about 3.5 g/g, less than about 3.0 g/g, from about 5.0 g/g to about 2.5 g/g, from about 4.0 g/g to about 2.0 g/g, or from about 3.5 g/g to about 1.5 g/g, specifically reciting all increments of 0.1 g/g within the above-recited ranges and all ranges formed therein or thereby;

a wet CD tensile modulus/wet CD tensile peak load less than about 5.0 g/g, less than about 4.5 g/g, less than about 4.25 g/g, less than about 4.0 g/g, less than about 3.75 g/g, less than about 3.5 g/g, less than about 3.25 g/g, less than about 3.0 g/g, less than about 2.5 g/g, less than about 2 g/g, from about 5.0 g/g to about 2.5 g/g, from about 4.0 g/g to about 2.0 g/g, or from about 3.5 g/g to about 1.5 g/g, specifically reciting all increments of 0.1 g/g within the above-recited ranges and all ranges formed therein or thereby;

a CD modulus (dry) of less than about 2000 g/cm, of less than about 2400 g/cm, of less than about 2500 g/cm, of less than about 3270 g/cm, or from about 200 g/cm to about 5000 g/cm, or from about 1000 g/cm to about 4500 g/cm, or from about 2000 g/cm to about 4000 g/cm, or from about 3000 g/cm to about 4000 g/cm, or from about 3270 g/cm to about 3800 g/cm, or from about 3300 g/cm to about 3700 g/cm, or from about 3350 g/cm to about 3600 g/cm, or from about 3400 g/cm to about 3500 g/cm, specifically reciting all increments of 1 g/cm within the above-recited ranges and all ranges formed therein or thereby;

an MD modulus (dry) of less than about 3360 g/cm, or less than about 1750 g/cm or from about 500 g/cm to about 6000 g/cm, or from about 1000 g/cm to about 5000 g/cm, or from about 2000 g/cm to about 4000 g/cm, or from about 3000 g/cm to about 4000 g/cm, or from about 3360 g/cm to about 3800 g/cm, or from about 3400 g/cm to about 3700 g/cm, or from about 3450 g/cm to about 3600 g/cm, or from about 3500 g/cm to about 3600 g/cm, specifically reciting all increments of 1 g/cm within the above-recited ranges and all ranges formed therein or thereby;

a TS7 of less than about 40.00 dB V$^2$ rms, or less than about 30.00 dB V$^2$ rms, or less than about 22.00 dB V$^2$ rms, or less than about 20.00 dB V$^2$ rms, or less than about 24.00 dB V$^2$ rms, or less than about 15.00 dB V$^2$ rms, or less than about 14.00 dB V$^2$ rms, or less than about 10.00 dB V$^2$ rms, or less than about 8.00 dB V$^2$ rms, or greater than about 5.00 dB V$^2$ rms, or between about 3.00 dB V$^2$ rms and about 40.00 dB V$^2$ rms ("between about 'X' and about 'X'" is used interchangeably with "from about 'X' to about 'X'"), or between about 3.00 dB V$^2$ rms and about 20.00 dB V$^2$ rms, or between about 4.00 dB V$^2$ rms and about 30 dB V$^2$ rms, or between about 15.00 dB V$^2$ rms and about 30.00 dB V$^2$ rms, or between about 5.00 dB V$^2$ rms and about 20.00 dB V$^2$ rms, or between about 6.00 dB V$^2$ rms and about 14 dB V$^2$ rms, or between about 7.00 dB V$^2$ rms and about 12.00 dB V$^2$ rms, or between about 8.00 dB V$^2$ rms and about 11.50 dB V$^2$ rms, or between about 9.0 dB V$^2$ rms and about 11.00 dB V$^2$ rms, or between about 9.50 dB V$^2$ rms and about 10.50 dB V$^2$ rms, between about 9.50 dB V$^2$ rms and about 10.00 dB V$^2$ rms, between about 15 dB V$^2$ rms and about 17 dB V$^2$ rms, or between about 15 dB V$^2$ rms and about 16 dB V$^2$ rms, specifically reciting all increments of 0.01 dB V$^2$ rms within the above-recited ranges and all ranges formed therein or thereby;

a compressive slope of less than about 14.0 mil/g, or less than about 3.0 mil/g, or less than about 4.0 mil/g, or less than about 5.0 mil/g, or less than about 6.0 mil/g, or less than about 7.0 mil/g, or less than about 8.0 mil/g, or less than about 9.0 mil/g, or greater than about 12.0 mil/g 8, or greater than about 11.0 mil/g, or greater than about 12.0 mil/g, or between about 4.0 mil/g and about 10.0 mil/g, or between about 8.0 mil/g and about 12.0 mil/g, or between about 6 mil/g and about 14.0 mil/g, or between about 8.0 mil/g and about 14 mil/g, or between about 7.5 mil/g and about 11 mil/g, or between about 12.0 mil/g and about 3.0 mil/g, or between about 11.0 mil/g and about 5.0 mil/g, or between about 10.0 mil/g and about 4.0 mil/g, or between about 8.0 mil/g and about 5.0 mil/g, specifically reciting all increments of 0.01 mil/g within the above-recited ranges and all ranges formed therein or thereby;

a formation index of less than about 170, or less than about 90, or less than about 65, or greater than about 30, or greater than about 50, or between about 55 and about 165, or between about 55 and about 85, or between about 60 and about 80, or between about 65 and about 75, specifically reciting all increments of 0.1 within the above-recited ranges and all ranges formed therein or thereby;

a coverage of less than about 10 fiber layers (making up a layer 55 of a ply 53), or less than about 9 fiber layers, or less than about 8 fiber layers, or less than about 7 fiber layers, or less than about 6 fiber layers, or less than about 5 fiber layers, or less than about 4 fiber layers, or greater than about 2 fiber layers, or greater than about 4.75 fiber layers, or greater than about 5 fiber layers, or greater than about 5.25 fiber layers, or greater than about 5.5 fiber layers, or greater than about 5.75 fiber layers, or greater than about 6 fiber layers, or greater than about 6.25 fiber layers, or greater than about 6.5 fiber layers, or greater than about 7 fiber layers, or greater than about 7.25 fiber layers, or greater than about 7.5 fiber layers, or greater than about 7.75 fiber layers, or greater than about 8 fiber layers, or greater than about 8.25 fiber layers, or greater than about 8.5 fiber layers, or greater than about 9 fiber layers, or between about 2 and about 10 fiber layers, or between about 4 and about fiber 9 fiber layers, or between about 5 and about fiber 8 fiber layers, or between about 4 and about fiber 7 fiber layers, specifically reciting all increments of 1 fiber layer within the above-recited ranges and all ranges formed therein or thereby;

a coarseness (according to the Coverage and Fiber Count Test Method) of less than about 0.35 mg/m, or less than about 0.30 mg/m, or less than about 0.25 mg/m, or less than about 0.20 mg/m, or greater than about 0.13 mg/m, or greater than about 0.14 mg/m, or greater than about 0.15 mg/m, or greater than about 0.16 mg/m, or greater than about 0.17 mg/m, or between about 0.15 mg/m and about 0.35 mg/m, or between about 0.15 mg/m and about 0.30 mg/m, or between about 0.16 mg/m and about 1.7 mg/m, or between about 0.15 mg/m and about 0.17 mg/m, or between about 0.15 mg/m and about 0.20 mg/m, or between about 0.25 mg/m and about 0.26 mg/m, or between about 0.22 mg/m and about 0.3 mg/m, or between about 0.19 mg/m and about 0.32 mg/m, specifically reciting all increments of 0.01 mg/m within the above-recited ranges and all ranges formed therein or thereby;

a lint value of less than about 11, or less than about 10, or less than about 9, or less than about 8, or less than about 7, or less than about 6, or less than about 5, or greater than about 0.5, greater than about 4.1, greater than about 6, or between about 0.5 and about 11, or between about 0.7 and about 11, or between about 7.5 and about 10.5, or between about 4 and about 5.5, or between about 6.3 and about 7.7, or between about 3 and about 10, or between about 4 and about 9, or between about 5 and about 8, or between about 6 and about 8, specifically reciting all increments of 0.01 (Hunter L value) within the above-recited ranges and all ranges formed therein or thereby;

a fiber length of less than about 4 mm, of less than about 3 mm, of less than about 2.3 mm, or less than about 2.2 mm, or less than about 2.1 mm, or less than about 2.0 mm, or less than about 1.9 mm, or less than about 1.5 mm, or less than about 1.4, or greater than about 0.7, or greater than about 1, or greater than about 2 mm or between about 0.6 mm and about 2.4 mm, or between about 0.7 mm and about 2.2 mm, or between about 0.8 mm and about 2 mm, or between 2.5 mm and 3.7 mm, or between about 0.9 mm and about 1.8 mm, or between about 1 mm and about 1.6 mm, or between about 1.1 mm and about 1.5 mm, or between about 1.1 mm and about 1.4 mm, or between about 1.1 mm and about 1.3 mm, specifically reciting all increments of 0.01 mm within the above-recited ranges and all ranges formed therein or thereby;

a fiber width of less than about 31 um, or less than about 28 um, or less than about 25 um, or less than about 22 um, or less than about 20 um, or greater than about 8 um, or between about 7 um and about 32 um, or between about 8 um and about 31 um, or between about 10 um and about 28 um, or between about 12 um and about 26 um, or between about 14 um and about 24 um, or between about 16 um and about 22 um, or between about 22 um and about 27 um, or between about 25 um and about 31 um, or between about 15 um and about 19 um, or between about 18 um and about 20 um, or between about 7.5 um and about 9.5 um, specifically reciting all increments of 0.1 um within the above-recited ranges and all ranges formed therein or thereby;

a fiber length/width ratio (according to the Fiber Length, Width, Coarseness, and Fiber Count Test Method) of less than about 190, or less than about 180, or less than about 170, or less than about 160, or less than about 150, or less than about 140, or less than about 130, or less than about 120, or less than about 110, or less than about 106, or less than about 100, or less than about 75, or less than about 50, or greater than about 40, or between about 190 and about 35, or between about 185 and about 40, or between about 175 and about 50, or between about 150 and about 75, or between about 125 and about 100, specifically reciting all increments of 1 within the above-recited ranges and all ranges formed therein or thereby;

a fiber count (length average) of less than about 30 fibers/g, or less than about 25 fibers/g, or less than about 20 fibers/g, or less than about 16 fibers/g, or less than about 15 fibers/g, or less than about 14 fibers/g, or less than about 13 fibers/g, or less than about 10 fibers/g, or greater than about 3 fibers/g, or between about 2.75 fibers/g and about 5 fibers/g, or between about 3 fibers/g and about 35 fibers/g, or between about 3.5 fibers/g and about 30 fibers/g, or between about 5 fibers/g and about 25 fibers/g, or between about 10 fibers/g and about 20 fibers/g, or between about 10 fibers/g and about 15 fibers/g, specifically reciting all increments of 0.1 fibers/g within the above-recited ranges and all ranges formed therein or thereby;

a fiber count (number average) of less than about 30 fibers/g, or less than about 25 fibers/g, or less than about 20 fibers/g, or less than about 16 fibers/g, or less than about 15 fibers/g, or less than about 14 fibers/g, or less than about 13 fibers/g, or less than about 10 fibers/g, or greater than about 3 fibers/g, or greater than about 8.9 fibers/g, or between about 3 fibers/g and about 35 fibers/g, or between about 3.5 fibers/g and about 30 fibers/g, or between about 5 fibers/g and about 25 fibers/g, or between about 10 fibers/g and about 20 fibers/g, or between about 10 fibers/g and about 15 fibers/g, specifically reciting all increments of 0.1 fibers/g within the above-recited ranges and all ranges formed therein or thereby;

fiber count-area (C(n)) of greater than about 800 million/m^2, greater than about 830 million/m^2, greater than about 850 million/m^2, greater than about 900 million/m^2, greater than about 950 million/m^2, greater than about 1,000 million/m^2, or less than about 1,050 million/m^2, less than about 950 million/m^2, or from about 800 million/m^2 to about 1,000 million/m^2, from about 850 million/m^2 to about 975 million/m^2, specifically reciting all increments of 1 million/m^2 within the above-recited ranges and all ranges formed therein or thereby;

fiber count-area (C(1)) of greater than about 260 million/m^2, greater than about 280 million/m^2, greater than about 300 million/m^2, greater than about 350 million/m^2, greater than about 400 million/m^2, greater than about 450 million/m^2, greater than about 500 million/m^2, greater than about 525 million/m^2, or less than about 530 million/m^2, less than about 500 million/m^2, less than about 400 million/m^2, or from about 260 million/m^2 to about 530 million/m^2, from about 260 million/m^2 to about 400 million/m^2, from about 260 million/m^2 to about 400 million/m^2, specifically reciting all increments of 1 million/m^2 within the above-recited ranges and all ranges formed therein or thereby;

a tensile ratio (also called "dry tensile ratio," see the Dry Elongation, Tensile Strength, TEA and Modulus Test Methods below) of less than about 4.5, or less than about 4, or less than about 3.5, or less than about 3, or less than about 2.5, or less than about 2.1, or less than about 2, or less than about 1.9, or less than about 1.7, or greater than about 0.5, or greater than about 1.3, or greater than about 1.6, or greater than about 2, or greater than about 2.5, or between about 0.4 and about 0.5, or between about 0.5 and about 4.5, or between about 1.1 and about 1.6, or between about 1.25 and about 3, or between about 1.8 and about 2.4, or between about 1 and about 3, or between about 1.2 and about 2.1, or between about 1.5 and about 2, or between about 1.7 and about 2, specifically reciting all increments of 0.01 within the above-recited ranges and all ranges formed therein or thereby;

an Emtec TS750 of greater than about 10 dB $V^2$ rms, or greater than about 20 dB $V^2$ rms, or greater than about 40 dB $V^2$ rms, or greater than about 47.7 dB $V^2$ rms, or greater than about 50 dB $V^2$ rms, or greater than about 75 dB $V^2$ rms, or less than about 115 dB $V^2$ rms, or less than about 20 dB $V^2$ rms, or less than about 40 dB $V^2$ rms, or less than about 45 dB $V^2$ rms, or less than about 60 dB $V^2$ rms, or less than about 80 dB $V^2$ rms, or between about 10 dB $V^2$ rms and about 120 dB $V^2$ rms, or between about 14 dB $V^2$ rms and about 113 dB $V^2$ rms, or between about 14 dB $V^2$ rms and about 75 dB $V^2$ rms, or between about 50 dB $V^2$ rms and about 112 dB $V^2$ rms, or between about 15 dB $V^2$ rms and about 50 dB $V^2$, or between about 16 dB $V^2$ rms and about 40 dB $V^2$, or between about 20 dB $V^2$ rms and about 30 dB $V^2$, or between about 25 dB $V^2$ rms and about 35 dB $V^2$, or between about 40 dB $V^2$ rms and about 55 dB $V^2$, specifically reciting all increments of 1 dB $V^2$ rms within the above-recited ranges and all ranges formed therein or thereby;

a slip stick of greater than about 235, or greater than about 270 greater than about 300, or greater than about 350, or greater than about 400, or greater than about 500, or greater than about 600, or greater than about 700, greater than about 800, or greater than about 900, or less than about 435, or less than about 605, or less than about 1000, or between about 230 and about 1400, or between about 235 and about 435, or between about 235 and about 605, or between about 280 and about 965, or between about 300 and about 800, or between about 350 and about 500, or between about 400 and about 600, specifically reciting all increments of 10 within the above-recited ranges and all ranges formed therein or thereby;

a density of a first zone (a first region) or a pillow zone may be different than a density of a second zone (a second region or a knuckle zone), which is adjacent to the first zone, such that the density of a second zone (a second region or a knuckle zone) may be 5%, 10%, 15%, 20%, 30%, 40%, 50%, 75%, 100%, 125%, 150%, 175%, or 200% greater than the first zone (first region or pillow zone), specifically reciting all increments of 0.01% within the above-recited ranges and all ranges formed therein or thereby (the Micro-CT Intensive Property Measurement Method can be used to determine density of an area of interest);

a Runkel Ratio of greater than about 1, or greater than about 2, or greater than about 3, or greater than about 5, or greater than about 6, or greater than about 7, or less than about 10, between about 0.5 and about 10, or between about 1 and about 8, or between about 1.5 and about 6.5, specifically reciting all increments of 0.1 within the above-recited ranges and all ranges formed therein or thereby;

a 2.5-160 micron PVD desorption of less than about 1600 mg, or less than about 1550 mg, or less than about 1500 mg, or less than about 1400 mg, or less than about 1300 mg, or less than about 1200 mg, or less than about 1100 mg, or less than about 1000 mg, or less than about 900 mg, or less than about 800 mg, or less than about 700 mg, or less than about 600 mg, or greater than about 550 mg, or between about 550 mg and about 1600 mg, or between about 600 mg and about 1550 mg, or between about 700 mg and about 1550 mg, or between about 825 mg and about 1550 mg, or between about 850 mg and about 1500 mg, or between about 900 mg and about 1400 mg, or between about 1000 mg and about 1200 mg, specifically reciting all increments of 1 mg within the above-recited ranges and all ranges formed therein or thereby;

a 2.5-160 micron PVD absorption of less than about 1200 mg, or less than about 1100 mg, or less than about 1000 mg, or less than about 900 mg, or greater than about 400 mg, or greater than about 800 mg, or greater than about 825 mg, or between about 400 mg and about 1200 mg, or between about 500 mg and about 1200 mg, or between about 600 mg and about 1200 mg, or between about 700 mg and about 1200 mg, or between about 800 mg and about 1200 mg, or between about 900 mg and about 1100 mg, specifically reciting all increments of 1 mg within the above-recited ranges and all ranges formed therein or thereby;

a VFS of greater than about 4 g/g, or greater than about 5.5 g/g, or greater than about 6.0 g/g, or greater than about 7.0 g/g, or greater than about 7.3 g/g, or greater than about 7.5 g/g, or greater than about 8 mg, or greater than about 8.5 g/g, or greater than about 9 g/g, or greater than about 9.5 g/g, or greater than about 10 g/g, or greater than about 10.5 g/g, or greater than about 11 g/g, or greater than about 11.5 g/g, or greater than about 12 g/g, or greater than about 12.5 g/g, or less than about 13 g/g, or between about 4 g/g and about 15 g/g, or between about 5 g/g and about 11 g/g, or between about 10 g/g and about 15 g/g, or between about 7 g/g and about 13 g/g, or between about 7.5 g/g and about 13 g/g, or between about 8 g/g and about 13 g/g, or between about 9 g/g and about 13 g/g, or between about 10 g/g and about 13 g/g, or between about 10.5 g/g and about 12.5 g/g, or between about 10 g/g and about 12 g/g, or between about 10.5 g/g and about 11.5 g/g, reciting all increments of 0.1 g/g within the above-recited ranges and all ranges formed therein or thereby;

a residual water of less than about 10%, less than about 9%, less than about 7%, less than about 5%, less than about 4%, less than about 3.5%, from about 1% to about 20%, from about 2% to about 18%, from about 3% to about 16%, from about 4% to about 14%, from about 5% to about 12%, from about 6% to about 10%, from about 1% to about 3%, or from about 1% to about 2%, specifically reciting all increments of 0.1% within the above-recited ranges and all ranges formed therein or thereby;

a basis weight of at least about 48 $g/m^2$ (i.e., gsm), of between about 10 $g/m^2$ and about 100 $g/m^2$, or between about 10 $g/m^2$ and about 45 $g/m^2$, between about 20 $g/m^2$ and about 40 $g/m^2$, or between about 24 $g/m^2$ and about 40 $g/m^2$, or between about 30 $g/m^2$ and about 32 $g/m^2$, or between about 40 $g/m^2$ and about 65 $g/m^2$, or between about 45 $g/m^2$ and about 60 $g/m^2$, or between about 50 $g/m^2$ and about 58 $g/m^2$, or between about 50 $g/m^2$ and about 55 $g/m^2$, or between about 50 $g/m^2$ and about 75 g/m², specifically reciting all increments of 0.1 g/m² within the above-recited ranges and all ranges formed therein or thereby;

a density (based on measuring caliper at 95 g/in²) of less than about 0.60 g/cm^3 and/or less than about 0.30 g/cm^3 and/or less than about 0.20 g/cm^3 and/or less than about 0.10 g/cm^3 and/or less than about 0.07 g/cm^3 and/or less than about 0.05 g/cm^3 and/or from about 0.01 g/cm^3 to about 0.20 g/cm^3 and/or from about 0.02 g/cm^3 to about 0.10 g/cm^3, specifically reciting all increments of 0.001 g/cm^3 within the above-recited ranges and all ranges formed therein or thereby;

a bulk (also called "dry bulk," based on measuring caliper at 95 g/in²) of greater than about 1.67 cm^3/g and/or greater than about 3.33 cm^3/g and/or greater than about 5.00 cm^3/g and/or greater than about 10.00 cm^3/g and/or greater than about 14.29 cm^3/g and/or greater than about 15.0 cm^3/g and/or greater than about 18.0 cm^3/g and/or greater than about 20.00 cm^3/g and/or from about 100.00 cm^3/g to about 5.00 cm^3/g and/or from about 50.00 cm^3/g to about 10.00 cm^3/g, specifically reciting all increments of 0.01 cm^3/g within the above-recited ranges and all ranges formed therein or thereby (Note: This is distinct from "Dry Bulk Ratio" and "Resilient Bulk.");

an SST (absorbency rate) of greater than about 0.3 g/sec$^{0.5}$, or greater than about 0.4 g/sec$^{0.5}$, or greater than about 0.45 g/sec$^{0.5}$, or greater than about 0.5 g/sec$^{0.5}$, or greater than about 0.75 g/sec$^{0.5}$, or greater than about 1.0 g/sec$^{0.5}$, or greater than about 1.60 g/sec$^{0.5}$, or greater than about 1.65 g/sec$^{0.5}$, or greater than about 1.70 g/sec$^{0.5}$, or greater than about 1.75 g/sec$^{0.5}$, or greater than about 1.80 g/sec$^{0.5}$, or greater than about 1.82 g/sec$^{0.5}$, or greater than about 1.85 g/sec$^{0.5}$, or greater than about 1.88 g/sec$^{0.5}$, or greater than about 1.90 g/sec$^{0.5}$, or greater than about 1.95 g/sec$^{0.5}$, or greater than about 2.00 g/sec$^{0.5}$, or between about 1.60 g/sec$^{0.5}$ and about 2.50 g/sec$^{0.5}$, between about 1.0 g/sec$^{0.5}$ and about 2.0 g/sec$^{0.5}$, or between about 2.0 g/sec$^{0.5}$ and about 2.50 g/sec$^{0.5}$, or between about 0.3 g/sec$^{0.5}$ and about 0.7 g/sec$^{0.5}$, or between about 1.0 g/sec$^{0.5}$ and about 1.50 g/sec$^{0.5}$, or between about 0.3 g/sec$^{0.5}$ and about 0.9 g/sec$^{0.5}$, or between about 1.65 g/sec$^{0.5}$ and about 2.50 g/sec$^{0.5}$, or between about 1.70 g/sec$^{0.5}$ and about 2.40 g/sec$^{0.5}$, or between about 1.75 g/sec$^{0.5}$ and about 2.30 g/sec$^{0.5}$, or between about 1.80 g/sec$^{0.5}$ and about 2.20 g/sec$^{0.5}$, or between about 1.82 g/sec$^{0.5}$ and about 2.10 g/sec$^{0.5}$, or between about 1.85 g/sec$^{0.5}$ and about 2.00 g/sec$^{0.5}$, specifically reciting all increments of 0.1 g/sec$^{0.5}$ within the above-recited ranges and all ranges formed therein or thereby;

a plate stiffness of greater than about 0.3 N*mm, or greater than about 0.5 N*mm, or greater than about 1.0 N*mm, or greater than about 2.0 N*mm, or greater than about 4.0 N*mm, or greater than about 6.0 N*mm, or greater than about 8.0 N*mm, or greater than about 12.0 N*mm, or greater than about 12.5 N*mm, or greater than about 13.0 N*mm, or greater than about 13.5 N*mm, or greater than about 14 N*mm, or greater than about 14.5 N*mm, or greater than about 15 N*mm, or greater than about 15.5 N*mm, or greater than about 16 N*mm, or greater than about 16.5 N*mm, or greater than about 17 N*mm, or between about 0.3 N*mm and about 20 N*mm, or between about 1 N*mm and about 20 N*mm, or between about 2 N*mm and about 20 N*mm, or between about 4 N*mm and about 20 N*mm, or between about 6 N*mm and about 20 N*mm, or between about 8 N*mm and about 20 N*mm, or between about 10 N*mm and about 20 N*mm, or between about 12 N*mm and about 20 N*mm, or between about 12.5 N*mm and about 20 N*mm, or between about 13 N*mm and about 20 N*mm, or between about 13.5 N*mm and about 20 N*mm, or between about 14 N*mm between about 20 N*mm, or between about 14.5 N*mm and about 20 N*mm, or between about 15 N*mm and about 20 N*mm, or between about 15.5 N*mm and about 20 N*mm, or between about 16 N*mm and about 20 N*mm, or between about 16.5 N*mm and about 20 N*mm, or between about 17 N*mm and about 20 N*mm, specifically reciting all increments of 0.1 N*mm within the above-recited ranges and all ranges formed therein or thereby;

a resilient bulk of greater than about 25 cm³/g, or greater than about 29 cm³/g, or greater than about 40 cm³/g, or greater than about 50 cm³/g, or greater than about 60 cm³/g, or greater than about 62 cm³/g, or greater than about 75 cm³/g, or greater than about 85 cm³/g, or greater than about 90 cm³/g, or greater than about 95 cm³/g, or greater than about 100 cm³/g, or greater than about 102 cm³/g, or greater than about 105 cm³/g, or between about 29 cm³/g and about 112 cm³/g, or between about 29 cm³/g and about 103 cm³/g, or between about 40 cm³/g and about 100 cm³/g, or between about 50 cm³/g and about 75 cm³/g, or between about 55 cm³/g and 70 cm³/g, or between about 85 cm³/g and about 110 cm³/g, or between about 90 cm³/g and about 110 cm³/g, or between about 95 cm³/g and about 110 cm³/g, or between about 100 cm³/g and about 110 cm³/g, specifically reciting all increments of 1 cm³/g within the above-recited ranges and all ranges formed therein or thereby;

a total wet tensile of greater than about 50 g/in, or greater than about 75 g/in, or greater than about 100 g/in, or greater than about 200 g/in, or greater than about 300 g/in, or greater than about 400 g/in, or greater than about 450 g/in, or greater than about 470 g/in, or greater than about 500 g/in, or greater than about 550 g/in, or greater than about 600 g/in, or greater than about 650 g/in, or greater than about 700 g/in, or greater than about 750 g/in, or greater than about 758 g/in, or greater than about 800 g/in, or greater than about 850 g/in, or greater than about 900 g/in, or greater than about 2278.or between about 350 g/in and about 475 g/in, or between about 420 g/in and about 440 g/in, or between about 100 g/in and about 640 g/in, or between about 300 g/in and about 1000 g/in, or between about 400 g/in and about 900 g/in, or between about 500 g/in and about 900 g/in, or between about 550 g/in and about 900 g/in, or between about 600 g/in and about 900 g/in, or between about 650 g/in and about 900 g/in, or between about 700 g/in and about 900 g/in, specifically reciting all increments of 10 g/in within the above-recited ranges and all ranges formed therein or thereby;

a total wet tensile (Finch) of greater than about between about 10 g/in and about 125 g/in, or between about 20 g/in and about 55 g/in, or between about 30 g/in and about 100 g/in, or between about 10 g/in and about 65 g/in, specifically reciting all increments of 1 g/in within the above-recited ranges and all ranges formed therein or thereby;

a dry burst (peak load) strength of greater than about 250 g, or greater than about 400 g, or greater than about 600 g, or greater than about 800 g, or greater than about 1000 g, or greater than about 1200 g, or greater than about 1300 g, or greater than about 1400 g, or between about 250 g and about 1500 g, or between about 400 g and about 1500 g, or between about 600 g and about 1500 g, or between about 800 g and about 1450 g, or between about 1000 g and about 1400 g; a wet burst (peak load) strength of greater than about 3 g, greater than about 5 g, or greater than about 10 g, or greater than about 20 g, or greater than about 50 g, or greater than about 55 g, or greater than about 75 g, or greater than about 100 g, or greater than about 115 g, or greater than about 150 g, or greater than about 177 g, or greater than about 200 g, or greater than about 300 g, or greater than about 350 g, or greater than about 400 g, or greater than about 450 g, or greater than about 478 g, or greater than about 500 g, or greater than about 550 g, or greater than about 600 g, or between about 20 g and about 530 g, or between about 3 g and about 22 g, or between about 25 g and about 52 g, or between about 230 g and about 525 g, or between about 180 g and about 525 g, or between about 200 g and about 700 g, or between about 350 g and about 600 g, or between about 350 g and about 550 g, or between about 400 g and about 550 g, or between about 400 g and about 525 g, or between about 50 g and about 220 g, or between about 50 g and about 60 g, or between about 50 g and 55 g, specifically reciting all increments of 10 g within the above-recited ranges and all ranges formed therein or thereby;

a flexural rigidity (avg.) of greater than about 40 mg-cm, greater than about 75 mg-cm, greater than about 175 mg-cm, 100, greater than about 125 mg-cm, greater than about 150 mg-cm, greater than about 175 mg-cm, greater than about 200 mg-cm, or greater than about 700 mg-cm, or greater than about 800 mg-cm, or greater than about 900 mg-cm, or greater than about 1000 mg-cm, or greater than about 1100 mg-cm, or greater than about 1200 mg-cm, or greater than about 1300 mg-cm, or greater than about 1400 mg-cm, or greater than about 1500 mg-cm, or greater than about 1600 mg-cm, or greater than about 1700 mg-cm, or between about 40 mg-cm and about 200 mg-cm, or between about 60 mg-cm and about 150 mg-cm, or between about 80 mg-cm and about 125 mg-cm, or between about 80 mg-cm and about 100 mg-cm, or between about 700 mg-cm and about 1800 mg-cm, or between about 800 mg-cm and about 1600 mg-cm, or between about 900 mg-cm and about 1400 mg-cm, or between about 1000 mg-cm and about 1350 mg-cm, or between about 1050 mg-cm and about 1350 mg-cm, or between about 1100 mg-cm and about 1350 mg-cm, or between about 1100 mg-cm and about 1300 mg-cm, specifically reciting all increments of 10 mg-cm within the above-recited ranges and all ranges formed therein or thereby;

a dry caliper of greater than about 4.0 mils, or greater than about 10.0 mils, or greater than about 15.0 mils, or greater than about 20.0 mils, or than about 26.0 mils, or than about 28.0 mils, or greater than about 40 mils, or greater than about 55 mils, or between about 4.0 mils and about 27.0 mils, or between about 18.0 mils and about 24.0 mils, or between about 45.0 mils and about 51.0 mils, or between about 29 mils and about 33.0 mils, or between about 19.0 mils and about 43.0 mils, or about 26.0 mils and about 80.0 mils, or between 40.0 mils and 60.0 mils, or between about 50 and about 60 mils, specifically reciting all increments of 0.10 mils within the above-recited ranges and all ranges formed therein or thereby;

a wet caliper of greater than about 8.0 mils, or greater than about 10.0 mils, or greater than about 15.0 mils, or greater than about 17.0 mils, or greater than about 26 mils, or between about 10.0 mils and about 33.0 mils, or between about 15.0 mils and about 25.0 mils, or between about 8.0 mils and about 20.0 mils, or between about 26.0 mils and about 70.0 mils, or between about 26.0 mils and about 40.0 mils, specifically reciting all increments of 0.10 mils within the above-recited ranges and all ranges formed therein or thereby;

a total dry tensile (total tensile) of greater than about 250 g/in, or greater than about 400 g/in, or greater than about 500 g/in, or greater than about 700 g/in, or greater than about 800 g/in, or greater than about 1000 g/in, or greater than about 1200 g/in, or greater than about 1300 g/in, or greater than about 1700 g/in, or greater than about 2278 g/in, or between about 880 g/in and about 2570 g/in, or between about 1800 g/in and about 2485 g/in, or between about 1900 g/in and about 2300 g/in, or between about 250 g/in and about 1000 g/in, or between about 400 g/in and about 580 g/in, or between about 700 g/in and about 800 g/in, or between about 275 g/in and about 1310 g/in, or about 1300 g/in and about 4000 g/in, or between about 1800 g/in and about 2800 g/in, specifically reciting all increments of 10 g/in within the above-recited ranges and all ranges formed therein or thereby;

a geometric mean (GM) dry modulus of greater than about 1000 g/cm, or greater than about 1700 g/cm, or less than about 3320 g/cm, or less than about 2500 g/cm, or less than about 2400 g/cm, or less than about 2300 g/cm, or less than about 2000 g/cm, or less than about 1500 g/cm, or less than about 1000 g/cm, or between about 1800 g/cm and about 4000 g/cm, or between about 1800 g/cm and about 3500 g/cm, or between about 3300 g/cm and about 3350 g/cm, specifically reciting all increments of 10 g/cm within the above-recited ranges and all ranges formed therein or thereby;

a wet tensile geometric mean (GM) modulus of greater than about 250 g/cm, or greater than about 375 g/cm, or between about 250 g/cm and about 700 g/cm, or between about 250 g/cm and about 525 g/cm, or between about 375 g/cm and 525 g/cm, specifically reciting all increments of 10 g/cm within the above-recited ranges and all ranges formed therein or thereby;

a CRT rate of greater than about 0.30 g/sec, or greater than about 0.5 g/sec, or greater than about 0.55 g/sec, or greater than about 0.6 g/sec, or greater than about 0.61 g/sec, or greater than about 0.65 g/sec, or greater than about 0.7 g/sec, or greater than about 0.75 g/sec, or greater than about 0.8 g/sec, or between about 0.30 g/sec and about 1.00 g/sec, or between about 0.61 g/sec and about 0.85 g/sec, specifically reciting all increments of 0.05 g/sec within the above-recited ranges and all ranges formed therein or thereby;

a CRT capacity of greater than about 10.0 g/g, or greater than about 12.5 g/g, or between about 12.5 g/g and about 23.0 g/g, or between about 16.5 g/g and about 21.5 g/g, specifically reciting all increments of 0.1 g/g within the above-recited ranges and all ranges formed therein or thereby; a kinetic CoF of greater than about 0.75, or greater than about 0.85, or between about 0.85 and about 1.30, or between about 0.77 and about 1.7, or between about 0.85 and about 1.20, specifically reciting all increments of 0.05 within the above-recited ranges and all ranges formed therein or thereby;

a dry depth of more negative than −240 um, or more negative than −255 um, or more negative than −265 um, or more negative than −275 um, or more negative than −285 um, or more negative than −295 um, or more negative than −300 um, or between about −240 um and about −310 um, or between about −245 um and about −305 um, or between about −255 um and about −303 um, or between about −265 um and about −302 um, or between about −275 um and about −300 um, specifically reciting all increments of 20 um within the above-recited ranges and all ranges formed therein or thereby;

a moist depth of more negative than −275 um, or more negative than −285 um, or more negative than −295 um, or more negative than −300 um, or more negative than −310 um, or more negative than −320 um, or more negative than −330 um, or between about −275 um and about −340 um, or between about −285 um and about −335 um, or between about −295 um and about −332 um, or between about −300 um and about −330 um, or between about −305 um and about −328 um, specifically reciting all increments of 20 um within the above-recited ranges and all ranges formed therein or thereby;

a moist contact area of greater than 25%, or greater than 27%, or greater than 29%, or greater than 31%, or greater than 32%, or greater than 34%, or greater than 36%, or between about 25% and about 38%, or between about 27% and about 37%, or between about 29% and about 36%, or between about 30% and about 35%, or between about 31% and about 34%, specifically reciting all increments of 1% within the above-recited ranges and all ranges formed therein or thereby;

a dry contact area of greater than 17%, or greater than 20%, or greater than 22%, or greater than 24%, or greater than 26%, or greater than 28%, or greater than 30%, or between about 17% and about 33%, or between about 20% and about 31%, or between about 22% and about 30%, or between about 23% and about 30%, or between about 24% and about 29%, specifically reciting all increments of 1% within the above-recited ranges and all ranges formed therein or thereby;

a dry compression (at 10 g force in mils) of greater than about 30 mils, or greater than about 45 mils, or greater than about 50 mils, or greater than about 55 mils, or greater than about 60 mils, or greater than about 65 mils, or greater than about 70, or greater than about 85 mils, or between about 40 mils and about 100 mils, or between about 50 mils and about 80 mils, or between about 50 mils and about 65 mils, or between about 50 mils and about 60 mils, or between about 55 mils and about 60 mils, specifically reciting all increments of 5 mil within the above-recited ranges and all ranges formed therein or thereby;

a wet compression (at 10 g force value) in mils of greater than about 30 mils, or greater than about 20 mils, or greater than about 30 mils, or greater than about 40 mils, or greater than about 50 mils, or greater than about 55, or greater than about 60 mils, or greater than about 70 mils, or between about 30 mils and about 100 mils, or between about 40 mils and about 70 mils, or between about 45 mils and about 60 mils, or between about 47 mils and about 58 mils, or between about 50 mils and about 55 mils, specifically reciting all increments of 5 mils within the above-recited ranges and all ranges formed therein or thereby;

a dry bulk ratio of greater than about 15, or greater than about 18, or greater than about 22, or greater than about 25, or greater than about 27, or greater than about 33, or greater than about 35, or greater than about 40, or greater than about 50, or between about 15 and about 60, or between about 22 and about 50, or between about 25 and about 35, or between about 27 and about 35, or between about 27 and about 33, specifically reciting all increments of 0.5 within the above-recited ranges and all ranges formed therein or thereby;

a wet bulk ratio of greater than about 20, or greater than about 22, or greater than about 25, or greater than about 28, or greater than about 30, or greater than about 34, or greater than about 40, or greater than about 45, or greater than about 50, or greater than about 55, or between about 22 and about 50, or between about 20 and about 50, or between about 25 and about 45, or between about 28 and about 40, or between about 30 and about 34, specifically reciting all increments of 0.5 inches within the above-recited ranges and all ranges formed therein or thereby;

a wet burst strength to dry tensile ratio ("wet burst/dry tensile ratio" which is wet burst strength divided by dry tensile) of greater than about 0.05, greater than about 0.09, greater than about 0.1, greater than about 0.15, greater than about 0.18, greater than about 0.20, greater than about 0.24, or greater than about 0.26, or between about 0.05 and about 0.27, or between about 0.15 and about 0.26, or between about 0.20 and about 0.26;

a wet burst strength to dry burst strength ratio ("wet/dry burst strength ratio" which is wet burst strength divided by dry burst strength) of greater than about 0.09, or greater than about 0.10, or greater than about 0.18, or greater than about 0.19, or greater than about 0.20, or greater than about 0.30, or greater than about 0.40, or between about 0.10 and about 0.50, or between about 0.20 and about 0.48, or between about 0.30 and about 0.46, or between about 0.40 and about 0.46; a concavity ratio measurement of greater than about 0.1, or greater than about 0.15, or greater than about 0.20, or greater than about 0.25, or greater than about 0.30, or greater than about 0.35, or greater than about 0.40, or greater than about 0.45, or greater than about 0.50, or greater than about 0.55, or greater than about 1.0, or greater than about 1.25, or greater than about 1.5, or between about 0.10 and about 0.95, or between about 0.15 and about 0.90, or between about 0.20 and about 0.85, specifically reciting all increments of 0.01 within the above-recited ranges and all ranges formed therein or thereby; and/or a packing fraction measurement of greater than about 0.05, or greater than about 0.08, or greater than about 0.10, or greater than about 0.12, or greater than about 0.15, or greater than about 0.17, or between about 0.05 and about 0.75, or between about 0.10 and about 0.80, or between about 0.15 and about 0.85, specifically reciting all increments of 0.01 within the above-recited ranges and all ranges formed therein or thereby.

Fibrous structure(s) of the present disclosure comprising non-wood fibers may have one or a combination of the above properties (disclosed in this Properties of Fibrous Structure(s) Section).

Softness

Of particular interest is softness of the fibrous structure. This is where so many sustainable sanitary tissue products fail and the art does not disclose how to achieve soft fibrous structures comprising bamboo and/or other sustainable non-wood fibers. This becomes truer as non-wood fiber inclusion increases. Surprisingly, the inventors have found that adding coarse bamboo fibers (bamboo is especially coarse versus eucalyptus) into the fibrous structure, even at high inclusion levels, and/or even disposed at a consumer-facing side of a sheet, can result in products with good softness. There are a number of ways the inventors have accomplished this, including creation of differential densities, utilizing unique layering, and/or fiber mixes. Details of such are in the specification below.

Also, surprisingly, the inventors of the present disclosure have found that they are able to deliver soft fibrous structures that have low lint values. Typically, higher lint values accompany greater softness values (e.g., TS7, TS750). Beyond the difficulties of processing fibrous structures that are linty, lint can cause unwanted debris at the point of use, which can be messy and can be aesthetically undesirable. Thus, it is of great benefit to achieve greater softness while maintaining lower lint values. Thus, the inventors have not only improved sustainable fibrous structures, but have improved the general offering of fibrous structures beyond what is otherwise available today, even including what is available on the shelf today as a high-tier offerings consisting only of wood fibers. FIG. 1A illustrates TS7 values of a sanitary tissue products of the present disclosure and FIG. 1C illustrates TS7 and lint values of sanitary tissue products of the present disclosure.

Coverage

Sanitary tissue products (e.g., bath tissue sheets) are often comprised of substantial portions of eucalyptus fibers, especially at a consumer-facing layer. Thus, as one incorporates higher levels of bamboo, one is necessarily replacing the short, narrow, and low coarseness eucalyptus fibers with longer, wider, and coarser bamboo fibers.

It is known in the art that fiber coverage is an important consideration when making premium sanitary tissue products. Fiber coverage can be thought of as the average number of fibers that would be encountered as one travels normal to the surface of the product (i.e., travels in the z-direction). Included in the calculation of fiber coverage are fiber coarseness (mg/m), fiber width (mm), and basis weight (gsm). A contradiction that paper (fibrous structures and, more particularly, sanitary tissue products) makers contend with is how to design a strong, yet soft substrate. This has previously been achieved through the judicious choice and layering of wood-based fibers. Long and easily bonded fibers such as softwoods are used in a sheet for strength, while short, thin, and low coarseness fibers such as eucalyptus are used for softness. These short, thin, and low coarseness eucalyptus fibers also provide a high level of fiber coverage in the sheet, aiding in hand protection and other aspects of absorbency.

While the art has disclosed that low coarseness bamboo can be used in toilet tissue, the inventors of the present disclosure have, surprisingly, found that adding much higher coarseness bamboo into the sheet, even at high inclusion levels, and against the consumer (i.e., on a consumer-facing surface), can result in products with good softness and low levels of lint. The bamboo fibers tested are also wider (18.9 um) than in previous examples. These coarse and wide bamboo fibers create substrates with lower fiber coverage at a given basis weight. Further, it has been surprisingly shown that the introduction of coarser, non-wood fibers such as bamboo, which create lower fiber coverage substates, can still create products that can successfully balance the traditional strength-softness contradiction. These improvements may be achieved, at least in part, through jet/wire velocity adjustments, varying levels of foreshortening at the wire/belt interface and at creping, and through creping geometry changes.

As indicated in this section above, one key part of consumer acceptance is hand protection. One way to improve hand protection is via increased fiber coverage in the sheet. This can be done by increasing basis weight or by choosing fibers that have a high specific surface area per weight. Fiber attributes that are tied to specific surface area are length, width, and coarseness. These characteristics can be used to create a stochastic model that projects fibers as rectangles laid out as bricks. Knowing the length, width, and weight of each brick then allows one to determine how much area a given weight of fibers would cover if they were arranged perfectly flat next to each other. Dividing the coarseness by fiber width results in the g/m^2-layer value. By comparing that weight per area (g/m^2) versus the actual weight per area of a sheet can give one the number of fiber layers (coverage) expected in the sheet. Of interest, when replacing eucalyptus with bamboo, the number of fiber layers (coverage) present at a given total sheet weight decreases.

Another way to address hand protection is to have a lower density sheet. At a given basis weight, lowering the density will increase the caliper of the sheet. This higher caliper will result in the hand being farther away from the material being removed, improving hand protection.

The papermaker is always conscious of manufacturing costs while striving to make superior products. Thus, the contradiction of increased weight versus fiber choice versus density is a consideration that should be kept in mind. It has surprisingly been found that the judicious layering of non-wood and/or wood fibers in a low-density sheet will allow for good hand protection.

Further relating to judicious layering, from a product quality perspective, there is a positive correlation between softness and lint. More lint generally means that the product is perceived as softer, but too much lint is not preferred by the consumer. One or two layer sanitary tissue products may be desirable because they require less equipment (fan pumps, stock chests, etc.) and simpler (single or dual layer headboxes versus a 3 layered headbox). In a one layer embodiment, and often in a two layer non-wood containing sanitary tissue product, the non-wood will be consumer facing—so, getting the right balance of softness, as characterized by lint, is critical. Adding a third layer gives another degree of freedom to the product designer, such that they could sequester part or all of the less desirable non-wood fibers in the center or non-consumer layers. A third layer also allows the Yankee contacting layer to have lower or no non-wood fibers contacting the surface. This results in a process which is easier to run, as the non-wood fibers have less interaction with the complex chemical and physical interactions with the glue coating and creping process. So, a three layered non-wood sanitary tissue product has more degrees of freedom from a design standpoint, is easier to run from a Yankee coating standpoint, and is more complex from an equipment standpoint. A one or two layer sanitary tissue product is more difficult to properly design to meet the consumer needs and more difficult to run from a Yankee coating standpoint. However, if these hurdles of a one or two layer embodiment can be overcome, they are desirable because they are made by a less complex process.

Absorption

In the design of fibrous structures, particularly sanitary tissue products, such as paper towels, bath tissue, and facial tissue, there are many characteristics that must be met in order to make a consumer desirable product. A couple of those consumer-desired characteristics are good absorbency and hand protection.

It is believed that having high volumetric absorption capacity at relatively small pore radii is consumer preferred, especially for multi-ply products, as the water that is absorbed at those small pore sizes is tenaciously held onto by the absorbent material in the product. In multi-ply constructions, these "functional" pore sizes can be between 2.5 and 200 microns. When fluid is absorbed into these pores it tends to remain in the substrate more than fluid that is taken up by larger pores.

One typical way to increase smaller pores is replacement of coarse softwood fibers with shorter, thinner, and lower coarseness hardwoods like eucalyptus. The increase in eucalyptus may be desirably balanced with the addition of softwoods such as NSK in order to maintain acceptable strength characteristics.

Upon experimentation, it has been surprisingly shown that the introduction of coarser, non-wood fibers such as bamboo can still create a high level of 2.5-200 micron (and ranges therebetween) volumetric capacity while still maintaining acceptable strength characteristics.

Desorption

Continuing with the discussion in the previous section (Absorption), without being bound by theory, regarding desorption, it is believed that having a high volumetric desorption capacity at relatively small pore radii is consumer preferred, especially for multiply products, as the water that is desorbed at those small pore sizes is water that was initially absorbed in the functional structure itself. When a wetting fluid is absorbed into a substrate, the mechanically imparted features (those imposed while the substrate is substantially dry, such as creping or embossing) relax, partially collapsing the structure. While these mechanically imparted features are important in the consumer experience, they are not resilient after fluid insult. Desorption curves can therefore be interpreted as a good characterization of the wet structure of the material. Maximizing the 2.5-200 micron (and ranges therebetween) desorption volume will result in a sheet that has a greater "functional" absorbent volume. This is a good indicator of consumer-preferred absorbency, as water that is absorbed in the structure will be less likely to come back out of the material, better protecting the consumer from the mess.

As said in the Absorption Section above, upon experimentation, it has been surprisingly shown that the introduction of coarser, non-wood fibers such as bamboo can still create a high level of 2.5-200 micron (and ranges therebetween) volumetric capacity while still maintaining acceptable strength characteristics.

VFS

Continuing with the discussion in the three previous sections (Absorption, Desorption, and Desorption-Absorption Hysteresis), it is believed that having high vertical full sheet ("VFS") absorbent capacity in a substrate is consumer preferred for absorption and hand protection. By its nature, the VFS measurement is believed to accurately characterize how much fluid is tightly held within plies of a substrate, as fluid that is in between plies, or loosely held within a ply, will drain out when the sheet goes to the (near) vertical position. This remaining tightly held fluid is thought to be fluid that would more slowly reach the hand of a consumer, resulting in improved hand protection.

One typical way to increase the VFS of a substrate is to create structures of low coarseness fibers, which are more prone to tightly holding onto water via a finer fiber network and pore structure. Upon experimentation, it has been surprisingly shown that the introduction of coarse, non-wood fibers such as bamboo can still create high VFS capacity substrates while still maintaining acceptable strength characteristics.

Upon experimentation, it has been surprisingly shown that the introduction of coarse, non-wood fibers such as bamboo can still create high VFS capacity substrates while still maintaining acceptable strength characteristics.

Slip-Stick

Continuing with the discussion in the four previous sections (Absorption, Desorption, Desorption-Absorption Hysteresis, and VFS), related to softness, another consumer-desired characteristic is surface smoothness/glide. It is thought that having low slip-stick values in a fibrous structure is consumer preferred, as the test is a good metric for quantifying how much "glide" a substrate has. Typical design levers for improving the slip stick of a substrate is to increase smoothness via calendaring, or to replace coarser softwood fibers with shorter, thinner, and lower coarseness hardwood fibers such as eucalyptus. The increase in eucalyptus may desirably be balanced with the addition of softwoods such as NSK in order to maintain acceptable strength characteristics.

Upon experimentation, it has been surprisingly shown that the introduction of coarse, non-wood fibers such as bamboo can still create low slip stick substrates while still maintaining acceptable strength characteristics. FIG. 1B illustrates slip-stick values of a sanitary tissue products of the present disclosure.

Absorbent and Strong (Wet)

It may be desirable for sanitary tissue products of the present disclosure, such as paper towels, to be strong when wet, while also being absorbent. This combination is often a contradiction due to the underlying physics. In order to have a strong paper towel, it must be comprised of many fibers that are strong, that are strongly bonded together, and that have been treated with a chemistry that protects the bonding between fibers when wet. A structure that is designed to maximize those characteristics, however, will not absorb quickly or to a high capacity, as the aforementioned structure would also have minimal interplay voids, retarding water absorption into the substrate. Softwood fibers, for example, are desirous for creating such structures, due to their fiber coarseness, length, and width. This source of fiber, however, is coming under increasing environmental pressure. It is therefore desirable to develop wetlaid structures with weaker, lower coarseness, fibers that still exhibit superior strength when wet and absorbency. It has surprisingly been found that, despite the often non-desirable (i.e., non-wood have much different characteristics versus conventional wood fibers and behave much differently) characteristics of non-wood fibers, it is still possible to achieve high levels of absorbency and wet strength in a non-wood containing substrate—see, for example, FIG. 2F.

Bidirectional Strength

Given the different nature of the wetlaid papermaking process to that of a woven substrate, there are many differences in the characteristics between durable substrates and sanitary tissue products. One difference in particular is the strength and durability of durable substrates vs. sanitary tissue products: the former, being comprised of woven filaments that are ostensibly continuous, exhibit very high strength when compared to the latter, which are comprised of hydrogen bonded cellulosic fibers. Directional differences in wetlaid structures are present due to the hydrodynamics of continuous forming, the use of discrete fibers, and the nonisometric forces that are imparted on the substrate during making Often, the weaker direction of a substrate is the CD, and improving strength and stretch characteristics in that direction improves the overall consumer experience by making the paper towel less prone to failure while in use. Ways to improve CD strength and stretch characteristics include the judicious choice of papermaking fibers, balancing the ability of the fibers to bond with their strength characteristics, process settings on the papermaking machine, such as refining or forming conditions, and the distribution of the heterogenous density zones in the sheet. Refined softwood fibers, for example, are desirous for creating such structures, due to their fiber coarseness, length, and strength. This source of fiber, however, is coming under increasing environmental pressure. It is therefore desirable to develop wetlaid substrates with weaker, shorter, or lower coarseness fibers that can still be implemented in structures that exhibit high levels of bidirectional strength. It has surprisingly been found that, despite the lower coarseness, shorter fiber length, and/or narrower width of non-wood fibers, it is still possible to achieve high levels of bidirectional strength in a non-wood containing substrate—see, for example, FIGS. 2J, 2K, and 2L.

Bulky and Strong (Wet)

It may be desirable for sanitary tissue products of the present disclosure, such as paper towels, to be strong when wet, while also being bulky when dry. Being strong when wet facilitates easy cleanup of messes, while having a high bulk sheet signals clothlike durability, spongelike absorbency, and other characteristics typical of durable substrates. However, this combination is often a contradiction due to the underlying physics. Typically, in order to have a strong paper towel, it must be comprised of many fibers that are strong, that are strongly bonded together, and that have been treated with a chemistry that protects the bonding between fibers when wet. A structure that is designed to maximize those characteristics, however, will not be bulky. A monoplanar layer of tightly bonded cellulose fibers would result in a flat, dense sheet that, while strong when wet, would have a very low bulk when dry. Typically, ways to improve dry bulk include the judicious choice of papermaking fibers, balancing the ability of the fibers to bond with their strength characteristics, process settings on the papermaking machine, such as refining or forming conditions, and the distribution of the heterogenous density zones in the sheet. Refined softwood fibers, for example, are often desirous for creating such structures, due to their fiber coarseness, length, and strength. This source of fiber, however, is coming under increasing environmental pressure. It is therefore desirable to develop wetlaid structures with weaker, shorter, or lower coarseness fibers that can still be implemented in a structure that exhibits superior wet strength and bulk when dry. It has surprisingly been found that, despite the often non-desirable (i.e., non-wood have much different characteristics versus conventional wood fibers and behave much differently) characteristics of non-wood fibers, it is still possible to achieve high levels of wet strength and dry bulk in a non-wood containing sanitary tissue product.

Durable and Strong (Wet)

It may be desirable for sanitary tissue products of the present disclosure, such as paper towels, to be strong when wet, while also being durable (i.e., being able to maintain integrity during cyclic stressing of the substrate, for example during scrubbing). This combination is often a contradiction due to the underlying physics. In order to have a strong paper towel, it must be comprised of many fibers that are strong, that are strongly bonded together, and that have been treated with a chemistry that protects the bonding between fibers when wet. A structure that is designed to maximize those characteristics, however, will not be durable, as a sheet that is comprised of tightly bonded, millimeter sized fibers will pick up load quickly in a tensile test and fail at relatively low percentages of stretch, contributing to low durability. Ways to improve the wet durability include the judicious choice of papermaking fibers, balancing the ability of the fibers to bond with their strength characteristics, process settings on the papermaking machine, such as refining or forming conditions, and the distribution of the heterogenous density zones in the sheet. Refined softwood fibers, for example, are desirous for creating such structures, due to their fiber coarseness, length, and strength. This source of fiber, however, is coming under increasing environmental pressure. It is therefore desirable to develop wetlaid structures with weaker, shorter, or lower coarseness fibers that can still be implemented in a structure that exhibits superior wet strength and durability. It has surprisingly been found that, despite the often non-desirable (i.e., non-wood fibers have much different characteristics versus conventional wood fibers and behave much differently) characteristics of non-wood fibers, it is still possible to achieve high levels of durability in a non-wood containing substrate.

Soft (Dry) and Strong (Wet)

It may be desirable for sanitary tissue products of the present disclosure, such as paper towels, to be soft when dry, yet strong when wet. Being strong when wet facilitates easy cleanup of messes, yet due to the strong fibers, dense fiber network, and high levels of fiber bonding needed, the resultant substrate will be very rough when dry. Conversely, a substrate that is soft when dry will have lower strength, lower coarseness fibers that are lightly bonded together with much interstitial space inside the ply. While cushiony and soft to the touch, such a substrate would be very weak when wet due to the aforementioned structure and low levels of bonding. Ways to improve softness when dry include the judicious choice of papermaking fibers, balancing the ability of the fibers to bond with their strength characteristics, process settings on the papermaking machine, such as refining or forming conditions, and the distribution of the heterogenous density zones in the sheet. Combinations of hardwood and softwood fibers are often used to strike an appropriate balance. Refined softwood fibers, for example, are desirous for creating strength when wet, due to their high fiber coarseness, long length, and high strength. Hardwood fibers are desirous for improving softness when dry, due to their low coarseness and length. These sources of fiber, however, are coming under increasing environmental pressures. It is therefore desirable to develop wetlaid structures with weaker, shorter, or lower coarseness fibers that can still be implemented in a structure that exhibits superior wet strength and softness when dry. It has surprisingly been found that, despite the often non-desirable (i.e., non-wood have much different characteristics versus conventional wood fibers and behave much differently) characteristics of non-wood fibers, it is still possible to achieve high levels of wet strength and dry softness in a non-wood (e.g., abaca) containing substrate—see, for example, FIG. 2G.

Strong and Durable

Given the different nature of the wetlaid papermaking process to that of a woven substrate, there are many differences in the characteristics between durable substrates and sanitary tissue products. One difference in particular is the strength and durability of durable substrates vs. sanitary tissue products: the former, being comprised of woven filaments that are ostensibly continuous, exhibit very high strength when compared to the latter, which are comprised of hydrogen bonded cellulosic fibers. Directional differences in wetlaid structures are present due to the hydrodynamics of continuous forming, the use of discrete fibers, and the nonisometric forces that are imparted on the substrate during making. Often, the weaker direction of a substrate is the CD, and improving strength and stretch characteristics in that direction improves the overall consumer experience by making the paper towel less prone to failure while in use. Ways to improve dry durability include the judicious choice of papermaking fibers, balancing the ability of the fibers to bond with their strength characteristics, process settings on the papermaking machine, such as refining or forming conditions, and the distribution of the heterogenous density zones in the sheet. Refined softwood fibers, for example, are desirous for creating such structures, due to their fiber coarseness, length, and strength. This source of fiber, however, is coming under increasing environmental pressure. It is therefore desirable to develop wetlaid structures with weaker, shorter, or lower coarseness fibers that can still be implemented in a structure that exhibits superior strength and durability when dry. It has surprisingly been found that, despite the often non-desirable (i.e., non-wood have much different characteristics versus conventional wood fibers and behave much differently) characteristics of non-wood fibers, it is still possible to achieve high levels of strength and durability in a non-wood containing substrate.

Soft and Strong

Given the different nature of the wetlaid papermaking process to that of created a woven substrate, there are many differences in the characteristics between durable substrates and sanitary tissue products. One difference is the relationship between strength and softness. Since wetlaid materials are comprised of fibers of approximately 5 mm or less, network strength is a function of both the fiber itself as well as the bonding between the fibers. Fiber to fiber bonding is typically improved through refining, a mechanical process that modifies the fibers. Without being bound by theory, it is believed that the mechanical energy from refining delaminates cell walls, externally fibrillates the fibers, and releases hemicellulose based gels, which improve the relative bonded area between fibers and the overall strength of the substrate. This increase in strength, however, is often at the cost of decreased softness, which can be described via tensile modulus. High tensile moduli are associated with lower softness sheets. Additionally, the strength of the fiber itself is typically a function of fiber cell wall thickness and fiber diameter. Non-woods have been found to typically have a higher degree of external fibrillation, shorter fiber lengths, and/or lower coarseness than softwoods. A substrate comprised of these fibers would therefore be expected to exhibit a lower strength, less soft sheet. It has surprisingly been found that, despite the often non-desirable (i.e., non-wood have much different characteristics versus conventional wood fibers and behave much differently) characteristics of non-wood fibers, it is still possible to create a substrate that has high levels of strength and is soft—see, for example, FIGS. 1D, 2B, 2C, 2D, and 2E.

Surprisingly, the inventors of the present disclosure have discovered that many of the above-referenced properties and characteristics can be achieved by replacing conventional wood fibers with non-wood fibers. For example, replacing refined long fiber northern and southern softwood kraft with abaca can help to achieve the desired strength of the fibrous structure. It may be desirable to combine abaca with a sustainable hardwood (e.g., eucalyptus) that is short and coarse (i.e. stiff, capable of preventing collapse). Particularly regarding using abaca for its strength characteristics as described in this paragraph, it is desirable to keep it from collapsing into a tightly bonded, rough, thin network with little variation in pore size. It may be further desirable to form such fibrous structures with fiber in patterns comprising higher degrees of pillow modulation; such fiber mixes and belt patterns can result in surprisingly high dry strength, wet strength, caliper, and surface texture with surface softness and absorbency. This surprising result may be increased by increasing molding conditions such as structuring belt pattern, belt overburden, crepe and/or wire to press draw. The inventors hypothesize that the long, high carboxyl abaca readily bonds around the short, coarse fibers, thus maintaining strength but building caliper, porosity, absorbency, and softness. In this way, the non-wood (e.g., abaca) helps to maximize diversity in pore size to enhance softness and absorbency while maintaining strength. More particularly, structuring belt patterns with low density regions of at least 10 mils width, or at least 20 mils width, or at least 30 mils width, and patterns that combined different sizes of low density regions may exploit the benefit more. Structuring belt fiber molding depths, also known as overburden, that capitalizes on the fiber length of the non-wood inclusive fiber mixture also may increase the benefit. Without being bound by theory, it may be desirable to have the distance between belt structuring pattern protrusions be equal or greater than the average fiber length of the fiber mixture to increase diverse pore formation when using non-woods. Additionally, without being bound by theory, crepe impact angle and reel draw can be used to create regions of micro-disturbance to increase the variation of bonds, pores and sheet structure. Wet transfer or rush transfer can induce multiple planes and orientations of fiber as well, and may contribute to increasing the benefit of the non-wood inclusive mixtures. Moreover, combinations of one or all of these molding factors can enhance the surprising combination of substrate properties.

Roll Properties

Large rolls have a consumer perceived benefit on the shelf. A larger diameter roll at a given price is normally preferred by the consumer. When the consumer unpackages that roll and uses it, the consumer also wants that same large roll to have just the right level of firmness. Overly soft rolls connote inferiority, and overly firm rolls connote roughness and lack of absorbency. From a manufacturing perspective, however, a roll of toilet tissue can be most cost effectively produced with a minimum amount of fiber mass, while effectively distributing that mass in such a way that the substrate still has superior strength, absorbency, and softness attributes.

The morphology of the bamboo fiber (high levels of fines, broad fiber length distribution, high coarseness, high fibrillation), as well as many other non-wood fibers, make for a fiber that drains poorly and makes it particularly unsuited for through-air-drying machines due to high energy costs associated with the drying of the nascent fiber web. Therefore, the majority of webs comprising bamboo are made on conventional wet press machines. These machines generate webs of low caliper and, when converted into finished product rolls, result in either low bulk and hard rolls or high bulk and extremely soft rolls. A few instances of products can be found comprising bamboo that are made on throughair-dried machines. These examples, however, when converted into a roll format, suffer from a non-consumer preferred roll structure that is high in bulk, yet still extremely soft.

The underlying cause of this roll bulk-roll firmness contradiction may be due to the compression/relaxation characteristics of the substrate. It is therefore an unmet consumer need to design a substrate that comprises bamboo fiber, yet can be wound into finished product rolls that are both bulky and firm.

As indicated in other parts of this disclosure, fibrous structures, such as sanitary tissue products, may be comprised of substantial amounts of eucalyptus fibers (especially at the consumer-facing layer of a sheet), which are short, narrow, and low exhibit low coarseness. These attributes allow for improved molding into a structured fabric, impacting density and compressibility/resiliency characteristics of the web. As one incorporates higher levels of non-wood (e.g., bamboo), one is replacing eucalyptus fibers with longer, wider, and coarser non-wood (e.g., bamboo) fibers. These attributes cause non-woods such as bamboo to be much less susceptible to molding into a structured fabric, resulting in less desirable properties, including, for instance, compression and resiliency characteristics.

The inventors of the present disclosure have surprisingly shown that substrates and rolls comprising non-woods (e.g., bamboo) can be created with good roll bulk and roll compression characteristics, despite the fact that introduction of non-woods (e.g., bamboo) results in substrates comprised of coarser, more fibrillated fibers, which are less prone to molding due to their morphological characteristics. These improvements may be achieved, in part, through jet/wire velocity adjustments, varying levels of foreshortening at the wire/belt interface and at creping, through creping geometry changes, and the judicious placement of high and low density zones in the substrate.

In addition to the beneficial properties as detailed in the disclosure above, the new fibrous structures detailed herein permit the fibrous structure manufacturer to wind rolls with high roll bulk (for example greater than 4 cm³/g), and/or greater roll firmness (for example between about 2.5 mm to about 15 mm), and/or lower roll percent compressibility (low percent compressibility, for example less than 10% compressibility).

"Roll Bulk" as used herein is the result of measuring finished product rolls. The rolls are placed into a controlled temperature and Humidity room (TAPPI conditions, about 23° C.±2° C. and about 50%±2% relative humidity) for at least 24 hours to equilibrate (equilibration can be monitored by measuring roll weight every 4 hours until the mass stabilizes). If rolls have been stored in greater than 50% relative humidity conditions, then said rolls should first be equilibrated at conditions lower than 50% relative humidity and then equilibrated at TAPPI conditions—see T-402. The rolls are weighed with the weight recorded to the hundredths of grams. The width of the rolls are measured with a ruler that shows millimeters, width recorded to the tenths of centimeter. Roll Diameter is measured according to the Percent Roll Compressibility test method included herein. Roll Bulk (cm^3/g) is then calculated by: multiplying the square of the radius of the roll (roll diameter (cm)/2) by 3.14159 and by the roll width (cm), then dividing that by the mass of the roll (g):

$$\text{Roll Bulk}\left(\frac{cc}{g}\right) = \frac{3.14159 * \left(\frac{\text{roll diameter (cm)}}{2}\right)^2 * \text{roll width (cm)}}{\text{roll weight (g)}}$$

The measurements are done with the roll core in place. The units "cc/g" are used interchangeably herein with "cm³/g."

The new rolled fibrous structures (e.g., sanitary tissue products) of the present disclosure may exhibit a roll bulk of greater than about 4 cm³/g, greater than about 5 cm³/g, greater than about 6 cm³/g, greater than about 7 cm³/g, greater than about 8 cm³/g, greater than about 9 cm³/g, greater than about 10 cm³/g, greater than about 12 cm³/g, greater than about 13 cm³/g, greater than about 14 cm³/g, greater than about 15 cm³/g, greater than about 16 cm³/, greater than about 17 cm³/g, and/or less than about 30 cm³/g, less than about 25 cm³/g, less than about 22 cm³/g, less than about 20 cm³/g, and/or from about 10 cm³/g to about 25 cm³/g, specifically including all 0.1 increments between the recited ranges.

Additionally, examples of the new rolled fibrous structures detailed herein may exhibit a roll firmness less than about 10.5 mm, less than about 9.5 mm, less than 8.5 mm, less than about 7 mm, or from about 2.5 mm to about 15 mm and/or from about 3 mm to about 13 mm, from about 4 mm to about 10 mm, and/or from about 6 to about 9 mm, specifically including all 0.1 increments between the recited ranges.

Additionally, examples of the new fibrous structures detailed herein may be in the form of a rolled tissue products (single-ply or multi-ply), for example a dry fibrous structure roll, and may have a percent compressibility of less than about 10%, less than about 8%, less than about 7%, less than about 6%, less than about 5%, less than about 4.5%, less than about 4%, less than about 3%, about 0%, greater than about 0.25%, greater than about 1%, from about 2.5% to about 5%, from about 3% to about 5.5%, from about 4% to about 10%, from about 4% to about 8%, from about 4% to about 7%, and/or from about 4% to about 6%, as measured according to the Percent Compressibility Test Method described herein.

Additionally, examples of the new rolled tissue products as detailed herein can be individually packaged to protect the fibrous structure from environmental factors during shipment, storage, and shelving for retail sale. Any of known methods and materials for wrapping bath tissue or paper towels can be utilized. Further, the plurality of individual packages, whether individually wrapped or not, can be wrapped together to form a package having inside a plurality of the new rolled tissue products as detailed herein. The package can have 2, 3, 4, 5, 6, 7, 8, 9, 10, 12, 14, 16 or more rolls. In such packages, the roll bulk and percent compressibility can be important factors in package integrity during shipping, storage, and shelving for retail sale. Further, the plurality of individual packages, or the packages having a plurality of the new rolled tissue products as detailed herein, can be palletized (i.e., organized and/or transported on a pallet). In such pallets of the new rolled tissue products as detailed herein, the roll bulk and percent compressibility can be important factors in package integrity during shipping, storage, and shelving for retail sale.

Further, a package of a plurality of individual rolled tissue products, in which at least one of the rolled tissue products exhibits a roll bulk of greater than about 4 cm³/g or a percent compressibility of less than about 10%, or less than about 8%, is contemplated. In one example, a package of a plurality of individual rolled tissue products, in which at least one of the rolled tissue products exhibits a roll bulk of greater than about 4 cm³/g and a percent compressibility of less than about 10%, or less than about 8%, is contemplated. In another example, a package of a plurality of individual rolled tissue products, in which at least one of the rolled tissue products exhibits a roll bulk of greater than about 6 cm³/g and a percent compressibility of less than about 8%, or less than about 5%, is contemplated.

U.S. Publication No. 2022-0031531 discloses the packages that may be desirable for containing the rolled fibrous structures of the present disclosure, including sanitary tissue products (e.g., bath tissue). Said packages may comprise non-wood fibers, just like the rolled fibrous structures the package is used contained.

Fibrous Structure Examples

Further nonlimiting examples of the new fibrous structures that include the various inventive non-wood fiber inclusion(s), as detailed herein, may have the properties disclosed in the tables of FIGS. 18A-1 through FIG. 25 and as illustrated in FIGS. 1 and 2 and may be used to form sanitary tissue products of the present disclosure. It should be noted that wheat straw fibers in the tables of FIGS. 18A-1 through FIG. 25 are never dried. The other fibers in the tables of FIGS. 18A-1 through FIG. 25 are once dried.

FIGS. 18A-1, 18A-2, 18B-1, 18B-2, and 19 are tables illustrating multiple inventive embodiments, specifically detailing fiber type and percent incorporation into specific layers and plies (note: common numbers between the tables indicate the same sample).

FIGS. 20A and 20B are tables illustrating multiple inventive and comparative embodiments, specifically detailing multiple properties for the purpose of comparing inventive versus comparative embodiments (note: common numbers between the tables indicate the same sample).

FIGS. 21A, 21B-1, 21B-2, 21B-3, 21C-1, 21C-2, 21C-3, 21D-1, 21D-2, 21D-3, 21E-1, 21E-2, 21E-3, 21F-1, 21F-2, 21G-1, 21G-2, 21H-1, 21H-2, 21I, 21J and 22A, 22B, 22C, 22D, 22E, and 22F are tables illustrating multiple inventive and comparative embodiments, specifically detailing multiple inventive and comparative embodiment properties, beyond the properties illustrated in FIGS. 20A and 20B (note: common numbers and letters between the tables indicate the same sample).

FIG. 23 is a table illustrating fiber morphology of the fibers used in fibrous structures of the present disclosure (note: common numbers between the tables indicate the same sample). In FIG. 23, fiber count (length average, million/g) is calculated from length weighted fiber average and coarseness via the following equation (where L(1) has the units of mm/fiber and coarseness has the units of mg/m): Fiber count=1/(L(1)×coarseness). And, fiber count (number average, million/g) is calculated from length weighted fiber average and coarseness via the following equation (where L(n) has the units of mm/fiber and coarseness has the units of mg/m): Fiber count=1/(L(n)×coarseness).

FIGS. 24A-1, 24A-2, 24B-1, 24B-2, 24C-1, 24C-2, 24D-1, 24D-2, 24E-1, 24E-2, 24F-1, 24F-2, 24G-1, 24G-2 are tables illustrating PVD data of fibrous structures of the present disclosure (common numbers between the tables indicate the same sample).

FIG. 25 is a table that details the fiber characteristic differences between non-wood fibers that are never-dried and that have been once-dried.

Papermaking Example 1:

An example of fibrous structures in accordance with the present disclosure can be prepared using a papermaking machine as described above with respect to FIG. 6A, and according to the method described below:

A 3% by weight aqueous slurry of northern softwood kraft (NSK) pulp is made up in a conventional re-pulper. The NSK slurry is refined gently and a 2% solution of a permanent wet strength resin (i.e., Cymene 5221 marketed by Solenis incorporated of Wilmington, Del.) is added to the NSK stock pipe at a rate of 1% by weight of the dry fibers. Kymene 5221 is added as a wet strength additive. The adsorption of Kymene 5221 to NSK is enhanced by an in-line mixer. A 1% solution of Carboxy Methyl Cellulose (CMC) (i.e., FinnFix 700 marketed by C. P. Kelco U.S. Inc. of Atlanta, GA) is added after the in-line mixer at a rate of 0.2% by weight of the dry fibers to enhance the dry strength of the fibrous substrate. A 3% by weight aqueous slurry of non-wood (e.g., bamboo, abaca, etc.) pulp is made up in a conventional re-pulper. The non-wood slurry is refined gently and a 2% solution of a permanent wet strength resin (i.e., Kymene 5221 marketed by Solenis incorporated of Wilmington, Del.) is added to the non-wood stock pipe at a rate of 1% by weight of the dry fibers. Kymene 5221 is added as a wet strength additive. The adsorption of Kymene 5221 to non-wood is enhanced by an in-line mixer. A 1% solution of Carboxy Methyl Cellulose (CMC) (i.e., FinnFix 700 marketed by C. P. Kelco U.S. Inc. of Atlanta, GA) is added after the in-line mixer at a rate of 0.2% by weight of the dry fibers to enhance the dry strength of the fibrous substrate. A 3% by weight aqueous slurry of hardwood Eucalyptus fibers is made up in a conventional re-pulper. A 1% solution of defoamer (i.e., BuBreak 4330 marketed by Buckman Labs, Memphis TS) is added to the Eucalyptus stock pipe at a rate of 0.25% by weight of the dry fibers and its adsorption is enhanced by an in-line mixer.

The NSK, non-wood, and eucalyptus fibers are combined in the head box at various ratios and deposited onto a Fourdrinier wire, running at a first velocity $V_1$, homogenously to form an embryonic web. The web is then transferred at the transfer zone from the Fourdrinier forming wire at a fiber consistency of about 15% to the papermaking belt, the papermaking belt moving at a second velocity, $V_2$. The papermaking belt has a pattern of raised portions (i.e., knuckles) extending from a reinforcing member, the raised portions defining either a plurality of discrete or a continuous/substantially continuous deflection conduit portion, as described herein, particularly with reference to a mask such as FIG. 5. The transfer occurs in the transfer zone without precipitating substantial densification of the web. The web is then forwarded, at the second velocity, $V_2$, on the papermaking belt along a looped path in contacting relation with a transfer head disposed at the transfer zone, the second velocity being from about 1% to about 40% slower than the first velocity, $V_1$. Since the Fourdrinier wire speed is faster than the papermaking belt, wet shortening, i.e., foreshortening, of the web occurs at the transfer point. In an example, the second velocity $V_2$ can be from about 0% to about 5% faster than the first velocity $V_1$.

Further de-watering is accomplished by vacuum assisted drainage until the web has a fiber consistency of about 15% to about 30%. The patterned web is pre-dried by air blow-through, i.e., through-air-drying (TAD), to a fiber consistency of about 65% by weight. The web is then adhered to the surface of a Yankee dryer with a sprayed creping adhesive comprising 0.25% aqueous solution of polyvinyl alcohol (PVA). The fiber consistency is increased to an estimated 95%-97% before dry creping the web with a doctor blade. The doctor blade has a bevel angle of about 45 degrees and is positioned with respect to the Yankee dryer to provide an impact angle of about 101 degrees. This doctor blade position permits the adequate amount of force to be applied to the substrate to remove it off the Yankee while minimally disturbing the previously generated web structure. The dried web is reeled onto a take up roll (known as a parent roll), the surface of the take up roll moving at a fourth velocity, $V_4$, that is faster than the third velocity, $V_3$, of the Yankee dryer. By reeling at a fourth velocity, $V_4$, that is about 1% to 20% faster than the third velocity, $V_3$, some of the foreshortening provided by the creping step is "pulled out," sometimes referred to as a "positive draw," so that the paper can be more stable for any further converting operations. In other examples, a "negative draw" as is known in the art is also contemplated.

Two plies of the web can be formed into paper towel products by embossing and laminating them together using PVA adhesive. The paper towel has about 53 g/m² basis weight and contains 0-65% by weight Northern Softwood Kraft, 0-100% non-wood fiber, and 0-50% by weight Eucalyptus furnish. The sanitary tissue product is soft, flexible, and absorbent.

Papermaking Example 2

An example of fibrous structures in accordance with the present disclosure can be prepared using a papermaking machine as described above with respect to FIG. 6A, and according to the method described below:

An aqueous slurry of eucalyptus (Suzano Papel e Celulose Brazilian bleached hardwood kraft pulp) pulp fibers is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top chamber of a multi-layered, three-chambered headbox of a Fourdrinier wet-laid papermaking machine.

Additionally, an aqueous slurry of eucalyptus (Suzano Papel e Celulose Brazilian bleached hardwood kraft pulp) pulp fibers is prepared at about 3% fiber by weight using a conventional repulper, then transferred to a hardwood fiber stock chest. The eucalyptus fiber slurry of the hardwood stock chest is pumped through a stock pipe and mixed with the aqueous slurry of Northern Softwood Kraft (NSK), described in the next paragraph, to a fan pump where the slurry consistency is reduced from about 1.5% by fiber weight to about 0.15% by fiber weight. The 0.15% eucalyptus/NSK slurry is then pumped and distributed in the center and bottom chamber of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center and bottom chamber of a multi-layered, three-chambered headbox of a Fourdrinier wet-laid papermaking machine.

Additionally, an aqueous slurry of non-wood (e.g., bamboo, abaca, etc.) pulp fibers is prepared at about 1.5-3% fiber by weight using a conventional repulper, then transferred to a non-wood fiber stock chest. The non-wood fiber slurry of the non-wood stock chest is pumped through a stock pipe to a refiner, where it is gently refined to a degree that is commensurate with the desired strength at the reel of the paper machine. The non-wood solution is then transported through a stock pipe to a fan pump where the slurry consistency is reduced from about 3% by fiber weight to about 0.15% by fiber weight. The 0.15% non-wood slurry is then pumped and distributed in the top and or middle and or bottom chamber of a multi-layered, three-chambered headbox of a Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK or non-wood or Eucalyptus fiber stock pipe at a rate sufficient to deliver 0.25% temporary wet strengthening additive based on the dry weight of the fibers. The absorption of the temporary wet strengthening additive is enhanced by passing the treated slurry through an in-line mixer.

The wet-laid papermaking machine has a layered headbox having a top chamber, a center chamber, and a bottom chamber where the chambers feed directly onto the forming wire (Fourdrinier wire). The eucalyptus fiber slurry of 0.15% consistency is directed to the top headbox chamber. Alternatively, a non-wood fiber slurry can be directed to the top headbox chamber. The NSK/Eucalyptus, NSK/non-wood, non-wood/eucalyptus, or non-wood fiber slurry is directed to the center and bottom headbox chambers. All three fiber layers are delivered simultaneously in superposed relation onto the Fourdrinier wire to form thereon a three-layer embryonic fibrous structure (web), of which about 40% of the top side is made up of the eucalyptus and or non-wood fibers, and about 60% of the sheet can be made of various blends of non-wood, NSK, and eucalyptus fibers, directed towards the center and bottom layers. Dewatering occurs through the Fourdrinier wire and is assisted by a deflector and wire table vacuum boxes. The Fourdrinier wire is a Legent 866A Dual Layer (0.11 mm×0.18 mm, Asten Johnson). The speed of the Fourdrinier wire is about 800 feet per minute (fpm).

The embryonic wet fibrous structure is transferred from the Fourdrinier wire, at a fiber consistency of about 18-22% at the point of transfer, to a 3D patterned, continuous knuckle, through-air-drying belt as shown in FIG. 3. The speed of the 3D patterned through-air-drying belt is 800 feet per minute (fpm), which is the same speed of the Fourdrinier wire. The 3D patterned through-air-drying belt is designed to yield a fibrous structure comprising a pattern of continuous high density knuckle region oriented approximately 75 Degrees relative to the cross direction. Each continuous high density knuckle region oriented approximately 75 Degrees relative to the cross direction is separated by a low-density discrete pillow region oriented approximately 75 Degrees relative to the cross direction. This 3D patterned through-air-drying belt is formed by casting a layer of an impervious resin surface of a continuous knuckle onto a fiber mesh supporting fabric. The supporting fabric is a 98×52 filament, dual layer mesh. The thickness of the resin cast is about 12.0 mils above the supporting fabric. Alternatively, the drying fabric is designed to yield a pattern of substantially machine direction oriented linear channels having a continuous network of high density (knuckle) areas. This drying fabric is formed by casting an impervious resin surface onto a fiber mesh supporting fabric. The supporting fabric is a 98×52 filament, dual layer mesh. The thickness of the resin cast is about 12 mils above the supporting fabric. The area of the continuous network is about 40 percent of the surface area of the drying fabric.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 50-65% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-44), about 20% CREPETROL® 5688. CREPETROL® 5688 is commercially available from Solenis. The creping adhesive is delivered to the Yankee surface at a rate of about 0.10-0.20% adhesive solids based on the dry weight of the fibrous structure. The fiber consistency is increased to about 96-98% before the fibrous structure is dry-creped from the Yankee with a doctor blade.

The doctor blade has a bevel angle of about 15-25° and is positioned with respect to the Yankee dryer to provide an impact angle of about 71-81°. The Yankee dryer is operated at a temperature of about 275-350° F. and a speed of about 800 fpm. The fibrous structure is wound in a roll (parent roll) using a surface driven reel drum having a surface speed of about 550-700 fpm.

Two parent rolls of the fibrous structure are then converted into a sanitary tissue product by loading the roll of fibrous structure into an unwind stand. The two parent rolls are converted with the low-density pillow side out. Alternatively, they can be converted with the high-density knuckle side out. The line speed is 550 ft/min. One parent roll of the fibrous structure is unwound and transported to an emboss stand where the fibrous structure is strained to form the emboss pattern in the fibrous structure via a 0.56" Pressure Roll Nip and then combined with the fibrous structure from the other parent roll to make a multi-ply (2-ply) sanitary tissue product. Approximately 0.5% of a proprietary quaternary amine softener is added to the top side of the multi-ply sanitary tissue product. Approximately 0.5% of a proprietary quaternary amine softener may also be added to the bottom side of the multi-ply sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls. The molding member used to make the multi-ply sanitary tissue product of this example exhibits the dimensions shown in Table 4 of U.S. Ser. No. 17/238,527 filed Apr. 23, 2021, and assigned to The Procter & Gamble Company.

Papermaking Example 3

Abaca and Eucalyptus are individually repulped at ~3% consistency with 2 min repulping time. The Abaca slurry is refined gently and a 2% solution of a permanent wet strength resin (i.e. Kymene 5221 marketed by Solenis incorporated of Wilmington, Del.) is added to the softwood stock pipe at a rate of 1% by weight of the dry fibers. Kymene 5221 is added as a wet strength additive. The adsorption of Kymene 5221 to Abaca is enhanced by an in-line mixer. A 1% solution of Carboxy Methyl Cellulose (CMC) (i.e. FinnFix 700 marketed by C. P. Kelco U.S. Inc. of Atlanta, Ga.) is added after the in-line mixer at a rate of 0.2% by weight of the dry fibers to enhance the dry strength of the fibrous substrate. A 1% solution of defoamer (i.e. Wicket 1285 marketed by Ivanhoe Industries, of Zion, IL) is added to the Eucalyptus stock pipe at a rate of 0.25% by weight of the dry fibers and its adsorption is enhanced by an in-line mixer.

The Abaca and the Eucalyptus fibers are combined in the headbox in a proportion of 65% Abaca and 35% Eucalyptus and deposited onto a wire running 10% faster than successive structuring papermaking belt. The web is transferred at the transfer nip with approximately 14 in Hg vacuum to the structuring papermaking belt at approximately 20% solids. The web is then forwarded on the papermaking belt along a looped path, passing through a pre-dryer and drying the web to a consistency 75%. The web is then pressed & adhered via nip and chemistry on to the Yankee drier that is sprayed with creping adhesive comprising 0.25% aqueous solution of polyvinyl alcohol (PVA). The fiber consistency is increased to an estimated 97% before dry creping the web with a doctor blade. The doctor blade has a bevel angle of about 45 degrees and is positioned with respect to the Yankee dryer to provide an impact angle of about 101 degrees. This doctor blade position permits the adequate amount of force to be applied to the substrate to remove it off the Yankee while minimally disturbing the previously generated web structure. The web travels through a gapped calendar stack to smooth the web, reducing caliper by approximately 10% before the dried web is reeled onto a take up roll (known as a parent roll), the surface of the take up roll moving approximately the same speed as the Yankee dryer.

Papermaking Example 4

Same as Papermaking Example 3, except: Abaca is not refined (vs. "refined gently").

Papermaking Example 5

Same as Papermaking Examples 3 and/or 4, except: the headbox deposits 40% Eucalyptus and 60% Abaca composition to the wire (vs. "headbox in a proportion of 65% Abaca and 35% Eucalyptus and deposited onto a wire . . . ").

Papermaking Example 6

Same as Papermaking Examples 3 and/or 4, except: the headbox deposits 45% Eucalyptus and 55% Abaca composition to the wire (vs. "headbox in a proportion of 65% Abaca and 35% Eucalyptus and deposited onto a wire . . . ").

Papermaking Example 7

Same as Papermaking Example 3, except: NSK and SSK in a ratio of 75% NSK/25% SSK are repulped at 3%, gently refined and have kymene & CMC added at similar weight percent as the Abaca stream; and the headbox deposits a 40% Eucalyptus, 50% Abaca, and 10% NSK/SSK composition to the wire.

Papermaking Example 8

Same as Papermaking Examples 3 and/or 4, except: the headbox deposits a 40% Eucalyptus, 20% Abaca, and 40% NSK/SSK composition to the wire.

Papermaking Example 9

Each of Papermaking Examples 3-8, further using the papermaking belt(s) described in U.S. Pub. No. 2021-0140115.

Papermaking Example 10

Each of Papermaking Examples 3-8, further using the papermaking belt(s) described in U.S. Pub. No. 2020-0181848.

Papermaking Example 11

Each of Papermaking Examples 3-10, where the wire moves 21% faster than the successive papermaking structuring belt.

Papermaking Example 12

Each of Papermaking Examples 3-11, where the structuring belt has a fiber forming depth of 30 mils.

Papermaking Example 13

Each of Papermaking Examples 3-11, where the structuring belt has a fiber forming depth of 25 mils.

Papermaking Example 14

Each of Papermaking Examples 3-13, where the substrate is embossed and laminated into a 2-ply finished fibrous structure, perforated to create sheets and rolled onto a core.

Papermaking Example 15

Each of Papermaking Examples 1 and 2, except: the headbox deposits 100% bamboo composition to the wire.

Arrays of the Present Disclosure

Sanitary tissue products within the scope of the present disclosure may be packaged in packages comprising sustainable materials (e.g., paper, recycled(able) plastic, corrugated cardboard, plant-based plastic, etc.) and displayed with other package(s) comprising sanitary tissue product(s) as an array(s)—see for example, U.S. Provisional Patent Application Ser. Nos. 63/353,167 and 63/375,858, both titled "Sanitary Tissue Products and Arrays Comprising Non-wood Fibers," filed on Jun. 17, 2022 and filed on Sep. 16, 2022, both by The Procter & Gamble Company and both naming Katherine Schwerdtfeger as the first-named inventor, and which are herein incorporated by reference, for details regarding the different arrays that sanitary tissue products of the present disclosure may be used to form and for packages that sanitary tissue products of the present disclosure may be contained in; further, packages comprising sanitary tissue products of the present disclosure may convey or connote sustainability.

Aspects of the Present Disclosure

The following aspects of the disclosure are exemplary only and not intended to limit the scope of the disclosure:

Aspect 1:
1. A sanitary tissue product, comprising:
   non-wood fibers; and
   a compressive slope (dry) of greater than about 8.0 mil/g.
2. The sanitary tissue product of claim 1, wherein the sanitary tissue product is a paper towel.
3. The sanitary tissue product of claim 1, wherein the compressive slope (dry) is greater than about 11.0 mil/g.
4. The sanitary tissue product of claim 3, wherein the sanitary tissue product is toilet paper.
5. A sanitary tissue product, comprising:
   non-wood fibers;
   a bulk (dry) greater than about 15 cm^3/g.
6. The sanitary tissue product of claim 5, wherein the sanitary tissue product is a paper towel.
7. The sanitary tissue product of claim 1, wherein the bulk (dry) is greater than about 18.0 cm^3/g.
8. The sanitary tissue product of claim 7, wherein the sanitary tissue product is toilet paper.

Beyond the "Aspects Of The Present Disclosure" disclosed above, the "Aspects Of The Present Disclosure," including Aspects 1-20, disclosed in U.S. Provisional Patent Application Ser. No. 63/456,020, titled "Fibrous Structures Comprising Non-wood Fibers," filed on Mar. 31, 2023, Young as the first-named inventor, are herein incorporated by reference.

Test Methods of the Present Disclosure

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, and/or single or multi-ply products. All tests are conducted in such conditioned room. Do not test samples that have defects such as wrinkles, tears, holes, and like. All instruments are calibrated according to manufacturer's specifications.

Coverage and Fiber Count-Area Test Method:

Coverage and Fiber Count are calculated using measurements acquired by analyzing fibers obtained from fibrous structures, such as sanitary tissue products, with a Fiber Quality Analyzer (FQA), available from OpTest Equipment Inc., Ontario, Canada. Prior to analysis in the FQA fibers from a finished product specimen must be dispersed and diluted to get an accurate measurement of the oven dry fiber mass in an aliquot of very dilute fiber and distilled water, which is utilized during the FQA analysis to determine specimen coarseness and fiber width. The resultant FQA values, in conjunction with basis weight, are then used to calculate fiber coverage and fiber count in a specimen.

Sample Preparation

Allow the fibrous structure finished product to be tested to equilibrate in a temperature-controlled room at a temperature of 73° F.±2° F. (23° C.±1° C.) and a relative humidity of 50%±2% for at least 24 hours. Further prepare the finished product for testing by removing and discarding any product which might have been abraded in handling, e.g., on the outside of the roll.

Determine the percent oven dry solids of the equilibrated test product. This is done on a moisture balance using least a 0.5 gram specimen from a selected usable unit of the test product. An exemplary balance is the Ohaus MB45 balance set to a drying temperature of 130° C., with moisture determined after the weight changes less than 1 mg in 60 seconds (A60 hold time).

Using another usable unit from the same equilibrated finished product, gently pull approximately 0.03 grams of fiber specimen from the center. The specimen should be equally pulled from all plies and layers of the substrate. Place the collected fibers into a 27 mm diameter, 70 mm tall clear glass vial, or similar. Record the net weight of collected fibers to the nearest 0.001 gram as $M_0$. The intent of this step is to get an even sampling across all plies and layers in the usable unit, pulled from the center of the usable unit so that no cutting of fibers at the end of the sheet or perforations is included.

The oven dry weight of the fiber specimen ($M_1$) is then calculated by multiplying the fiber specimen weight ($M_0$) by the previously determined percent oven dry solids.

$$M_1 = M_0 \times \% \text{ oven dry solids}$$

To fully disperse the fiber specimen, begin by pouring DI or distilled water into the vial until approximately ½ full, adding about ten 5 mm diameter glass beads, and then closing the vial with a cap. Next, allow the specimen to sit for at least two hours with occasional shaking. Lastly, stir the vial with a Fisher Scientific vortex genie, or similar, until fiber clusters are dispersed, and the fibers appear fully individualized.

To quantitatively dilute the dispersed fiber sample, begin by transferring the entire vial contents into a 5 L plastic beaker that has been weighed to the nearest 0.1 g. To accomplish this, slowly pour the contents of vial through a

6 US Standard Sieve (3.35 mm), trying to keep the glass beads in the vial as long as possible. Then rinse the vial and cap at least three times with DI or distilled water and continue to pour the liquid slowly through the #6 sieve. Once the vial has been at least triple rinsed, pour the glass beads into the sieve and wash thoroughly with a DI water squeeze bottle, being sure to collect all water used to rinse the beads.

Continue with the dilution procedure by filling the 5 L plastic beaker to approximately the 1.75 L mark with DI or distilled water. Weigh the beaker and record the net weight of the contents to the nearest 0.1 g as $M_{2,1}$. Using a second clean 5 L beaker, transfer the 1.75 L of solution back and forth at least 3 times from beaker to beaker to ensure that the suspension is homogenously mixed. Next, transfer approximately 150 g of the solution into a third clean 5 L beaker that has been weighed to the nearest 0.1 g. Weigh the beaker and record the net weight of the contents to the nearest 0.1 g as $M_{2,2}$. Then add approximately 1600 g of DI or distilled water to the third 5 L beaker. Weigh the beaker and record the net weight of the contents to the nearest 0.1 g as $M_{2,3}$. With a fourth clean 5 L beaker, transfer the approximately 1.75 L of solution back and forth at least 3 times from beaker to beaker to ensure that the suspension is homogenously mixed. Lastly, immediately after mixing, pour a 500 mL aliquot of the diluted fiber solution into a 600 mL plastic beaker that has been weighed to the nearest 0.1 g. Weigh the beaker and record the net weight of the contents to the nearest 0.1 g as $M_3$.

Upon completion of the dilution procedure, calculate the oven dry weight of fibers present in the testing beaker ($M_4$) according to the following equation:

$$M_4 = M_1 \times \left(\frac{M_{2,2}}{M_{2,1}}\right) \times \left(\frac{M_3}{M_{2,3}}\right)$$

Measurement of Samples

Set up, calibrate, and operate the Fiber Quality Analyzer (FQA) instrument according to the manufacturer's instructions. Place the beaker containing the diluted fiber suspension on carrousel of the FQA, select the "Optest default" for coarseness method, and when prompted, enter $M_4$ (the oven dry weight of fibers present in the testing beaker) in the cell for "sample mass" to determine coarseness.

Calculations

Once the analysis has been performed, open the report file and record each of the following measurements: Arithmetic Mean Width, Coarseness, Arithmetic Mean Length, and Length Weighted Mean Length.

Calculate Coverage, which has the units of fiber layers, using the following equation:

$$\text{Coverage} = \frac{\text{Basis Weight of product tested}}{\text{Coarseness}} \times \frac{1}{\text{Arithmetic mean width}}$$

Where basis weight has units of grams/m², Coarseness has units of mg/m, and Arithmetic Mean Width has the units of mm.

Calculate Fiber Count-Area, which has the units of millions fibers/m², using one of these two equations:

$$\text{Fiber Count-Area}(C(n)) = \frac{\text{Basis Weight of product tested}}{\text{Coarseness} \times \text{Arithmetic Mean Length}}$$

Where basis weight has the units of g/m², Coarseness has the units of mg/m, and Arithmetic Mean Length has the units of mm $$\text{Fiber Count-Area}(C(l)) = \frac{\text{Basis Weight of product tested}}{\text{Coarseness} \times \text{Length Weighted Mean Length}}$$

Where basis weight has the units of g/m², Coarseness has the units of mg/m, and Length Weighted Mean Length has the units of mm Pore Volume Distribution Test Method:

The Pore Volume Distribution (PVD) Test Method is used to determine the average amount of fluid (mg) retained by a specimen within an effective pore radius range of 2.5 to 160 microns. This method makes use of stepped, controlled differential pressure and measurement of associated fluid movement into and out of a porous specimen, where the radius of a pore is related to the differential pressure required to fill or empty the pore. The fluid retained (mg) by each specimen during its first absorption cycle of decreasing differential pressures is measured, this is followed by measurement of fluid retained (mg) by the specimen during its first drainage or desorption cycle of increasing differential pressures. The sum of fluid retained (mg) by the specimen within the effective pore radius range of 2.5 to 160 microns for the absorption and desorption cycles, as well as a calculated hysteresis (difference of fluid retained during the absorption and desorption cycles) in the effective pore radius range of 2.5 to 100 microns are reported.

Method Principle

For uniform cylindrical pores, the radius of a pore is related to the differential pressure required to fill or empty the pore by the equation Differential pressure=$(2\gamma \cos \Theta)/r$, where $\gamma$=liquid surface tension, $\Theta$=contact angle, and r=effective pore radius.

Pores contained in natural and manufactured porous materials are often thought of in terms such as voids, holes or conduits, and these pores are generally not perfectly cylindrical nor all uniform. One can nonetheless use the above equation to relate differential pressure to an effective pore radius, and by monitoring liquid movement into or out of the material as a function of differential pressure characterize the effective pore radius distribution in a porous material. (Because nonuniform pores are approximated as uniform by the use of an effective pore radius, this general methodology may not produce results precisely in agreement with measurements of void dimensions obtained by other methods such as microscopy.)

The Pore Volume Distribution Test Method uses the above principle and is reduced to practice using the apparatus and approach described in "Liquid Porosimetry: New Methodology and Applications" by B. Miller and I. Tyomkin published in The Journal of Colloid and Interface Science (1994), volume 162, pages 163-170, incorporated herein by reference. This method relies on measuring the increment of liquid volume that enters or leaves a porous material as the differential air pressure is changed between ambient ("lab") air pressure and a slightly elevated air pressure (positive differential pressure) surrounding the specimen in a sample test chamber. The specimen is introduced to the sample chamber dry, and the sample chamber is controlled at a positive differential pressure (relative to the lab) sufficient to prevent fluid uptake into the specimen after the fluid bridge is opened. After opening the fluid bridge, the differential air pressure is decreased in steps to 0, and in this process subpopulations of pores acquire liquid according to their effective pore radius. After reaching a minimal differential pressure at which the mass of fluid within the specimen is at a maximum, differential pressure is increased stepwise again toward the starting pressure, and the liquid is drained from the specimen. It is during this latter draining sequence (from minimal differential pressure, or largest corresponding effective pore radius, to the largest differential pressure, or smallest corresponding effective pore radius), that the fluid retention by the sample (mg) at each differential pressure is determined in this method. After correcting for any fluid movement for each particular pressure step measured on the chamber while empty, the fluid retention by the sample (mg) for each pressure step is determined. The fluid retained may be normalized by dividing the equilibrium quantity of retained liquid (mg) associated with this particular step by the dry weight of the sample (mg).

Sample Conditioning and Specimen Preparation

The Pore Volume Distribution Test Method is conducted on samples that have been conditioned in a room at a temperature of 23° C.±2.0° C. and a relative humidity of 50%±5%, all tests are conducted under the same environmental conditions and in such conditioned room. Any damaged product or samples that have defects such as wrinkles, tears, holes, and similar are not tested. Samples conditioned as described herein are considered dry samples for purposes of this invention. A 5.5 cm square specimen to be tested is die cut from the conditioned product or sample. The dry specimen weight is measured and recorded.

Apparatus

Apparatus suitable for this method is described in: "Liquid Porosimetry: New Methodology and Applications" by B. Miller and I. Tyomkin published in The Journal of Colloid and Interface Science (1994), volume 162, pages 163-170. Further, any pressure control scheme capable of achieving the required pressures and controlling the sample chamber differential pressure may be used in place of the pressure-control subsystem described in this reference. One example of suitable overall instrumentation and software is the TRI/Autoporosimeter (Textile Research Institute (TRI)/Princeton Inc. of Princeton, N.J., U.S.A.). The TRI/Autoporosimeter is an automated computer-controlled instrument for measuring pore volume distributions in porous materials (e.g., the volumes of different size pores within the range from 1 to 1000 um effective pore radii). Computer programs such as Automated Instrument Software Releases 2000.1 or 2003.1/2005.1 or 2006.2; or Data Treatment Software Release 2000.1 (available from TRI Princeton Inc.), and spreadsheet programs may be used to capture and analyse the measured data.

Method Procedure

The wetting liquid used is a degassed 0.2 weight % solution of octylphenoxy polyethoxy ethanol (Triton X-100 from Sigma-Aldrich) in distilled water. The instrument calculation constants are as follows: $\rho$ (density)=1 g/cm$^3$; $\gamma$ (surface tension)=31 dynes/cm; cos $\Theta$=1. A 90-mm diameter mixed-cellulose-ester filter membrane with a characteristic pore size of 1.2 μm (such Millipore Corporation of Bedford, MA, Catalogue #RAWP09025) is affixed to the porous frit (Monel plates with diameter of 90 mm, 6.4 mm thickness from Mott Corp., Farmington, CT, or equivalent) of the sample chamber. A plexiglass plate weighing about 34 g (supplied with the instrument) is placed on the sample to ensure the sample rests flat on the membrane/frit assembly. No additional weight is placed on the sample.

Someone skilled in the art knows that it is critical to degas the test fluid as well as the frit/membrane/tubing system such that the system is free from air bubbles.

The sequence of pore sizes (differential pressures) for this application is as follows (effective pore radius in μm): 2.5, 5, 10, 15, 20, 30, 40, 50, 60, 70, 80, 90, 100, 120, 140, 160, 180, 200, 225, 250, 275, 300, 350, 400, 500, 600, 800, 1000. This sequence is then replicated in reverse order. The criterion for moving from one pressure step to the next is that fluid uptake/drainage from the specimen is measured to be less than 10 mg/min for 10 s.

A separate "blank" measurement is performed by following this method procedure on an empty sample chamber with no specimen or weight present on the membrane/frit assembly. Any fluid movement observed is recorded (mg) at each of the pressure steps. Fluid retention data for a specimen are corrected for any fluid movement associated with the empty sample chamber by subtracting fluid retention values of this "blank" measurement from corresponding values in the measurement of the specimen.

Determination of Parameters

Data from the PVD instrument can be presented in a cumulative fashion, so that the cumulative mass absorbed is tabulated alongside the diameter of pore, which allow the following parameters to be calculated:

2.5-160 micron PVD Absorption (mg)=[mg at 160 micron absorbed]–[mg at 2.5 micron absorbed] from the advancing curve, 2.5-160 micron PVD Desorption (mg)=[mg at 160 micron desorbed]–[mg at 2.5 micron desorbed] from the receding curve, and 2.5-100 micron hysteresis (mg)=[mg at 100 micron desorbed–mg at 2.5 micron desorbed]–[mg at 100 micron absorbed–mg at 2.5 micron absorbed]

Horizontal Full Sheet (HFS) Test Method:

The Horizontal Full Sheet (HFS) test method determines the amount of distilled water absorbed and retained by a fibrous structure of the present invention. This method is performed by first weighing a sample of the fibrous structure to be tested (referred to herein as the "dry weight of the sample"), then thoroughly wetting the sample, draining the wetted sample in a horizontal position and then reweighing (referred to herein as "wet weight of the sample"). The absorptive capacity of the sample is then computed as the amount of water retained in units of grams of water absorbed by the sample. When evaluating different fibrous structure samples, the same size of fibrous structure is used for all samples tested.

The apparatus for determining the HFS capacity of fibrous structures comprises the following:

An electronic balance with a sensitivity of at least ±0.01 grams and a minimum capacity of 1200 grams. The balance should have a special balance pan to be able to handle the size of the sample tested (i.e.; a fibrous structure sample of about 27.9 cm by 27.9 cm).

A sample support rack (FIGS. 14 and 14A) and sample support rack cover (FIGS. 15 and 15A) is also required. Both the support rack (FIGS. 14 and 14A) and support rack cover (FIGS. 15 and 15A) are comprised of a lightweight metal frame, strung with 0.305 cm diameter monofilament so as to form a grid as shown in FIG. 14. The size of the support rack (FIGS. 14 and 14A) and support rack cover (FIGS. 15 and 15A) is such that the sample size can be conveniently placed between the two.

The HFS test is performed in an environment maintained at 23±1° C. and 50±2% relative humidity. A water reservoir or tub is filled with distilled water at 23±1° C. to a depth of 3 inches (7.6 cm).

Samples are tested in duplicate. The dry weight of each sample is reported to the nearest 0.01 grams. The empty sample support rack (FIGS. 14 and 14A) is placed on the balance with the special balance pan described above. The balance is then zeroed (tared). One sample is carefully placed on the sample support rack (FIGS. 14 and 14A), "face up" or with the outside of the sample facing up, away from the sample support rack (FIGS. 14 and 14A). The support rack cover (FIGS. 15 and 15A) is placed on top of the support rack (FIGS. 14 and 14A). The sample (now sandwiched between the rack and cover) is submerged in the water reservoir. After the sample is submerged for 30±3 seconds, the sample support rack (FIGS. 14 and 14A) and support rack cover (FIGS. 15 and 15A) are gently raised out of the reservoir.

The sample, support rack (FIGS. 14 and 14A) and support rack cover (FIGS. 15 and 15A) are allowed to drain horizontally for 120±5 seconds, taking care not to excessively shake or vibrate the sample. While the sample is draining, the support rack cover (FIGS. 15 and 15A) is carefully removed and all excess water is wiped from the support rack (FIGS. 15 and 15A). The wet sample and the support rack (FIGS. 14 and 14A) are weighed on the previously tared balance. The weight is recorded to the nearest 0.01 g. This is the wet weight of the sample after horizontal drainage.

The HFS grain per gram fibrous structure sample absorptive capacity is defined as: absorbent capacity=(wet weight of the sample after horizontal drainage–dry weight of the sample)/(dry weight of the sample) and has a unit of gram/gram.

The HFS gram per sheet fibrous structure sample absorptive capacity is defined as (wet weight of the sample after horizontal drainage minus dry weight of the sample) and has a unit of gram/sheet.

Vertical Full Sheet (VFS) Test Method:

The Vertical Full Sheet (VFS) test method is similar to the HFS method described previously, and determines the amount of distilled water absorbed and retained by a fibrous structure when held at an angle of 75°.

After setting up the apparatus, preparing the sample, taking the initial weights, and submerging the sample, according to the HFS method, the support rack (FIGS. 14 and 14A) and sample are removed from the reservoir and inclined at, an angle of 75° and allowed to drain for 60±5 seconds. Care should be taken so that the sample does not slide or move relative to the support rack (FIGS. 14 and 14A). If there is difficulty keeping the sample from sliding down the support rack (FIGS. 14 and 14A) sample can be held with the fingers.

At the end of this time frame (60±5 seconds), carefully bring the sample and support rack (FIGS. 14 and 14A) to the horizontal position and wipe the bottom edge of the sample support rack (FIGS. 14 and 14A) that water dripped onto during vertical drainage. Return the sample and support rack (FIGS. 14 and 14A) to the balance and take the weight to the nearest 0.01 g. This value represents the wet weight of the sample after vertical drainage.

The VFS gram per gram fibrous structure sample absorptive capacity is defined as the wet weight of the sample after vertical drainage minus the dry weight of the sample divided by the dry weight of the sample, and has a unit of gram/gram (g/g).

The VFS gram per sheet fibrous structure sample absorptive capacity is defined as the wet weight of the sample after vertical drainage minus the dry weight of the sample, and has a unit of gram/sheet.

The calculated VFS is the average of the absorptive capacities of the two samples of the fibrous structure.

Dry Bulk Ratio Method:

"Dry Bulk Ratio" may be calculated as follows: (Dry Compression×Flexural Rigidity (avg))/TDT.

Wet Bulk Ratio Method:

"Wet Bulk Ratio" may be calculated as follows: (Wet Compression×Geometric Mean Wet Modulus)/Total Wet Tensile.

Fiber Length, Width, Coarseness, and Fiber Count Test Method:

Fiber Length values are generated by running the test procedure as defined in U.S. Patent Application No. 2004-0163782 and informs the following procedure:

The length, width, and coarseness of the-fibers (which are averages of the plurality of fibers being analyzed in a sample), as well as the fiber count (number and/or length average), may be determined using a Valmet FS5 Fiber Image Analyzer commercially available from Valmet, Kajaani Finland (as the Kajaani Fiber Lab is less available) following the procedures outlined in the manual. If in-going or raw pulp is not accessible, samples may be taken from commercially available product (e.g., a roll of sanitary tissue product) to determine length, width, coarseness and fiber count (number and/or length average) using the FS5 by obtaining samples as outlined in the "Sample Preparation" section of the Coverage and Fiber Count Test Method in the Test Methods Section. As used herein, fiber length is defined as the "length weighted average fiber length". The instructions supplied with the unit detail the formula used to arrive at this average. The length can be reported in units of millimeters (mm) or in inches (in). As used herein, fiber width is defined as the "width weighted average fiber width" and can be reported in units of micrometers (um) or in millimeters (mm). The instructions supplied with the unit detail the formula used to arrive at this average. The width can be reported in units of millimeters (mm) or in inches (in). The instructions supplied with the unit detail the formula used to arrive at this average. Fiber count (number and/or length average) can be reported in units of million fibers/g. As used herein, fiber length/width ratio is defined as the "length weighted average fiber length (mm)/width weighted average fiber width (mm)."

Fiber count (length average, million/g) is calculated from length weighted fiber average and coarseness via the following equation (where L(1) has the units of mm/fiber and coarseness has the units of mg/m): Fiber count=1/(L(1)×coarseness). And, fiber count (number average, million/g) is calculated from length weighted fiber average and coarseness via the following equation (where L(n) has the units of mm/fiber and coarseness has the units of mg/m): Fiber count=1/(L(n)×coarseness). (L(1)) means length weighted averaged and (L(n)) means number weighted averaged.

It should be understood that the values from different fiber image analyzers can differ significantly, even as much as 59%—see "Fiber Quality Analysis: OpTest Fiber Quality Analyzer versus L&W Fiber Tester," Bin Li, Rohan Bandekar, Quanqing Zha, Ahmed Alsaggaf, and Yonghao Ni, *Industrial & Engineering Chemistry Research* 2011 50 (22), 12572-12578, DOI: 10.1021/ie201631q, which compares values from the FQA fiber analyzer to the FT fiber analyzer, stating: "These new instruments, such as PQM (pulp quality monitor), Galai CIS-100, Fiberlab, MorFi, FiberMaster, FQA (fiber quality analyzer), and L&W Fiber Tester (FT), provide fast measurements with the capability of both laboratory and online analysis. However, the measurement differences among these instruments are expected due to the different designs of hardware and software."

Percent Roll Compressibility Method:

Percent Roll Compressibility (Percent Compressibility) is determined using the Roll Diameter Tester 1000 as shown in FIG. 7. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2° C. and about 50%±2% relative humidity.

The diameter of the test roll is measured directly using a Pi® tape or equivalent precision diameter tape (e.g., an Executive Diameter tape available from Apex Tool Group, LLC, Apex, NC, Model No. W606PD) which converts the circumferential distance into a diameter measurement, so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary, the diameter tape is shortened from its original length to a length that allows both of the attached weights to hang freely during the test, yet is still long enough to wrap completely around the test roll being measured. The cut end of the tape is modified to allow for hanging of a weight (e.g., a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steal bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2° C. and about 50%±2% relative humidity for 2 hours prior to testing. Rolls with cores that are crushed, bent, or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate percent compressibility to the according to the following equation and record to the nearest 0.1%:

$$\% \text{ Compressibility} = \frac{(Orginal \text{ Roll Diameter}) - (\text{Compressed Roll Diameter})}{\text{Original Roll Diamter}} \times 100$$

Repeat the testing on 10 replicate rolls and record the separate results to the nearest 0.1%. Average the 10 results and report as the Percent Compressibility to the nearest 0.1%.

Roll Firmness Method:

Roll Firmness is measured on a constant rate of extension tensile tester with computer interface (a suitable instrument is the MTS Alliance using Testworks 4.0 Software, as available from MTS Systems Corp., Eden Prairie, MN) using a load cell for which the forces measured are within 10% to 90% of the limit of the cell. The roll product is held horizontally, a cylindrical probe is pressed into the test roll, and the compressive force is measured versus the depth of penetration. All testing is performed in a conditioned room maintained at 23° C.±2° C. and 50%±2% relative humidity.

Referring to FIG. 8, the upper movable fixture 2000 consist of a cylindrical probe 2001 made of machined aluminum with a 19.00±0.05 mm diameter and a length of 38 mm. The end of the cylindrical probe 2002 is hemispheric (radius of 9.50±0.05 mm) with the opposing end 2003 machined to fit the crosshead of the tensile tester. The fixture includes a locking collar 2004 to stabilize the probe and maintain alignment orthogonal to the lower fixture. The lower stationary fixture 2100 is an aluminum fork with vertical prongs 2101 that supports a smooth aluminum sample shaft 2101 in a horizontal position perpendicular to the probe. The lower fixture has a vertical post 2102 machined to fit its base of the tensile tester and also uses a locking collar 2103 to stabilize the fixture orthogonal to the upper fixture.

The sample shaft 2101 has a diameter that is 85% to 95% of the inner diameter of the roll and longer than the width of the roll. The ends of sample shaft are secured on the vertical prongs with a screw cap 2104 to prevent rotation of the shaft during testing. The height of the vertical prongs 2101 should be sufficient to assure that the test roll does not contact the horizontal base of the fork during testing. The horizontal distance between the prongs must exceed the length of the test roll.

Program the tensile tester to perform a compression test, collecting force and crosshead extension data at an acquisition rate of 100 Hz. Lower the crosshead at a rate of 10 mm/min until 5.00 g is detected at the load cell. Set the current crosshead position as the corrected gage length and zero the crosshead position. Begin data collection and lower the crosshead at a rate of 50 mm/min until the force reaches 10 N. Recturn the crosshead to the original gage length.

Remove all of the test rolls from their packaging and allow them to condition at about 23° C.±2° C. and about 50%±2% relative humidity for 2 hours prior to testing. Rolls with cores that are crushed, bent, or damaged should not be tested. Insert sample shaft through the test roll's core and then mount the roll and shaft onto the lower stationary fixture. Secure the sample shaft to the vertical prongs then align the midpoint of the roll's width with the probe. Orient the test roll's tail seal so that it faces upward toward the probe. Rotate the roll 90 degrees toward the operator to align it for the initial compression.

Position the tip of the probe approximately 2 cm above the surface of the sample roll. Zero the crosshead position and load cell and start the tensile program. After the crosshead has returned to its starting position, rotate the roll toward the operator 120 degrees and in like fashion acquire a second measurement on the same sample roll.

From the resulting Force (N) verses Distance (mm) curves, read the penetration at 7.00 N as the Roll Firmness and record to the nearest 0.1 mm. In like fashion analyze a total of ten (10) replicate sample rolls. Calculate the arithmetic mean of the 20 values and report Roll Firmness to the nearest 0.1 mm Slip Stick Coefficient of Friction and Kinetic Coefficient of Friction Method:

The Kinetic Coefficient of Friction values (actual measurements) and Slip Stick Coefficient of Friction (based on standard deviation from the mean Kinetic Coefficient of Friction) are generated by running the test procedure as defined in U.S. Pat. No. 9,896,806.

Lint Value Test Method:

The amount of lint generated from a finished fibrous structure is determined with a Sutherland Rub Tester (available from Danilee Co., Medina, Ohio) and a color spectrophotometer (a suitable instrument is the HunterLab LabScan XE, as available from Hunter Associates Laboratory Inc., Reston, VA, or equivalent). such as the Hunter LabScan XE. The rub tester is a motor-driven instrument for moving a weighted felt test strip over a finished fibrous structure specimen (referred to throughout this method as the "web") along an arc path. The Hunter Color L value is measured on the felt test strip before and after the rub test. The difference between these two Hunter Color L values is then used to calculate a lint value. This lint method is designed to be used with white or substantially white fibrous structures and/or sanitary toilet tissue products. Therefore, if testing of a non-white tissue, such as blue-colored or peach-colored tissue is desired, the same formulation should be used to make a sample without the colored dye, pigment, etc., using bleached kraft pulps.

I. Sample Preparation

Prior to the lint rub testing, the samples to be tested should be conditioned according to Tappi Method T402OM-88. Here, samples are preconditioned for 24 hours at a relative humidity level of 10 to 35% and within a temperature range of 22° C. to 40° C. After this preconditioning step, samples should be conditioned for 24 hours at a relative humidity of 48 to 52% and within a temperature range of 22° C. to 24° C. This rub testing should also take place within the confines of the constant temperature and humidity room.

The web is first prepared by removing and discarding any product which might have been abraded in handling, e.g., on the outside of the roll. For products formed from multiple plies of webs, this test can be used to make a lint measurement on the multi-ply product, or, if the plies can be separated without damaging the specimen, a measurement can be taken on the individual plies making up the product. If a given sample differs from surface to surface, it is necessary to test both surfaces and average the values in order to arrive at a composite lint value. In some cases, products are made from multiple-plies of webs such that the facing-out surfaces are identical, in which case it is only necessary to test one surface. If both surfaces are to be tested, it is necessary to obtain six specimens for testing (Single surface testing only requires three specimens). Each specimen should measure approximately 9.5 by 4.5 in. (241.3 mm by 114 mm) with the 9.5 in. (241.3 mm) dimension running in the machine direction (MD). Specimens can be obtained directly from a finished product roll, if the appropriate width, or cut to size using a paper cutter. Each specimen should be folded in half such that the crease is running along the cross direction (CD) of the web sample. For two-surface testing, make up 3 samples with a first surface "out" and 3 with the second-side surface "out". Keep track of which samples are first surface "out" and which are second surface out.

Obtain a 30 in. by 40 in. piece of Crescent #300 cardboard. Using a paper cutter, cut out six pieces of cardboard to dimensions of 2.5 in. by 6 in. Puncture two holes into each of the six cards by forcing the cardboard onto the hold down pins of the Sutherland Rub tester.

Center and carefully place each of the 2.5 in. by 6 in. cardboard pieces on top of the six previously folded samples. Make sure the 6 in. dimension of the cardboard is running parallel to the machine direction (MD) of each of the tissue samples. Center and carefully place each of the cardboard pieces on top of the three previously folded samples. Once again, make sure the 6 in. dimension of the cardboard is running parallel to the machine direction (MD) of each of the web samples.

Fold one edge of the exposed portion of the web specimen onto the back of the cardboard. Secure this edge to the cardboard with adhesive tape obtained from 3M Inc. (¾ in. wide Scotch Brand, St. Paul, Minn.). Carefully grasp the other over-hanging tissue edge and snugly fold it over onto the back of the cardboard. While maintaining a snug fit of the web specimen onto the board, tape this second edge to the back of the cardboard. Repeat this procedure for each sample.

Turn over each sample and tape the cross-direction edge of the web specimen to the cardboard. One half of the adhesive tape should contact the web specimen while the other half is adhering to the cardboard. Repeat this procedure for each of the samples. If the tissue sample breaks, tears, or becomes frayed at any time during the course of this sample preparation procedure, discard and make up a new sample with a new tissue sample strip.

There will now be 3 first-side surface "out" samples on cardboard and (optionally) 3 second-side surface "out" samples on cardboard.

ii. Felt Preparation

Obtain a 30 in. by 40 in. piece of Crescent #300 cardboard. Using a paper cutter, cut out six pieces of cardboard to dimensions of 2.25 in. by 7.25 in. Draw two lines parallel to the short dimension and down 1.125 in. from the top and bottom most edges on the white side of the cardboard. Carefully score the length of the line with a razor blade using a straight edge as a guide. Score it to a depth about halfway through the thickness of the sheet. This scoring allows the cardboard/felt combination to fit tightly around and rest flat against the weight of the Sutherland Rub tester. Draw an arrow running parallel to the long dimension of the cardboard on this scored side of the cardboard.

Cut six pieces of black felt (F-55, or equivalent) to the dimensions of 2.25 in. by 8.5 in. Place a felt piece on top of the unscored, green side of the cardboard such that the long edges of both the felt and cardboard are parallel and in alignment. Make sure the fluffy side of the felt is facing up.

Also allow about 0.5" to overhang the top and bottom most edges of the cardboard. Snugly fold over both overhanging felt edges onto the backside of the cardboard and attach with Scotch brand tape. Prepare a total of six of these felt/cardboard combinations. For best reproducibility, all samples should be run with the same lot of felt.

iii. Care of 4-Pound Weight

The four-pound weight has four square inches of effective contact area providing a contact pressure of one pound per square inch. Since the contact pressure can be changed by alteration of the rubber pads mounted on the face of the weight, it is important to use only the rubber pads supplied by the instrument manufacturer and mounted according to their instructions. These pads must be replaced if they become hard, abraded, or chipped off. When not in use, the weight must be positioned such that the pads are not supporting the full weight of the weight. It is best to store the weight on its side.

iv. Rub Tester Instrument Calibration

Set up and calibrate the Sutherland Rub Tester according to the manufacturer's instructions. For this method, the tester is preset to run for five strokes (one stroke is a full forward and reverse cycle of the movable arm) and operates at 42 cycles per minute.

v. Color Spectrophotometer Calibration

Setup and standardize the color instrument using a 2 in. measurement area port size utilizing the manufacturer supplied black tile, then white tile. Calibrate the instrument according to manufacturer's specifications using their supplied standard tiles and configure it to measure Hunter L, a, b values.

vi. Measurement of Samples

The first step in the measurement of lint is to measure the Hunter color values of the black felt/cardboard samples prior to being rubbed on the web sample. Center a felt covered cardboard, with the arrow pointing to the back of the color meter, over the measurement port backing it with a standard white plate. Since the felt width is only slightly larger than the viewing area diameter, make sure the felt completely covers the measurement area. After confirming complete coverage, take a reading and record the Hunter L value.

Measure the Hunter Color L values for all the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the rubbing of the web sample/cardboard combinations, secure a prepared web sample card on the base plate of the rub tester by slipping the holes in the board over the hold-down pins. Clip a prepared felt covered card (with established initial "L" reading) onto the four-pound weight by pressing the card ends evenly under the clips on the sides of the weight. Make certain the card is centered score bend to score bend on the weight, positioned flat against the rubber pads, with the felt side facing away from the rubber pads. Hook the weight onto the tester arm and gently lower onto the prepared web sample card. It is important to check that the felt is resting flat on the web sample and that the weight does not bind on the arm.

Next, activate the tester allowing the weighted felt test strip to complete five full rubbing strokes against the web sample surface. At the end of the five strokes the tester will automatically stop. Remove the weight with the felt covered cardboard. Inspect the web sample. If torn, discard the felt and web sample and start over. If the web sample is intact, remove the felt covered cardboard from the weight. Measure the Hunter Color L value on the felt covered cardboard in the same location as described above for the blank felts. Record the Hunter Color L readings for the felt after rubbing. Rub, measure, and record the Hunter Color L values for all remaining samples. After all web specimens have been measured, remove and discard all felt. Felts strips are not used again. Cardboards are used until they are bent, torn, limp, or no longer have a smooth surface.

vii. Calculations

For samples measured on both surfaces, subtract the average initial L reading found for the unused felts from each of the three first-side surface L readings and each of the three second-side surface L readings. Calculate the average delta for the three first-side surface values. Calculate the average delta for the three second-side surface values. Finally, calculate the average of the lint value on the first-side surface and the second-side surface, and record as the lint value to the nearest whole unit.

For samples measured on only one surface, subtract the average initial L reading found for the unused felts from each of the three L readings. Calculate the average delta L for the three surface values and record as the lint value to the nearest whole unit.

Formation Index Test Method:

The formation index is a ratio of the contrast and size distribution components of the nonwoven substrate. The higher the formation index, the better the formation uniformity. Conversely, the lower the formation index, the worse the formation uniformity. The "formation index" is measured using a commercially available PAPRICAN Micro-Scanner Code LAD94, manufactured by OpTest Equipment, Incorporated, utilizing the software developed by PAPRICAN & OpTest, Version 9.0, both commercially available from OpTest Equipment Inc., Ontario, Canada. The PAPRICAN Micro-Scanner Code LAD94 uses a video camera system for image input and a light box for illuminating the sample. The camera is a CCD camera with 65 um/pixel resolution.

The video camera system views a nonwoven sample placed on the center of a light box having a diffuser plate. To illuminate the sample for imaging, the light box contains a diffused quartz halogen lamp of 82V/250 W that is used to provide a field of illumination. A uniform field of illumination of adjustable intensity is provided. Specifically, samples for the formation index testing are cut from a cross direction width strip of the nonwoven substrate. The samples are cut into 101.6 mm (4 inches) by 101.6 mm (4 inches) squares, with one side aligned with the machine direction of the test material. The side aligned with the machine direction of the test material is placed onto the testing area and held in place by the specimen plate with the machine direction pointed towards the instrument support arm that holds the camera. Each specimen is placed on the light box such that the side of the web to be measured for uniformity is facing up, away from the diffuser plate. To determine the formation index, the light level must be adjusted to indicate MEAN LCU GRAY LEVEL of 128±1.

The specimen is set on the light box between the specimen plate so that the center of the specimen is aligned with the center of the illumination field. All other natural or artificial room light is extinguished. The camera is adjusted so that its optical axis is perpendicular to the plane of the specimen and so that its video field is centered on the center of the specimen. The specimen is then scanned and calculated with the OpTest Software.

Fifteen specimens of the nonwoven substrate were tested for each sample and the values were averaged to determine the formation index.

Density and Bulk (Dry) Test Method:

The density of a fibrous structure and/or sanitary tissue product is calculated as the quotient of the Basis Weight of a fibrous structure or sanitary tissue product expressed in lbs/3000 ft2 divided by the Caliper (at 95 g/in$^2$) of the fibrous structure or sanitary tissue product expressed in mils. The final Density value is calculated in lbs/ft^3 and/or g/cm$^3$, by using the appropriate converting factors. The bulk of a fibrous structure and/or sanitary tissue product is the reciprocal of the density method (i.e., Bulk=1/Density).

Dry Thick Compression and Recovery Test Method ("Dry Compression" or "Compressive Slope (Dry)"):

Dry Thick Compression and Dry Thick Compressive Recovery are measured using a constant rate of extension tensile tester (a suitable instrument is the EJA Vantage, Thwing-Albert, West Berlin NJ, or equivalent) fitted with compression fixtures, a circular compression foot having an area of 1.0 in$^2$ and a circular anvil having an area of at least 4.9 in$^2$. The thickness (caliper in mils) is measured at varying pressure values ranging from 10-1500 g/in$^2$ in both the compression and relaxation directions.

Four (4) samples are prepared by the cutting of a usable unit obtained from the outermost sheets of a finished product roll after removing at least the leading five sheets by unwinding and tearing off via the closest line of weakness, such that each cut sample is 2.5×2.5 inches, avoiding creases, folds, and obvious defects.

The compression foot and anvil surfaces are aligned parallel to each other, and the crosshead zeroed at the point where they are in contact with each other. The tensile tester is programmed to perform a compression cycle, immediately followed by an extension (recovery) cycle. Force and extension data are collected at a rate of 50 Hz, with a crosshead speed of 0.10 in/min. Force data is converted to pressure (g/in$^2$, or gsi). The compression cycle continues until a pressure of 1500 gsi is reached, at which point the crosshead stops and immediately begins the extension (recovery) cycle with the data collection and crosshead speed remaining the same.

The sample is placed flat on the anvil fixture, ensuring the sample is centered beneath the foot so that when contact is made the edges of the sample will be avoided. Start the tensile tester and data collection. Testing is repeated in like fashion for all four samples.

The thickness (mils) vs. pressure (g/in$^2$, or gsi) data is used to calculate the sample's compressibility, near-zero load caliper, and compressive modulus. A least-squares linear regressions is performed on the thickness vs. the logarithm (base10) of the applied pressure data using nine discrete data points at pressures of 10, 25, 50, 75, 100, 125, 150, 200, 300 gsi and their respective thickness readings. Compressibility (m) equals the slope of the linear regression line, with units of mils/log (gsi). The higher the magnitude of the negative value the more "compressible" the sample is. Near-zero load caliper (b) equals the y-intercept of the linear regression line, with units of mils. This is the extrapolated thickness at log (1 gsi pressure). Compressive Modulus is calculated as the y-intercept divided by the negative slope (−b/m) with units of log (gsi).

Dry Thick Compression is defined as:

Dry Thick Compression (mils mils/log (gsi)=−1×
Near Zero Load Caliper (b)×Compressibility
(m)

Compression Slope is defined as −1×Compressibility (m).

Multiplication by −1 turns formula into a positive. Larger results represent thick products that compress when a pressure is applied. Calculate the arithmetic mean of the four replicate values and report Dry Thick Compression to the nearest integer value mils*mils/log (gsi).

Dry Thick Compressive Recovery is defined as:

Dry Thick Compressive Recovery $$(\text{mils} \cdot \text{mils/log(gsi)}) = -1 \times \text{Near Zero Load Caliper}$$

$$(b) \times \text{Compressibility}\, (m) \times \frac{\text{Recovered Thickness at 10 gsi}}{\text{Compressed Thickness at 10 gsi}}$$

Multiplication by −1 turns formula into a positive. Larger results represent thick products that compress when a pressure is applied and maintain fraction recovery at 10 g/in$^2$. Compressed thickness at 10 g/in$^2$ is the thickness of the material at 10 g/in$^2$ pressure during the compressive portion of the test. Recovered thickness at 10 g/in$^2$ is the thickness of the material at 10 g/in$^2$ pressure during the recovery portion of the test. Calculate the arithmetic mean of the four replicate values and report Dry Thick Compressive Recovery to the nearest integer value mils*mils/log (gsi).

Wet Thick Compression and Recovery Test Method (Wet Compression):

Wet Thick Compression and Wet Thick Compressive Recovery are measured using a constant rate of extension tensile tester (a suitable instrument is the EJA Vantage, Thwing-Albert, West Berlin NJ, or equivalent) fitted with compression fixtures, a circular compression foot having an area of 1.0 in$^2$ and a circular anvil having an area of at least 4.9 in$^2$. The thickness (caliper in mils) is measured at varying pressure values ranging from 10-1500 g/in$^2$ in both the compression and relaxation directions.

Four (4) samples are prepared by the cutting of a usable unit obtained from the outermost sheets of a finished product roll after removing at least the leading five sheets by unwinding and tearing off via the closest line of weakness, such that each cut sample is 2.5×2.5 inches, avoiding creases, folds, and obvious defects.

The compression foot and anvil surfaces are aligned parallel to each other, and the crosshead zeroed at the point where they are in contact with each other. The tensile tester is programmed to perform a compression cycle, immediately followed by an extension (recovery) cycle. Force and extension data are collected at a rate of 50 Hz, with a crosshead speed of 0.10 in/min. Force data is converted to pressure (g/in$^2$, or gsi). The compression cycle continues until a pressure of 1500 gsi is reached, at which point the crosshead stops and immediately begins the extension (recovery) cycle with the data collection and crosshead speed remaining the same.

The sample is placed flat on the anvil fixture, ensuring the sample is centered beneath the foot so that when contact is made the edges of the sample will be avoided. Using a pipette, fully saturate the entire sample with distilled or deionized water until there is no observable dry area remaining and water begins to run out of the edges. Start the tensile tester and data collection. Testing is repeated in like fashion for all four samples.

The thickness (mils) vs. pressure (g/in$^2$, or gsi) data is used to calculate the sample's compressibility, "near-zero load caliper", and compressive modulus. A least-squares linear regressions is performed on the thickness vs. the logarithm (base10) of the applied pressure data using nine discrete data points at pressures of 10, 25, 50, 75, 100, 125, 150, 200, 300 gsi and their respective thickness readings. Compressibility (m) equals the slope of the linear regression line, with units of mils/log (gsi). The higher the magnitude of the negative value the more "compressible" the sample is. Near-zero load caliper (b) equals the y-intercept of the linear regression line, with units of mils. This is the extrapolated thickness at log (1 gsi pressure). Compressive Modulus is calculated as the y-intercept divided by the negative slope (−b/m) with units of log (gsi).

Wet Thick Compression is defined as:

Dry Thick Compression (mils mils/log (gsi)=−1× Near Zero Load Caliper (b)×Compressibility (m)

Multiplication by −1 turns formula into a positive. Larger results represent thick products that compress when a pressure is applied. Calculate the arithmetic mean of the four replicate values and report Wet Thick Compression to the nearest integer value mils*mils/log (gsi).

Wet Thick Compressive Recovery is defined as:

Dry Thick Compressive Recovery $$(\text{mils} \cdot \text{mils/log(gsi)}) = -1 \times \text{Near Zero Load Caliper}$$
$$(b) \times \text{Compressibility} (m) \times \frac{\text{Recovered Thickness at 10 gsi}}{\text{Compressed Thickness at 10 gsi}}$$

Multiplication by −1 turns formula into a positive. Larger results represent thick products that compress when a pressure is applied and maintain fraction recovery at 10 g/in$^2$. Compressed thickness at 10 g/in$^2$ is the thickness of the material at 10 g/in$^2$ pressure during the compressive portion of the test. Recovered thickness at 10 g/in$^2$ is the thickness of the material at 10 g/in$^2$ pressure during the recovery portion of the test. Calculate the arithmetic mean of the four replicate values and report Wet Thick Compressive Recovery to the nearest integer value mils*mils/log (gsi).

Moist Towel Surface Structure Test Method:

This test method measures the surface topography of a towel surface, both in a dry and moist state, and calculates the % contact area and the median depth of the lowest 10% of the projected measured area, with the test sample under a specified pressure using a smooth and rigid transparent plate with an anti-reflective coating (to minimize and/or eliminate invalid image pixels).

Condition the samples or useable units of product, with wrapper or packaging materials removed, in a room conditioned at 50±2% relative humidity and 23° C.±1° C. (73°±2° F.) for a minimum of two hours prior to testing. Do not test useable units with defects such as wrinkles, tears, holes, effects of tail seal or core adhesive, etc., and when necessary, replace with other useable units free of such defects. Test sample dimensions shall be of the size of the usable unit, removed carefully at the perforations if they are present. If perforations are not present, or for samples larger than 8 inches MD by 11 inches CD, cut the sample to a length of approximately 6 inches in the MD and 11 inches in the CD. In this test only the inside surface of the usable unit(s) is analyzed. The inside surface is identified as the surface oriented toward the interior core when wound on a product roll (i.e., the opposite side of the surface visible on the outside roll as presented to a consumer).

The instrument used in this method is a Gocator 3210 Snapshot System (LMI Technologies, Inc., 9200 Glenlyon Parkway, Burnaby, BC V5J 5J8 Canada), or equivalent. This instrument is an optical 3D surface topography measurement system that measures the surface height of a sample using a projected structured light pattern technique. The result of the measurement is a topography map of surface height (z-directional or z-axis) versus displacement in the x-y plane. This particular system has a field of view of approximately 100×154 mm, however the captured images are cropped to 80×130 mm (from the center) prior to analysis. The system has an x-y pixel resolution of 86 microns. The clearance distance from the camera to the testing surface (which is smooth and flat, and perpendicular to the camera view) is 23.5 (+/−0.2) cm—see FIG. 10. Calibration plates can be used to verify that the system is accurate to manufacturer's specifications. The system is set to a Brightness value of 7, and a Dynamic value of 3, in order to most accurately capture the surface topography and minimize non-measured pixels and noise. Other camera settings may be used, with the objective of most accurately measuring the surface topography, while minimizing the number of invalid and non-measurable points.

Test samples are handled only at their corners. The test sample is first weighted on a scale with at least 0.001 gram accuracy, and its dry weight recorded to the nearest 0.01 gram. It is then placed on the testing surface, with its inside face oriented towards the Gocator camera, and centered with respect to the imaging view. A smooth and rigid transparent plate (8×10 inches) is gently placed on top of the test sample, centered with respect to its x-y dimensions. Equal size weights are placed on the four corners of the transparent plate such that they are close to the four corners of the projected imaged area, but do not interfere in any way with the measurement image. The size of each equal sized weight is such that the total weight of transparent plate and the four weights delivers a total pressure of 25 (+/−1) grams per square inch (gsi) to the test sample under the plate. Within 15 seconds of placing the four weights in their proper position, the Gocator system is then initiated to acquire the topography image of the test sample in its 'dry' state.

Immediately after saving the Gocator image of the 'dry' state image, the weights and plate are removed from the test sample. The test sample is then moved to a smooth, clean countertop surface, with its inside face still up. Using a pipette, 15-30 ml of deionized water is distributed evenly across the entire surface of the test sample until it is visibly apparent that the water has fully wetted the entire test sample, and no unwetted area is observed. The wetting process is to be completed in less than a minute. The wet test sample is then gently picked up by two adjacent corners, so that it hangs freely (dripping may occur), and carefully placed on a sheet of blotter paper (Whatman cellulose blotting paper, grade GB003, cut to dimensions larger than the test sample). The wet test sample must be placed flat on the blotting paper without wrinkles or folds present. A smooth, 304 stainless steel cylindrical rod (density of ~8 g/cm$^3$), with dimensions of 1.75 inch diameter and 12 inches long, is then rolled over the entire test sample at a speed of 1.5-2.0 inches per second, in the direction of the shorter of the two dimensions of the test sample. If creases or folds are created during the rolling process, and are inside the central area of the sample to be measured (i.e., if they cannot slightly adjusted or avoided in the topography measurement), then the test sample is to be discarded for a new test sample, and the measurement process started over. Otherwise, the moist sample is picked up by two adjacent corners and weighed on the scale to the nearest 0.01 gram (i.e., its moist weight). At this point, the moist test paper towel test sample will have a moisture level between 1.25 and 2.00 grams $H_2O$ per gram of initial dry material.

The moist test sample is then placed flat on the Gocator testing surface (handling it carefully, only touching its corners), with its inside surface pointing towards the Gocator camera, and centered with respect to the imaging view (as close to the same position it was for the 'dry' state image). After ensuring that the sample is flat, and no folds or creases are present in the imaging area, the smooth and rigid transparent plate (8×10 inches) is gently placed on top of the test sample, centered with respect to its x-y dimensions. The equal size weights are placed on the four corners of the transparent plate (i.e., the same weights that were used in the dry sample testing) such that they are close to the four corners of the projected imaged area, but do not interfere in any way with the measurement image. Within 15 seconds of placing the four weights in their proper position, the Gocator system is then initiated to acquire the topography image of the test sample in its 'moist' state.

At this point, the test sample has both 'dry' and 'moist' surface topography (3D) images. These are processed using surface texture analysis software such as MountainsMap® (available from Digital Surf, France) or equivalent, as follows: 1) The first step is to crop the image. As stated previously, this particular system has a field of view of approximately 100×154 mm, however the image is cropped to 80×130 mm (from the center). 2) Remove 'invalid' and non-measured points. 3) Apply a 3×3 median filter (to reduce effects of noise). 4) Apply an 'Align' filter, which subtracts a least squares plane to level the surface (to create an overall average of heights centered at zero). 5) Apply a Gaussian filter (according to ISO 16610-61) with a nesting index (cut-off wavelength) of 25 mm (to flatten out large scale waviness, while preserving finer structure).

From these processed 3D images of the surface, the following parameters are calculated, using software such as MountainsMap® or equivalent: Dry Depth (um), Dry Contact Area (%), Moist Depth (um), and Moist Contact Area (%).

Height measurements are derived from the Areal Material Ratio (Abbott-Firestone) curve described in the ISO 13565-2:1996 standard extrapolated to surfaces. This curve is the cumulative curve of the surface height distribution histogram versus the range of surface heights measured. A material ratio is the ratio, expressed as a percent, of the area corresponding to points with heights equal to or above an intersecting plane passing through the surface at a given height, or cut depth, to the cross-sectional area of the evaluation region (field of view area). For calculating contact area, the height at a material ratio of 2% is first identified. A cut depth of 100 um below this height is then identified, and the material ratio at this depth is recorded as the "Dry Contact Area" and "Moist Contact Area", respectively, to the nearest 0.1%.

In order to calculate "Depth" (Dry and Moist, respectively), the depth at the 95% material ratio relative to the mean plane (centered height data) of the specimen surface is identified. This corresponds to a depth equal to the median of the lowest 10% of the projected area (valleys) of the specimen surface and is recorded as the "Dry Depth" and "Moist Depth", respectively, to the nearest 1 micron (um). These values will be negative as they represent depths below the mean plane of the surface heights having a value of zero.

Three replicate samples are prepared and measured in this way, to produce an average for each of the four parameters: Dry Depth (um), Dry Contact Area (%), Moist Depth (um), and Moist Contact Area (%). Additionally, from these parameters, the difference between the dry and moist depths can be calculated to demonstrate the change in depth from the dry to the moist state.

Micro-CT Intensive Property Measurement Method:

The micro-CT intensive property measurement method measures the basis weight, thickness and density values within visually discernable zones or regions of a substrate sample. It is based on analysis of a 3D x-ray sample image obtained on a micro-CT instrument (a suitable instrument is the Scanco μCT 50 available from Scanco Medical AG, Switzerland, or equivalent). The micro-CT instrument is a cone beam microtomograph with a shielded cabinet. A maintenance free x-ray tube is used as the source with an adjustable diameter focal spot. The x-ray beam passes through the sample, where some of the x-rays are attenuated by the sample. The extent of attenuation correlates to the mass of material the x-rays have to pass through. The transmitted x-rays continue on to the digital detector array and generate a 2D projection image of the sample. A 3D image of the sample is generated by collecting several individual projection images of the sample as it is rotated, which are then reconstructed into a single 3D image. The instrument is interfaced with a computer running software to control the image acquisition and save the raw data. The 3D image is then analyzed using image analysis software (a suitable image analysis software is MATLAB available from The Mathworks, Inc., Natick, MA, or equivalent) to measure the basis weight, thickness and density intensive properties of regions within the sample.

Sample Preparation

To obtain a sample for measurement, lay a single layer of the dry substrate material out flat and die cut a circular piece with a diameter of 16 mm. If the sample being measured is a 2 (or more) ply finished product, carefully separate an individual ply of the finished product prior to die cutting. The sample weight is recorded. A sample may be cut from any location containing the region or cells to be analyzed. Regions, zones, or cells within different samples taken from the same substrate material can be analyzed and compared to each other. Care should be taken to avoid embossed regions, folds, wrinkles, or tears when selecting a location for sampling.

Image Acquisition

Set up and calibrate the micro-CT instrument according to the manufacturer's specifications. Place the sample into the appropriate holder, between two rings of low-density material, which have an inner diameter of 12 mm. This will allow the central portion of the sample to lay horizontal and be scanned without having any other materials directly adjacent to its upper and lower surfaces. Measurements should be taken in this region. The 3D image field of view is approximately 20 mm on each side in the xy-plane with a resolution of approximately 3400 by 3400 pixels, and with a sufficient number of 6 micron thick slices collected to fully include the z-direction of the sample. The reconstructed 3D image contains isotropic voxels of 6 microns. Images were acquired with the source at 45 kVp and 133 μA with no additional low energy filter. These current and voltage settings should be optimized to produce the maximum contrast in the projection data with sufficient x-ray penetration through the sample, but once optimized held constant for all substantially similar samples. A total of 1700 projections images are obtained with an integration time of 500 ms and 4 averages. The projection images are reconstructed into the 3D image and saved in 16-bit format to preserve the full detector output signal for analysis.

Image Processing

Load the 3D image into the image analysis software. The largest cross-sectional area of the sample should be nearly parallel with the x-y plane, with the z-axis being perpendicular. Threshold the 3D image at a value which separates, and removes, the background signal due to air, but maintains the signal from the sample fibers within the substrate.

Five 2D intensive property images are generated from the thresholded 3D image. The first is the Basis Weight Image, which is a projection image. Each x-y pixel in this image represents the summation of the intensity values along voxels in the z-direction. This results in a 2D image where each pixel now has a value equal to the cumulative signal through the entire sample.

The weight of the sample divided by the z-direction projected area of the punched sample provides the actual average basis weight of the sample. This correlates with the average signal intensity from the Basis Weight image described above, allowing it to be represented in units of $g/m^2$ (gsm).

The second intensive property 2D image is the Thickness Image. To generate this image the upper and lower surfaces of the sample are identified, and the distance between these surfaces is calculated giving the sample thickness. The upper surface of the sample is identified by starting at the uppermost z-direction slice and evaluating each slice going through the sample to locate the z-direction voxel for all pixel positions in the xy-plane where sample signal was first detected. The same procedure is followed for identifying the lower surface of the sample, except the z-direction voxels located are all the positions in the xy-plane where sample signal was last detected. Once the upper and lower surfaces have been identified they are smoothed with a 15×15 median filter to remove signal from stray fibers. The 2D Thickness Image is then generated by counting the number of voxels that exist between the upper and lower surfaces for each of the pixel positions in the xy-plane. This raw thickness value is then converted to actual distance, in microns, by multiplying the voxel count by the 6 um slice thickness resolution.

The third intensive property 2D image is the Density Image (see for example FIG. 12). To generate this image, divide each xy-plane pixel value in the Basis Weight Image, in units of gsm, by the corresponding pixel in the Thickness Image, in units of microns. The units of the Density Image are grams per cubic centimeter (g/cc).

For each x-y location, the first and last occurrence of a thresholded voxel position in the z-direction is recorded. This provides two sets of points representing the Top Layer and Bottom Layer of the sample. Each set of points are fit to a second-order polynomial to provide smooth top and bottom surfaces. These surfaces define fourth and fifth 2D intensive property images, the top-layer and bottom-layer of the sample. These surfaces are saved as images with the gray values of each pixel representing the z-value of the surface point.

Micro-CT Basis Weight, Thickness and Density Intensive Properties

This sub-section of the method may be used to measure zones or regions generally. Begin by identifying the zone or region to be analyzed. Next, identify the boundary of the identified region to be analyzed. The boundary of a region is identified by visual discernment of differences in intensive properties when compared to other regions within the sample. For example, a region boundary can be identified based by visually discerning a thickness difference when compared to another region in the sample. Any of the intensive properties can be used to discern region boundaries on either on the physical sample itself or any of the micro-CT intensive property images. Once the boundary of a zone or region has been identified draw the largest circular region of interest that can be inscribed within the region. From each of the first three intensive property images calculate the average basis weight, thickness, and density within the region of interest. Record these values as the region's micro-CT basis weight to the nearest 0.01 gsm, micro-CT thickness to the nearest 0.1 micron and micro-CT density to the nearest 0.0001 g/cc.

To calculate the percent difference between zones or regions may be calculated according to the "Percent (%) difference" definition above.

Concavity Ratio and Packing Fraction Measurements

As outlined above, five different types of 2D intensive property images are created. These images include: (1) a basis weight image, (2) a thickness image, (3) a density image, (4) a top-layer image, and (5) a bottom-layer image.

To measure discrete pillow and knuckle Concavity Ratio and Packing Fraction, begin by identifying the boundary of the selected discrete pillow or knuckle cells. The boundary of a cell is identified by visual discernment of differences in intensive properties when compared to other cells within the sample. For example, a cell boundary can be identified based by visually discerning a density difference when compared to another cell in the sample. Any of the intensive properties (basis weight, thickness, density, top-layer, and bottom-layer) can be used to discern cell boundaries on either the physical sample itself or any of the micro-CT 2D intensive property images.

Using the image analysis software, manually draw a line tracing the identified boundary of each individual whole and partial discrete knuckle or discrete pillow cell 24 visible within the sample boundary 100, and generate a new binary image containing only the closed filled in shapes of all the identified discrete cells (see for example FIG. 13). Analyze all the individual discrete cell shapes in the binary image and record the following measurements for each: 1) Area and 2) Convex Hull Area.

The Concavity Ratio is a measure of the presence and extent of concavity within the shapes of the discrete knuckle or pillow cells. Using the recorded measurements calculate the Concavity Ratio for each of the analyzed discrete cells as the ratio of the shape area to its convex hull area. Identify ten substantially similar replicate discrete knuckle or pillow cells and average together their individual Concavity Ratio values and report the average Concavity Ratio as a unitless value to the nearest 0.01. If ten replicate cells cannot be identified in a single sample, then a sufficient number of replicate samples are to be analyzed according to the described procedure. If the sample contains discrete knuckle or pillow cells of differing size or shape, identify ten substantially similar replicates of each of the different shapes and sizes, calculate an average Concavity Ratio for each and report the minimum average Concavity Ratio value.

The Packing Fraction is the fraction of the sample area filled by the discrete knuckle and pillow shapes. The Packing Fraction value for the sample is calculated by summing all the recorded whole and partial identified shape areas, regardless of shape or size, and dividing that total by the sample area within the sample boundary 100. The Packing Fraction is reported as a unitless value to the nearest 0.01.

Continuous Region Density Difference Measurement

This sub-section of the method may be used when a continuous region is present. To measure the Continuous Region Density Difference, first identify a Cell Group 40 of four adjacent and nearest-neighboring discrete knuckle (e.g., FIG. 11, 20-A through 20-D) or pillow cells and their boundaries as described above, such that when the centroids of each of the four cells are connected a quadrilateral will be formed having four edges 90 and two diagonals 92 (see for example FIG. 11). Avoid analyzing any Cells Groups containing embossing. Within this Cell Group identify the continuous pillow or knuckle region. Select five locations to analyze within the identified continuous region: One will be located on each of the cell centroid connecting lines forming the four edges of the quadrilateral, and one located in the middle where the quadrilateral diagonals intersect. At each of the selected locations draw the largest circular region of interest that can be inscribed within the continuous region, with the center of each of the four edge regions of interest lying on the centroid connecting line (e.g., pillow regions 22-1, 22-3, 22-8, 22-9) and the middle region of interest centered at the location where the diagonals intersect (e.g., 22-2). From the density intensive property image calculate and record the average density within each of the five regions of interest. Calculate and record the percent difference between the highest and lowest recorded density values. Percent difference is calculated by: subtracting the lowest density value from the highest density value and then dividing that value by the average of the lowest and highest density values, and then multiplying the result by 100. Perform this analysis for three substantially similar replicate Cell Groups of four discrete knuckle or pillow locations within the sample and report the average percent difference value to the nearest whole percent.

Continuous Region Density Difference Measurement

This sub-section of the method may be used when a continuous region is present. To measure the Continuous Region Density Difference, first identify a Cell Group 40 of four adjacent and nearest-neighboring discrete knuckle (e.g., FIG. 11, 20-A through 20-D) or pillow cells and their boundaries as described above, such that when the centroids of each of the four cells are connected a quadrilateral will be formed having four edges 90 and two diagonals 92 (see for example FIG. 11). Avoid analyzing any Cells Groups containing embossing. Within this Cell Group identify the continuous pillow or knuckle region. Select five locations to analyze within the identified continuous region: One will be located on each of the cell centroid connecting lines forming the four edges of the quadrilateral, and one located in the middle where the quadrilateral diagonals intersect. At each of the selected locations draw the largest circular region of interest that can be inscribed within the continuous region, with the center of each of the four edge regions of interest lying on the centroid connecting line (e.g., pillow regions 22-1, 22-3, 22-8, 22-9) and the middle region of interest centered at the location where the diagonals intersect (e.g., 22-2). From the density intensive property image calculate and record the average density within each of the five regions of interest. Calculate and record the percent difference between the highest and lowest recorded density values. Percent difference is calculated by: subtracting the lowest density value from the highest density value and then dividing that value by the average of the lowest and highest density values, and then multiplying the result by 100. Perform this analysis for three substantially similar replicate Cell Groups of four discrete knuckle or pillow locations within the sample and report the average percent difference value to the nearest whole percent.

Micro-CT Basis Weight, Thickness and Density Intensive Properties

This sub-section of the method may be used to measure zones or regions generally. Once the boundary of a zone or region has been identified draw the largest circular region of interest that can be inscribed within the region. From each of the first three intensive property images calculate the average basis weight, thickness and density within the region of interest. Record these values as the region's micro-CT basis weight to the nearest 0.01 gsm, micro-CT thickness to the nearest 0.1 micron and micro-CT density to the nearest 0.0001 g/cc. To calculate and record the percent difference between ZONES OR REGIONS: the highest and lowest recorded density values. Percent difference is calculated by: subtracting the lowest density value from the highest density value and then dividing that value by the average of the lowest and highest density values, and then multiplying the result by 100.

Basis Weigh—Method:

Basis weight of a fibrous structure and/or sanitary tissue product (TAPPI conditioned as follows: Temperature is controlled from 23° C.±1° C. and Relative Humidity is controlled from 50%±2%) is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 ft$^2$ or g/m$^2$ as follows:

$$\text{Basis Weight} = (\text{Mass of stack})/[(\text{Area of 1 square in stack}) \times (\text{No. of squares in stack})]$$

For example:

$$\text{Basis Weight (lbs/3000 ft}^2) = [[\text{Mass of stack (g)}/453.6(\text{g/lbs})]/[12.25(\text{in}^2)/144(\text{in}^2/\text{ft}^2) \times 12]] \times 3000$$

or, $$\text{Basis Weight (g/m}^2) = \text{Mass of stack (g)}/[79.032 (\text{cm}^2)/10,000(\text{cm}^2/\text{m}^2) \times 12].$$

Report the numerical result to the nearest 0.1 lbs/3000 ft$^2$ or 0.1 g/m$^2$ or "gsm." Sample dimensions can be changed or varied using a similar precision cutter as mentioned above, so as at least 100 square inches of sample area in stack.

Emtec Test Method:

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about ("no greater than about" used interchangeably with "less than about" herein) 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2° C. and 50%±2%) for at least 1 hour prior to conducting the TSA testing, which is also conducted under TAPPI conditions.

Testing Procedure

Calibrate the instrument according to the manufacturer's instructions using the 1-point calibration method with Emtec reference standards ("ref.2 samples"). If these reference samples are no longer available, use the appropriate reference samples provided by the manufacturer. Calibrate the instrument according to the manufacturer's recommendation and instruction, so that the results will be comparable to those obtained when using the 1-point calibration method with Emtec reference standards ("ref.2 samples").

Mount the test sample into the instrument and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms. Unless otherwise specified, the reported values for TS7 and TS750 will be the overall average of the eight test values from the top and bottom surfaces.

SST Absorbency Rate Method:

This test incorporates the Slope of the Square Root of Time (SST) Test Method. The SST method measures rate over a wide spectrum of time to capture a view of the product pick-up rate over the useful lifetime. In particular, the method measures the absorbency rate via the slope of the mass versus the square root of time from 2-15 seconds.

Overview

The absorption (wicking) of water by a fibrous sample is measured over time. A sample is placed horizontally in the instrument and is supported with minimal contact during testing (without allowing the sample to droop) by an open weave net structure that rests on a balance. The test is initiated when a tube connected to a water reservoir is raised and the meniscus makes contact with the center of the sample from beneath, at a small negative pressure. Absorption is controlled by the ability of the sample to pull the water from the instrument for approximately 20 seconds. Rate is determined as the slope of the regression line of the outputted weight vs sqrt(time) from 2 to 15 seconds.

Apparatus

Conditioned Room—Temperature is controlled from 73° F.±2° F. (23° C.±1° C.). Relative Humidity is controlled from 50%±2%

Sample Preparation—Product samples are cut using hydraulic/pneumatic precision cutter into 3.375 inch diameter circles.

Capacity Rate Tester (CRT)—The CRT is an absorbency tester capable of measuring capacity and rate. The CRT consists of a balance (0.001 g), on which rests on a woven grid (using nylon monofilament line having a 0.014" diameter) placed over a small reservoir with a delivery tube in the center. This reservoir is filled by the action of solenoid valves, which help to connect the sample supply reservoir to an intermediate reservoir, the water level of which is monitored by an optical sensor. The CRT is run with a −2 mm water column, controlled by adjusting the height of water in the supply reservoir.

A diagram of the testing apparatus set up is shown in FIG. 9.

Software—LabView based custom software specific to CRT Version 4.2 or later.

Water—Distilled water with conductivity <10 µS/cm (target <5 µS/cm) @ 25° C.

Sample Preparation

For this method, a usable unit is described as one finished product unit regardless of the number of plies. Condition all samples with packaging materials removed for a minimum of 2 hours prior to testing. Discard at least the first ten usable units from the roll. Remove two usable units and cut one 3.375-inch circular sample from the center of each usable unit for a total of 2 replicates for each test result. Do not test samples with defects such as wrinkles, tears, holes, etc. Replace with another usable unit which is free of such defects Sample Testing Pre-Test Set-Up 1. The water height in the reservoir tank is set −2.0 mm below the top of the support rack (where the towel sample will be placed).
2. The supply tube (8 mm I.D.) is centered with respect to the support net.
3. Test samples are cut into circles of 3⅜" diameter and equilibrated at Tappi environment conditions for a minimum of 2 hours.

Test Description

1. After pressing the start button on the software application, the supply tube moves to 0.33 mm below the water height in the reserve tank. This creates a small meniscus of water above the supply tube to ensure test initiation. A valve between the tank and the supply tube closes, and the scale is zeroed.
2. The software prompts you to "load a sample". A sample is placed on the support net, centering it over the supply tube, and with the side facing the outside of the roll placed downward.
3. Close the balance windows and press the "OK" button—the software records the dry weight of the circle.
4. The software prompts you to "place cover on sample". The plastic cover is placed on top of the sample, on top of the support net. The plastic cover has a center pin (which is flush with the outside rim) to ensure that the sample is in the proper position to establish hydraulic connection. Four other pins, 1 mm shorter in depth, are positioned 1.25-1.5 inches radially away from the center pin to ensure the sample is flat during the test. The sample cover rim should not contact the sheet. Close the top balance window and click "OK".

5. The software re-zeroes the scale and then moves the supply tube towards the sample. When the supply tube reaches its destination, which is 0.33 mm below the support net, the valve opens (i.e., the valve between the reserve tank and the supply tube), and hydraulic connection is established between the supply tube and the sample. Data acquisition occurs at a rate of 5 Hz and is started about 0.4 seconds before water contacts the sample.
6. The test runs for at least 20 seconds. After this, the supply tube pulls away from the sample to break the hydraulic connection.
7. The wet sample is removed from the support net. Residual water on the support net and cover are dried with a paper towel.
8. Repeat until all samples are tested.
9. After each test is run, a *.txt file is created (typically stored in the CRT/data/rate directory) with a file name as typed at the start of the test. The file contains all the test set-up parameters, dry sample weight, and cumulative water absorbed (g) vs. time (sec) data collected from the test.

Calculation of Rate of Uptake

Take the raw data file that includes time and weight data.

First, create a new time column that subtracts 0.4 seconds from the raw time data to adjust the raw time data to correspond to when initiation actually occurs (about 0.4 seconds after data collection begins).

Second, create a column of data that converts the adjusted time data to square root of time data (e.g., using a formula such as SQRT( ) within Excel).

Third, calculate the slope of the weight data vs the square root of time data (e.g., using the SLOPE( ) function within Excel, using the weight data as the y-data and the sqrt(time) data as the x-data, etc.). The slope should be calculated for the data points from 2 to 15 seconds, inclusive (or 1.41 to 3.87 in the sqrt(time) data column).

Calculation of Slope of the Square Root of Time (SST)

The start time of water contact with the sample is estimated to be 0.4 seconds after the start of hydraulic connection is established between the supply tube and the sample (CRT Time). This is because data acquisition begins while the tube is still moving towards the sample and incorporates the small delay in scale response. Thus, "time zero" is actually at 0.4 seconds in CRT Time as recorded in the *.txt file.

The slope of the square root of time (SST) from 2-15 seconds is calculated from the slope of a linear regression line from the square root of time between (and including) 2 to 15 seconds (x-axis) versus the cumulative grams of water absorbed. The units are $g/sec^{0.5}$.

Reporting Results

Report the average slope to the nearest 0.01 $g/s^{0.5}$.

Plate Stiffness Test Method:

As used herein, the "Plate Stiffness" test is a measure of stiffness of a flat sample as it is deformed downward into a hole beneath the sample. For the test, the sample is modeled as an infinite plate with thickness "t" that resides on a flat surface where it is centered over a hole with radius "R". A central force "F" applied to the tissue directly over the center of the hole deflects the tissue down into the hole by a distance "w". For a linear elastic material, the deflection can be predicted by:

$$w = \frac{3F}{4\pi E t^3}(1-v)(3+v)R^2$$

where "E" is the effective linear elastic modulus, "v" is the Poisson's ratio, "R" is the radius of the hole, and "t" is the thickness of the tissue, taken as the caliper in millimeters measured on a stack of 5 tissues under a load of about 0.29 psi. Taking Poisson's ratio as 0.1 (the solution is not highly sensitive to this parameter, so the inaccuracy due to the assumed value is likely to be minor), the previous equation can be rewritten for "w" to estimate the effective modulus as a function of the flexibility test results:

$$E \approx \frac{3R^2}{4t^3}\frac{F}{w}$$

The test results are carried out using an MTS Alliance RT/l, Insight Renew, or similar model testing machine (MTS Systems Corp., Eden Prairie, Minn.), with a 50 newton load cell, and data acquisition rate of at least 25 force points per second. As a stack of five tissue sheets (created without any bending, pressing, or straining) at least 2.5-inches by 2.5 inches, but no more than 5.0 inches by 5.0 inches, oriented in the same direction, sits centered over a hole of radius 15.75 mm on a support plate, a blunt probe of 3.15 mm radius descends at a speed of 20 mm/min. For typical perforated rolled bath tissue, sample preparation consists of removing five (5) connected usable units, and carefully forming a 5 sheet stack, accordion style, by bending only at the perforation lines. When the probe tip descends to 1 mm below the plane of the support plate, the test is terminated. The maximum slope (using least squares regression) in grams of force/mm over any 0.5 mm span during the test is recorded (this maximum slope generally occurs at the end of the stroke). The load cell monitors the applied force and the position of the probe tip relative to the plane of the support plate is also monitored. The peak load is recorded, and "E" is estimated using the above equation.

The Plate Stiffness "S" per unit width can then be calculated as:

$$S = \frac{Et^3}{12}$$

and is expressed in units of Newtons*millimeters. The Testworks program uses the following formula to calculate stiffness (or can be calculated manually from the raw data output):

$$S = \left(\frac{F}{w}\right)\left[\frac{(3+v)R^2}{16\pi}\right]$$

wherein "F/w" is max slope (force divided by deflection), "v" is Poisson's ratio taken as 0.1, and "R" is the ring radius.

The same sample stack (as used above) is then flipped upside down and retested in the same manner as previously described. This test is run three more times (with different sample stacks). Thus, eight S values are calculated from four 5-sheet stacks of the same sample. The numerical average of these eight S values is reported as Plate Stiffness for the sample.

Stack Compressibility and Resilient Bulk Test Method:

Stack thickness (measured in mils, 0.001 inch) is measured as a function of confining pressure (g/in$^2$) using a Thwing-Albert (14 W. Collings Ave., West Berlin, NJ) Vantage Compression/Softness Tester (model 1750-2005 or similar) or equivalent instrument, equipped with a 2500 g load cell (force accuracy is +/−0.25% when measuring value is between 10%-100% of load cell capacity, and 0.025% when measuring value is less than 10% of load cell capacity), a 1.128 inch diameter steel pressure foot (one square inch cross sectional area) which is aligned parallel to the steel anvil (2.5 inch diameter). The pressure foot and anvil surfaces must be clean and dust free, particularly when performing the steel-to-steel test. Thwing-Albert software (MAP) controls the motion and data acquisition of the instrument.

The instrument and software are set-up to acquire crosshead position and force data at a rate of 50 points/sec. The crosshead speed (which moves the pressure foot) for testing samples is set to 0.20 inches/min (the steel-to-steel test speed is set to 0.05 inches/min). Crosshead position and force data are recorded between the load cell range of approximately 5 and 1500 grams during compression. The crosshead is programmed to stop immediately after surpassing 1500 grams, record the thickness at this pressure (termed $T_{max}$), and immediately reverse direction at the same speed as performed in compression. Data is collected during this decompression portion of the test (also termed recovery) between approximately 1500 and 5 grams. Since the foot area is one square inch, the force data recorded corresponds to pressure in units of g/in$^2$. The MAP software is programmed to the select 15 crosshead position values (for both compression and recovery) at specific pressure trap points of 10, 25, 50, 75, 100, 125, 150, 200, 300, 400, 500, 600, 750, 1000, and 1250 g/in$^2$ (i.e., recording the crosshead position of very next acquired data point after the each pressure point trap is surpassed). In addition to these 30 collected trap points, $T_{max}$ is also recorded, which is the thickness at the maximum pressure applied during the test (approximately 1500 g/in$^2$).

Since the overall test system, including the load cell, is not perfectly rigid, a steel-to-steel test is performed (i.e., nothing in between the pressure foot and anvil) at least twice for each batch of testing, to obtain an average set of steel-to-steel crosshead positions at each of the 31 trap points described above. This steel-to-steel crosshead position data is subtracted from the corresponding crosshead position data at each trap point for each tested stacked sample, thereby resulting in the stack thickness (mils) at each pressure trap point during the compression, maximum pressure, and recovery portions of the test.

StackT(trap)=StackCP(trap)−SteelCP(trap)

Where:
trap=trap point pressure at either compression, recovery, or max
StackT=Thickness of Stack (at trap pressure)
StackCP=Crosshead position of Stack in test (at trap pressure)
SteelCP=Crosshead position of steel-to-steel test (at trap pressure)

A stack of five (5) usable units thick is prepared for testing as follows. The minimum usable unit size is 2.5 inch by 2.5 inch; however a larger sheet size is preferable for testing, since it allows for easier handling without touching the central region where compression testing takes place. For typical perforated rolled bath tissue, this consists of removing five (5) sets of 3 connected usable units. In this case, testing is performed on the middle usable unit, and the outer 2 usable units are used for handling while removing from the roll and stacking. For other product formats, it is advisable, when possible, to create a test sheet size (each one usable unit thick) that is large enough such that the inner testing region of the created 5 usable unit thick stack is never physically touched, stretched, or strained, but with dimensions that do not exceed 14 inches by 6 inches.

The 5 sheets (one usable unit thick each) of the same approximate dimensions, are placed one on top the other, with their MD aligned in the same direction, their outer face all pointing in the same direction, and their edges aligned+/−3 mm of each other. The central portion of the stack, where compression testing will take place, is never to be physically touched, stretched, and/or strained (this includes never to 'smooth out' the surface with a hand or other apparatus prior to testing).

The 5 sheet stack is placed on the anvil, positioning it such that the pressure foot will contact the central region of the stack (for the first compression test) in a physically untouched spot, leaving space for a subsequent (second) compression test, also in the central region of the stack, but separated by ¼ inch or more from the first compression test, such that both tests are in untouched, and separated spots in the central region of the stack. From these two tests, an average crosshead position of the stack at each trap pressure (i.e., StackCP(trap)) is calculated for compression, maximum pressure, and recovery portions of the tests. Then, using the average steel-to-steel crosshead trap points (i.e., SteelCP(trap)), the average stack thickness at each trap (i.e., StackT(trap) is calculated (mils).

Stack Compressibility is defined here as the absolute value of the linear slope of the stack thickness (mils) as a function of the log(10) of the confining pressure (grams/in$^2$), by using the 15 compression trap points discussed previously (i.e., compression from 10 to 1250 g/in$^2$), in a least squares regression. The units for Stack Compressibility are [mils/(log(g/in$^2$))], and is reported to the nearest 0.1 [mils/(log(g/in$^2$))].

Resilient Bulk is calculated from the stack weight per unit area and the sum of 8 StackT(trap) thickness values from the maximum pressure and recovery portion of the tests: i.e., at maximum pressure ($T_{max}$) and recovery trap points at R1250, R1000, R750, R500, R300, R100, and R10 g/in$^2$ (a prefix of "R" denotes these traps come from recovery portion of the test). Stack weight per unit area is measured from the same region of the stack contacted by the compression foot, after the compression testing is complete, by cutting a 3.50 inch square (typically) with a precision die cutter, and weighing on a calibrated 3-place balance, to the nearest 0.001 gram. The weight of the precisely cut stack, along with the StackT(trap) data at each required trap pressure (each point being an average from the two compression/recovery tests discussed previously), are used in the following equation to calculate Resilient Bulk, reported in units of cm$^3$/g, to the nearest 0.1 cm$^3$/g.

$$\text{Resilient Bulk} = \frac{\text{SUM}\left(StackT\left(\begin{array}{c}T_{\max}, R1250, R1000, R750,\\ R500, R300, R100, R10\end{array}\right)\right)*0.00254}{M/A}$$

Where:
StackT=Thickness of Stack (at trap pressures of $T_{max}$ and recovery pressures listed above), (mils)
M=weight of precisely cut stack, (grams)
A=area of the precisely cut stack, (cm²)

Wet Burst Method:

"Wet Burst Strength" as used herein is a measure of the ability of a fibrous structure and/or a fibrous structure product incorporating a fibrous structure to absorb energy, when wet and subjected to deformation normal to the plane of the fibrous structure and/or fibrous structure product. The Wet Burst Test is run according to ISO 12625-9:2005, except for any deviations or modifications described below.

Wet burst strength may be measured using a Thwing-Albert Burst Tester Cat. No. 177 equipped with a 2000 g load cell commercially available from Thwing-Albert Instrument Company, Philadelphia, Pa, or an equivalent instrument.

Wet burst strength is measured by preparing four (4) multi-ply fibrous structure product samples for testing. First, condition the samples for two (2) hours at a temperature of 73° F.±2° F. (23° C.±1° C.) and a relative humidity of 50% (±2%). Take one sample and horizontally dip the center of the sample into a pan filled with about 25 mm of room temperature distilled water. Leave the sample in the water four (4) (±0.5) seconds. Remove and drain for three (3) (±0.5) seconds holding the sample vertically so the water runs off in the cross-machine direction. Proceed with the test immediately after the drain step.

Place the wet sample on the lower ring of the sample holding device of the Burst Tester with the outer surface of the sample facing up so that the wet part of the sample completely covers the open surface of the sample holding ring. If wrinkles are present, discard the samples and repeat with a new sample. After the sample is properly in place on the lower sample holding ring, turn the switch that lowers the upper ring on the Burst Tester. The sample to be tested is now securely gripped in the sample holding unit. Start the burst test immediately at this point by pressing the start button on the Burst Tester. A plunger will begin to rise (or lower) toward the wet surface of the sample. At the point when the sample tears or ruptures, report the maximum reading. The plunger will automatically reverse and return to its original starting position. Repeat this procedure on three (3) more samples for a total of four (4) tests, i.e., four (4) replicates. Report the results as an average of the four (4) replicates, to the nearest gram.

Wet Tensile Method:

Wet Elongation, Tensile Strength, and TEA are measured on a constant rate of extension tensile tester with computer interface (a suitable instrument is the EJA Vantage from the Thwing-Albert Instrument Co. West Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing Albert) take a CD stack and cut one, 1.00 in ±0.01 in wide by at least 3.0 in long stack of strips (long dimension in CD). In like fashion cut the remaining stack in the MD (strip long dimension in MD), to give a total of 8 specimens, four CD and four MD strips. Each strip to be tested is one usable unit thick, and will be treated as a unitary specimen for testing.

Program the tensile tester to perform an extension test (described below), collecting force and extension data at an acquisition rate of 100 Hz as the crosshead raises at a rate of 2.00 in/min (10.16 cm/min) until the specimen breaks. The break sensitivity is set to 50%, i.e., the test is terminated when the measured force drops below 50% of the maximum peak force, after which the crosshead is returned to its original position.

Set the gage length to 2.00 inches. Zero the crosshead and load cell. Insert the specimen into the upper and lower open grips such that at least 0.5 inches of specimen length is contained each grip. Align the specimen vertically within the upper and lower jaws, then close the upper grip. Verify the specimen is hanging freely and aligned with the lower grip, then close the lower grip. Initiate the first portion of the test, which pulls the specimen at a rate of 0.5 in/min, then stops immediately after a load of 10 grams is achieved. Using a pipet, thoroughly wet the specimen with DI water to the point where excess water can be seen pooling on the top of the lower closed grip. Immediately after achieving this wetting status, initiate the second portion of the test, which pulls the wetted strip at 2.0 in/min until break status is achieved. Repeat testing in like fashion for all four CD and four MD specimens.

Program the software to calculate the following from the constructed force (g) verses extension (in) curve:

Wet Tensile Strength (g/in) is the maximum peak force (g) divided by the specimen width (1 in), and reported as g/in to the nearest 0.1 g/in.

Adjusted Gage Length (in) is calculated as the extension measured (from original 2.00 inch gage length) at 3 g of force during the test following the wetting of the specimen (or the next data point after 3 g force) added to the original gage length (in). If the load does not fall below 3 g force during the wetting procedure, then the adjusted gage length will be the extension measured at the point the test is resumed following wetting added to the original gage length (in).

Wet Peak Elongation (%) is calculated as the additional extension (in) from the Adjusted Gage Length (in) at the maximum peak force point (more specifically, at the last maximum peak force point, if there is more than one) divided by the Adjusted Gage Length (in) multiplied by 100 and reported as % to the nearest 0.1%.

Wet Peak Tensile Energy Absorption (TEA, g*in/in²) is calculated as the area under the force curve (g*in²) integrated from zero extension (i.e., the Adjusted Gage Length) to the extension at the maximum peak force elongation point (more specifically, at the last maximum peak force point, if there is more than one) (in), divided by the product of the adjusted Gage Length (in) and specimen width (in). This is reported as g*in/in² to the nearest 0.01 g*in/in².

The Wet Tensile Strength (g/in), Wet Peak Elongation (%), Wet Peak TEA (g*in/in² are calculated for the four CD specimens and the four MD specimens. Calculate an average for each parameter separately for the CD and MD specimens.

Calculations

> Geometric Mean Initial Wet Tensile Strength=Square Root of [MD Wet Tensile Strength (g/in)×CD Wet Tensile Strength (g/in)]

> Geometric Mean Wet Peak Elongation=Square Root of [MD Wet Peak Elongation (%)×CD Wet Peak Elongation (%)]

Geometric Mean Wet Peak TEA=Square Root of
[MD Wet Peak TEA (g*in/in$^2$)×CD Wet Peak
TEA (g*in/in$^2$)]

Total Wet Tensile (TWT)=MD Wet Tensile Strength
(g/in)+CD Wet Tensile Strength (g/in)

Total Wet Peak TEA=MD Wet Peak TEA (g*in/in$^2$)+
CD Wet Peak TEA (g*in/in$^2$)

Wet Tensile Ratio=MD Wet Peak Tensile Strength
(g/in)/CD Wet Peak Tensile Strength (g/in)

Wet Tensile Geometric Mean (GM) Modulus=Square
Root of [MD Modulus (at 38 g/cm)×CD Modulus (at 38 g/cm)]

This method is typically used for sanitary tissue products in the form of a paper towel. In the present application, unless the term "Finch" or "Finch cup" is coupled with wet tensile terminology, this is the method being referred to. If "Finch" or "Finch cup" is coupled with wet tensile terminology, the Finch Cup Wet Tensile Test Method should be referred to.

Dry Elongation, Tensile Strength, TEA and Modulus Test Methods for Toilet Paper (for Paper Towels, use: "Dry Elongation, Tensile Strength, TEA and Modulus Test Methods for Paper Towels;" for Facial Tissue, use: "Dry Elongation, Tensile Strength, TEA and Modulus Test Methods for Facial Tissue"):

Elongation, Tensile Strength, TEA and Tangent Modulus are measured on a constant rate of extension tensile tester with computer interface (a suitable instrument is the EJA Vantage from the Thwing-Albert Instrument Co. Wet Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Twenty usable units of fibrous structures are divided into four stacks of five usable units each. The usable units in each stack are consistently oriented with respect to machine direction (MD) and cross direction (CD). Two of the stacks are designated for testing in the MD and two for CD. Using a one inch precision cutter (Thwing Albert) take a CD stack and cut two, 1.00 in ±0.01 in wide by at least 3.0 in long strips from each CD stack (long dimension in CD). Each strip is five usable unit layers thick and will be treated as a unitary specimen for testing. In like fashion cut the remaining CD stack and the two MD stacks (long dimension in MD) to give a total of 8 specimens (five layers each), four CD and four MD.

Program the tensile tester to perform an extension test, collecting force and extension data at an acquisition rate of 20 Hz as the crosshead raises at a rate of 4.00 in/min (10.16 cm/min) until the specimen breaks. The break sensitivity is set to 50%, i.e., the test is terminated when the measured force drops to 50% of the maximum peak force, after which the crosshead is returned to its original position.

Set the gage length to 2.00 inches. Zero the crosshead and load cell. Insert the specimen into the upper and lower open grips such that at least 0.5 inches of specimen length is contained each grip. Align specimen vertically within the upper and lower jaws, then close the upper grip. Verify specimen is aligned, then close lower grip. The specimen should be under enough tension to eliminate any slack, but less than 0.05 N of force measured on the load cell. Start the tensile tester and data collection. Repeat testing in like fashion for all four CD and four MD specimens.

Program the software to calculate the following from the constructed force (g) verses extension (in) curve:

Tensile Strength is the maximum peak force (g) divided by the product of the specimen width (1 in) and the number of usable units in the specimen (5), and then reported as Win to the nearest 1 g/in.

Adjusted Gage Length is calculated as the extension measured at 11.12 g of force (in) added to the original gage length (in).

Elongation is calculated as the extension at maximum peak force (in) divided by the Adjusted Gage Length (in) multiplied by 100 and reported as % to the nearest 0.1%.

Tensile Energy Absorption (TEA) is calculated as the area under the force curve integrated from zero extension to the extension at the maximum peak force (g*in), divided by the product of the adjusted Gage Length (in), specimen width (in), and number of usable units in the specimen (5). This is reported as g*in/in$^2$ to the nearest 1 g*in/in$^2$.

Replot the force (g) verses extension (in) curve as a force (g) verses strain curve. Strain is herein defined as the extension (in) divided by the Adjusted Gage Length (in).

Program the software to calculate the following from the constructed force (g) verses strain curve:

Tangent Modulus is calculated as the least squares linear regression using the first data point from the force (g) verses strain curve recorded after 190.5 g (38.1 g×5 layers) force and the 5 data points immediately preceding and the 5 data points immediately following it. This slope is then divided by the product of the specimen width (2.54 cm) and the number of usable units in the specimen (5), and then reported to the nearest 1 g/cm.

The Tensile Strength (g/in), Elongation (%), TEA (g*in/in$^2$) and Tangent Modulus (g/cm) are calculated for the four CD specimens and the four MD specimens. Calculate an average for each parameter separately for the CD and MD specimens.

Calculations

Geometric Mean Tensile=Square Root of [MD Tensile Strength (g/in)×CD Tensile Strength (g/in)]

Geometric Mean Peak Elongation=Square Root of
[MD Elongation (%)×CD Elongation (%)]

Geometric Mean TEA=Square Root of [MD TEA
(g*in/in$^2$)×CD TEA (g*in/in$^2$)]

Geometric Mean Modulus=Square Root of [MD
Modulus (g/cm)×CD Modulus (g/cm)]

Total Dry Tensile Strength (TDT)=MD Tensile
Strength (g/in)+CD Tensile Strength (g/in)

Total TEA=MD TEA (g*in/in$^2$)+CD TEA (g*in/in$^2$)

Total Modulus=MD Modulus (g/cm)+CD Modulus
(g/cm)

Tensile Ratio=MD Tensile Strength (g/in)/CD Tensile Strength (g/in)

Dry Elongation, Tensile Strength, TEA and Modulus Test Methods for Facial Tissue (for Paper Towels, use: "Dry Elongation, Tensile Strength, TEA and Modulus Test Methods for Paper Towels;" for Toilet Paper, use: "Dry Elongation, Tensile Strength, TEA and Modulus Test Methods for Toilet Paper"):

Elongation, Tensile Strength, TEA and Tangent Modulus are measured on a constant rate of extension tensile tester with computer interface (a suitable instrument is the EJA Vantage from the Thwing-Albert Instrument Co. Wet Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing Albert) take a CD stack and cut one, 1.00 in ±0.01 in wide by at least 5.0 in long stack of strips (long dimension in CD). In like fashion cut the remaining stack in the MD (strip long dimension in MD), to give a total of 8 specimens, four CD and four MD strips. Each strip to be tested is one usable unit thick, and will be treated as a unitary specimen for testing.

Program the tensile tester to perform an extension test, collecting force and extension data at an acquisition rate of 20 Hz as the crosshead raises at a rate of 6.00 in/min (15.24 cm/min) until the specimen breaks. The break sensitivity is set to 50%, i.e., the test is terminated when the measured force drops to 50% of the maximum peak force, after which the crosshead is returned to its original position.

Set the gage length to 4.00 inches. Zero the crosshead and load cell. Insert the specimen into the upper and lower open grips such that at least 0.5 inches of specimen length is contained each grip. Align specimen vertically within the upper and lower jaws, then close the upper grip. Verify specimen is aligned, then close lower grip. The specimen should be under enough tension to eliminate any slack, but less than 0.05 N of force measured on the load cell. Start the tensile tester and data collection. Repeat testing in like fashion for all four CD and four MD specimens.

Program the software to calculate the following from the constructed force (g) verses extension (in) curve:

Tensile Strength is the maximum peak force (g) divided by the specimen width (1 in), and reported as g/in to the nearest 1 g/in.

Adjusted Gage Length is calculated as the extension measured at 11.12 g of force (in) added to the original gage length (in).

Elongation is calculated as the extension at maximum peak force (in) divided by the Adjusted Gage Length (in) multiplied by 100 and reported as % to the nearest 0.1%.

Tensile Energy Absorption (TEA) is calculated as the area under the force curve integrated from zero extension to the extension at the maximum peak force (g*in), divided by the product of the adjusted Gage Length (in) and specimen width (in). This is reported as $g*in/in^2$ to the nearest 1 $g*in/in^2$.

Replot the force (g) verses extension (in) curve as a force (g) verses strain curve. Strain is herein defined as the extension (in) divided by the Adjusted Gage Length (in).

Program the software to calculate the following from the constructed force (g) verses strain curve:

Tangent Modulus is calculated as the least squares linear regression using the first data point from the force (g) verses strain curve recorded after 38.1 g force and the 5 data points immediately preceding and the 5 data points immediately following it. This slope is then divided by the specimen width (2.54 cm), and then reported to the nearest 1 g/cm.

The Tensile Strength (g/in), Elongation (%), TEA ($g*in/in^2$) and Tangent Modulus (g/cm) are calculated for the four CD specimens and the four MD specimens. Calculate an average for each parameter separately for the CD and MD specimens.

Calculations

Geometric Mean Tensile=Square Root of [MD Tensile Strength (g/in)×CD Tensile Strength (g/in)]

Geometric Mean Peak Elongation=Square Root of [MD Elongation (%)×CD Elongation (%)]

Geometric Mean TEA=Square Root of [MD TEA ($g*in/in^2$)×CD TEA ($g*in/in^2$)]

Geometric Mean Modulus=Square Root of [MD Modulus (g/cm)×CD Modulus (g/cm)]

Total Dry Tensile Strength (TDT)=MD Tensile Strength (g/in)+CD Tensile Strength (g/in)

Total TEA=MD TEA ($g*in/in^2$)+CD TEA ($g*in/in^2$)

Total Modulus=MD Modulus (g/cm)+CD Modulus (g/cm)

Tensile Ratio=MD Tensile Strength (g/in)/CD Tensile Strength (g/in)

Dry Elongation, Tensile Strength, TEA and Modulus Test Methods for Paper Towels (for Facial Tissue, use: "Dry Elongation, Tensile Strength, TEA and Modulus Test Methods for Facial Tissue;" for Toilet Paper, use: "Dry Elongation, Tensile Strength, TEA and Modulus Test Methods for Toilet Paper"):

Elongation, Tensile Strength, TEA and Tangent Modulus are measured on a constant rate of extension tensile tester with computer interface (a suitable instrument is the EJA Vantage from the Thwing-Albert Instrument Co. Wet Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing Albert) take a CD stack and cut one, 1.00 in ±0.01 in wide by at least 5.0 in long stack of strips (long dimension in CD). In like fashion cut the remaining stack in the MD (strip long dimension in MD), to give a total of 8 specimens, four CD and four MD strips. Each strip to be tested is one usable unit thick, and will be treated as a unitary specimen for testing.

Program the tensile tester to perform an extension test, collecting force and extension data at an acquisition rate of 20 Hz as the crosshead raises at a rate of 4.00 in/min (10.16 cm/min) until the specimen breaks. The break sensitivity is set to 50%, i.e., the test is terminated when the measured force drops to 50% of the maximum peak force, after which the crosshead is returned to its original position.

Set the gage length to 4.00 inches. Zero the crosshead and load cell. Insert the specimen into the upper and lower open grips such that at least 0.5 inches of specimen length is contained each grip. Align specimen vertically within the upper and lower jaws, then close the upper grip. Verify specimen is aligned, then close lower grip. The specimen should be under enough tension to eliminate any slack, but less than 0.05 N of force measured on the load cell. Start the tensile tester and data collection. Repeat testing in like fashion for all four CD and four MD specimens.

Program the software to calculate the following from the constructed force (g) verses extension (in) curve:

Tensile Strength is the maximum peak force (g) divided by the specimen width (1 in), and reported as W/in to the nearest 1 g/in.

Adjusted Gage Length is calculated as the extension measured at 11.12 g of force (in) added to the original gage length (in).

Elongation is calculated as the extension at maximum peak force (in) divided by the Adjusted Gage Length (in) multiplied by 100 and reported as % to the nearest 0.1%.

Tensile Energy Absorption (TEA) is calculated as the area under the force curve integrated from zero extension to the extension at the maximum peak force (g*in), divided by the product of the adjusted Gage Length (in) and specimen width (in). This is reported as $g*in/in^2$ to the nearest 1 $g*in/in^2$.

Replot the force (g) verses extension (in) curve as a force (g) verses strain curve. Strain is herein defined as the extension (in) divided by the Adjusted Gage Length (in).

Program the software to calculate the following from the constructed force (g) verses strain curve:

Tangent Modulus is calculated as the least squares linear regression using the first data point from the force (g) verses strain curve recorded after 38.1 g force and the 5 data points immediately preceding and the 5 data points immediately following it. This slope is then divided by the specimen width (2.54 cm), and then reported to the nearest 1 g/cm.

The Tensile Strength (g/in), Elongation (%), TEA (g*in/$in^2$) and Tangent Modulus (g/cm) are calculated for the four CD specimens and the four MD specimens. Calculate an average for each parameter separately for the CD and MD specimens.

Calculations

Geometric Mean Tensile=Square Root of [MD Tensile Strength (g/in)×CD Tensile Strength (g/in)]

Geometric Mean Peak Elongation=Square Root of [MD Elongation (%)×CD Elongation (%)]

Geometric Mean TEA=Square Root of [MD TEA (g*in/$in^2$)×CD TEA (g*in/$in^2$)]

Geometric Mean Modulus=Square Root of [MD Modulus (g/cm)×CD Modulus (g/cm)]

Total Dry Tensile Strength (TDT)=MD Tensile Strength (g/in)+CD Tensile Strength (g/in)

Total TEA=MD TEA (g*in/$in^2$)+CD TEA (g*in/$in^2$)

Total Modulus=MD Modulus (g/cm)+CD Modulus (g/cm)

Tensile Ratio=MD Tensile Strength (g/in)/CD Tensile Strength (g/in)

Flexural Rigidity Method:

This test is based on the cantilever beam principle. A Cantilever Bending Tester such as described in ASTM Standard D1388 is used to measure the distance a strip of sample can be extended beyond a horizontal flat platform before it bends to a ramp angle of 41.5±0.5°. The measured Bend Length, in addition to the Basis Weight and Caliper, of the sample is used to calculate Flexural Rigidity.

Using a 1 inch (2.54 cm) JDC Cutter (available from Thwing-Albert Instrument Company, Philadelphia, PA), carefully cut eight (8) 1 inch (2.54 cm) wide test strips from a fibrous structure sample oriented in the MD direction. From a second fibrous structure sample from the same sample set, carefully cut eight (8) 1 inch (2.54 cm) wide strips of the fibrous structure in the CD direction.

The sample strip must be adjusted to 4.0±0.1 in (101.5±2.5 mm), or 6.0±0.1 in (152±2.5 mm) in length. Towel samples and those products which are perforated into usable units 6 inches (152 mm) or greater in both dimensions without folds or perforations are tested as 6 in (152 mm) strips. Toilet tissue samples and facial tissue samples are tested as 4 in (101.5 mm) long strips. To adjust the strips to length, carefully make a cut exactly perpendicular to the long dimension of the strip near one end using a paper cutter. It is important that the cut be exactly perpendicular to the long dimension of the strip. Make a second cut exactly 4.0±0.1 in (101.5 mm), or 6.0±0.1 in (152±2.5 mm) along the strip, again being careful that the cut is exactly perpendicular to the long dimension of the strip. In the case of perforated or folded products, be sure that all cuts are made in such a way that perforations and/or folds are excluded from the 4.0 (101.5 mm) or 6.0 in (152 mm) strip which will be used for the test. All sample strips should be cut individually with minimal mechanical manipulation. No fibrous structure sample which is creased, bent, folded, perforated, or in any other way weakened should be tested using this test.

Mark the direction (MD or CD) very lightly on one end of the strip, keeping the same surface of the sample up for all strips. Later, half of the strips will be turned over for testing, thus it is important that one surface of the strip be clearly identified, however, it makes no difference which surface of the sample is designated as the upper surface.

Using other portions of the fibrous structure sample (not the cut strips), determine the basis weight of the fibrous structure sample in lbs/3000 $ft^2$ and the caliper of the fibrous structure in mils (thousandths of an inch) using the standard procedures disclosed herein. Place the Cantilever Bending Tester level on a bench or table that is relatively free of vibration, excessive heat and most importantly air drafts. Adjust the platform of the Tester to horizontal as indicated by the leveling bubble and verify that the ramp angle is at 41.5±0.5°. Remove the sample slide bar from the top of the platform of the Tester. Lay one of the strips flat on the horizontal platform using care to align the strip to be parallel with the movable sample slide. Align the end of the strip exactly even with the vertical edge of the Tester where the angular ramp is attached or where the zero mark line is scribed on the Tester. Carefully place the sample slide bar on top of the sample strip in the Tester. The sample slide bar must be carefully placed so that the strip is not wrinkled or moved from its initial position.

Using the sample slide bar, move the strip at a rate of approximately 0.5±0.2 in/second (1.3±0.5 cm/second) toward the end of the Tester to which the angular ramp is attached. This can be accomplished with either a manual or automatic Tester. Ensure that no slippage between the strip and movable sample slide occurs. As the sample slide bar and strip project over the edge of the Tester, the strip will begin to bend, or drape downward. Stop moving the sample slide bar the instant the leading edge of the strip falls level with the ramp edge. Read and record the overhang length from the linear scale to the nearest 0.5 mm Record the distance the sample slide bar has moved in cm as overhang length. This test sequence is performed a total of eight (8)

times for each fibrous structure in each direction (MD and CD). The first four strips are tested with the upper surface as the fibrous structure was cut facing up. The last four strips are inverted so that the upper surface as the fibrous structure was cut is facing down as the strip is placed on the horizontal platform of the Tester.

The average Overhang Lengths (MD, CD, and Avg) and Bend Lengths (MD, CD, and Avg) are determined by the following calculations:

$$\text{Overhang Length } MD = \frac{\text{Sum of 8 } MD \text{ readings}}{8}$$

$$\text{Overhang Length } CD = \frac{\text{Sum of 8 } CD \text{ readings}}{8}$$

$$\text{Overhang Length Average } (Avg) = \frac{\text{Sum of all 16 readings}}{16}$$

$$\text{Bend Length } MD = \frac{\text{Overhang Length } MD}{2}$$

$$\text{Bend Length } CD = \frac{\text{Overhang Length } CD}{2}$$

$$\text{Bend Length Average } (Avg) = \frac{\text{Overhang Length Total}}{2}$$

$$\text{Flexural Rigidity} = 0.1629 \times W \times C$$

Where W is the basis weight of the fibrous structure in lbs/3000 ft$^2$; C is the Bend Length (MD, CD, or Avg) in cm; and the constant 0.1629 is used to convert the basis weight from English to metric units. The results are expressed in mg-cm to the nearest 0.1 mg-cm.

GM Flexural Rigidity=Square root of (MD Flexural Rigidity×CD Flexural Rigidity)

CRT Rate and Capacity Method:

CRT Rate and Capacity values are generated by running the test procedure as defined in U.S. Patent Application No. US 2017-0183824.

Dry and Wet Caliper Test Methods:

Dry and Wet Caliper values are generated by running the test procedure as defined in U.S. Pat. No. 7,744,723 and states, in relevant part:

Dry Caliper Method:

Samples are conditioned at 23+/−1° C. and 50%+/−2% relative humidity for two hours prior to testing.

Dry Caliper of a sample of fibrous structure product is determined by cutting a sample of the fibrous structure product such that it is larger in size than a load foot loading surface where the load foot loading surface has a circular surface area of about 3.14 in 2. The sample is confined between a horizontal flat surface and the load foot loading surface. The load foot loading surface applies a confining pressure to the sample of 14.7 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

Wet Caliper Method:

Samples are conditioned at 23+/−1° C. and 50% relative humidity for two hours prior to testing.

Wet Caliper of a sample of fibrous structure product is determined by cutting a sample of the fibrous structure product such that it is larger in size than a load foot loading surface where the load foot loading surface has a circular surface area of about 3.14 int. Each sample is wetted by submerging the sample in a distilled water bath for 30 seconds. The caliper of the wet sample is measured within 30 seconds of removing the sample from the bath. The sample is then confined between a horizontal flat surface and the load foot loading surface. The load foot loading surface applies a confining pressure to the sample of 14.7 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

Finch Cup Wet Tensile Test Method:

The Wet Tensile Strength test method is utilized for the determination of the wet tensile strength of a sanitary tissue product or web strip after soaking with water, using a tensile-strength-testing apparatus operating with a constant rate of elongation. The Wet Tensile Strength test is run according to ISO 12625-5:2005, except for any deviations or modifications described below. This method uses a vertical tensile-strength tester, in which a device that is held in the lower grip of the tensile-strength tester, called a Finch Cup, is used to achieve the wetting.

Using a one inch MC precision sample cutter (Thwing Albert) cut six 1.00 in±0.01 in wide strips from a sanitary tissue product sheet or web sheet in the machine direction (MD), and six strips in the cross machine direction (CD). An electronic tensile tester (Model 1122, Instron Corp., or equivalent) is used and operated at a crosshead speed of 1.0 inch (about 1.3 cm) per minute and a gauge length of 1.0 inch (about 2.5 cm). The two ends of the strip are placed in the upper jaws of the machine, and the center of the strip is placed around a stainless steel peg. The strip is soaked in distilled water at about 20° C., for the identified soak time, and then measured for peak tensile strength. Reference to a machine direction means that the sample being tested is prepared such that the length of the strip is cut parallel to the machine direction of manufacture of the product.

The MD and CD wet peak tensile strengths are determined using the above equipment and calculations in the conventional manner. The reported value is the arithmetic average of the six strips tested for each directional strength to the nearest 0.1 grains force. The total wet tensile strength for a given soak time is the arithmetic total of the MD and CD tensile strengths for that soak time. Initial total wet tensile strength ("ITWT") is measured when the paper has been submerged for 5±0.5 seconds. Decayed total wet tensile ("DTWT") is measured after the paper has been submerged for 30±0.5 minutes.

This method is typically used for sanitary tissue products in the form of toilet (or bath) tissue.

Wet Decay Test Method:

Wet decay (loss of wet tensile) for a sanitary tissue product or web is measured according to the Wet Tensile Test Method described herein and is the wet tensile of the sanitary tissue product or web after it has been standing in the soaked condition in the Finch Cup for 30 minutes. Wet decay is reported in units of "%". Wet decay is the % loss of Initial Total Wet Tensile after the 30 minute soaking.

Dry Burst ("Dry Burst Strength" or "Dry Burst (Peak Load) Strength") Test Method:

The Dry Burst Test is run according to ISO 12625-9:2005, except for any deviations described below. Sanitary tissue product samples or web samples for each condition to be tested are cut to a size appropriate for testing, a minimum of five (5) samples for each condition to be tested are prepared.

A burst tester (Burst Tester Intelect-H-STD Tensile Test Instrument, Cat. No. 1451-24PGB available from Thwing-Albert Instrument Co., Philadelphia, Pa., or equivalent) is set up according to the manufacturer's instructions and the following conditions: Speed: 12.7 centimeters per minute; Break Sensitivity: 20 grams; and Peak Load: 2000 grams. The load cell is calibrated according to the expected burst strength.

A sanitary tissue product sample or web sample to be tested is clamped and held between the annular clamps of the burst tester and is subjected to increasing force that is applied by a 0.625 inch diameter, polished stainless steel ball upon operation of the burst tester according to the manufacturer's instructions. The burst strength is that force that causes the sample to fail.

The burst strength for each sanitary tissue product sample or web sample is recorded. An average and a standard deviation for the burst strength for each condition is calculated.

The Dry Burst is reported as the average and standard deviation for each condition to the nearest gram.

Residual Water ($R_w$) Test Method:

This method measures the amount of distilled water absorbed by a paper product. In general a finite amount of distilled water is deposited to a standard surface. A paper towel is then placed over the water for a given amount of time. After the elapsed time the towel is removed and the amount of water left behind and amount of water absorbed are calculated.

The temperature and humidity are controlled within the following limits

Temperature: 23° C.±1" C. (73° F.±2° F.)

Relative humidity: 50%±2%

The following equipment is used in this test method. A top loading balance is used with sensitivity: ±0.01 grams or better having the capacity of grams minimum A pipette is used having a capacity of 5 mL and a Sensitivity±1 mL. A Formica™ Tile 6 in×7 in is used. A stop watch or digital timer capable of measuring time in seconds to the nearest 0.1 seconds is also used.

Sample and Solution Preparation

For this test method, distilled water is used, controlled to a temperature of 23° C.±1° C. (73° F.±2° F.). For this method, a usable unit is described as one finished product unit regardless of the number of plies. Condition the rolls or usable units of products, with wrapper or packaging materials removed in a room conditioned at 50%±2% relative humidity, 23° C.±1° C. (73° F.±2° F.) for a minimum of two hours. Do not test usable units with defects such as wrinkles, tears, holes etc.

Paper Samples

Remove and discard at least the four outermost usable units from the roll. For testing remove usable units from each roll of product submitted as indicated below. For Paper Towel products, select five (5) usable units from the roll. For Paper Napkins that are folded, cut and stacked, select five (5) usable units front the sample stack submitted for testing. For all napkins, either double or triple folded, unfold the usable units to their largest square state. One-ply napkins will have one 1-ply layer; 2-ply napkins will have one 2-ply layer. With 2-ply napkins, the plies may be either embossed (just pressed) together, or embossed and laminated (pressed and glued) together. Care must be taken when unfolding 2-ply usable units to keep the plies together. If the unfolded usable unit dimensions exceed 279 mm (11 inches) in either direction, cut the usable unit down to 279 mm (11 inches). Record the original usable unit size if over 279 ram (11 inches). If the unfolded usable unit dimensions are less than 279 Mill 1 inches) in either direction, record the usable unit dimensions.

Place the Formica Tile (standard surface) in the center of the cleaned balance surface. Wipe the Formica Tile to ensure that it is dry and free of any debris. Tare the balance to get a zero reading. Slowly dispense 2.5 mL of distilled water onto the center of the standard surface using the pipette. Record the weight of the water to the nearest 0.001 g. Drop 1 usable unit of the paper towel onto the spot of water with the outside ply down. Immediately start the stop watch. The sample should be dropped on the spot such that the spot is in the center of the sample once it is dropped. Allow the paper towel to absorb the distilled water for 30 seconds after hitting the stop watch. Remove the paper from the spot after the 30 seconds has elapsed. The towel must be removed when the stop watch reads 30 seconds±0.1 sec. The paper towel should be removed using a quick vertical motion. Record the weight of the remaining water on the surface to the nearest 0.001 g.t Calculations where:

n=the number of replicates which for this method is 5.

Record the RWV to the nearest 0.001 g.

Breaking Length Test Method:

Handsheet Preparation

Low Density handsheets are made essentially according to TAPIA standard T205, with the following modifications which are believed to more accurately reflect the tissue manufacturing process.

(1) tap water, with no pH adjustment, is used;

(2) the embryonic web is formed in a 12 in. by 12 in. handsheet making apparatus on a monofilament polyester wire supplied by Appelton Wire Co., Appelton, Wis. with the following specifications:

Size: 13.5 inch×13.5 inch

Machine direction Warp Count: 84 1.5 fibers/inch

Cross direction Warp Count: 76±3.0 fibers/inch

Warp size/type: 0.17 millimeters/9FU

Shute size/type: 0.17 millimeters/WP-110

Caliper: 0.016±0.0005 inch

Air permeability: 720±25 cubic feet/minute (3) the embryonic web is transferred by vacuum from the monofilament polyester wire to a monofilament polyester papermaking fabric supplied by Appelton Wire Co., Appelton, Wis. and dewatered by vacuum suction instead of pressing; Fabric specifications:

Size: 16 inch×14 inch

Machine direction Warp Count: 36±1 fibers/inch

Cross direction Warp Count: 30±3 fibers/inch

Warp size/type: Shute size/type: 0.40 millimeters/WP-87-12A-W 0.40 millimeters/WP-801-12A-W Caliper: 0.0270±0.001 inch Air permeability: 397±25 cubic feet/minute Sheet Side to be Monoplane Transfer and dewatering details: The embryonic web and papermaking wire are placed on top of the fabric such that the embryonic web contacts the fabric. The trilayer (wire, web, fabric with fabric side down) is then passed lengthwise across a 13 in.×1/16 in. wide vacuum slot box with a 90 degree flare set at a peak gauge reading of approximately 4.0 in. of mercury vacuum. The rate of the trilayer passing across the vacuum slot should be uniform at a velocity of 16±5 in./sec.

The vacuum is then increased to achieve a peak gauge reading of approximately 9 in. of mercury vacuum and the trilayer is passed lengthwise across the same vacuum slot at the same rate of 16±5 in./sec 2 more times. Note that the peak gauge reading is the amount of vacuum measured as the trilayer passes across the slot. The web is carefully removed from the wire to ensure that no fibers stick to the wire.

(4) the sheet is then dried on a rotary drum drier with a drying felt by passing the web and fabric between the felt and drum with the fabric against the drum surface and again with a second pass with the web against the drum surface.

Dryer specifications: Stainless steel polished finish cylinder with internal steam heating, horizontally mounted.

External dimensions: 17 inches length×13 inches diameter

Temperature: 230±5 degrees Fahrenheit.

Rotation speed: 0.90±0.05 revolutions/minute

Dryer felt: Endless, 60 inches wide. No. 11614, style X225, all wool. Noble and Wood Lab circumference by 16 inches Machine Company, Hoosick Falls, NY.

Felt tension: As low and even as possible, without any slippage occurring between the felt and dryer drum and uniform tracking.

(5) the resulting handsheet is 12 in.×12 in. with a resulting target basis weight of 16.5±1.5 pounds per 3,000 ft$^2$ and a target density of 0.15±0.06 g/cc, unless otherwise noted.

Sample Preparation

Condition the handsheet to be tested for a minimum of 2 hours in a room controlled to 73° F.±2° F. (2.3° C.±1° C.) 50±2% relative humidity. After conditioning the handsheet for at least the minimum time period, measure and record the Basis Weight of the handsheet. The Basis Weight should be within the range 15.0-18.0 pounds per 3000 square feet, if the Basis Weight of the handsheet falls outside of this range the handsheet should be discarded and a new one made. From the handsheet, cut eight sample strips 1.00 inch wide and at least 6-7 inches long in the cross direction (only) using a precision 1" cutter or an appropriate die.

Measurement

Using art electronic tensile tester (Thwing Albert EJA or Intellect II-STD, Corp., Philadelphia, Pa., or equivalent) measure the Tensile Strength of each of the eight sample strips. To perform the test, set the gage length to 4.00 inches, properly secure the sample strip into the upper and lower grips, and perform an extension test, collecting force and extension data as the crosshead raises at a rate of 0.5 in/min until the sample breaks. The resulting Tensile Strength values for each of the eight individual sample strips are recorded in gun. The Tensile Strength is the maximum peak force (g) divided by the specimen width (1 in), and reported as g/in to the nearest 1 g/in.

Calculations

Calculate the Average Tensile Strength of the eight test strips using the following formula:

$$\text{Average Tensile Strength} = \frac{\text{Sum of tensile strengths measured}}{\text{number of strips tested}}$$

Basis weight corrected tensile (BWCT) is calculated via the following formula:

$$BWCT = \text{Average Tensile Strength} \times \frac{10.5}{(\text{Basis Weight} - 6.0)}$$

Where Basis Weight has the units of pounds per 3000 ft$^2$ and Average Tensile Strength and BWCT have the units of g/in. This equation has the effect of normalizing the strength of the tensile strip to a standard 16.5 pound/3000 ft$^2$ weight when the handsheet is in the specified 15-18 pound/3000 ft$^2$ range.

Breaking Length is then calculated by the following formula:

$$\text{Breaking Length} = BWCT \times 1.4673$$

Where Breaking Length has the units of meters reported to the nearest whole meter.

Regarding the Present Disclosure

In the interests of brevity and conciseness, any ranges of values set forth in this specification are to be construed as written description support for Claims reciting any sub-ranges having endpoints which are whole number values within the specified range in question. By way of a hypothetical illustrative example, a disclosure in this specification of a range of 1-5 shall be considered to support Claims to any of the following sub-ranges: 1-4; 1-3; 1-2; 2-5; 2-4; 2-3; 3-5; 3-4; and 4-5.

The dimensions and values disclosed herein in this application are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any example disclosed or claimed herein or that it alone, or in any combination with any other reference or references, teaches, suggests or discloses any such example. Further, to the extent that any meaning or definition of a term in this document conflicts with any meaning or definition of the same term in a document incorporated by reference, the meaning or definition assigned to that term in this document shall govern.

While particular examples of the present disclosure have been illustrated and described, it would be obvious to those skilled in the art that various other changes and modifications can be made without departing from the spirit and scope of the present disclosure. It is therefore intended to cover in the appended Claims all such changes and modifications that are within the scope of this disclosure.

What is claimed is:

1. A two-ply sanitary tissue product, comprising:
   at least about 5% to about 100% by weight non-wood fibers selected from the group consisting of bamboo, abaca, and mixtures thereof;
   wherein the two-ply sanitary tissue product comprises at least one multi-layered fibrous structure ply comprising a plurality of layers, wherein all of the layers of the at least one multi-layered fibrous structure ply comprise at least about 5% by weight of the layer of the non-wood fibers; and wherein the two-ply sanitary tissue product exhibits a TS7 of less than about 14 dB V2 rms.

2. The two-ply sanitary tissue product of claim 1, wherein the non-wood fibers consist of bamboo fibers.

3. The two-ply sanitary tissue product of claim 1, wherein the two-ply sanitary tissue product is a two-ply toilet tissue.

4. The two-ply sanitary tissue product of claim 1, wherein the two-ply sanitary tissue product comprises greater than about 30% to about 100% by weight of the non-wood fibers.

5. A two-ply sanitary tissue product, comprising:
at least about 5% to about 100% by weight bamboo fibers; wherein the two-ply sanitary tissue product comprises at least one multi-layered fibrous structure ply comprising a plurality of layers, wherein all of the layers of the at least one multi-layered fibrous structure ply comprise at least about 5% by weight of the layer of the bamboo fibers; and
wherein the two-ply sanitary tissue product exhibits a TS750 less than about 45 dB V2 rms.

6. The two-ply sanitary tissue product of claim 5, wherein the two-ply sanitary tissue product is a two-ply multi-ply toilet tissue.

7. The two-ply sanitary tissue product of claim 5, wherein the two-ply sanitary tissue product comprises greater than about 30% to about 100% by weight of the bamboo fibers.

8. The two-ply sanitary tissue product of claim 5, wherein the two-ply sanitary tissue product comprises greater than about 75% to about 100% by weight of the bamboo fibers.

9. A two-ply sanitary tissue product, comprising:
at least about 5% to about 100% by weight non-wood fibers selected from the group consisting of bamboo, abaca, and mixtures thereof;
wherein the two-ply sanitary tissue product comprises wherein the two-ply sanitary tissue product comprises at least one multi-layered fibrous structure ply comprising a plurality of layers, wherein all of the layers of the at least one multi-layered fibrous structure ply comprise at least about 5% by weight of the layer of non-wood fibers; and
wherein the two-ply sanitary tissue product exhibits a TS750 less than about 45 dB V2 rms.

10. The two-ply multi-ply sanitary tissue product of claim 9, wherein the two-ply sanitary tissue product comprises a structured fibrous structure.

11. The two-ply sanitary tissue product of claim 9, wherein the two-ply sanitary tissue product is a two-ply multi-ply toilet tissue.

12. The two-ply sanitary tissue product of claim 9, wherein the two-ply sanitary tissue product comprises greater than about 30% to about 100% by weight of the non-wood fibers.

13. The two-ply sanitary tissue product of claim 9, wherein the two-ply sanitary tissue product exhibits a TS750 of less than 40 dB V2 rms.

14. The two-ply sanitary tissue product of claim 9, wherein the two-ply sanitary tissue product exhibits a TS750 of from about 25 to about 35 dB V2 rms.

15. A multi-ply sanitary tissue product, comprising:
at least about 5% to about 100% by weight non-wood fibers selected from the group consisting of bamboo, abaca, and mixtures thereof;
wherein the multi-ply sanitary tissue product comprises at least one multi-layered fibrous structure ply comprising a plurality of layers, wherein all of the layers of the at least one multi-layered fibrous structure ply comprise at least about 5% by weight of the layer of the non-wood fibers and wherein the at least one multi-layered fibrous structure ply forms an exterior ply of the multi-ply sanitary tissue product; and
wherein the multi-ply sanitary tissue product exhibits a TS7 of less than about 14 dB V2 rms.

16. The multi-ply sanitary tissue product of claim 15, wherein the non-wood fibers consist of bamboo fibers.

17. The multi-ply sanitary tissue product of claim 15, wherein the multi-ply sanitary tissue product is a multi-ply toilet tissue.

18. The multi-ply sanitary tissue product of claim 15, wherein the multi-ply sanitary tissue product comprises greater than about 30% to about 100% by weight of the non-wood fibers.

19. A multi-ply sanitary tissue product, comprising:
at least about 5% to about 100% by weight bamboo fibers; wherein the multi-ply sanitary tissue product comprises at least one multi-layered fibrous structure ply comprising a plurality of layers, wherein all of the layers of the at least one multi-layered fibrous structure ply comprise at least about 5% by weight of the layer of the bamboo fibers and wherein the at least one multi-layered fibrous structure ply forms an exterior ply of the multi-ply sanitary tissue product; and
wherein the multi-ply sanitary tissue product exhibits a TS750 less than about 45 dB V2 rms.

20. The multi-ply sanitary tissue product of claim 19, wherein the multi-ply sanitary tissue product is a multi-ply toilet tissue.

21. The multi-ply sanitary tissue product of claim 19, wherein the multi-ply sanitary tissue product comprises greater than about 30% to about 100% by weight of the bamboo fibers.

22. The multi-ply sanitary tissue product of claim 19, wherein the multi-ply sanitary tissue product comprises greater than about 75% to about 100% by weight of the bamboo fibers.

23. A multi-ply sanitary tissue product, comprising:
at least about 5% to about 100% by weight non-wood fibers selected from the group consisting of bamboo, abaca, and mixtures thereof;
wherein the multi-ply sanitary tissue product comprises wherein the multi-ply sanitary tissue product comprises at least one multi-layered fibrous structure ply comprising a plurality of layers, wherein all of the layers of the at least one multi-layered fibrous structure ply comprise at least about 5% by weight of the layer of non-wood fibers and wherein the at least one multi-layered fibrous structure ply forms an exterior ply of the multi-ply sanitary tissue product; and
wherein the multi-ply sanitary tissue product exhibits a TS750 less than about 45 dB V2 rms.

24. The multi-ply sanitary tissue product of claim 23, wherein the multi-ply sanitary tissue product comprises a structured fibrous structure.

25. The multi-ply sanitary tissue product of claim 23, wherein the multi-ply sanitary tissue product is a multi-ply toilet tissue.

26. The multi-ply sanitary tissue product of claim 23, wherein the multi-ply sanitary tissue product comprises greater than about 30% to about 100% by weight of the non-wood fibers.

27. The multi-ply sanitary tissue product of claim 23, wherein the multi-ply sanitary tissue product exhibits a TS750 of less than 40 dB V2 rms.

28. The multi-ply sanitary tissue product of claim 23, wherein the multi-ply sanitary tissue product exhibits a TS750 of from about 25 to about 35 dB V2 rms.

* * * * *